US007096188B1

(12) United States Patent
Schlick et al.

(10) Patent No.: US 7,096,188 B1
(45) Date of Patent: Aug. 22, 2006

(54) METHOD AND APPARATUS FOR PROBLEM SOLVING, DECISION MAKING AND STORING, ANALYZING, AND RETRIEVING ENTERPRISEWIDE KNOWLEDGE AND CONCLUSIVE DATA

(75) Inventors: James D. Schlick, Langhorne, PA (US); Andrew D. Longman, Frenchtown, NJ (US); Betsy L. Alvarez, Somerset, NJ (US); Rachel Cline, Brooklyn, NY (US); Gloria Gery, Tolland, MA (US); Barbara Stoeber, Belle Mead, NJ (US); James Mullins, East Windsor, NJ (US)

(73) Assignee: Kepner-Tregoe, Inc., Princeton, NJ (US)

( * ) Notice: Subject to any disclaimer, the term of this patent is extended or adjusted under 35 U.S.C. 154(b) by 0 days.

(21) Appl. No.: 09/493,783

(22) Filed: Jan. 28, 2000

Related U.S. Application Data

(63) Continuation of application No. 09/347,238, filed on Jul. 2, 1999, now abandoned.

(60) Provisional application No. 60/133,746, filed on May 12, 1999, provisional application No. 60/091,476, filed on Jul. 2, 1998.

(51) Int. Cl.
*G06F 17/60* (2006.01)

(52) U.S. Cl. .......................................................... 705/7

(58) Field of Classification Search ................ 705/7–9, 705/11; 706/11, 45, 46, 50, 59, 61, 62
See application file for complete search history.

(56) References Cited

U.S. PATENT DOCUMENTS

| | | | | |
|---|---|---|---|---|
| 5,237,497 A | | 8/1993 | Sitarski | 705/8 |
| 5,321,605 A | | 6/1994 | Chapman et al. | 705/7 |
| 5,331,545 A | | 7/1994 | Yajima et al. | 705/8 |
| 5,521,814 A | | 5/1996 | Teran et al. | 700/266 |
| 5,521,815 A | | 5/1996 | Rose, Jr. | 705/28 |
| 5,537,590 A | * | 7/1996 | Amado | 706/45 |
| 5,675,745 A | | 10/1997 | Oku et al. | 705/7 |
| 5,737,727 A | | 4/1998 | Lehmann et al. | 705/7 |
| 5,963,931 A | * | 10/1999 | Fagg et al. | 706/50 |
| 6,053,737 A | * | 4/2000 | Babbitt et al. | 434/40 |
| 6,151,565 A | * | 11/2000 | Lobley et al. | 703/2 |
| 6,308,162 B1 | * | 10/2001 | Ouimet et al. | 705/7 |

FOREIGN PATENT DOCUMENTS

JP 08083182 A * 3/1996

OTHER PUBLICATIONS

Browning, Dave, "Database Design Techniques," PC Tech Journal, vol. 5, No. 7, p. 112(12), Jul. 1987.*

Lee, Heeseok, "Justifying Database Normalization: A Cost/Benefit Model," Information Processing & Management, vol. 31, No. 1, pp. 59-67, Jan.-Feb. 1995.*

Kepner Tregoe, Problem Solving & Decision Making, Workshop Concept Briefings in Microsoft PowerPoint®, Copyright 1996, Kepner-Tregoe, Inc. *Printout of floppy disk contents.*

(Continued)

*Primary Examiner*—Susanna M. Diaz
(74) *Attorney, Agent, or Firm*—Mintz Levin Cohn Ferris Glovsky & Popeo, PC

(57) ABSTRACT

A computer software application, graphical user interface, and method for entering information concerning a complex business situation, refining such information in a stepwise manner through the interface, generating a list of effective actions for addressing such a business situation, and storing such information in a knowledge base adapted for future query and reporting use of such a complex business situations is provided.

90 Claims, 149 Drawing Sheets

OTHER PUBLICATIONS

Kepner Tregoe, Problem Solving & Decision Making, Instructor Outline, Copyright 1996 by Kepner-Tregoe.
Kepner Tregoe, Problem Solving & Decision Making, Instructor Manual, Copyright 1965 by Kepner-Tregoe.
Kepner Tregoe, Participant's Guide, Copyright 1996 by Kepner-Tregoe.
RMC, Ltd.., "Problem Solving & Decision Making User's Guide".
Executive Development, Inc., print-outs of on-screen worksheets from Decision Focus software, date unknown.
Apian Software, Inc., Decision Pad User Guide, Rev.2.0, Oct. 1991.
Decision Focus Software, version 1.0 User's Guide, copyrighted 1995.
Figures 1-24, which are screen shots from Decision Focus Software, version 1.0.
Decision Focus Software Network Version 1.0 User'sGuide, copyrighted 1995.
Excerpt from "3M Stemwinder," published May 10, 1995.
1996 ASTD Buyer's Guide & Consultant Directory, published Nov. 1995.
*Kepner-Tregoe, Inc. v. Executive Development, Inc.*, Civ. No. 97-CV-3473 (D. N.J. 1999), p. 4, App. 0006.
Molloy Group Incorporated, "Exceeding Customer Expectations Through Knowledge Management", Knowledge Bridge™ The Molly Group Parsippany, NJ 07054, Date Unknown.
Decision Systems, Inc, "A Quick Hands-On With Reason® for TQM", Decision Systems Inc, 1995.
Peter Dorfman, "Call Center Solutions—Knowledge Metrics—New Ways to Benefit from What You Know", TMC, vol. 17, No. 1, Jul. 1998.
Molloy Group Incorporated, "Internet Knowledge Kisok™—Internet Support for Real Time Solutions"., The Molly Group Parsippany, NJ 07054, 1998.
Molloy Group Incorporated, "Lantimes" Net Applications, vol. 15, Issue 9, 1998.
Molloy Group Incorporated, "Keeping the Motor Humming with Data", PCWeek, Feb. 1998.
David Bank, "The New Worker—Know It Alls", Technology Sections, Wall Street Journal, Nov. 1996.
Sam Albert., "Commentary—Knowledge-based Customer Support Works?", The AS/400 News Source—Midrange Systems, BCI Publication, Vol.. 10, No. 3 1997.
Rebecca Quick, "Just Like Us—To be Truly Useful, Computers are Going to Have to Start Acting a Lot More Human", The Wall Street Journal, Jun. 16, 1997.
Molloy Group Incorporated, "Knowledge Bridge—Practical Applications of Knowledge for Customer Interactions Systems", Technology White Paper, Jan. 1998.
Dashper et al., "TapRoot Events and Casual Factors Charter", User's Guide, Version 1.0a, 1996.
Steve Dashper., TapRoot for Windows—Software for Root Cause Analysis, Incident Reporting, Trending and Corrective Action Tracking', User's Guide, Version 1.0 1996.
Kepner Tregoe "Decision Aide II" User Manual.
Kepner Tregoe "Trouble Shooter II" User Manual.
Kepner Tregoe "Trouble Shooter IBM Hardware Guide".
Kepner Tregoe "Planning Pro" User Manual.
Decision Aide II software (2 disks).
Planning Pro software (3 disks).
Trouble Shooter software (1984 version) (3 disks).
Trouble Shooter software (1985 version) (1 disk).
Trouble Shooter software (1986 version) (2 disks).
Jago and Vroom. (1987) "A Normative Model of Leadership Styles".
Jago and Vroom. (1986) "Managing Participation in Organizations (MPO): A Computer Program" *Al Software*.
Jago and Vroom. (1988) *The New Leadership*. Prentice-Hall, Inc., New Jersey (title page and table of contents only).
A copyrighted work entitled APEX II deposited in the Copyright Office with claim of copyright registered under No. A 550880.
A copyrighted work entitled GENCO II deposited in the Copyright Office with claim of copyright registered under No. A 550878.

* cited by examiner

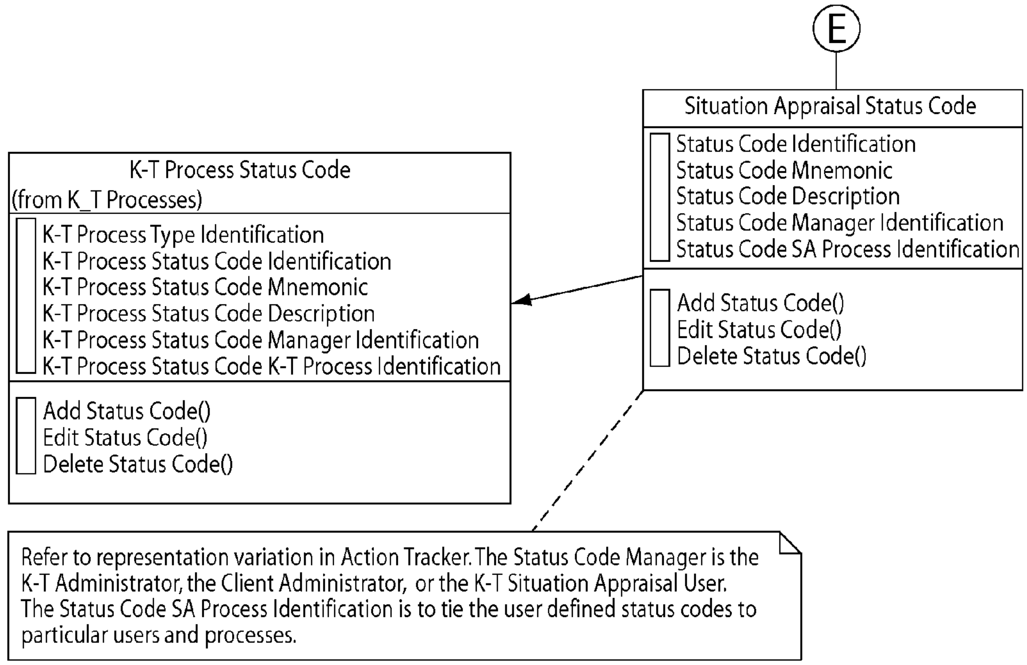

Establish priority:
Select a concern that seems to be the highest priority.
Select another and place it above or below the first concern in priority.
Select a third and place it relative to the first two concerns. Use drag and drop graphically.
Select additional concerns sequentially and place as above.
Select those that represent the group classified as H for High Priority and designate as such.
Select from the remainder those that represent the Group classified as M for Medium Priority and designate as such.
The remainder are classified as L for Low Priority and are designated as such.

Karl,

As a follow up to our discussion I want to confirm that we do need some type of ordering control in the SA grid on the initial "list concerns" screens. We may also want to allow this on the "separate and clarify" grid; however, in this case, the user could still only order the parent cells (with the children following the parents). they could not order children cells individually.

I can see where this functionality could be useful any time we have a single-column grid, such as in DA (list Objectives and List Alternatives) and PPA/POA (list Potential Problems/Opportunities).

Nikki

Fig. 44C

METHOD AND APPARATUS FOR PROBLEM SOLVING, DECISION MAKING AND STORING, ANALYZING, AND RETRIEVING ENTERPRISEWIDE KNOWLEDGE AND CONCLUSIVE DATA

CROSS REFERENCE TO RELATED APPLICATIONS

This application claims priority under 35 U.S.C. §119(e) to U.S. Provisional Patent Application No. 60/091,476, filed Jul. 2, 1998, entitled ELECTRONIC TOOL, and U.S. Provisional Patent Application No. 60/133,746, filed May 12, 1999, entitled ELECTRONIC TOOL, both incorporated herein by reference.

This application is a continuation and claims priority under 35 U.S.C. 120 to U.S. application Ser. No. 09/347,238, filed Jul. 2, 1999, entitled METHOD AND APPARATUS FOR PROBLEM SOLVING, DECISION MAKING AND STORING, ANALYZING, AND RETRIEVING ENTERPRISEWIDE KNOWLEDGE AND CONCLUSIVE DATA now abandoned.

STATEMENT REGARDING FEDERALLY SPONSORED RESEARCH OR DEVELOPMENT

Not Applicable

NOTICE REGARDING COPYRIGHTED MATERIAL PURSUANT TO 37 CFR § 1.71

A portion of the disclosure of this patent document contains material which is subject to copyright protection. The copyright owner has no objection to the reproduction by anyone of the patent document or the patent disclosure, as it appears in the Patent and Trademark Office file or records, but otherwise reserves all copyright rights.

BACKGROUND OF THE INVENTION

Modern business enterprises must address issues surrounding the business in a systematic, often time-driven, manner. Such business enterprises typically have an organizational structure, often of a hierarchical or matrix form, to define the various groups of individuals responsible for a particular area of the business. Often a particular issue evokes different concerns from different groups, resulting in differing definitions of a problem to be addressed. Further, individuals within the groups may not have the knowledge, or expertise, to effectively address a particular problem or decision, due to factors such as inexperience or lack of longevity in a particular role.

Lines of communication can become blurred when individuals assume they share a common understanding of a problem. The notion of a problem surrounding a complex situation can have different meanings to different groups or individuals within the business enterprise. The term "problem" is often used indiscriminately to define factors such as a complex situation requiring action, a malfunction or error, the cause of a malfunction or error, a difficult choice, or future trouble. Each of these concerns requires different action, yet all elements may be common to a particular situation. Prior to implementing action, such a situation must be broken down into a manageable set of issues which require action, and which can be verified as the correct set of issues which will resolve the situation.

Effectively addressing the issues presented by such a complex situation, therefore, requires clarification of the exact issues to be acted upon. However, as indicated above, different groups and/or individuals have different needs, and each may have a different definition of the problem, depending on how the complex situation affects the responsibilities of that group and/or individual. Further, employment terminations, transfers, and organizational changes can result in a lack of individuals with expertise and experience concerning such a complex situation. Such factors can cause a business enterprise to implement ineffective actions, perform duplicative acts, or even to implement actions which exacerbate the situation.

It would be beneficial to provide a computer software program adapted to provide an interactive interface to receive information surrounding such a complex situation, display such information in a format which allows the user to refine issues in a stepwise manner, and store such information, including both the solution or resolution and the thought processes that created them, for subsequent query and retrieval by multiple users for addressing future such complex situations.

BRIEF SUMMARY OF THE INVENTION

A computer software application, graphical user interface (GUI), and method for entering information concerning a complex business situation, refining such information in a stepwise manner through such an interface, generating a list of effective actions for addressing such a business situation, and storing such information in a knowledge base adapted for future query and reporting use for such complex business situations, is provided. A set or sequence of process screen structures allows entry of specific aspects of such a situation to generate such an action list. Such process screen sequences provide a systematic method to gather and organize information effectively in order to resolve a complex situation, and to store such information in a knowledge base for later query and retrieval for the same or similar situations, thereby preserving enterprisewide knowledge and expertise. An action tracker interface is also provided which provides task management and monitoring of the various actions determined by the process screen sequences. The user has the ability to access the process screens in a non-linear mode and can toggle between interview and worksheet modes described further below.

A situation appraisal process screen sequence provides a starting point in assessing a complex or ill-defined business situation. An interface for entering concerns presented by such a situation is presented to a user, and allows prioritization and categorization of such concerns. In this manner a user determines which concerns should be addressed first, and whether these concerns present a problem to be resolved, a decision to be made, or a potential problem which could result from a present plan or decision. A list of actions to be undertaken by groups or individuals is defined through the action tracker interface to address the prioritized concerns, and includes an indication of which of the other process screen sequences should be undertaken: problem analysis, decision analysis, and/or potential problem/opportunity analysis.

A problem analysis process screen sequence provides an interface for entering information surrounding the problem in a selectively sequential, orderly manner, and for entering possible causes for the problem by drawing on the experience of the user and the knowledge base of past situations. Possible causes are then evaluated and eliminated in a prioritized manner to determine which possible cause explains the facts presented by the problem, and confirmed to be the true cause by verifying any questionable information pointing to the most probable cause. Actions and tasks needed to be undertaken to verify the most probable cause are assigned and monitored through the action tracker interface.

A decision analysis process screen sequence provides an interface to allow entry of a PURPOSE OF A DECISION based on specific lists of results sought, and entering alternatives which might satisfy each result. Alternatives are then considered with respect to each result. Various risks associated with each alternative are entered, and are ranked based on magnitude and probability. A decision choice is then determined by scrolling through and balancing the alternatives and risks. A decision analysis may be undertaken based on a situation appraisal, may be used to assess several possible causes resulting from a problem analysis, or may be undertaken independently. Actions needed to implement the decision are then entered and tracked using the action tracker interface.

A potential problem/opportunity analysis process screen sequence provides an interface to assess and determine actions to mitigate or eliminate future possible problems and capitalize on opportunities which may arise during implementation of decisions and plans. This process screen sequence may be undertaken as indicated by a situation appraisal, may be used to evaluate a decision indicated by a decision analysis, or may be undertaken independently. Possible future problems or opportunities are identified and entered, and likely causes of each future problem are identified. Preventative actions which serve to reduce the likelihood of occurrence of each of the future problems are developed by scrolling through the likely causes, and contingent actions which may mitigate the result should the future problem occur despite the preventative action are also entered. Tasks required to implement the preventative actions and contingent actions are then entered and tracked using the action tracker interface.

One embodiment of the invention provides a method of gathering, processing, storing, and displaying information concerning a complex business situation. The method includes: providing a graphical user interface for entering data concerning said complex business situation; refining said data in a predetermined, stepwise manner through user interaction with the graphical user interface; generating, through the stepwise manner and the graphical user interface, a list of effective actions for addressing the complex business situation; and storing the data in an indexed and normalized form in a knowledge base adapted for structured query and retrieval in performing the steps of refining and generating.

Another embodiment of the invention provides a computer program product. The product includes computer readable program code fixed on a computer readable medium operable to receive, process, store, and display information concerning a complex business situation. The code includes: computer readable program code for providing a graphical user interface for entering data concerning the complex business situation; computer readable program code for refining the data in a predetermined, stepwise manner through user interaction with the graphical user interface; computer readable program code for generating a list of effective actions for addressing the complex business situation through use of the computer readable program code for refining the data; and computer readable program code for storing the data in an indexed and normalized form in a knowledge base adapted for structured query and retrieval by the computer readable program code for refining the data and the computer readable program code for generating the list.

Yet another embodiment of the invention provides an apparatus for gathering, processing, storing, and displaying information concerning a complex business situation. The apparatus includes: a graphical display device operable to provide a graphical user interface for entering data concerning the complex business situation; a digital input device for entering the data; a first memory for storing the data for indexed retrieval; a processor for refining the data stored in the first memory in a predetermined, stepwise manner through user interaction with the graphical user interface and the digital input device; a second memory having a set of instructions operable by the processor to generate, through the stepwise manner and the graphical user interface, a list of effective actions for addressing the complex business situation; and a third memory operable to store the entered data and the refined data in an indexed and normalized form in a knowledge base adapted for structured query and retrieval.

BRIEF DESCRIPTION OF THE SEVERAL VIEWS OF THE DRAWING

The invention as defined herein will be more fully understood by reference to the following drawings and detailed description of the drawings, of which:

FIGS. 44*a*–44*c* show the situation appraisal class inheritance graph;

DETAILED DESCRIPTION OF THE INVENTION

Figure 1:
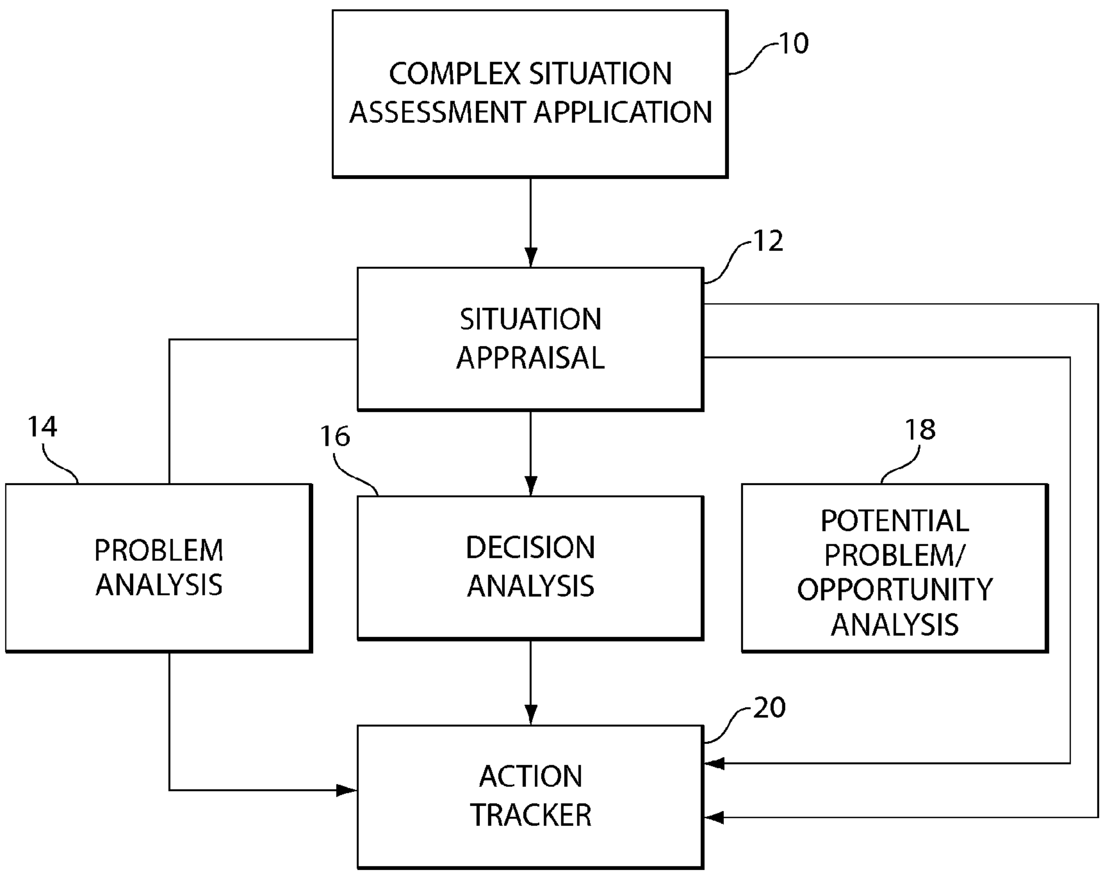
FIG. 1 shows a top level functional block diagram.

The top level functional block diagram of the complex situation assessment process screen sequences 10 as defined herein is shown in FIG. 1. Situation appraisal 12 is typically most applicable to an initial assessment and enumeration of concerns surrounding a situation. This appraisal results in an indication of which of the process screen sequences, problem analysis 14, decision analysis 16, or potential problem/opportunity analysis 18, is most applicable to a particular concern. Each of the three analysis process screen sequences 14, 16, 18 may also be invoked independently irrespective of a corresponding situation analysis. Action tracker interface 20 is available from all process screen sequences, and may also be invoked independently.

Figure 2:
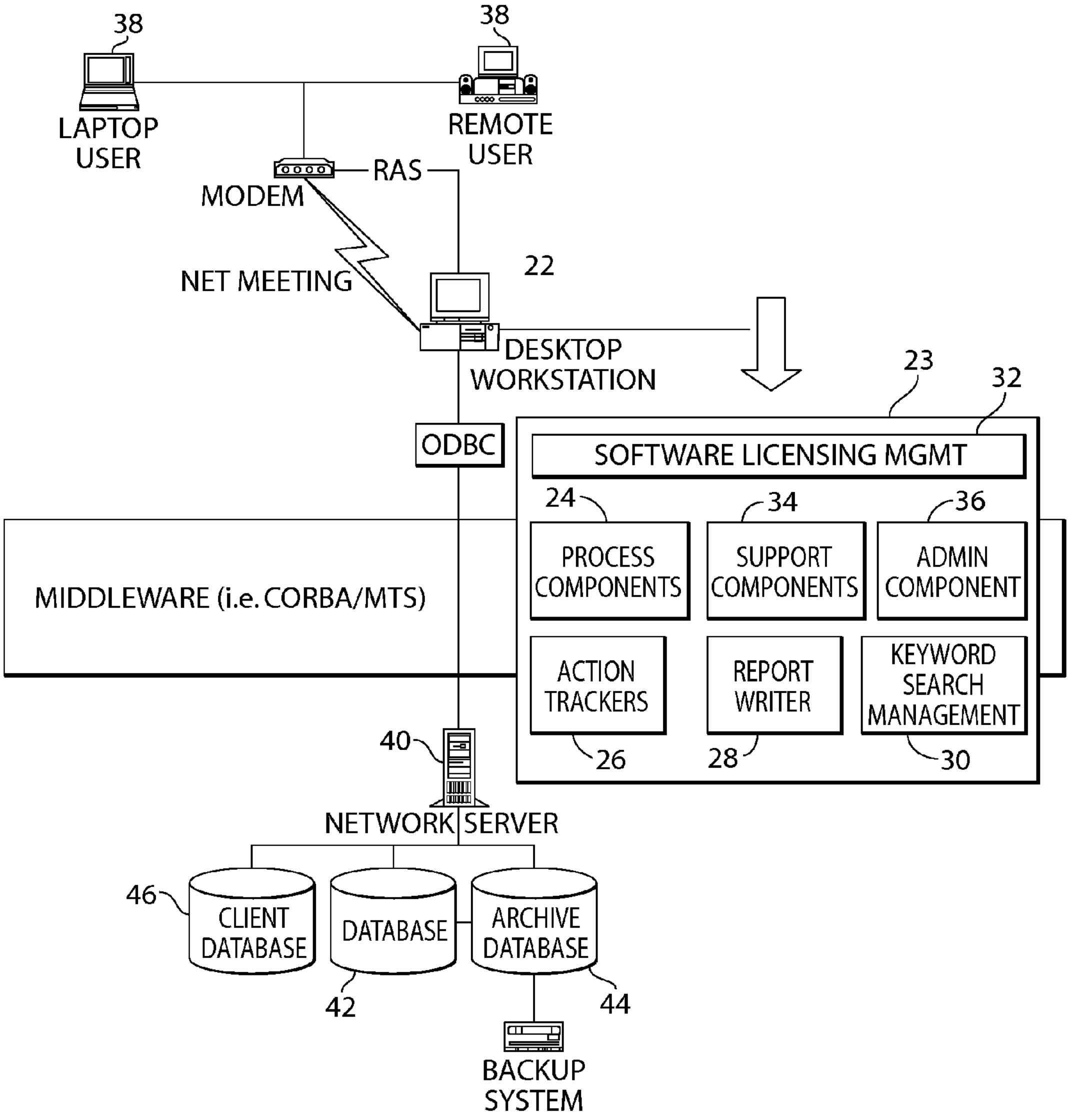
FIG. 2 shows a system architecture block diagram.

FIG. 2 shows an architectural block diagram of the system in which the situation assessment process screen sequences are invoked. Software architecture 23 as included, for example, in workstation 22 includes the process components 24 which comprise the situation appraisal, problem analysis, decision analysis, and potential problem/opportunity analysis software which drive the process screen sequences. Action tracker component 26 comprises software driving the action tracker, accessible from any of the process screen sequences. Knowledge base access and retrieval of prior situation assessment activities are performed by report writer component 28, for broad queries and retrieval of large quantities of data, and keyword query or other searching component 30, for pinpointing specific entities and situations. Other support and administrative functions are provided by licensing management component 32, system support component 34, and administrative component 36.

Workstation 22 is networked to remote users 38, for enterprisewide access at remote locations, and local network server 40, for accessing the knowledge base 42 to store and retrieve prior situation assessment data. Archive database 44 and client database 46 are for backup functions and enterprise specific information, respectively.

The software as described above is executed on a device such as workstation 22. In this embodiment, workstation 22 is a 32 bit microprocessor-based system such as a PENTIUM® PC and executes on a WINDOWS® (94, 98, or NT) platform or other operating system as compiled. 16 bit users may utilize commercially available extensions for use on older PCs. 32 M main memory is recommended, however execution may be possible with less memory with lower performance.

The process screen sequences defined further below are point and click WINDOWS®-type graphical user interfaces common to many computer applications. Screens are scrolled through using common scroll arrow buttons, and pull-down menus may be used to jump between various screens in a particular screen sequence. A user may begin with any process screen sequence, also through a pull-down menu, although it is expected that a situation appraisal will precede one or more of the other process screen sequences. Each process screen sequence is identified by a unique process identifier or file name for later retrieval and knowledge base entry. Entry cells are either for free form entry of descriptive text, or pull-down menus to populate the field from among a list of finite choices. A user may elect either a worksheet mode or interview mode of operation. Worksheet mode is for the experienced user, and allows unprompted entry of data into the relevant fields to expedite the assessment. Interview mode is a more structured environment which prompts the user with specific questions to elicit the proper type of data from the user. While slightly more time consuming, this mode allows a novice to produce an accurate assessment until the user is comfortable with worksheet mode. Modes may be toggled at any time. Information input by the user during interview mode is incorporated into the corresponding worksheet and vice-versa. Each of the process screen sequences outlined above are organized into deliverables called Process Application Kits (PAKs), which can be independently provided. Further, each PAK can be customized to suit a particular business focus or group of users through the COM object architecture (per MICROSOFT® Component Object Model). Additional PAKs can be developed to access the knowledge base accumulated with the process screen sequences, for example to generate project specific reports or to generate periodic reports about critical items. Throughout the process screen sequences, process checkers running in the background screen and filter data which is input by the user, thereby ensuring that complete and correct data is provided by the user throughout each screen sequence. These process checkers analyze the user input at various input points, and detect items which are likely to require refinement or correction. Constructively phrased messages are provided to the user to assist in proper correction of data entry, or to confirm that the input data is correct, along with corresponding prompts for response. In one embodiment, three process checkers are implemented, however additional checkers could be implemented to suit particular types of errors as the user base requires. Further, process checker messages may be toggled off by experienced users who do not require such assistance. An INFORMATION MISSTATED process checker employs rule-based analysis of input to detect skipped steps, unsound data, or incomplete analysis. Such messages are typically displayed as the user attempts to advance to a next screen, after completing entry on the current screen, however could also be provided upon entry of a particularly suspect cell. A COMMON PITFALLS process checker flags areas where imprecise data will result in later difficulty, as with critical data items. Such messages are displayed prior to user input as a reminder, and do not analyze data after entry. A SHARPENER process checker assists in entry of critical fields where further prompting assists in refining the response. A series of questions is presented to the user to assist in editing the response entered in the cell. This process checker, therefore, guides the user through a series of successively narrower questions in order to pinpoint accurately the desired item of information. All process checkers may be overridden by the user once confirming that the response entered is in fact correct.

Cells as presented by the process screen sequences defined herein may be populated via direct text entry from the keyboard, or may be populated and/or supplemented by attaching an external file. These files are stored in the knowledge base and remain associated with the particular cell or record. Such files may be MICROSOFT® Word Documents, POWER POINT® files, jpegs, bitmaps, AUTOCAD® files, or other external file appropriate to the particular cell.

Figure 3:
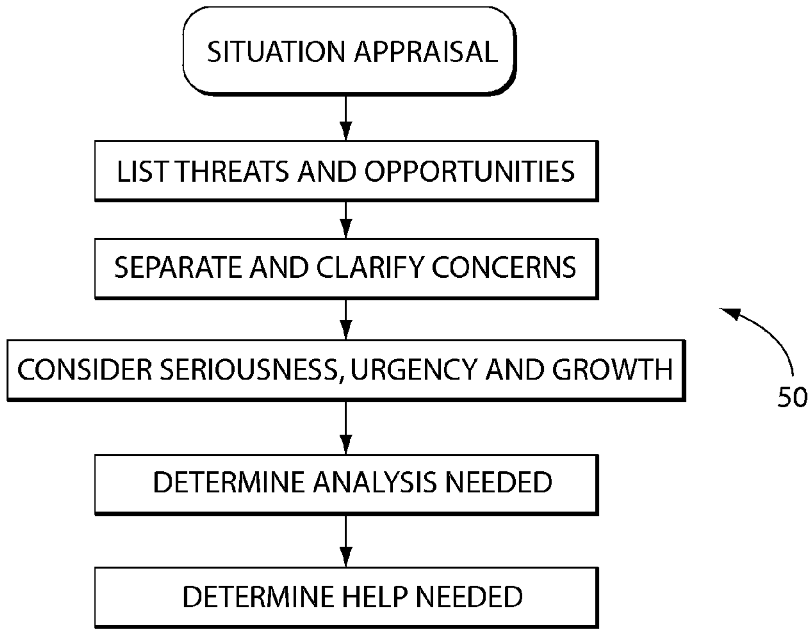
FIG. 3 shows a flowchart of the situation appraisal process screen sequence.
Figure 4:
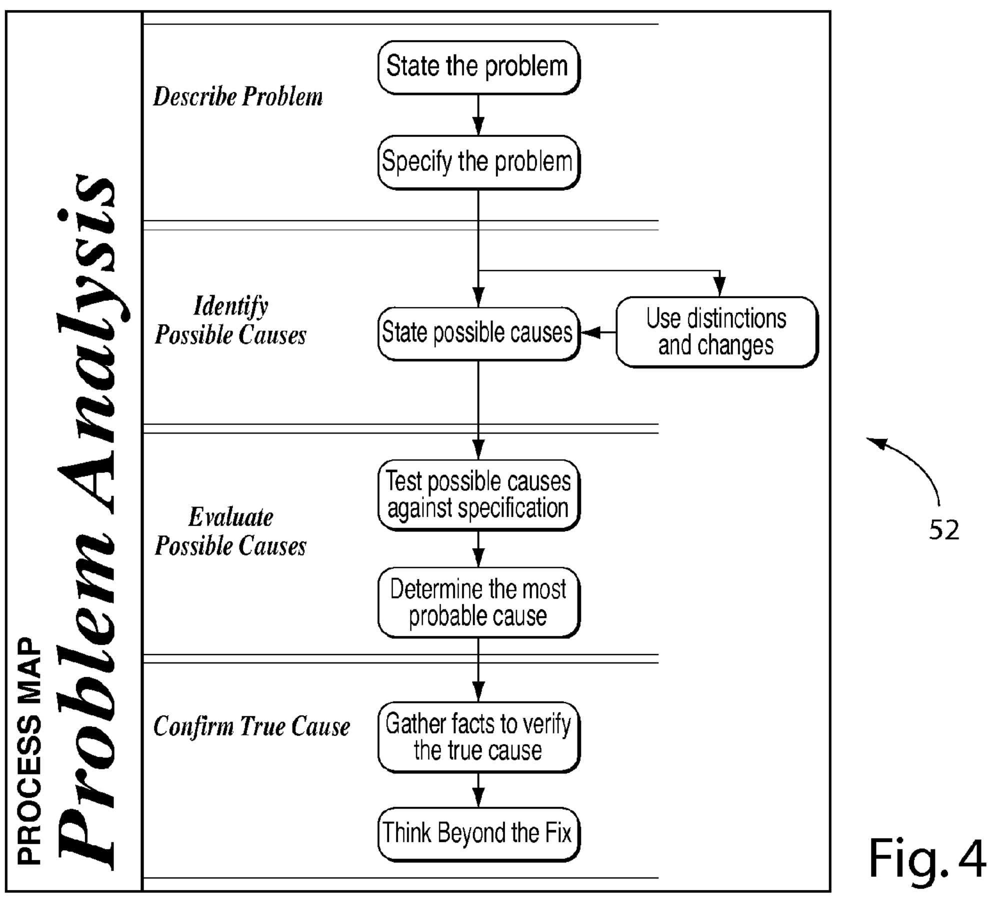
FIG. 4 shows a flowchart of the problem analysis process screen sequence.
Figure 5:
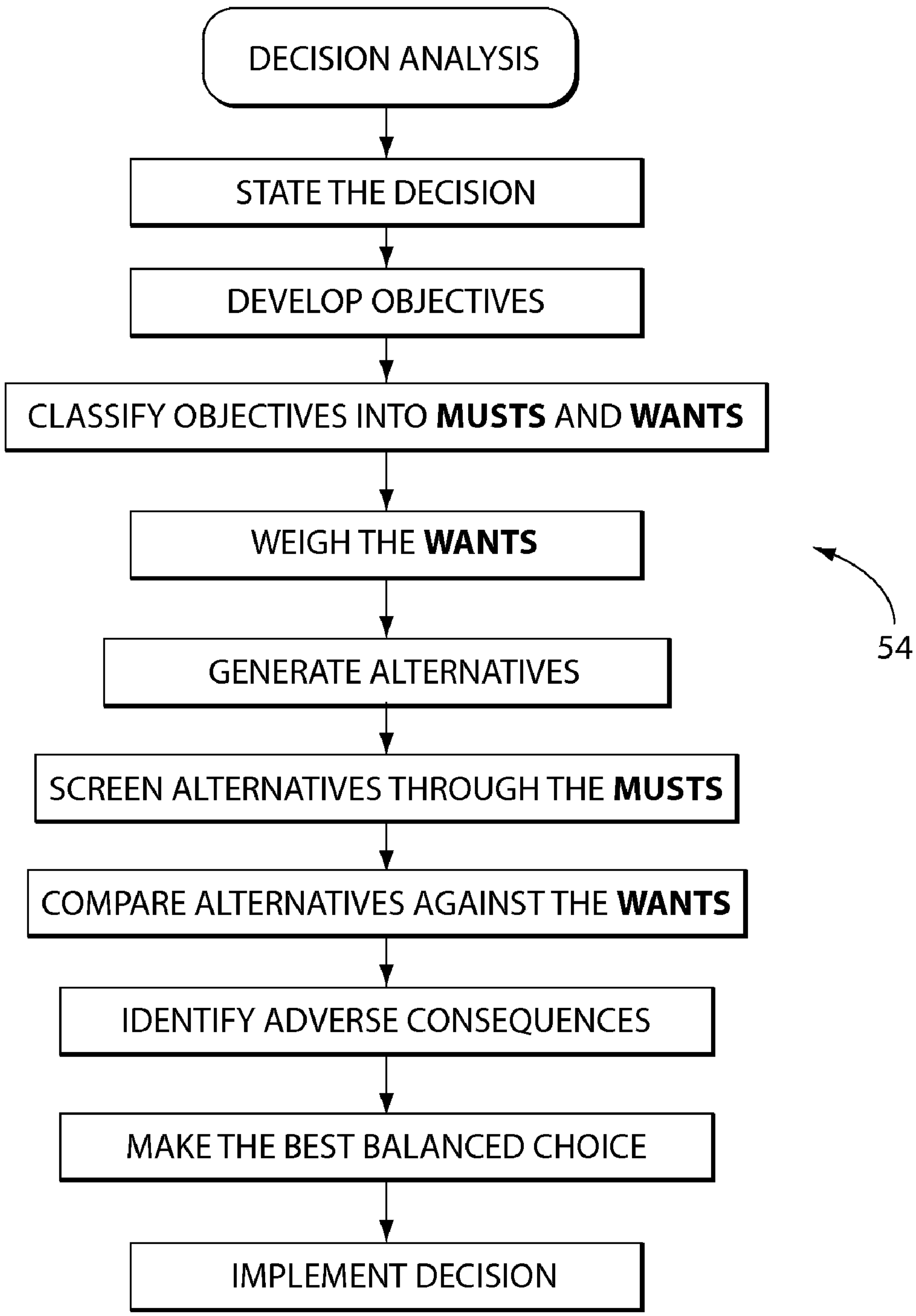
FIG. 5 shows a flowchart of the decision analysis process screen sequence.
Figure 6:
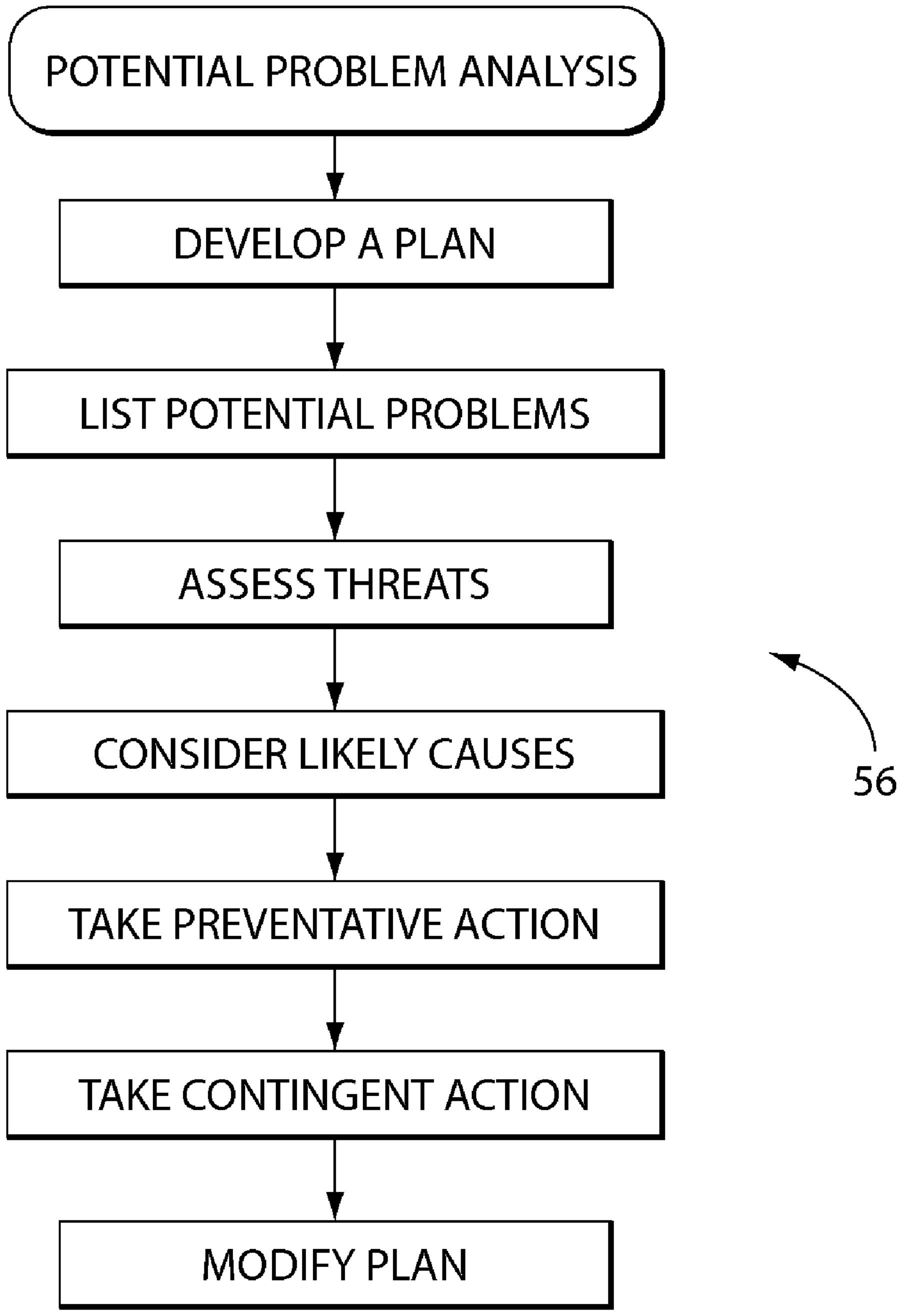
FIG. 6 shows a flowchart of the potential problem analysis process screen sequence.

Flowcharts for exemplary situation appraisal, problem analysis, decision analysis, and potential problem analysis process screen sequences are shown in FIGS. 3–6. Each of the steps in the flowcharts corresponds to a specific screen in the sequences described in further detail below. Specifically, FIG. 3 shows a situation appraisal flowchart 50; FIG. 4 shows a problem analysis flowchart 52; FIG. 5 shows a decision analysis flowchart 54, and FIG. 6 shows a potential problem analysis flowchart 56.

Software architecture is based upon various third-party toolkits and development platforms consistent with modern industry development standards to facilitate modifications and extensions. Unified Modeling Language (UML) is employed to standardize the object-oriented architecture. COM objects are provided where appropriate, to facilitate integration and modification. Rational Rose Modeler for software design, ERWin® for database modeling, and Delphi Client/Server are used to facilitate future enhancements.

Situation Appraisal

The situation appraisal screen sequence 50 provides a user interface which allows a situation to be subdivided into a set of specific concerns so that a user may graphically organize and clarify issues to be resolved. Each situation is stored in an individual situation file for later retrieval and database indexing. A situation background and theme are also provided to set the general business context and to be used as a reference or refresher for later querying and retrieval.

Figure 7:
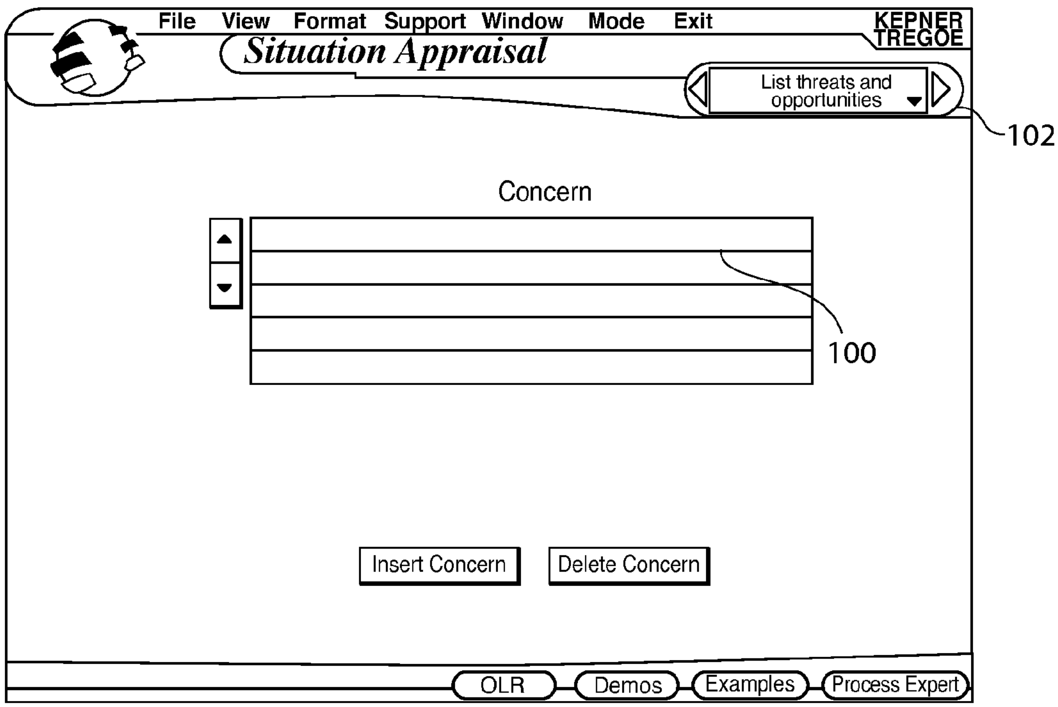
FIG. 7 shows the LIST THREATS AND OPPORTUNITIES screen of the Situation Appraisal screen sequence.
Figure 8:
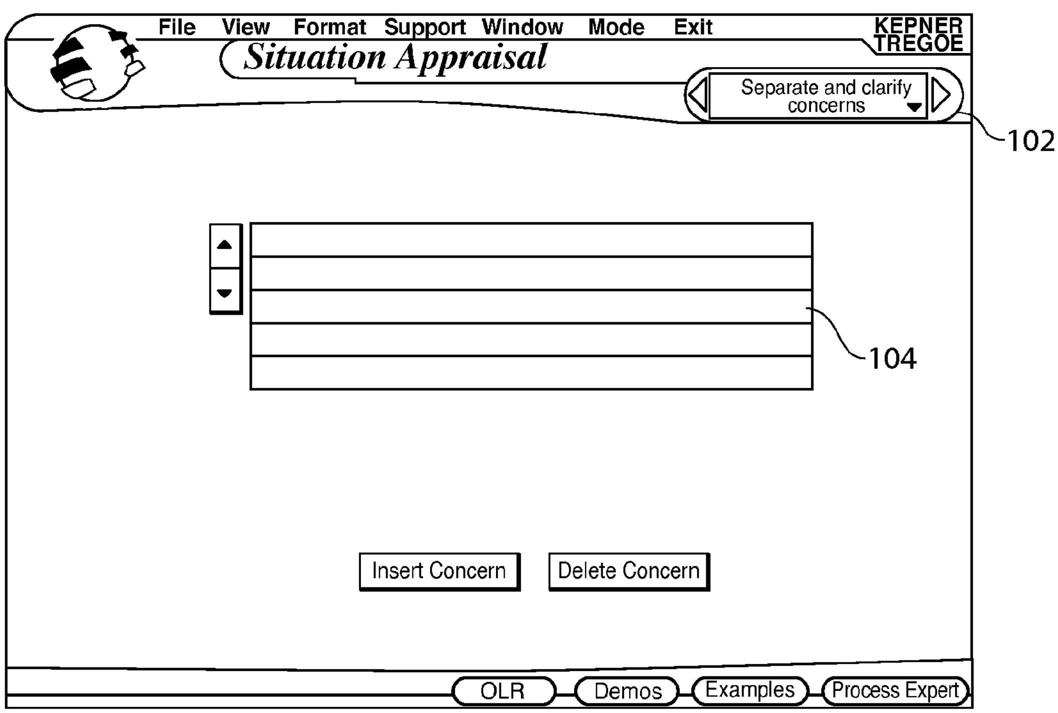
FIG. 8 shows the SEPARATE AND CLARIFY CONCERNS screen of the Situation Appraisal screen sequence.

Once the situation file is created, the threats and opportunities screen, shown in FIG. 7, is then used to enter broad issues relating to general concerns of the situation. Users enter descriptive text for each broad issue in concern cells 100, which scroll downward to accommodate all the broad issues entered. Once complete, the ADVANCE SEQUENCE arrow button 102 is used to progress to the separate and clarify concerns screen shown in FIG. 8. Users then consider the broad issues entered in the previous screen, and clarify and refine them into distinct concerns in refined concern cells 104, removing redundant items and consolidating overlapping issues. When the modified list describes distinct refined concerns, rather than broad issues, ADVANCE SEQUENCE arrow 102 is used to progress to the concern consideration screen.

Figure 9:
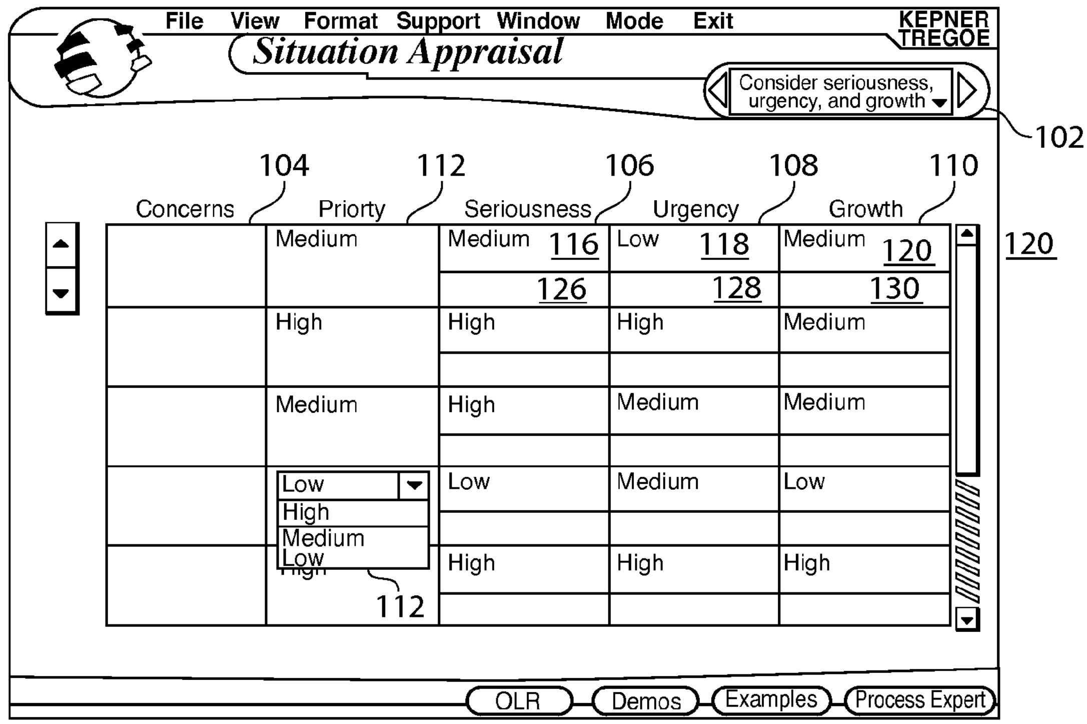
FIG. 9 shows the CONSIDER SERIOUSNESS, URGENCY AND GROWTH screen of the Situation Appraisal screen sequence.

The concern consideration screen shown in FIG. 9 allows a user to enter specific information for each of the stored refined concerns 104 stemming from a particular situation, as listed on the separate and clarify concerns screen. This provides an interface to populate various cells addressing the seriousness 106, urgency 108, and growth 110, defined further below, of a particular situation, thereby allowing computation of a priority 112 for that concern. The CONCERN CONSIDERATION screen is used to refine details of each concern. Some of these cells are further subdivided into a specification, for descriptive text, and a relativity field, for ranking relative to other concerns.

The priority cell 112 is computed based on the relativity fields for seriousness, urgency, and growth, described further below, to provide an overall ranking of concerns. Alternatively, this cell may be overridden by the user through priority pull-down 112.

The SERIOUSNESS cell 106 is further divided into a specification cell 126 and a relativity cell 116. Users enter descriptive text in the specification cell 126 to describe the impact the concern in question will have with respect to human resources, safety, cost, customers, productivity, reputation, and other factor which affect the enterprise. The seriousness relativity cell 116 is for entering a discrete ranking of magnitude relative to the seriousness of other concerns. A ranking hierarchy such as high (H), medium (M), low (L), and need more data (NMD) can be entered here through a pull-down menu similar to the priority cell, and will be displayed as well as used in calculating priority.

The URGENCY cell 108 also has two components, a specification cell 128 and a relativity cell 118. The urgency specification cell 128 is for descriptive text directed to determining when resolution of this concern would become difficult, expensive, or impossible. The urgency relativity cell 118 is for entering a discrete ranking of magnitude relative to the urgency of other concerns, similar to the priority cell pull-down.

The GROWTH cell also has specification and relativity components. Specification cell 130 is for descriptive text directed to determining the evidence that the seriousness of the concern will grow. The growth relativity cell 120 is for entering a discrete ranking relative to growth potential of other concerns, similar to the priority cell pull-down. High (H) indicates that the growth potential is increasing, medium (M) indicates that the growth potential is stable, and low (L) indicates that growth is decreasing. Need more data (NMD) may also be entered.

Figure 10:
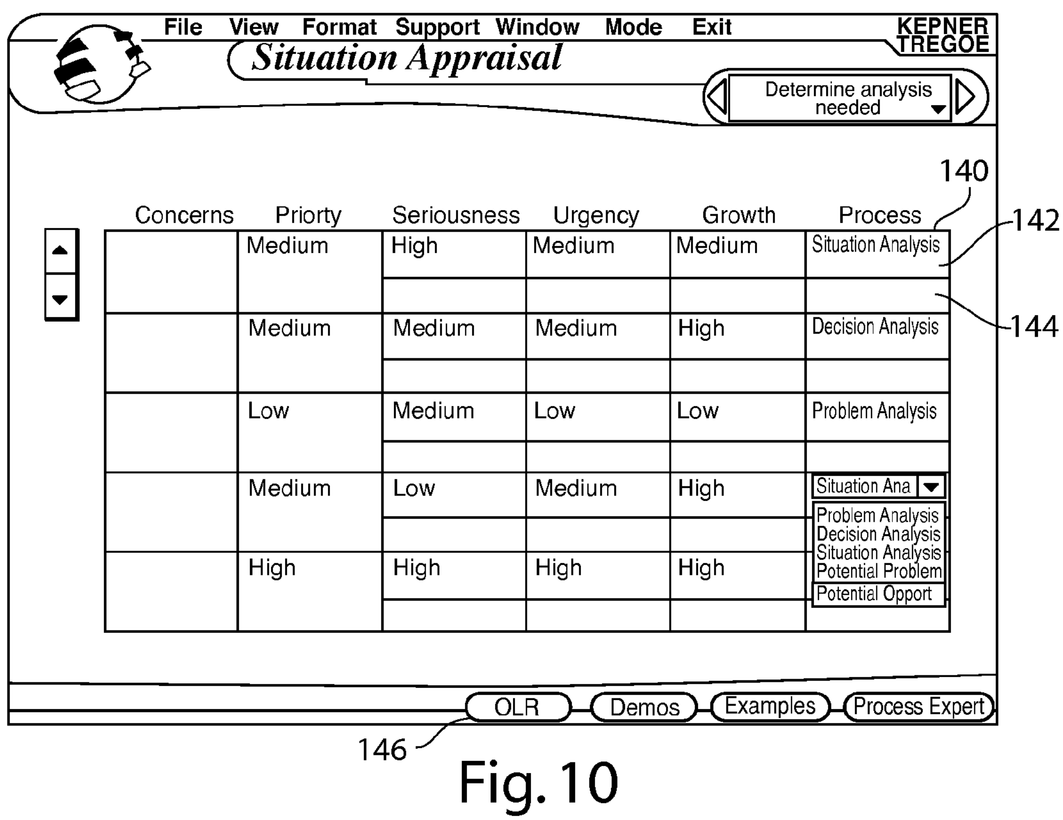
FIG. 10 shows the DETERMINE ANALYSIS NEEDED screen of the Situation Appraisal screen sequence.

Once all concerns 104 relevant to the situation are entered, screen sequence button 102 is used to advance to the determine analysis needed screen in FIG. 10. For each concern entered, five clarifying cells are provided: PRIORITY, SERIOUSNESS, URGENCY, GROWTH, and PROCESS. Each concern cell entered on the previous screen is displayed, along with a PROCESS cell 140 for each concern. PROCESS cell also has specification 144 and a relativity components 142. Process relativity cell 142 is for entering the specific process sequences, described further below, that should be used to address each concern, and is selected by pull-down menu 146. A problem analysis sequence should be undertaken if the concern is directed to the cause of why a particular event or occurrence happened. A decision analysis sequence should be undertaken if the concern is directed to determining the course of action that should be pursued to address the concern. A potential problem analysis should be undertaken if the concern is directed to predicting future occurrences or events and possible remedial action to be taken. A further situation appraisal should be undertaken if the concern is too broad to be adequately addressed by the problem, decision, or potential problem analysis sequences.

Figure 11:
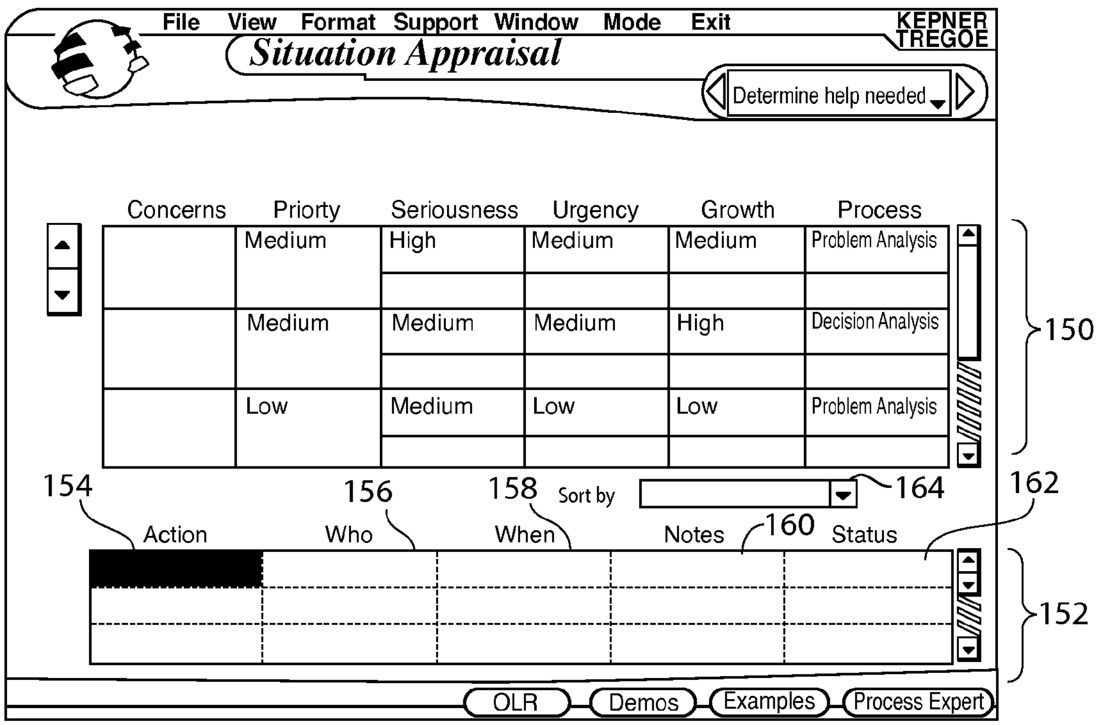
FIG. 11 shows the DETERMINE HELP NEEDED screen of the Situation Appraisal screen sequence.

After an analysis is selected for each concern, the DETERMINE HELP NEEDED screen (FIG. 11) is used to identify specific individuals or groups to execute the analysis determined in the previous screen and to identify the specific objective of the analysis. The DETERMINE HELP NEEDED screen has a PROCESS section 150, which echoes information from the DETERMINE ANALYSIS screen, and an ASSIGNMENT section 152, for specifying involvement of other people. The ASSIGNMENT section 152 is integrated with the action tracker, described further below, which provides scheduling for all screen sequences. ACTION cell 154 is used to enter descriptive text for the task and objective. This task is generally an "analysis" from the determine analysis screen, or other task for addressing a particular concern. WHO cell 156 is a pull-down menu of names for assignment to the analysis, and also allows for entry of new names. WHEN cell 158 indicates the completion date of the analysis. NOTES cell 160 is a descriptive text cell which can contain clarifying or specification information of the analysis, such as product, assembly line, or plant location. STATUS cell 162 is used to describe the current state of the task, and is a pull-down with the options not started, action assigned, cancelled, on hold, cause confirmed. Other status cell values may be entered. Sort pull-down 164 allows sorting by any of the ASSIGNMENT section cells. The result of this process screen sequence is that the user is provided with an indication of which of the analysis process screen sequences, problem, decision, or potential problem, are most applicable to the concern in question, as described further below.

Problem Analysis

The problem analysis screen sequence provides a user interface which allows a problem to be subdivided into a set of statements which describe various aspects of the problem and what they are and are not, creating a concise, accurate problem specification. These statements are then assigned possible causes. The possible causes are then evaluated to determine the most probable cause and verify the most probable cause to determine of it is the true cause.

A problem background statement concerning the context is read from the situation appraisal file to which this problem analysis corresponds. This statement may be edited by the user or alternately, entered entirely by the user. This problem background statement is then stored in an individual problem analysis file for later retrieval and database indexing.

Figure 12:
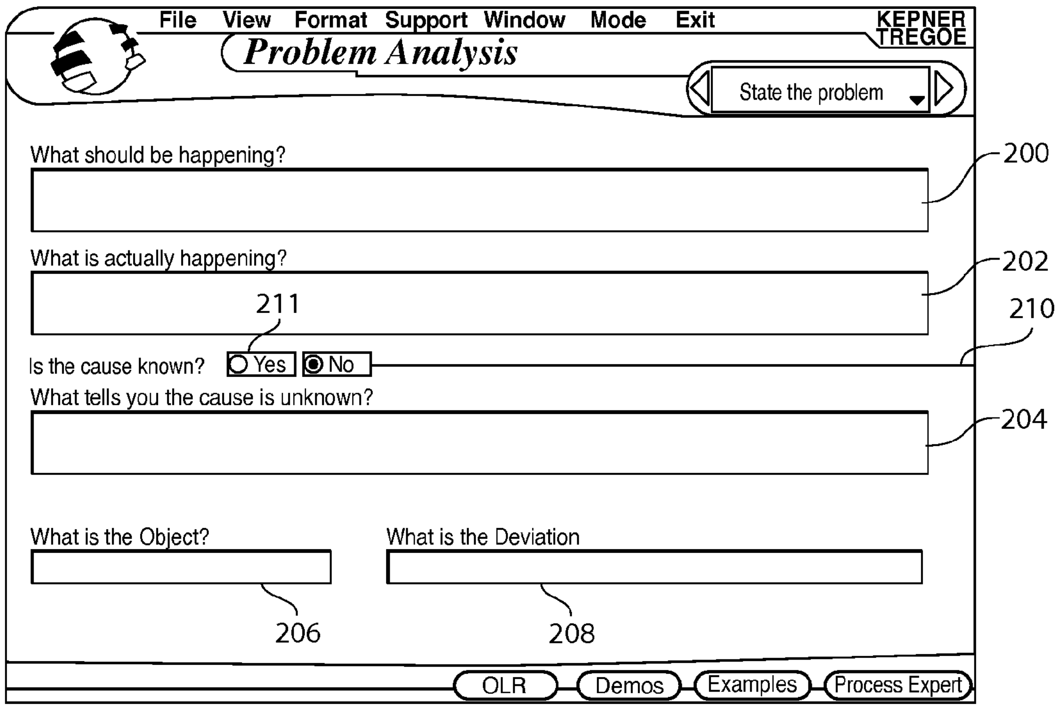
FIG. 12 shows the STATE THE PROBLEM screen of the Problem Analysis screen sequence.

Referring to FIG. 12, the STATE THE PROBLEM screen is used to enter a statement of normal operation in the SHOULD BE HAPPENING cell 200 to describe what the object of the problem should be doing when performing properly. ACTUALLY HAPPENING cell 202 is then used to enter a perceived problem, which is the current condition of the object that is believed to be, or have, the problem. User then selects the applicable cause known/unknown button. If the cause is known, button 211 is selected, and the user is prompted that a problem analysis is not appropriate and an alternate screen sequence, such as decision analysis, may be applied. If the cause is not known, button 210 is selected, and the object of the problem is then entered in OBJECT cell 206, such as "motor", "assembly line five", or "Boston office". The DEVIATION cell 208 is used to enter the deviation from normal operation, such as "cracked housing" or "sales down ten percent".

Figure 13:
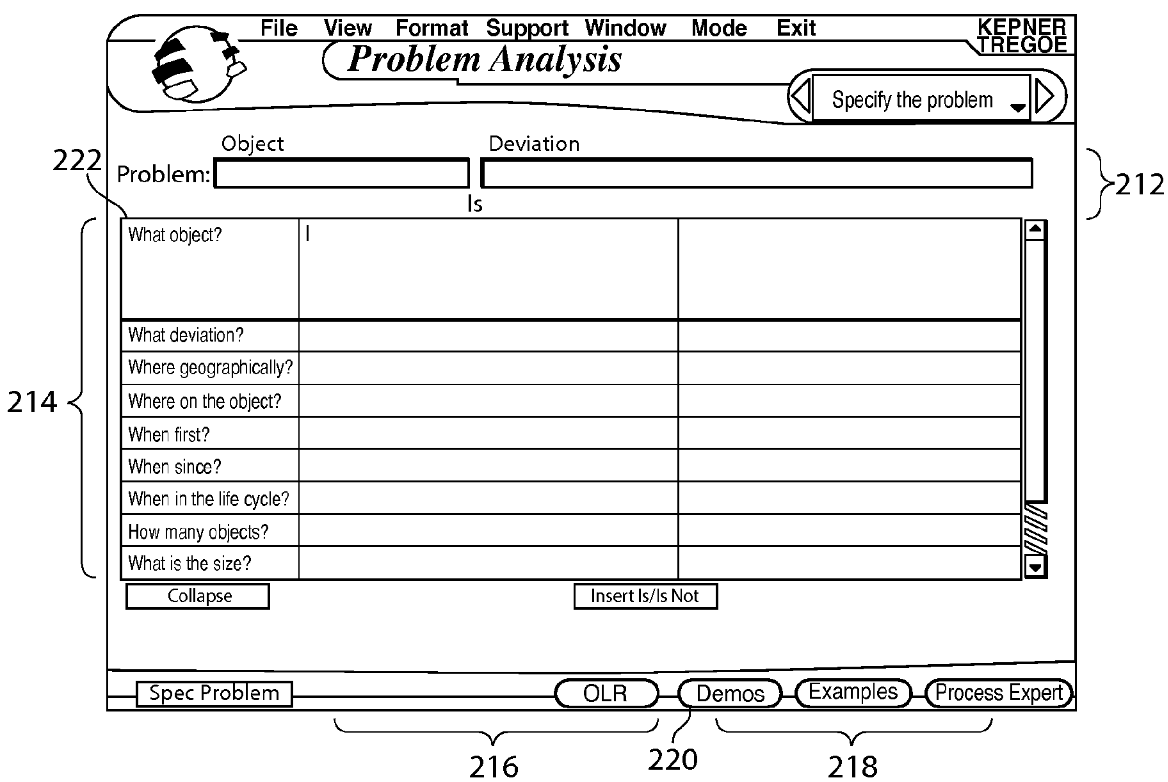
FIG. 13 shows the SPECIFY THE PROBLEM screen of the Problem Analysis screen sequence.

The user then advances to the SPECIFY THE PROBLEM screen, for example as shown in FIG. 13, to enter specific statements of fact concerning the problem. A concise problem statement 212 from the object 206 and deviation 208 cells is carried over from the previous screen, and is the concatenation of the object and deviation cells to form a statement such as "Boston office sales down ten percent." Eleven descriptor question cells 214 are provided (not all shown due to scroll down display), however fewer or additional statement cells could also be used. Collectively, these descriptor question cells are for describing the problem in terms of four domains: what, where, when, and extent. The eleven descriptor question cells 214 are for entering information to address the following: problem object, problem deviation, geographical variance or location, location of the deviation on the problem object, first problem (deviation) occurrence, most recent or subsequent problem (deviation) occurrence, problem cycle (during lifecycle history of object), number of problem objects (how many objects have/do not have the deviation), size of problem (magnitude of a single deviation), number of problem deviations (how many deviations on each object), and problem trend (how it is/is not progressing). For each descriptor cell, two subfields are provided. In each subfield, for each of the eleven descriptors, the user enters descriptive text directed to what the problem is 216 and is not 218. The IS descriptor subfield is for accurately refining and narrowing the object that has the deviation. The IS NOT descriptor subfield is for indicating which other closely related entities could have the deviation, but do not. By defining both the IS and IS NOT subfields, the responses in these cells serve to establish clear boundaries around the problem. Additional descriptor question cells for a particular descriptor question may be added by clicking on insert button 220 if needed to accurately refine the problem. For example, WHAT OBJECT descriptor 222 might further clarify specific product packaging that is and is not experiencing the deviation, and also might indicate which assembly lines are affected. Other comparative designators may be used in place of "is" and "is not".

Figure 14:
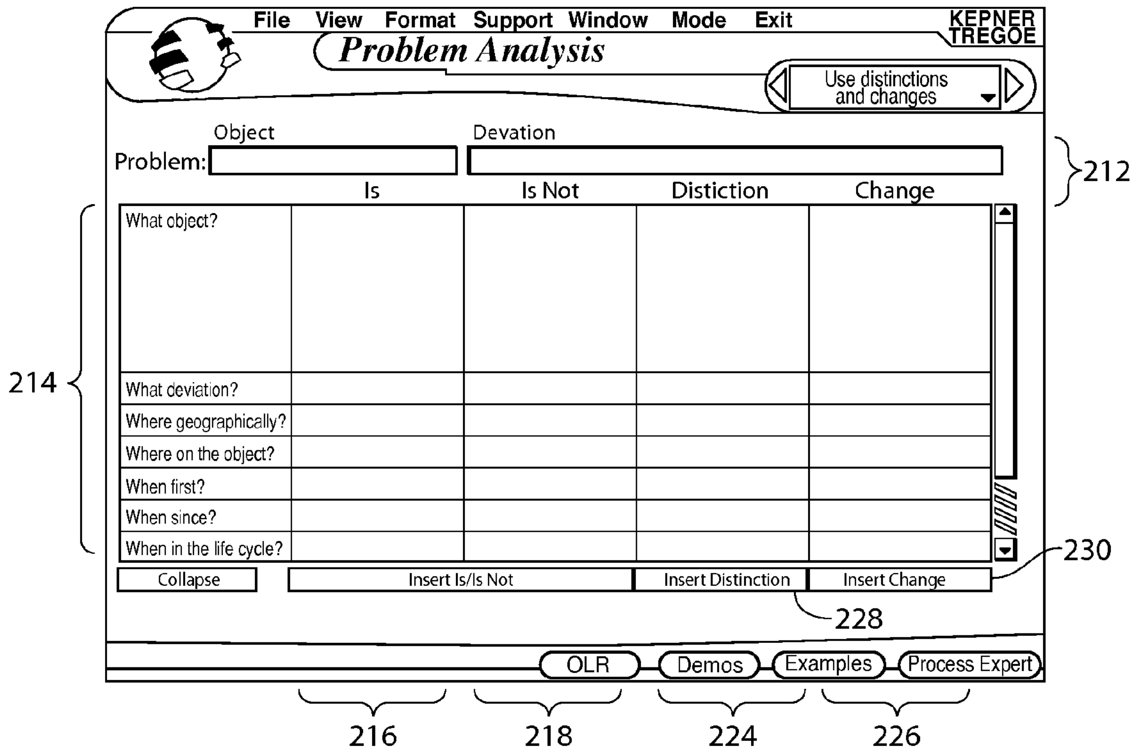
FIG. 14 shows the USE DISTINCTIONS AND CHANGES screen of the Problem Analysis screen sequence.
Figure 15:
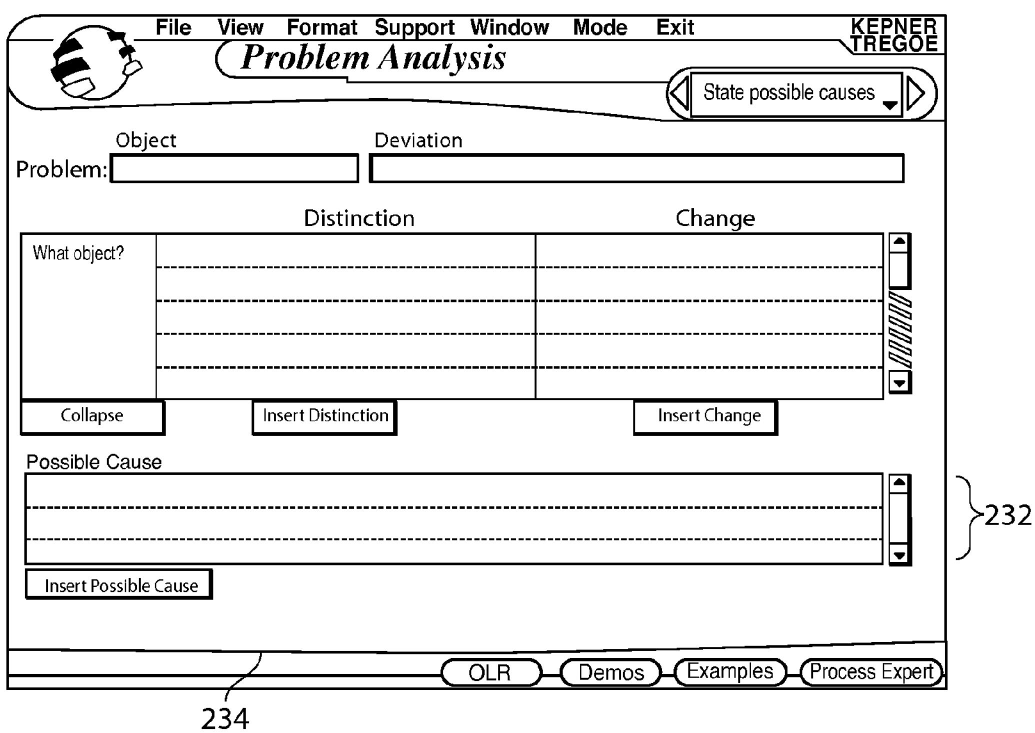
FIG. 15 shows the STATE POSSIBLE CAUSES screen of the Problem Analysis screen sequence.

Following entry of the IS/IS NOT descriptor cells, the user advances to one of two screens. The user may advance to the USE DISTINCTIONS AND CHANGES screen shown in FIG. 14, which provides cells for entering distinctions between each of the IS/IS not descriptors entered previously. These distinction fields assist in entering possible causes (FIG. 15). Alternatively, if the user prefers using their own knowledge and experience, they may advance directly to the STATE POSSIBLE CAUSES screen.

The USE DISTINCTION AND CHANGES screen (FIG. 14) presents the user with the previously entered problem statement 212 and descriptor question cells 214, and provides, for each descriptor question, DISTINCTION 224 and CHANGE 226 cells. These DISTINCTION and CHANGE cells are for entering descriptive text to identify the distinctive features concerning the "IS" data 216 relative to the "IS NOT" data 218, for each of the descriptor questions 214. The information in these cells assists in identifying possible causes in the subsequent state possible causes screen (FIG. 15). Users enter distinctive features for each is/is not pair in DISTINCTION cells 224. Multiple distinctive features may be entered by clicking insert button 228 to insert a DISTINCTION cell. Not all descriptor IS/IS NOT cells need be populated, however a distinction may not be entered unless the corresponding descriptor question cells are populated. Descriptor IS/IS NOT cells may be entered here as well.

For each DISTINCTION cell 224, descriptive text concerning changes are entered in CHANGE cells 226. Such changes may be those that have occurred in, on, around, or about each distinction, in order to identify possible causes. Other changes may also be used. As with DISTINCTIONS 224, multiple change cells may be entered for each distinction by clicking the INSERT CHANGE button 230.

The user next advances to the STATE POSSIBLE CAUSES screen shown in FIG. 15. This screen has two formats depending on whether the user has elected to enter distinctions and changes. FIG. 15 shows the STATE POSSIBLE CAUSES screen with the DISTINCTION and CHANGE cells 224, 226 echoed. If the user has not entered distinctions and changes, the descriptor question cells 214 and IS/IS NOT responses 216, 218 are displayed. For either screen descriptive text is entered in possible CAUSE cells based upon the information in the DISTINCTION/CHANGE cells 224, 226 or is/is not responses 216, 218, as applicable. The most effective possible causes tend to be provided by cross-correlating the eleven different descriptor questions to find common denominators and items which are mutually exclusive. Additional possible cause cells may be added through INSERT POSSIBLE CAUSE button 234.

Figure 16:
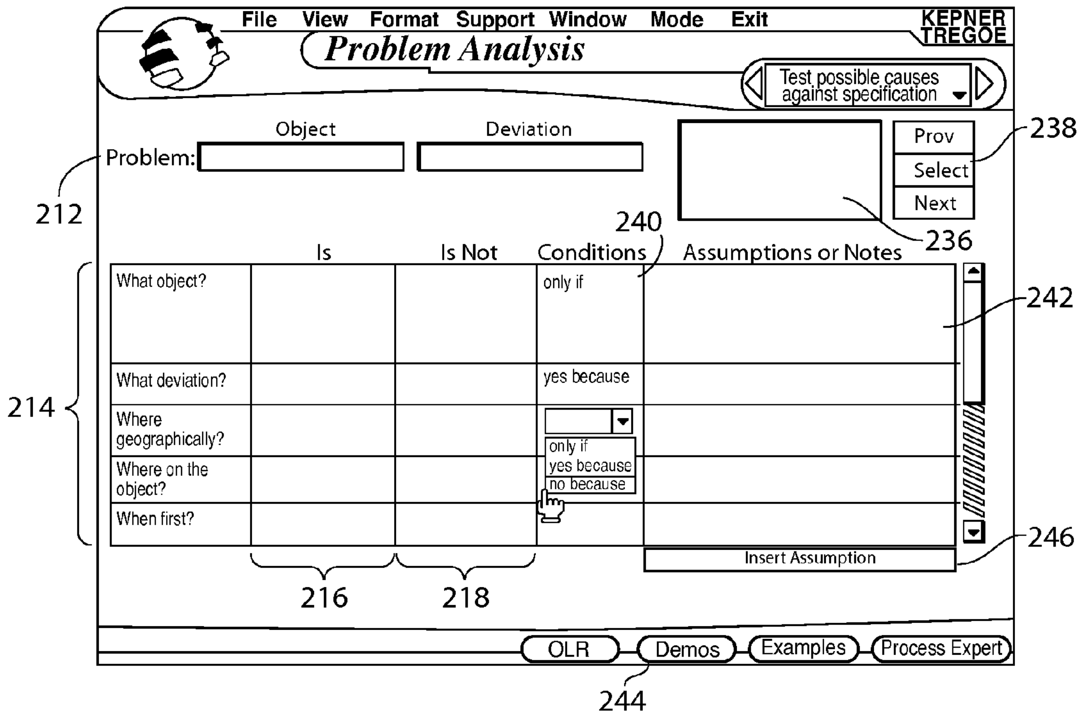
FIG. 16 shows the TEST POSSIBLE CAUSES AGAINST SPECIFICATION screen of the Problem Analysis screen sequence.

Upon entry of POSSIBLE CAUSE cells 232, the user advances to the test possible causes against specification screen shown in FIG. 16. This screen presents possible causes one at a time in POSSIBLE CAUSE cell 236. The possible cause selection buttons 238 are used to scroll through the list of previously entered possible causes. The problem statement 212 is echoed here, as well as the descriptor questions 214 and responses 216, 218. A CONDITIONS 240 cell and an ASSUMPTIONS cell 242 are provided for user input. For each possible cause 236, users scan the list of descriptor questions 214. For each descriptor question, conditions 240 under which the possible cause would prove or disprove the descriptor question are entered. Conditions are entered under prefixes such as "ONLY IF", "YES BECAUSE", and "NO BECAUSE" via condition pull-down 244. Assumptions pertinent to the basic condition are then entered in ASSUMPTIONS/NOTES cell 242. An "ONLY IF" assumption specifies the specific circumstances under which the possible cause would explain the particular descriptor question 214. A "YES BECAUSE" assumption explains why the possible cause would explain the particular descriptor question. A "NO BECAUSE" assumption explains why the possible cause could not explain the particular descriptor question 214, and eliminates the possible cause 236 from the list. Conditions may be limited to three options to facilitate later sorting and processing of the possible causes to determine the true cause or causes, described below. Such an eliminated possible cause, however, and the associated assumption, is nonetheless retained in the knowledge base for subsequent queries, described further below with respect to the knowledge base query engine. Multiple ASSUMPTIONS/NOTES cells 242 needed to explain a particular descriptor question may be entered through INSERT ASSUMPTION button 246.

Figure 17:
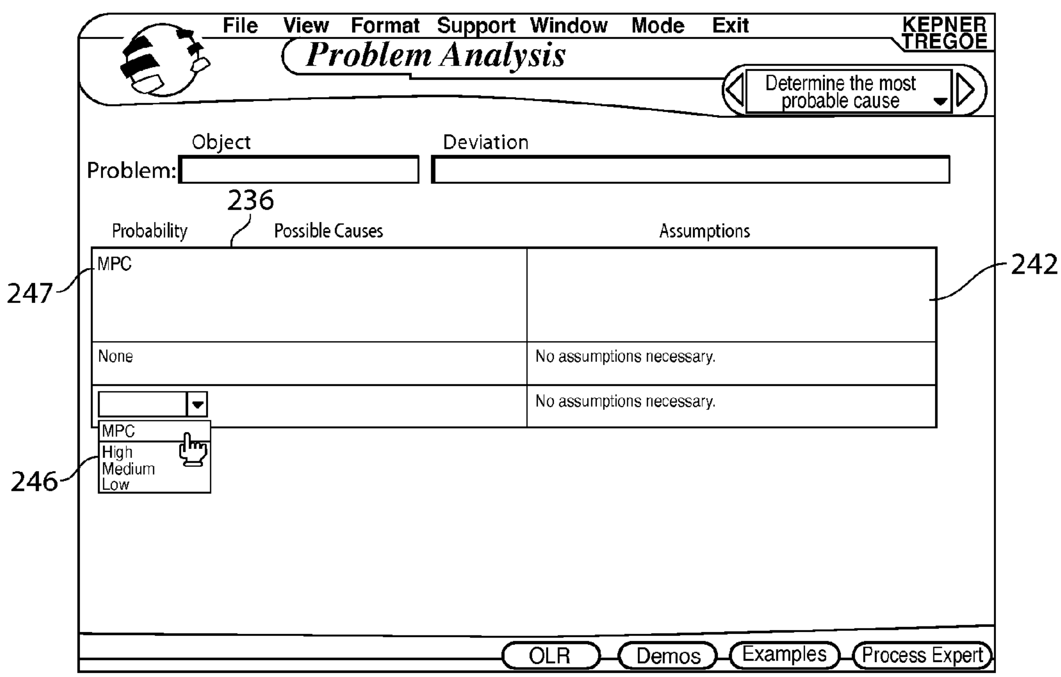
FIG. 17 shows the DETERMINE THE MOST PROBABLE CAUSE screen of the Problem Analysis screen sequence.

Following the entry of conditional assumptions, positive cause notes, and elimination of a subset of the causes, the DETERMINE MOST PROBABLE cause screen is called (FIG. 17). At this point the list of possible causes has been narrowed due to elimination of the possible causes resulting in a "NO BECAUSE" condition test, above. This screen presents remaining assumptions entered on the TEST POSSIBLE CAUSES screen (FIG. 16) in an ASSUMPTION cell 242, alongside the corresponding POSSIBLE CAUSE cell 236. For a listed possible cause, probability pull-down 247 may be used to assign a probability cell 248 from among: MPC (most probable cause, high (consider next), medium (also verify) and low (consider later). The ASSUMPTION cells 242 and POSSIBLE CAUSE cells 236 are sorted according to the probability 248 and the condition (244, FIG. 16) for use in the next screen.

Figure 18:
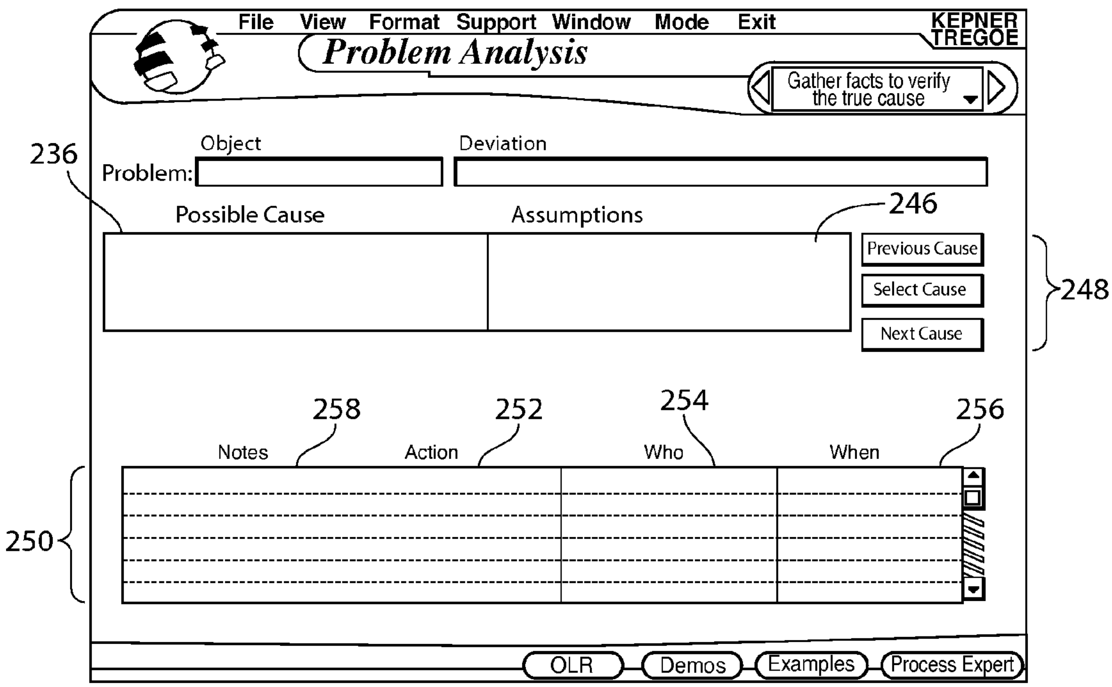
FIG. 18 shows the GATHER FACTS TO VERIFY THE TRUE CAUSE screen of the Problem Analysis screen sequence.

The GATHER FACTS TO VERIFY THE TRUE CAUSE screen (FIG. 18) is then presented. Low probability possible causes are not carried over onto this screen, however such causes and assumptions are nonetheless stored in the knowledge base for later query use. The remaining possible causes and their respective assumptions are displayed in their respective cells 236, 246. Individual possible causes are considered by the user in a scrolling format which allows the user to advance through scroll buttons 248 from most probable to the "ALSO VERIFY" possible causes. For each possible cause 236 presented, ACTION TRACKER cells 250 are used to enter actions needed to resolve the possible cause 236 and the accompanying assumptions 246. ACTION cell 252 is for descriptive text indicative of the specific test, activity, or question to be undertaken in order to confirm or deny a particular possible cause and the assumptions associated therewith. WHO cell 254 is for indicating the person or group responsible for the action, and WHEN cell 256 is for a completion date. NOTES cell 258 allows entry of descriptive text concerning other aspects of the action.

ACTION TRACKER cells 250 are integrated with the action tracker, described further below, which is integrated with the other process screen sequences as defined herein. In this manner, a concise itemization of the actions required to address a particular possible cause can be entered, stored in the knowledge base, and later searched and retrieved through the query engine, in addition to being codified for tracking the present problem. The query engine, described further below, may also be invoked to search for similar possible causes in the knowledge base. Resolution of the action items should then focus and refine the remaining possible causes to determine the true cause.

Figure 19:
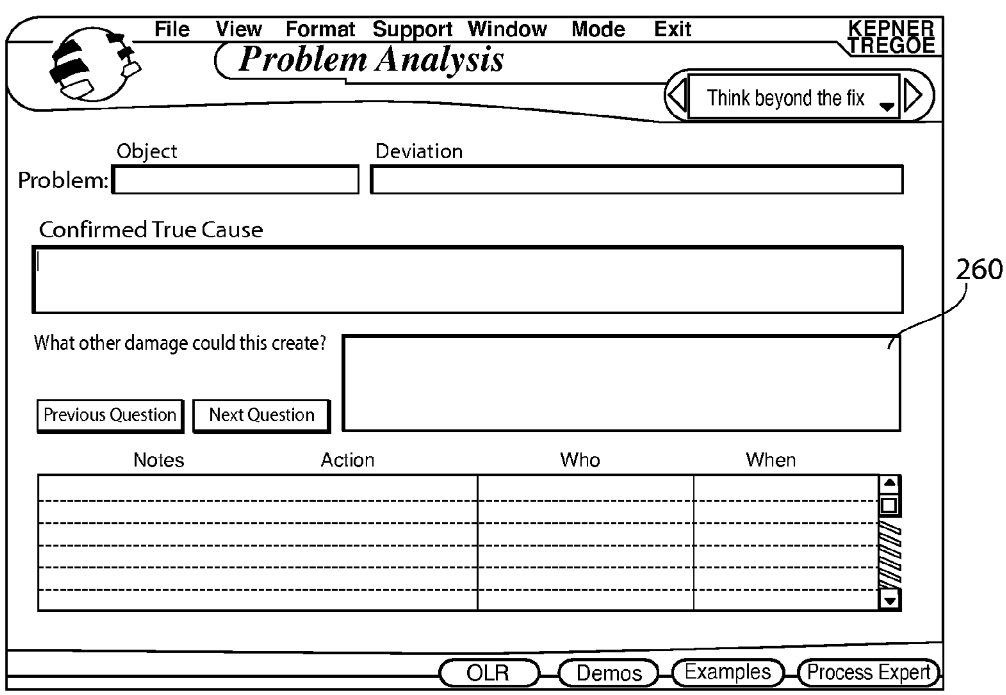
FIG. 19 shows the THINK BEYOND THE FIX screen of the Problem Analysis screen sequence.

FIG. 19 shows the THINK BEYOND THE FIX SCREEN for entering data to enumerate ramifications of the actions just entered. This information may be useful in the potential problem analysis process screen sequence, described further below.

Decision Analysis

A situation appraisal, as described above, may also indicate that a decision analysis is warranted. A decision analysis, as described further below, allows a user to populate cells specifying objective aspects of the decision, and use these cells for reporting and querying of the knowledge base to provide a graphical verification and record that all aspects concerning a particular decision were considered. The screens presented in the decision analysis screen sequence allow a user to populate cells focused on the objective of the decision, the alternatives which strive towards achieving that objective, risks associated with each alternative, and on selecting the final decision from among the alternatives.

Each decision analysis screen sequence is stored in a unique file to facilitate later indexing, searching and retrieval from the knowledge base. A previous or in process decision analysis can be selected for modification by the user, or a new decision analysis screen sequence may be entered.

Figure 20:
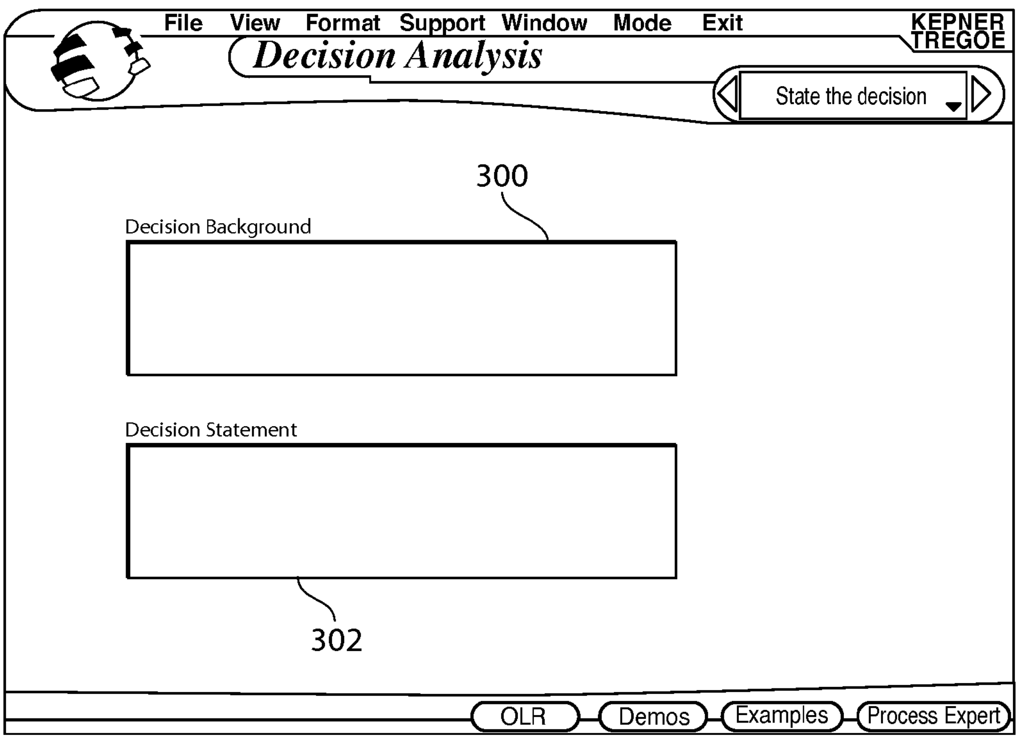
FIG. 20 shows the STATE THE DECISION screen of the Decision Analysis screen sequence.

Referring to FIG. 20, the STATE THE DECISION screen is shown. The DECISION BACKGROUND cell 300 is for descriptive text concerning the context and other data about the situation. Alternatively, this cell may be populated from a situation appraisal or action tracker sequence which raised this decision analysis. Next, a DECISION STATEMENT is entered in the decision statement cell 302. The decision statement should clarify the fundamental purpose of the decision, the intended result, and should set the scope of boundaries of the alternatives which will be considered. An overly broad decision statement may purport to provide a far reaching solution, but may also prove difficult to enumerate alternatives for, as will be described below, and may not provide informative value during future queries of the knowledge base.

Figure 21:
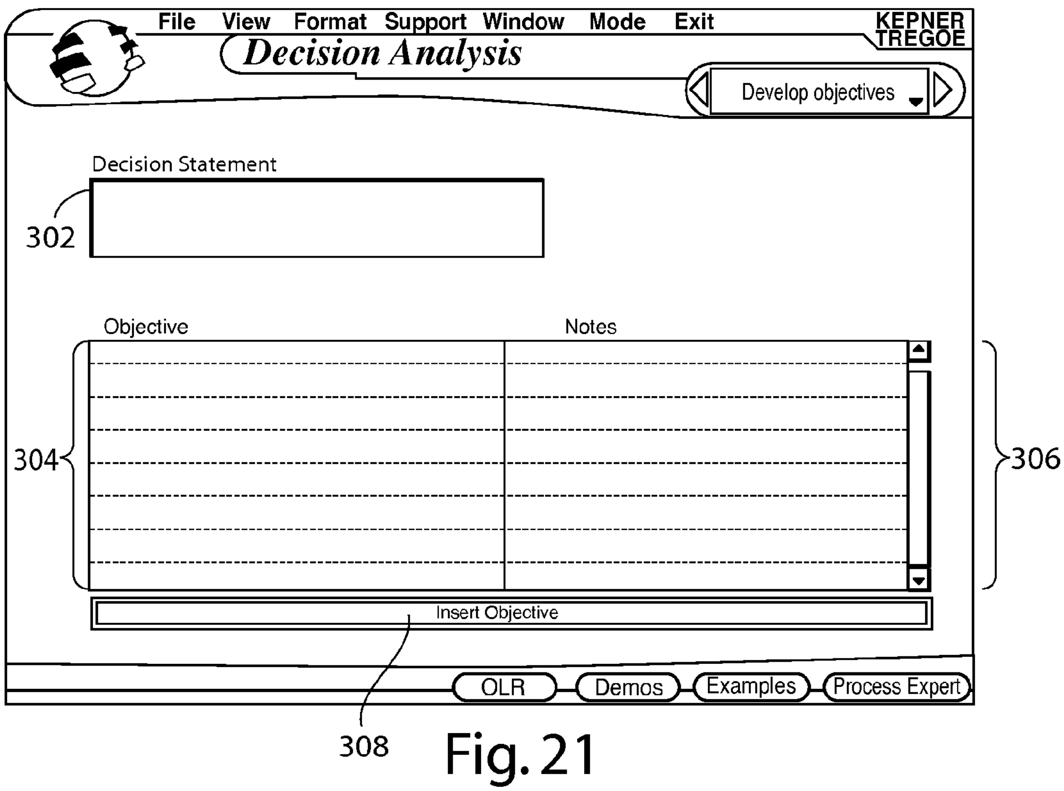
FIG. 21 shows the DEVELOP OBJECTIVES screen of the Decision Analysis screen sequence.

Once the decision statement is entered, the user advances to the DEVELOP OBJECTIVE screen (FIG. 21). The DECISION STATEMENT cell 302 is echoed here, and additional cells for objectives 304 and notes 306 are provided. An INSERT OBJECTIVE button 308 allows entry of additional objectives. Using the DECISION STATEMENT 302 as a reference, the user enters descriptive text in the OBJECTIVES cells 304 to indicate particular results to be achieved. Objectives, both short and long term and of varying priorities and constraints, are entered at this point to robustly populate the knowledge base. The criteria to measure the objective should be clear. Refinement occurs at a later screen. Notes concerning constraints, priority, or other aspects concerning this objective may be entered in NOTES cell 306.

Figure 22:
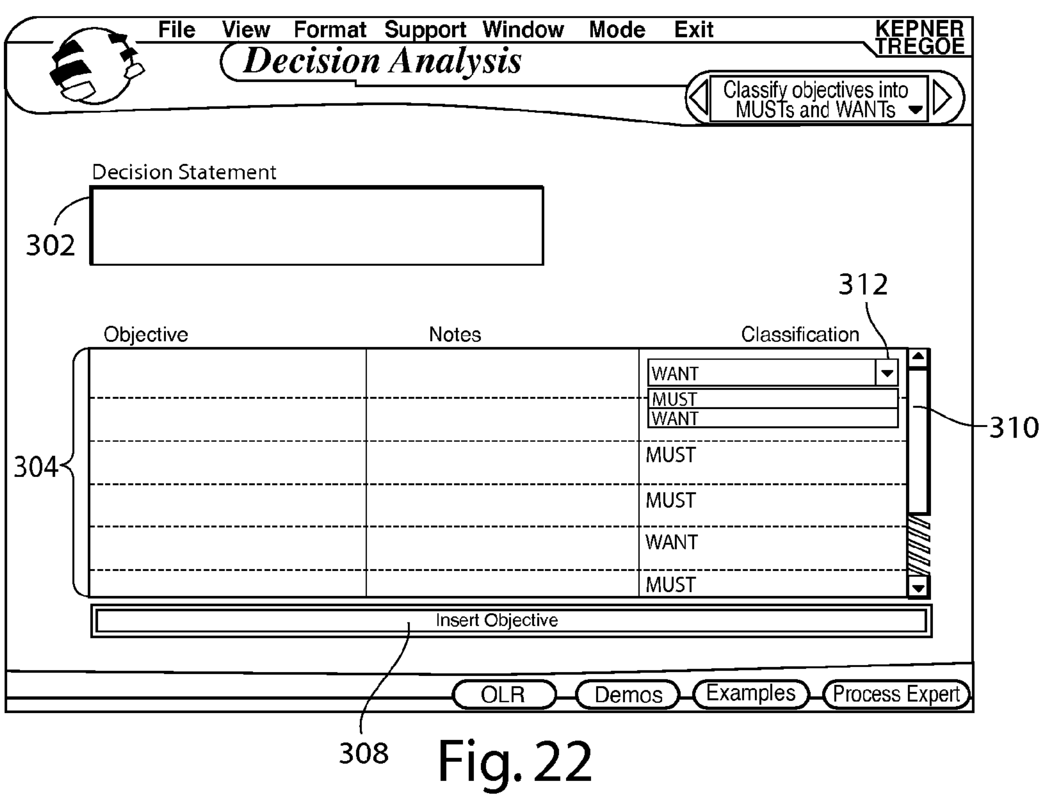
FIG. 22 shows the CLASSIFY OBJECTIVES INTO MUSTS AND WANTS screen of the Decision Analysis screen sequence.

After listing the objectives, the CLASSIFY OBJECTIVES screen, shown in FIG. 22, is displayed. This screen echoes the DECISION STATEMENT 302, and lists each OBJECTIVE and NOTES cell 304, 306 for review by the user. For each objective, a CLASSIFICATION cell 310 is provided. The user scans the objectives, and for each listed objective enters a classification of MUST or WANT, or other descriptive classification, in CLASSIFICATION cell 310 using pull-down menu 312. Objectives that are mandatory, measurable with a finite limit, and realistic should receive a classification value of MUST. Others that may be desirable should receive a classification value of WANT. Not all CLASSIFICATION cells need be entered; a default value of WANT is then assigned. Additional objectives may also be added at this screen by clicking INSERT OBJECTIVES button 308. In this manner the objectives sought by the decision are ranked into groups representing objectives such as uncompromisable and optional.

Figure 23:
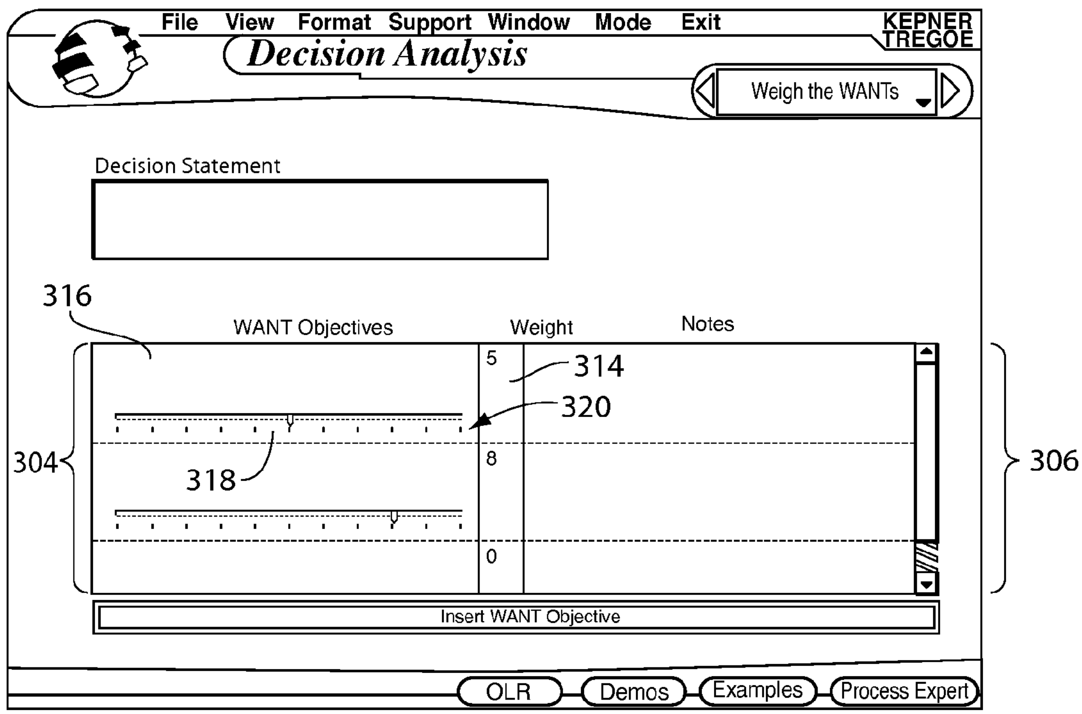
FIG. 23 shows the WEIGHT THE WANTS screen of the Decision Analysis screen sequence.

Next, the user advances to WEIGHT THE WANTS screen (FIG. 23) to further classify the optional WANT objectives. Below the DECISION STATEMENT cell, each OBJECTIVE cell 304 is displayed adjacent a WEIGHT cell 314. NOTES cell 306, corresponding to each objective, is also displayed, and may be further modified with descriptive text. Each OBJECTIVES cell 304 is further subdivided into a descriptive portion 316 and a relative weight portion 318. The relative weight portion may be implemented as a slide bar 320. For each WANT objective, the user determines a relative priority weight. The most compelling objective is assigned a value of ten on a zero to ten scale, however the upper limit could be varied to suit the granularity desired as can the scale itself. The user then considers each remaining objective and assigns a relative weight accordingly.

Figure 24:
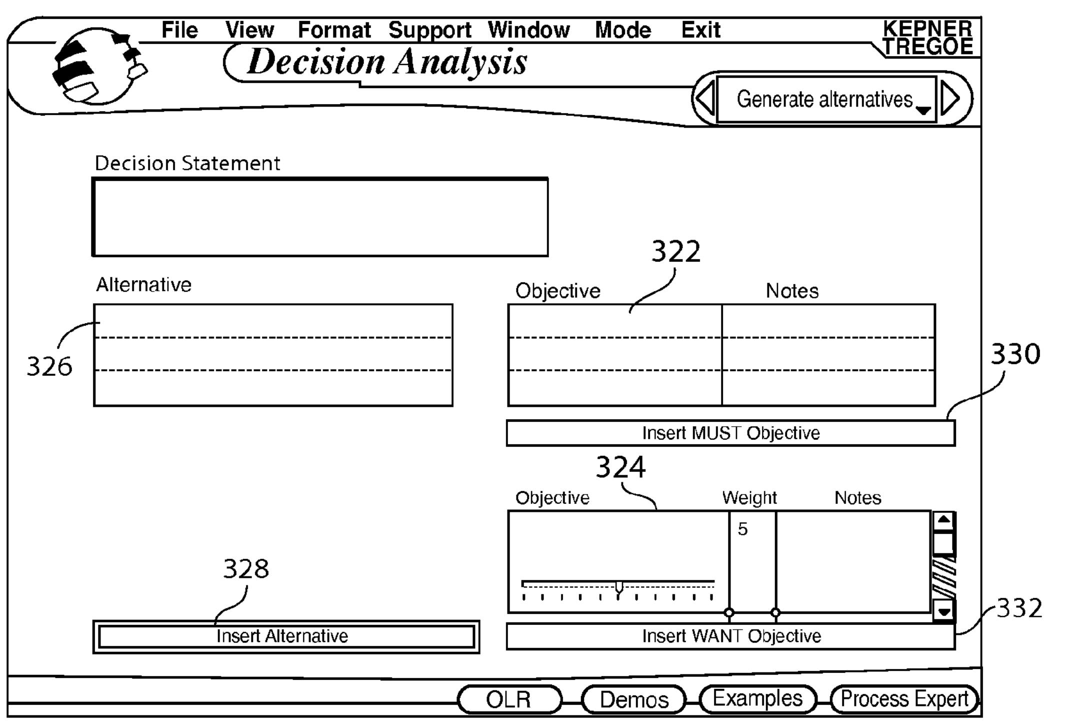
FIG. 24 shows the GERNERATE ALTNERATIVES screen of the Decision Analysis screen sequence.
Figure 25:
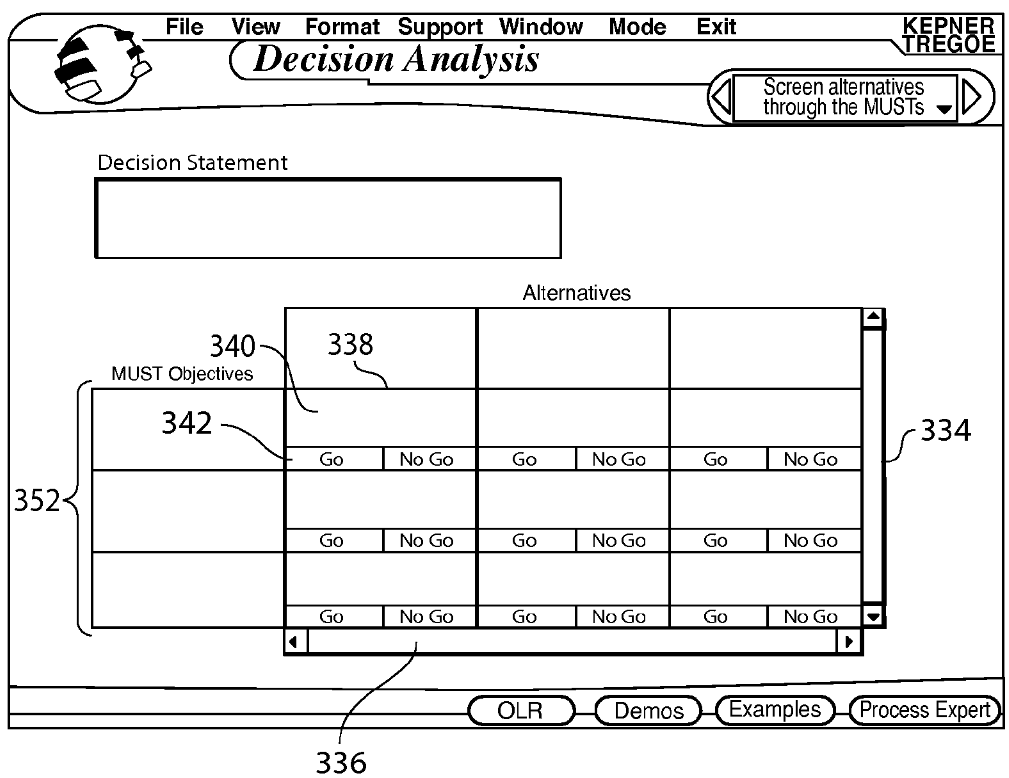
FIG. 25 shows the SCREEN ALTERNATIVES THROUGH THE MUSTS screen of the Decision Analysis screen sequence.

Following the WEIGHT THE WANTS screen, the user progresses to the generate alternatives screen shown in FIG. 24. This screen is for generating alternatives based on the previously entered objectives. MUST and WANT objectives are displayed in MUST OBJECTIVES cell 322 and WANT OBJECTIVES cell 324. Want objectives may be sorted by relative weight cell 318 value, or may remain in the order entered. The user scrolls through the MUST and WANT objectives to generate alternatives, and enters these alternatives in ALTERNATIVE cell 326. The user may scroll through the objectives in any order. However, considering the MUST objectives first ensures that mandatory items are reflected in the resulting alternatives list. Additionally, users may query the knowledge base for previously entered alternatives using query engine, described further below. Additional alternatives may be entered by clicking INSERT ALTERNATIVES button 328. Objectives may also be added by clicking insert MUST OBJECTIVE button 330 and insert WANT OBJECTIVE button 332. Once all alternatives are entered, the user advances to the screen alternatives through the musts screen, shown in FIG. 25, to refine and narrow the entered alternatives.

On screen alternatives through the MUSTS screen (FIG. 25), the MUST OBJECTIVES 322 and the ALTERNATIVES 326 are displayed in a matrix form for review and selection. Scroll bars 336 and 334 can be used for horizontal scrolling through the alternatives and vertical scrolling through the must objectives, respectively. A FEASIBILITY cell 338 is therefore provided corresponding to each alternative and must objective. Descriptive text to describe how an alternative does or does not meet a must objective is entered by the user in descriptive portion 340. Each FEASIBILITY cell 338 also has a GO/NO GO toggle button 342 to provide a discrete indication of whether an alternative satisfies a particular must objective. An alternative with even one "no go" attributed to it is deemed eliminated and is not carried forward. However, it will be retained in the knowledge base for later query and retrieval.

Figure 26:
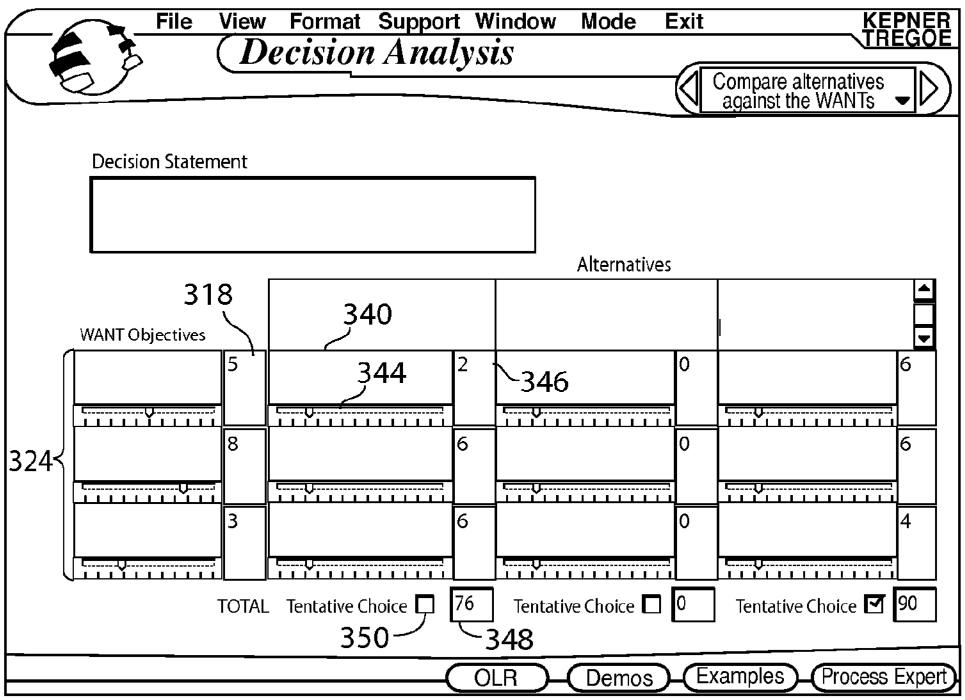
FIG. 26 shows the COMPARE ALTERNATIVES AGAINST THE WANTS screen of the Decision Analysis screen sequence.

Following consideration of MUST objectives, the COMPARE ALTERNATIVES AGAINST THE WANTS screen (FIG. 26) is entered. This screen is provides a WANT ALTERNATIVE slider 344 to rank alternatives, such as on a 1–10 scale, rather than a discrete GO/NO GO toggle. Previously entered want weight 318 is also displayed for reference. For each want objective/alternative combination, a FEASIBILITY cell 340 is provided to describe the alternative with respect to the objective. Each WANT OBJECTIVE 304 is compared to ALTERNATIVES 326. The alternative which best satisfies the want objective receives a score 346 value of ten, or highest, using slider 344. The other alternatives for that WANT OBJECTIVE 324 are scored relative to the alternative which received the score of ten.

Once the ALTERNATIVES 326 are scored, a weighted score for each objective 324 is computed and displayed. The weighted score is the result of the weight value assigned the objective multiplied by the score value assigned to this alternative. The total weighted scores then indicate which alternatives best satisfy the objectives. Also provided is a total alternative score 348 for each alternative, which serves as an indicator of the alternatives having a greater overall impact. A tentative choice button 350 is clicked to indicate which alternatives are selected by the user, which need not be the alternatives having the highest total alternative score 348.

Figure 27:
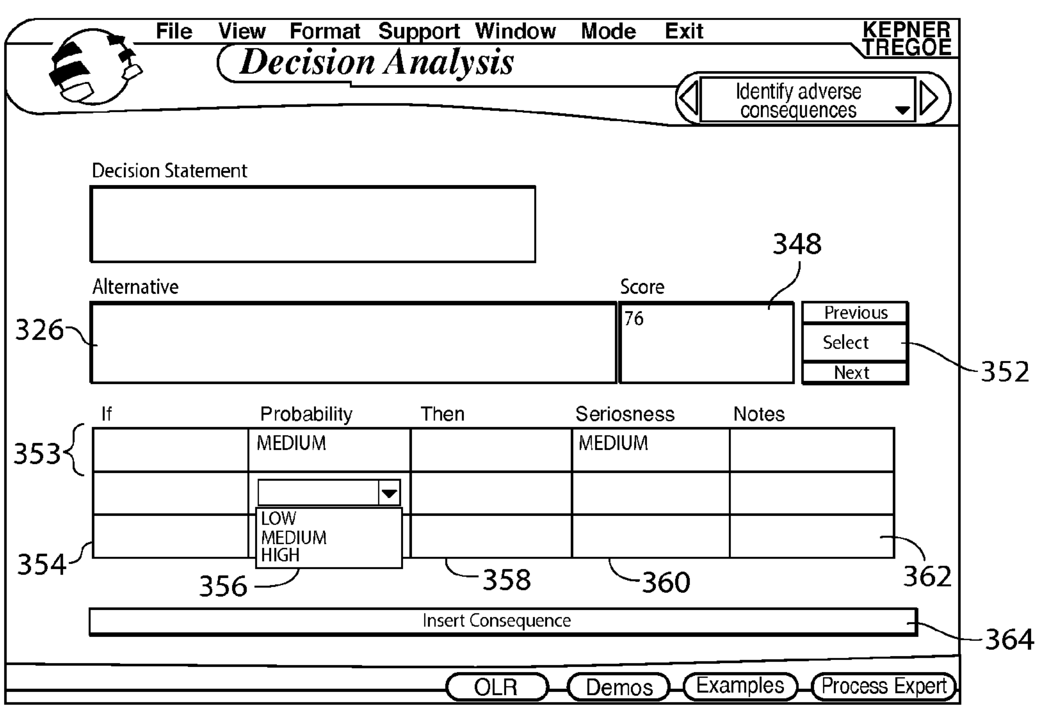
FIG. 27 shows the IDENTIFY ADVERSE CONSEQUENCES screen of the Decision Analysis screen sequence.

Following the scoring of the alternatives, risks associated with each alternative selected for further evaluation are considered on the identify adverse consequences screen (FIG. 27). The remaining alternatives are displayed in descending order by total alternative score, one at a time in alternatives cell 326, along with the corresponding total alternative score cell 348. Users scroll through the alternatives carried over from the previous screen using alternative selection buttons 352. As each alternative is displayed, users identify a possible adverse consequence 353 which could result from this alternative. The user enters descriptive text in "if" cell 354 to define the condition under which the adverse consequence could occur. Probability cell 356 is a pull-down of choices such as low, medium, and high, indicative of the probability that the adverse consequence will occur. "Then" cell 358 is for descriptive text concerning the result of the adverse consequence occurring, and seriousness cell 360 is a pull-down with the options low, medium, and high Indicative of the magnitude of the result should the adverse consequence occur. Notes cell 362 is for descriptive text concerning other information about the condition or result for further clarification or later query. Multiple consequences for an alternative may be entered through INSERT adverse CONSEQUENCE button 364.

Figure 28:
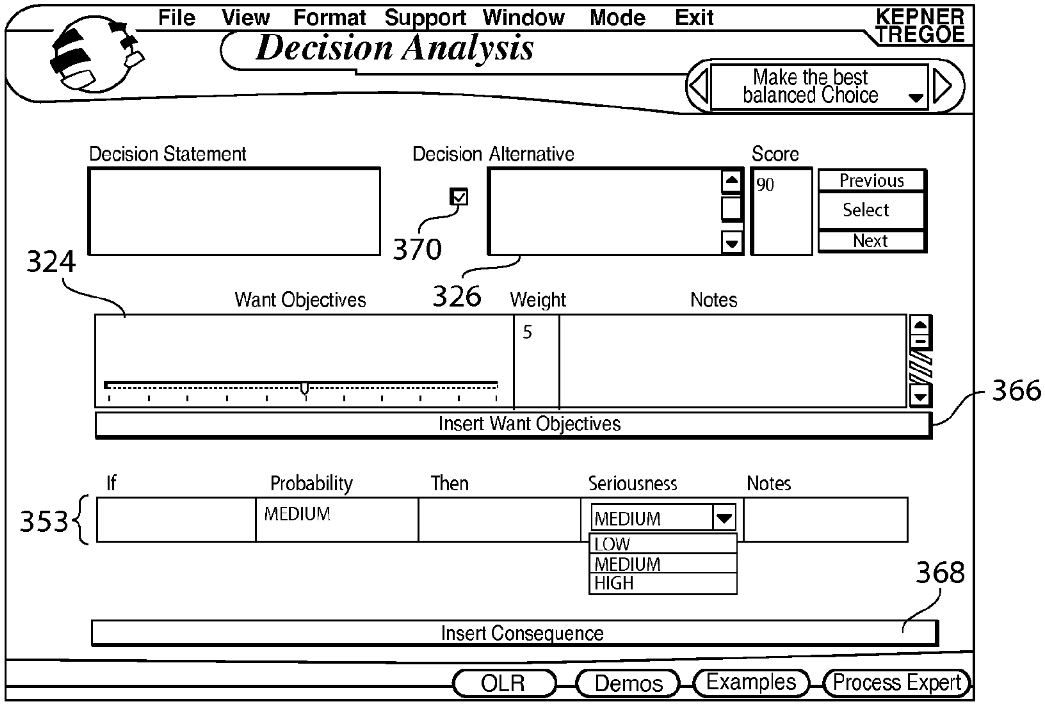
FIG. 28 shows the MAKE THE BEST BALANCED CHOICE screen of the Decision Analysis screen sequence.

FIG. 28 shows the MAKE THE BEST BALANCED CHOICE screen. This screen is used to select one alternative as a decision by displaying cells for the ADVERSE CONSEQUENCES 353 carried over from the previous screen, the total alternative score cell 348, and the want OBJECTIVES cell 324, entered previously. Mandatory "MUST" objectives have already been considered by eliminating the alternatives which do not satisfy them. Accordingly, the adverse consequence cells 353, WANT OBJECTIVE cells 324, and ALTERNATIVES cells 326, may now be scrolled through to evaluate the elements of each available alternative 326. Additional want objectives or adverse consequences may also be entered on this screen by clicking on INSERT WANT OBJECTIVE button 366 or INSERT ADVERSE CONSEQUENCE button 368, respectively. The chosen alternative is marked as a final decision by DECISION checkbox cell 370.

Figure 29:
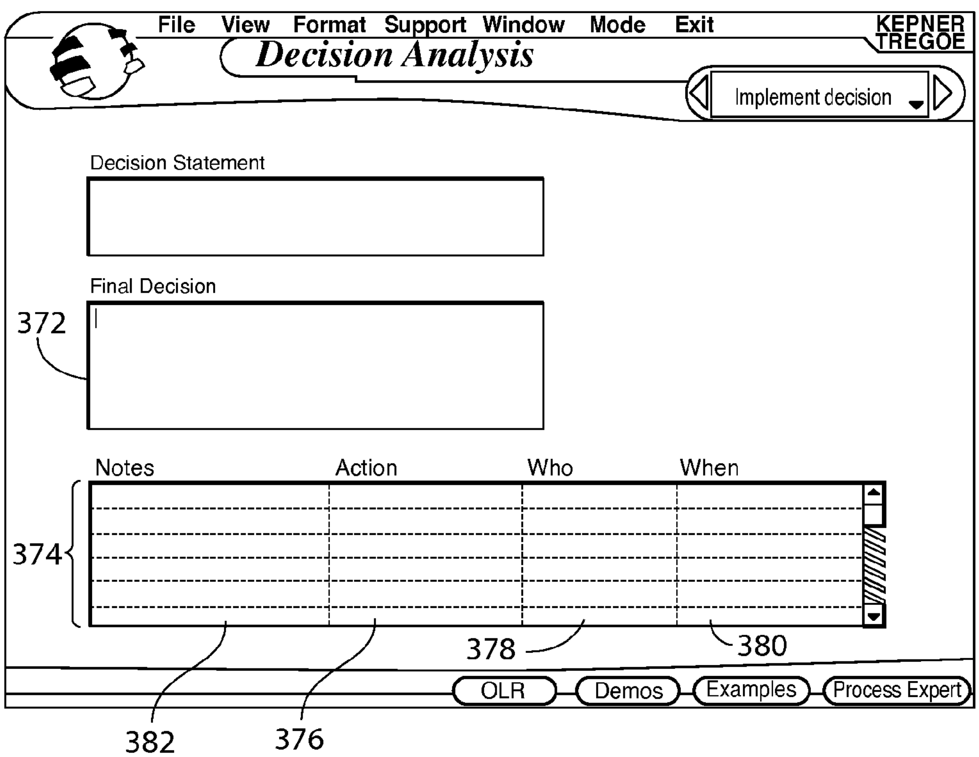
FIG. 29 shows the IMPLEMENT DECISION screen of the Decision Analysis screen sequence.

Following selection of final decision, the IMPLEMENT DECISION screen is displayed (FIG. 29). This screen displays the final decision 372 as chosen on the previous screen from the most appealing alternative 326, and further provides ACTION TRACKER cells for ACTION 376, WHO 378, WHEN 380, and NOTES 382. These cells provide input to the ACTION TRACKER, and are used similarly to the action tracker cells in the other screen sequences. Actions required to implement or complete the chosen decision are assigned to groups or individuals, scheduled, and tracked using the action tracker, described further below.

Potential Problem Analysis

Once a decision is made, the implementation of that decision may nonetheless encounter problems. The potential problem analysis screen sequence is used to enter and organize events and/or occurrences which may hinder the implementation of action plans. This screen sequence may be pursued following entry of ACTION TRACKER cells after a decision analysis or other process screen sequence, above, or may be undertaken alone with respect to an independent course of action.

Figure 30:
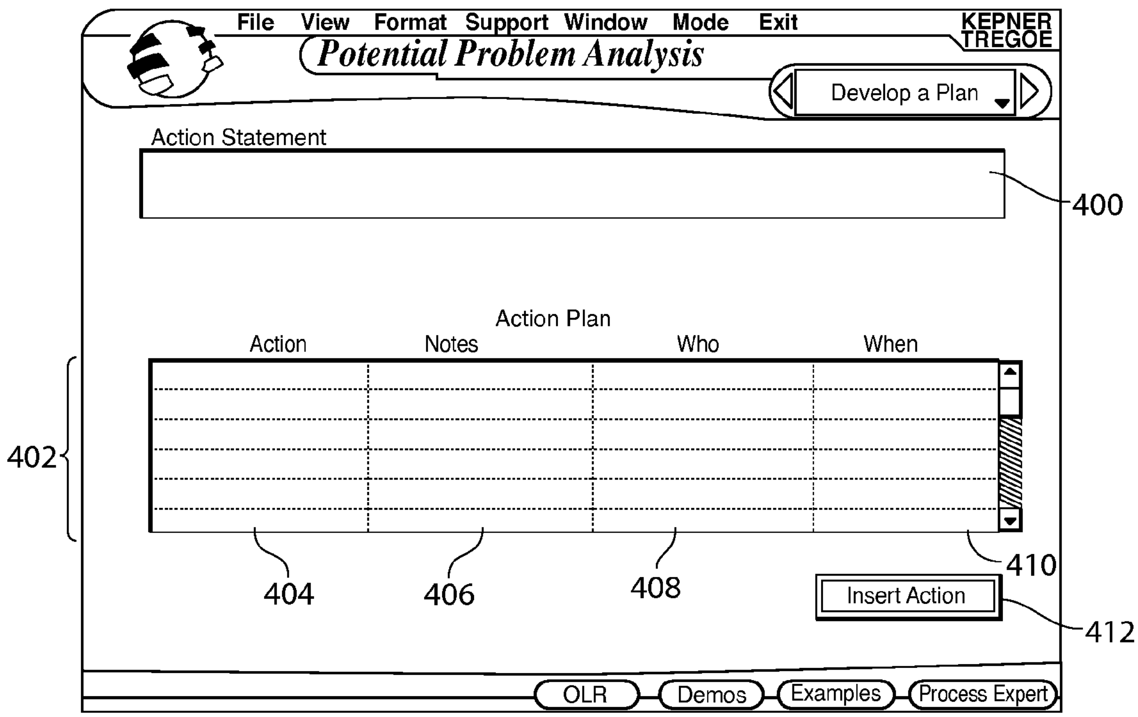
FIG. 30 shows the DEVELOP A PLAN screen of the Potential Problem Analysis screen sequence.

Referring to FIG. 30, the DEVELOP A PLAN screen is shown. An action statement defining a specific and concise purpose of the action, task, or project is entered in ACTION STATEMENT cell 400. This statement may be carried over or modified from a decision analysis, or may be entered as free form text. A set of ACTION cells 402 is provided, which may be populated from an action tracker file or entered by the user. ACTION PLAN cell 404, NOTES cell 406, WHO cell 408, and WHEN cell 410 are used as in other process screen sequences to enter actions or tasks, clarifying notes, responsible groups or individuals, and due dates, respectively, and are described with the action tracker description below. Additional ACTION cells may be entered by clicking on INSERT ACTION button 412.

Figure 31:
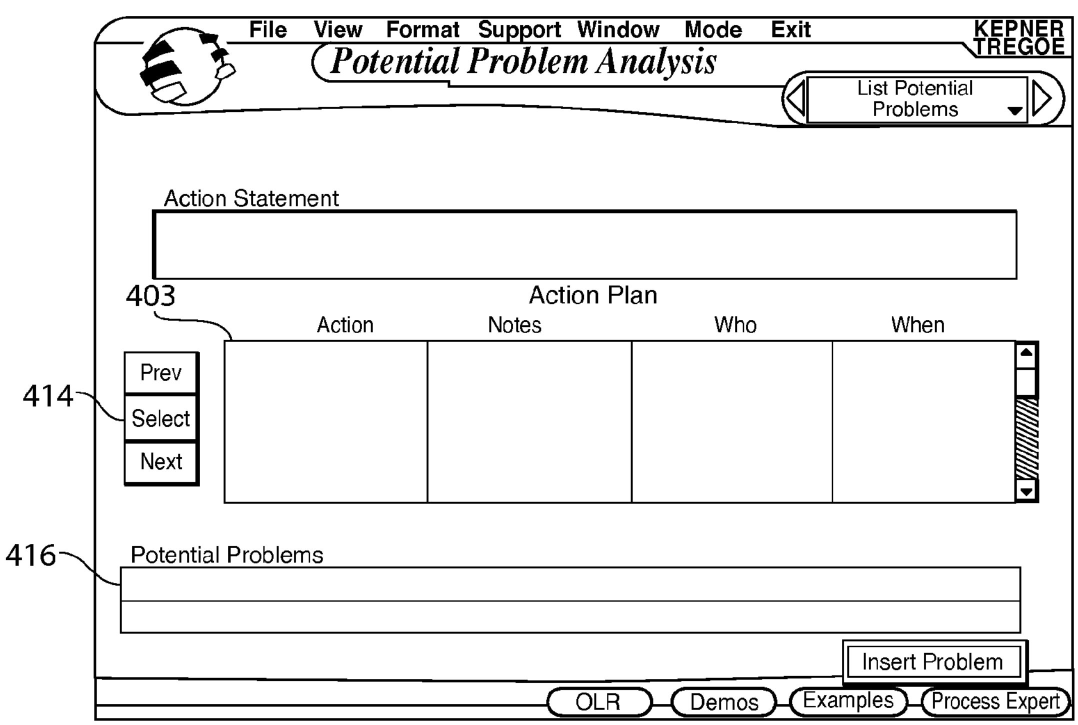
FIG. 31 shows the LIST POTENTIAL PROBLEMS screen of the Potential Problem Analysis screen sequence.

List potential problems screen (FIG. 31) is then used to view each ACTION cell 403 individually, and enter potential problems which could be raised by the specific action in POTENTIAL PROBLEMS cell 416. The POTENTIAL PROBLEMS cell allows entry of a concise statement to respond to important areas of the corresponding action. This sequence therefore allows entry of specific, concise potential problems corresponding to a particular action for later analysis. Scroll buttons 414 are used to advance through the ACTION cells 402 to review each action.

Figure 32:
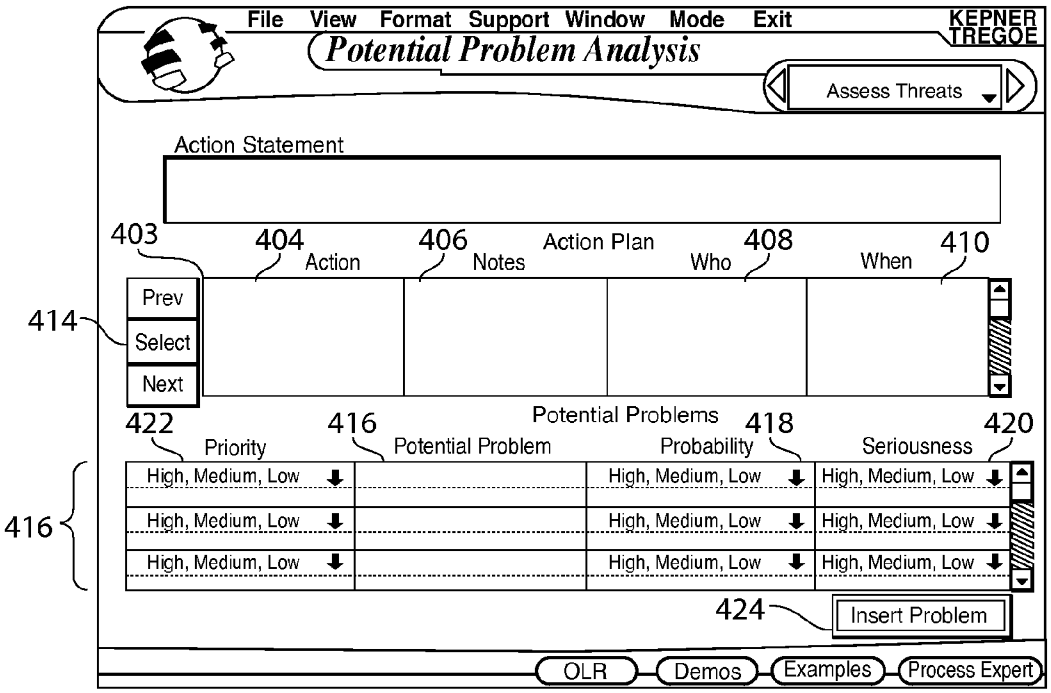
FIG. 32 shows the ASSESS THREATS screen of the Potential Problem Analysis screen sequence.

After the user has entered the potential problems for the actions, the ASSESS THREATS screen (FIG. 32) is used to identify potential problems which require the most attention, and those which are unlikely to have a serious impact. The potential problems list entered on the previous screen therefore prioritizes the list to identify potential problems requiring attention first. ACTION STATEMENT cell 400 echoes the action statement. ACTION cell 403 lists the ACTION plan 404, NOTES 406, WHO 408, and when 410 cells individually, and may be scrolled using scroll buttons 414. For each ACTION cell 403, the potential problems associated with that action are listed in POTENTIAL PROBLEM cells 416. For a potential problem, the user enters a PROBABILITY cell 418, and a SERIOUSNESS cell 420. PRIORITY cell 422 is computed based on the values of the seriousness and probability cells after potential problems have been assigned values. PROBABILITY cell 418 is a pull-down with comparative values such as low, medium, and high. For each potential problem the user evaluates the probability of occurrence and enters a value accordingly. Similarly, SERIOUSNESS cell 420 is a low, medium, high pull-down which is set according to the magnitude of the result should the potential problem occur. In this manner, the user can identify potential problems which represent an acceptable amount of risk, and those that need to be accounted for. INSERT PROBLEM button 424 can be used to add additional potential problems.

Figure 33:
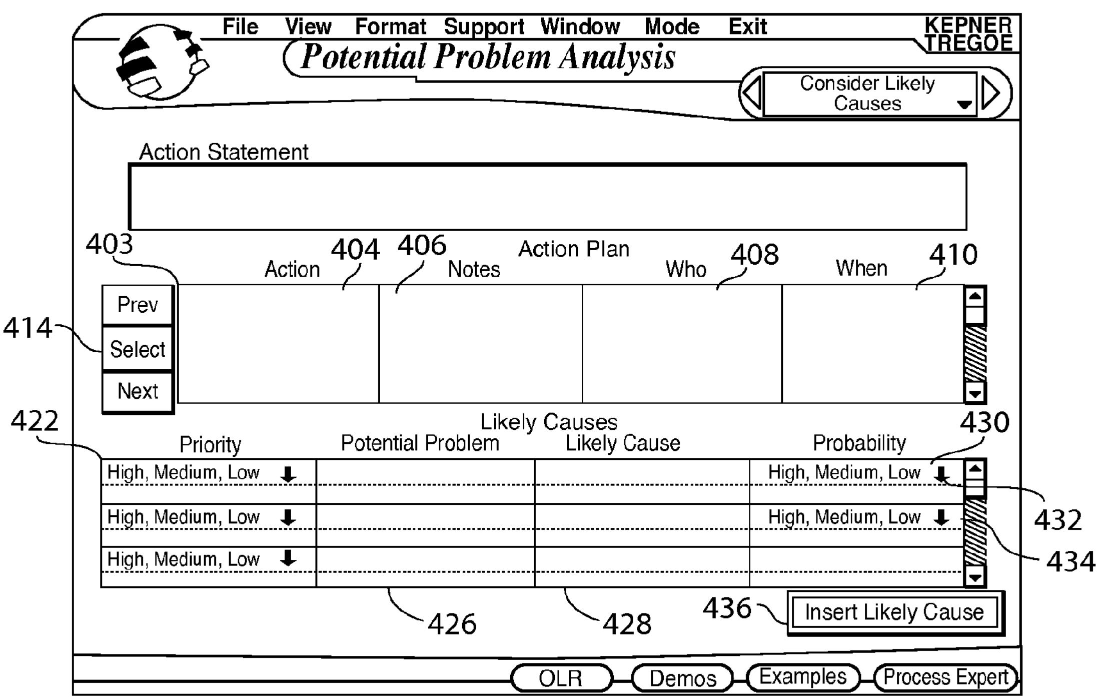
FIG. 33 shows the CONSIDER LIKELY CAUSES screen of the Potential Problem Analysis screen sequence.

The CONSIDER LIKELY CAUSES screen (FIG. 33) is next used to enter likely causes of each of the potential problems. Each potential problem is displayed in POTENTIAL PROBLEM cell 426, along with the corresponding PRIORITY cell 422. In this manner, the user can elect to only address potential problems having a certain priority, high or medium, for example, and deem the others to represent an acceptable risk. For each potential problem chosen to be addressed, a LIKELY CAUSE cell 428 is provided for entering a concise statement of the actions, occurrences, or other events which might result in the potential problem. Multiple likely causes may be entered for each potential problem. A CAUSE PROBABILITY cell 430 is also provided to describe the probability of the cause occurring. CAUSE PROBABILITY pull-down 432 is used to enter a comparative discrete low, medium, or high value, while PROBABILITY notes portion 434 is used for descriptive text describing the probability. Additional likely causes attributed to a potential problem may be added through INSERT LIKELY CAUSE button 436.

Figure 34:
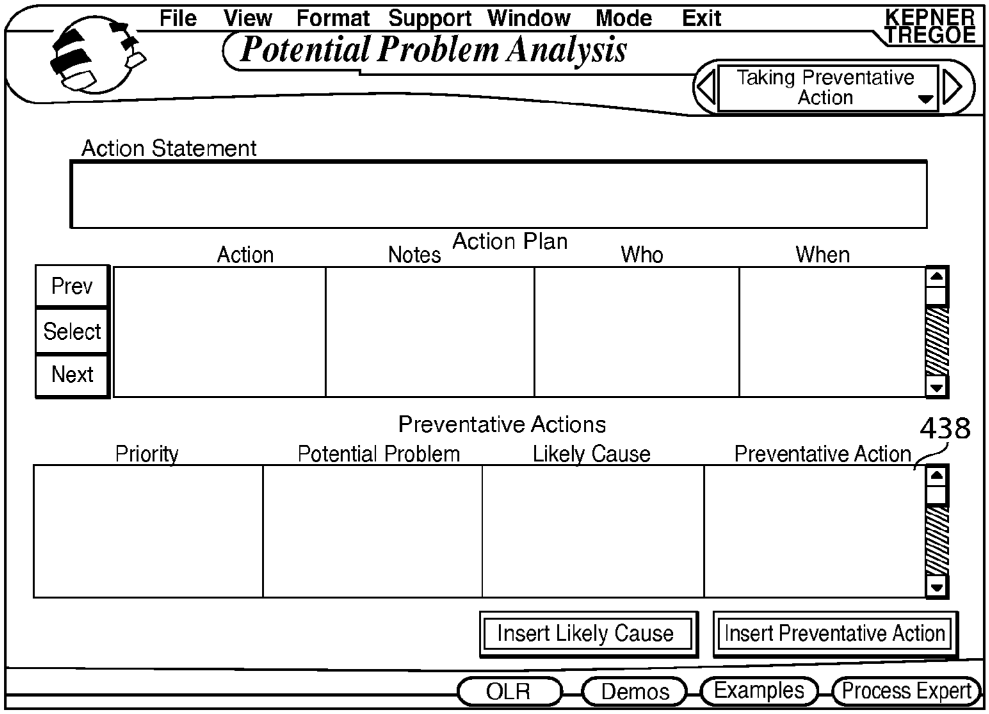
FIG. 34 shows the TAKING PREVENTATIVE ACTION screen of the Potential Problem Analysis screen sequence.

The TAKING PREVENTIVE ACTION screen shown in FIG. 34 is then used to enter one or more PREVENTIVE ACTION cells 438 corresponding to a particular likely cause. A preventative action to serve as a barrier against the likely cause is entered in this cell 438. CAUSE PROBABILITY cell 430 from the previous screen may be used to assess more serious likely causes first, or to accept the risk of a low probability likely cause.

Figure 35:
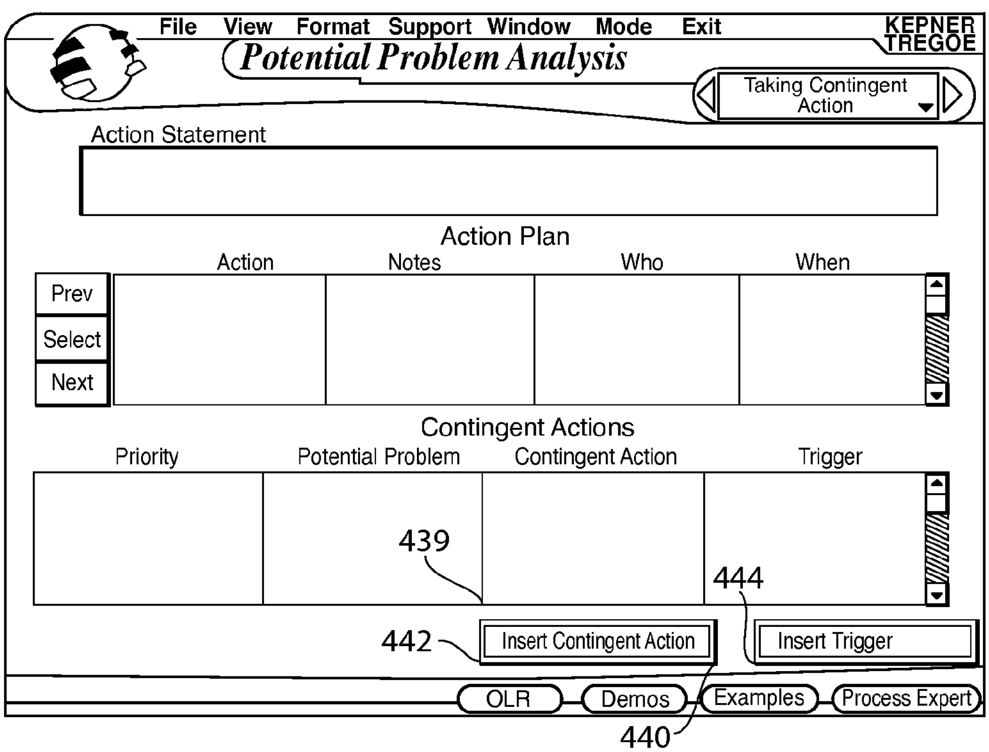
FIG. 35 shows the TAKING CONTINGENT ACTION screen of the Potential Problem Analysis screen sequence.

Despite robust preventative actions, it is may be that the chance of a likely cause occurring cannot be reduced to zero. TAKING CONTINGENT ACTION screen (FIG. 35) is used to enter actions which can minimize the effect if a particular potential problem nonetheless occurs. CONTINGENT ACTION cells 439 are used to enter such actions. Since such actions are only necessary if the potential problem occurs, TRIGGER cell 440 is used to specify the system, person, or event to invoke the particular contingent action. The information in TRIGGER cell 440 therefore contains information identifying the event that triggers and commences the contingent action to provide a rapid response to a particular potential problem. Additional CONTINGENT ACTION cells 439 and TRIGGER cells 440 may be added through the respective buttons 442, 444.

Figure 36:
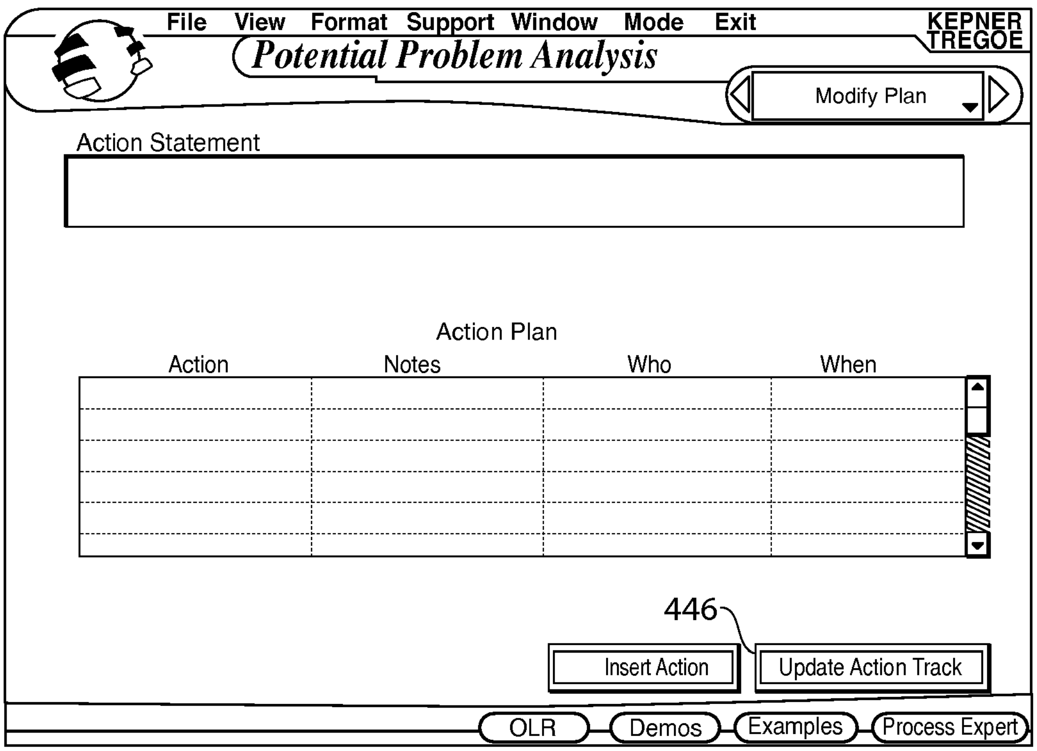
FIG. 36 shows the MODIFY PLAN screen of the Potential Problem Analysis screen sequence.

MODIFY PLAN screen (FIG. 36) is then used to review the action cells along with the preventative and contingent actions entered in this screen sequence. Upon finalization of the action plan, update ACTION TRACKER button 446 is used to store the information in the knowledge base where it is available to other process screen sequences as described further below with respect to the action tracker.

Potential Opportunity Analysis

Once a decision is made, the implementation of that decision may provide additional opportunities. The potential opportunity analysis screen sequence is used to enter and organize events and/or occurrences which may offer opportunities in the implementation of action plans. This screen sequence may be pursued following entry of ACTION TRACKER cells following a decision analysis or other process screen sequence, above, or may be undertaken alone with respect to an independent course of action.

Figure 49:
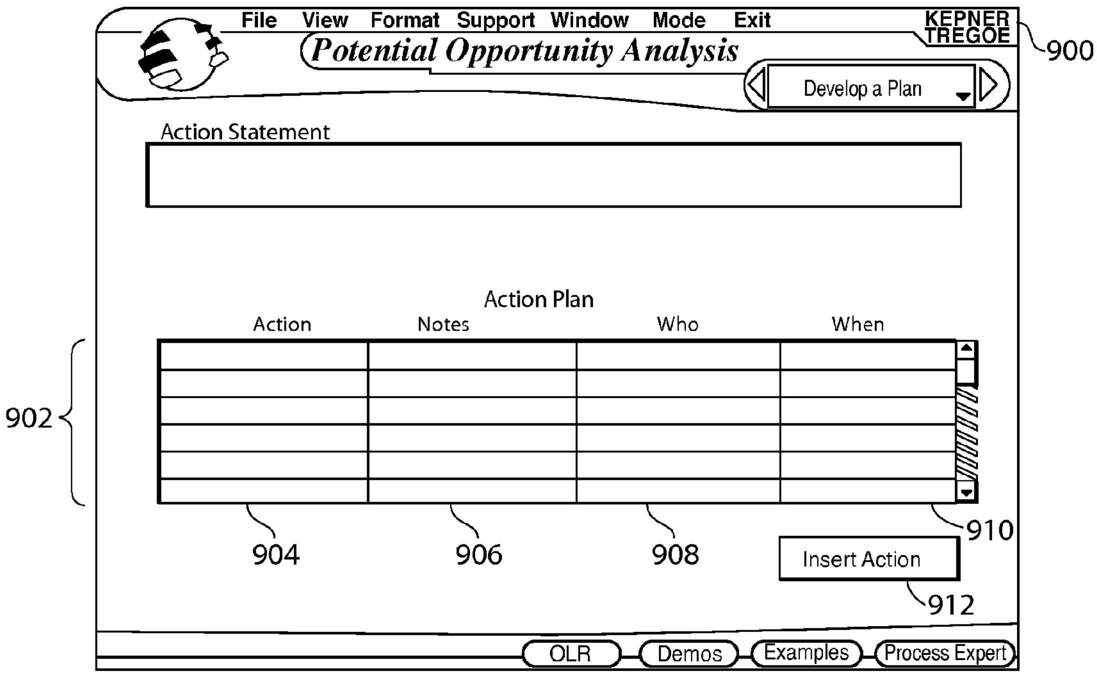
FIG. 49 shows the DEVELOP A PLAN screen of the Potential Opportunity Analysis screen sequence.

Referring to FIG. 49, the DEVELOP A PLAN screen is shown. An action statement defining a specific and concise purpose of the action, task, or project is entered in ACTION STATEMENT cell 900. This statement may be carried over or modified from a decision analysis, or may be entered as free form text. A set of ACTION cells 902 is provided, which may be populated from an action tracker file or entered by the user. ACTION PLAN cell 904, NOTES cell 906, WHO cell 908, and WHEN cell 910 are used as in other process screen sequences to enter actions or tasks, clarifying notes, responsible groups or individuals, and due dates, respectively, and are described with the action tracker description below. Additional ACTION cells may be entered by clicking on INSERT ACTION button 912.

Figure 50:
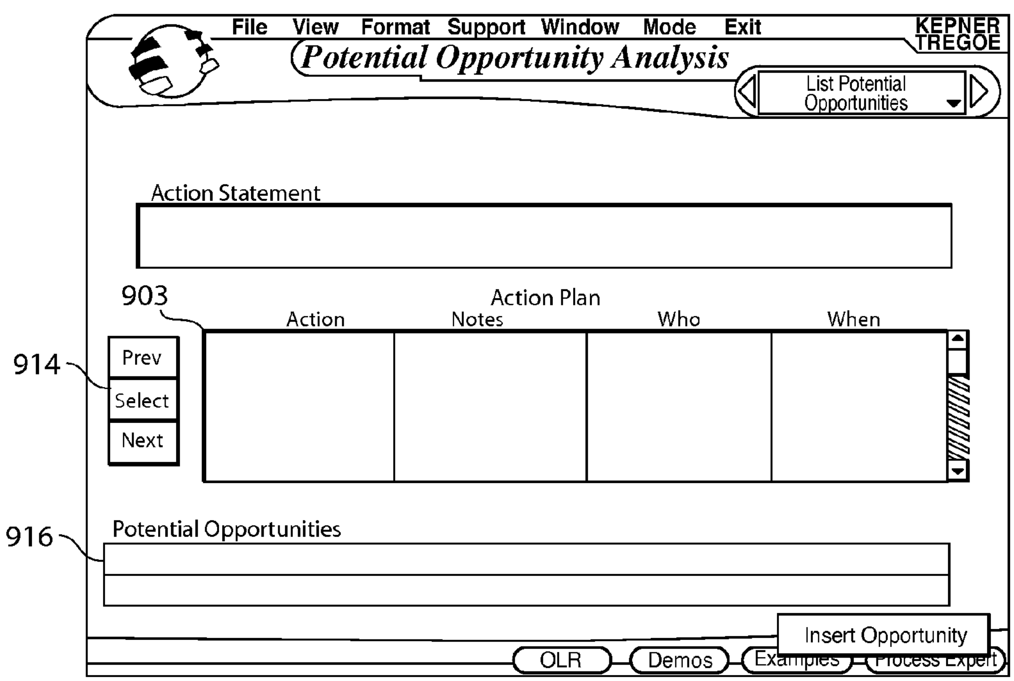
FIG. 50 shows the LIST POTENTIAL OPPORTUNITIES screen of the Potential Opportunity Analysis screen sequence.

List potential opportunities screen (FIG. 50) is then used to view each ACTION cell 903 individually, and enter potential opportunities which could be raised by the specific action in POTENTIAL OPPORTUNITIES cell 916. The POTENTIAL OPPORTUNITIES cell allows entry of a concise statement to respond to important areas of the corresponding action. This sequence therefore allows entry of specific, concise potential opportunities corresponding to a particular action for later analysis. Scroll buttons 914 are used to advance through the ACTION cells 902 to review each action.

Figure 51:
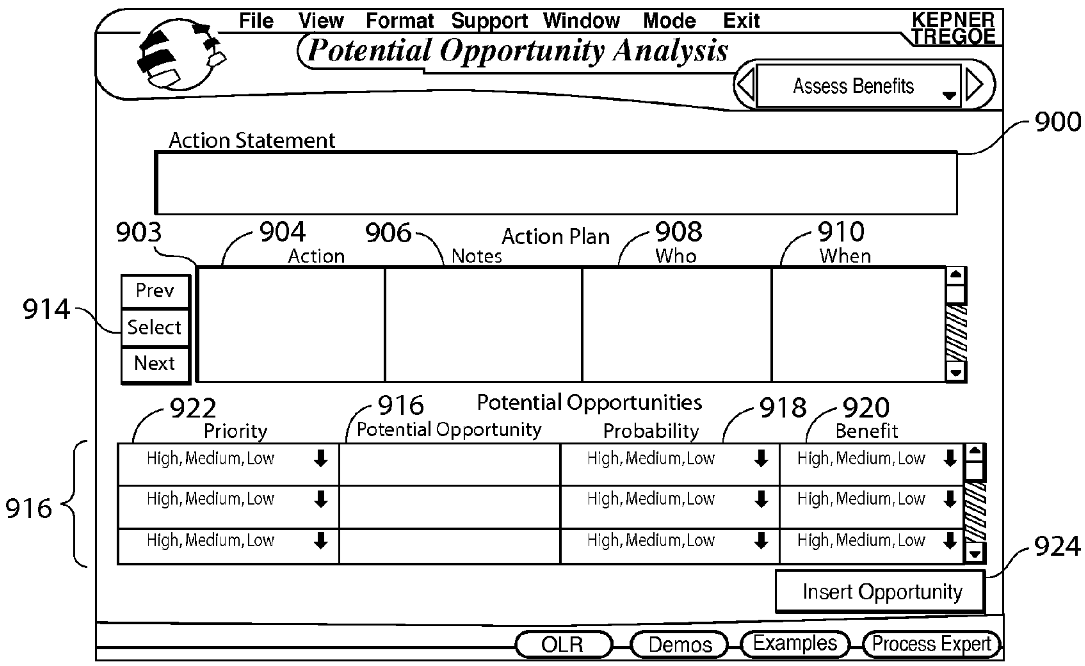
FIG. 51 shows the ASSESS BENEFITS screen of the Potential Opportunity Analysis screen sequence.

After the user has entered the potential opportunities for the actions, the ASSESS BENEFITS screen (FIG. 51) is used to identify potential opportunities which offer the greatest benefit, and those which are unlikely to have an opportunistic impact. The potential opportunities list entered on the previous screen therefore prioritizes the list to identify potential opportunities requiring attention first. ACTION STATEMENT cell 900 echoes the action statement. ACTION cell 903 lists the ACTION plan 904, NOTES 906, WHO 908, and when 910 cells individually, and may be scrolled using scroll buttons 914. For each ACTION cell 903, the potential opportunities associated with that action are listed in POTENTIAL OPPORTUNITY cells 916. For each potential opportunity, the user enters a PROBABILITY cell 918, and a SERIOUSNESS cell 920. PRIORITY cell 922 is computed based on the values of the benefit and probability cells after potential opportunities have been assigned values. PROBABILITY cell 918 is a pull-down with comparative values such as low, medium, and high. For each potential problem the user evaluates the probability of occurrence and enters a value accordingly. Similarly, BENEFIT cell 920 is a low, medium, high pull-down which is set according to the magnitude of the result should the potential opportunity occur. In this manner, the user can identify potential opportunities which represent an acceptable amount of benefit, and those that need to be acted upon. INSERT OPPORTUNITY button 924 can be used to add additional potential opportunities.

Figure 52:
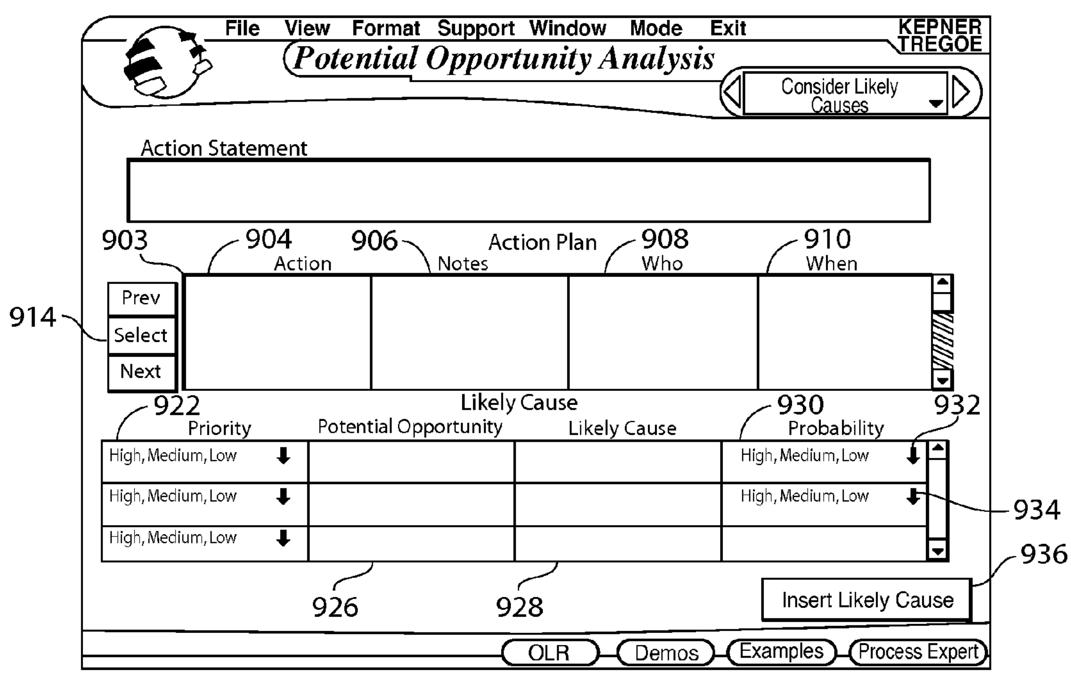
FIG. 52 shows the CONSIDER LIKELY CAUSES screen of the Potential Opportunity Analysis screen sequence.

The CONSIDER LIKELY CAUSES screen (FIG. 52) is next used to enter likely causes of each of the potential opportunities. Each potential opportunity is displayed in POTENTIAL OPPORTUNITY cell 926, along with the corresponding PRIORITY cell 922. In this manner, the user can elect to only address potential opportunities having a certain priority, high or medium, for example, and deem the others to represent a lower priority benefit. For each potential opportunity chosen to be addressed, a LIKELY CAUSE cell 928 is provided for entering a concise statement of the actions, occurrences, or other events which might result in the potential opportunity. Multiple likely causes may be entered for each potential problem opportunity. A CAUSE PROBABILITY cell 930 is also provided to describe the probability of the cause occurring. CAUSE PROBABILITY pull-down 932 is used to enter a discrete comparative value such as low, medium, or high, while PROBABILITY notes portion 934 is used for descriptive text describing the probability. Additional likely causes attributed to a potential problem may be added through INSERT LIKELY CAUSE button 936.

Figure 53:
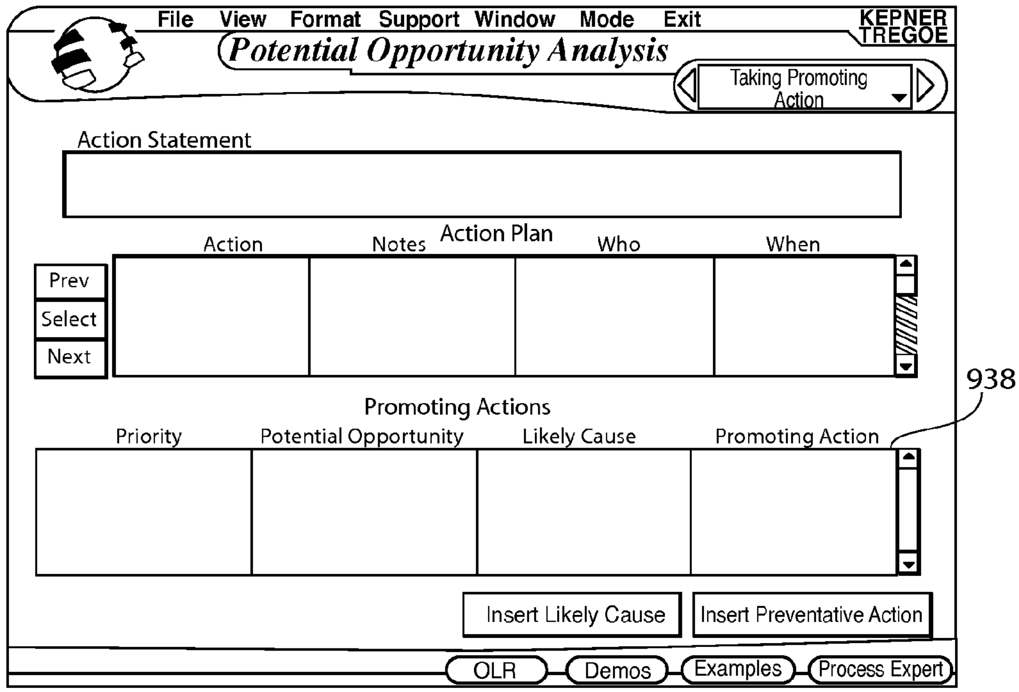
FIG. 53 shows the TAKING PROMOTING ACTION screen of the Potential Opportunity Analysis screen sequence.

The TAKING PROMOTING ACTION screen shown in FIG. 53 is then used to enter one or more PROMOTING ACTION cells 938 corresponding to a particular likely cause. A promoting action to serve as a barrier against the likely cause is entered in this cell 938. CAUSE PROBABILITY cell 930 from the previous screen may be used to assess higher benefit likely causes first, or to no longer consider a low probability likely cause.

Figure 54:
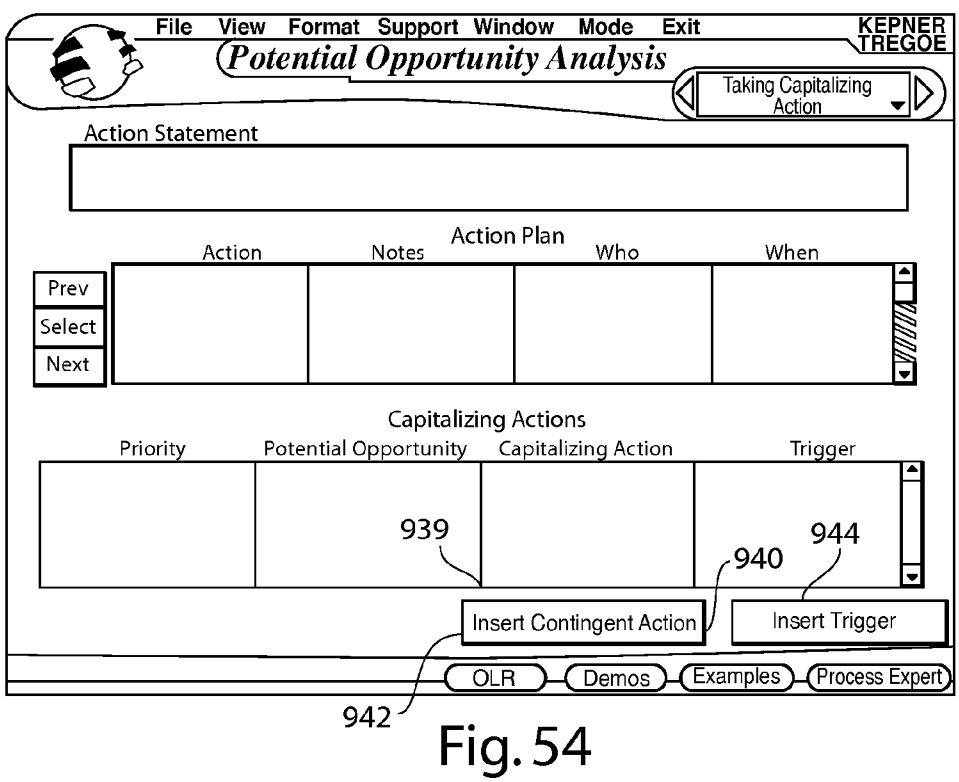
FIG. 54 shows the TAKING CAPITALIZING ACTION screen of the Potential Opportunity Analysis screen sequence.

Despite robust promoting actions, it is unlikely that the chance of a likely cause occurring can be increased to be a certainty. TAKING CAPITALIZING ACTION screen (FIG. 54) is used to enter actions which can maximize the effect if a particular potential opportunity occurs, whether caused by the promoting action or not. CAPITALIZING ACTION cells 939 are used to enter such actions. Since such actions are only necessary if the potential opportunity occurs, TRIGGER cell 940 is used to specify the system, person, or event to invoke the particular capitalizing action. The information in TRIGGER cell 940 therefore provides an enumeration to provide a rapid response to a particular potential opportunity. Additional CAPITALIZING ACTION cells 939 and TRIGGER cells 940 may be added through the respective buttons 942, 944.

When the capitalizing actions and triggers have been identified, it is often necessary to take preparatory actions that set the capitalizing actions and/or triggers in place before the potential opportunity might occur, and to remove the capitalizing actions and triggers after the potential opportunity could no longer occur.

Figure 37:
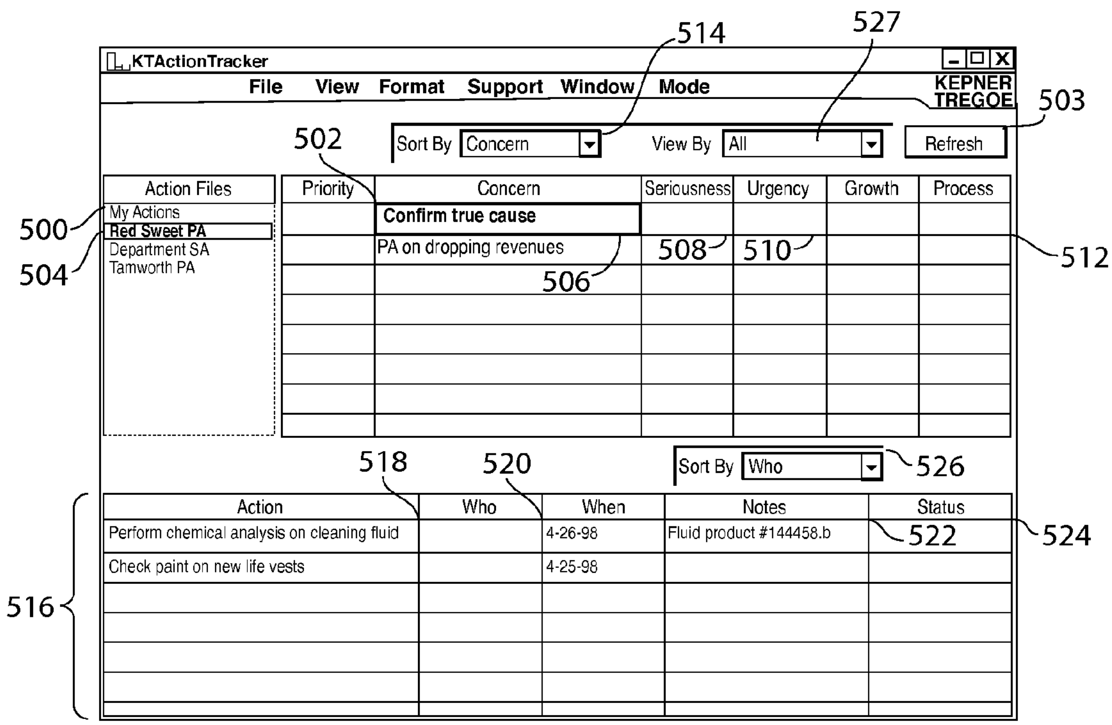
FIG. 37 shows the ACTION TRACKER screen.
Figure 55:
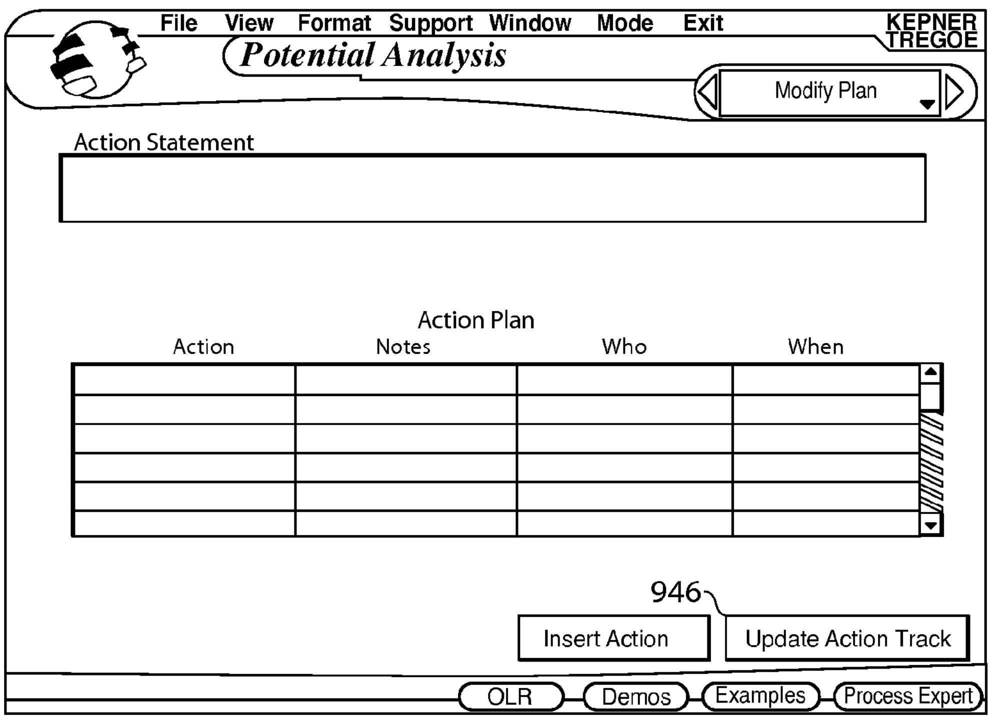
FIG. 55 shows the MODIFY PLAN screen of the Potential Opportunity Analysis screen sequence.

MODIFY PLAN screen (FIG. 55) is then used to review the action cells along with the promoting and capitalizing actions entered in this screen sequence. Upon finalization of the action plan, update ACTION TRACKER button 946 is used to store the information in the knowledge base where it is available to other process screen sequences as described further below with respect to the action tracker. ACTION TRACKER The action tracker interface is used to store, identify and compare tasks, responsible individuals or groups, due dates, and other logistical information associated with the various process screen sequence defined herein. The action tracker can be updated directly or through action tracker data entered during the process screen sequences. Referring to FIG. 37, the ACTION TRACKER master screen is shown. This screen is similar to the ACTION TRACKER entry screen in the other process screen sequences. ACTION FILE cell 500 is used to select a previously entered action file for review and/or update. Action files on users systems across the network are listed here for various action files resulting from the process screen sequences described above. In this manner, enterprisewide monitoring of the various process screen sequences being undertaken is provided. REFRESH button 503 can be used to update the action tracker master screen with any new information entered by a user concerning a process screen sequence.

CONCERN cells 502 in the ACTION FILE 504, that can also be implemented in the other processes, list the concerns stored in the ACTION FILE 504 selected. Each concern is evaluated by criteria such as: urgency, growth, and seriousness, and is specified along a scale through a pull-down menu. A fourth cell, PRIORITY, is computed based on the values of the other three. SERIOUSNESS cell 506 is for entering a discrete ranking of magnitude relative to the seriousness of other concerns, and has a value of High (H), medium (M), low (L), and need more data (NMD). URGENCY cell 508 is rated based on a determination of when resolution of this concern would become difficult, expensive, or impossible, and has a value of low, medium, or high. GROWTH cell 510 is for indicating the potential that the seriousness of the concern will grow. PROCESS cell 512 is for specifying which of the process screen sequences applies to this concern: situation appraisal, problem analysis, decision analysis, or potential problem analysis. CONCERN SORT pull-down 514 allows the CONCERNS 502 from the action file to be sorted by various fields such as concern, process, or priority. VIEW BY pull-down 527 allows a user to view all concerns in the action file, or only those specific to a certain individual, such as all concerns to which the user is attributed an action.

Figure 56:
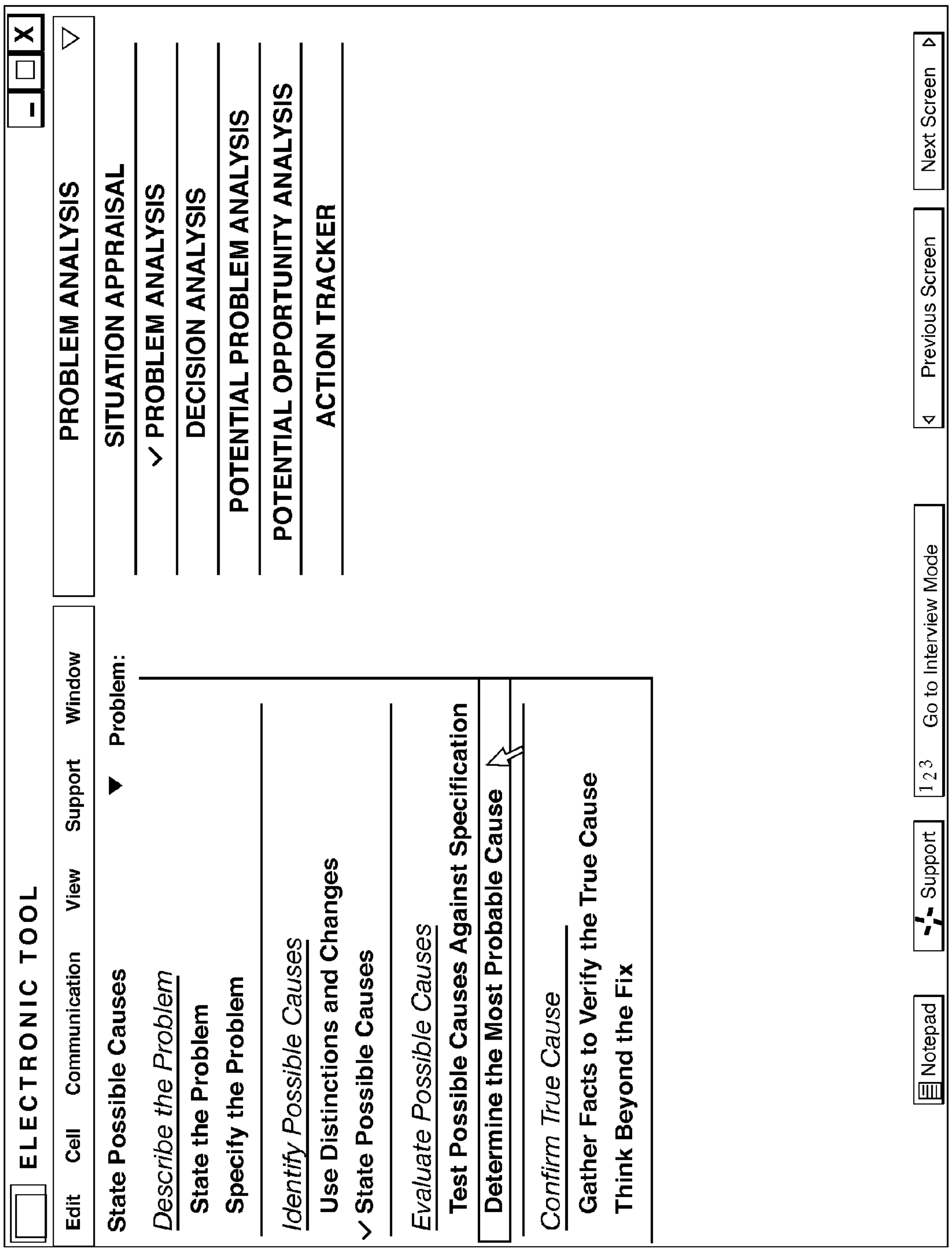
FIG. 56 shows a GUI screen indicative of the top-level menu as illustrated in FIG. 1.
Figure 57:
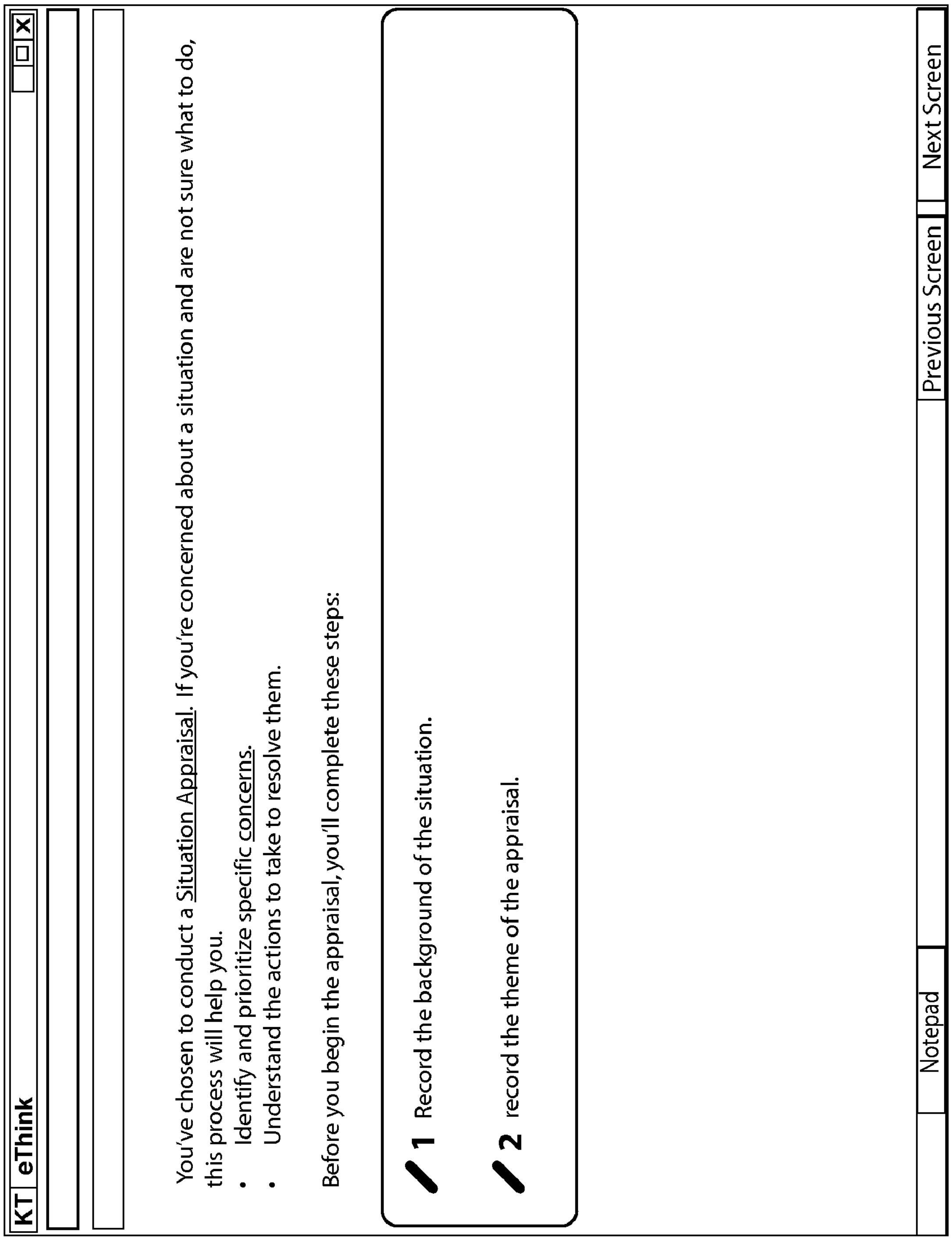
FIGS. 57–73 show an alternative embodiment of the GUI screens of the situation appraisal process screen sequence.
Figure 58:
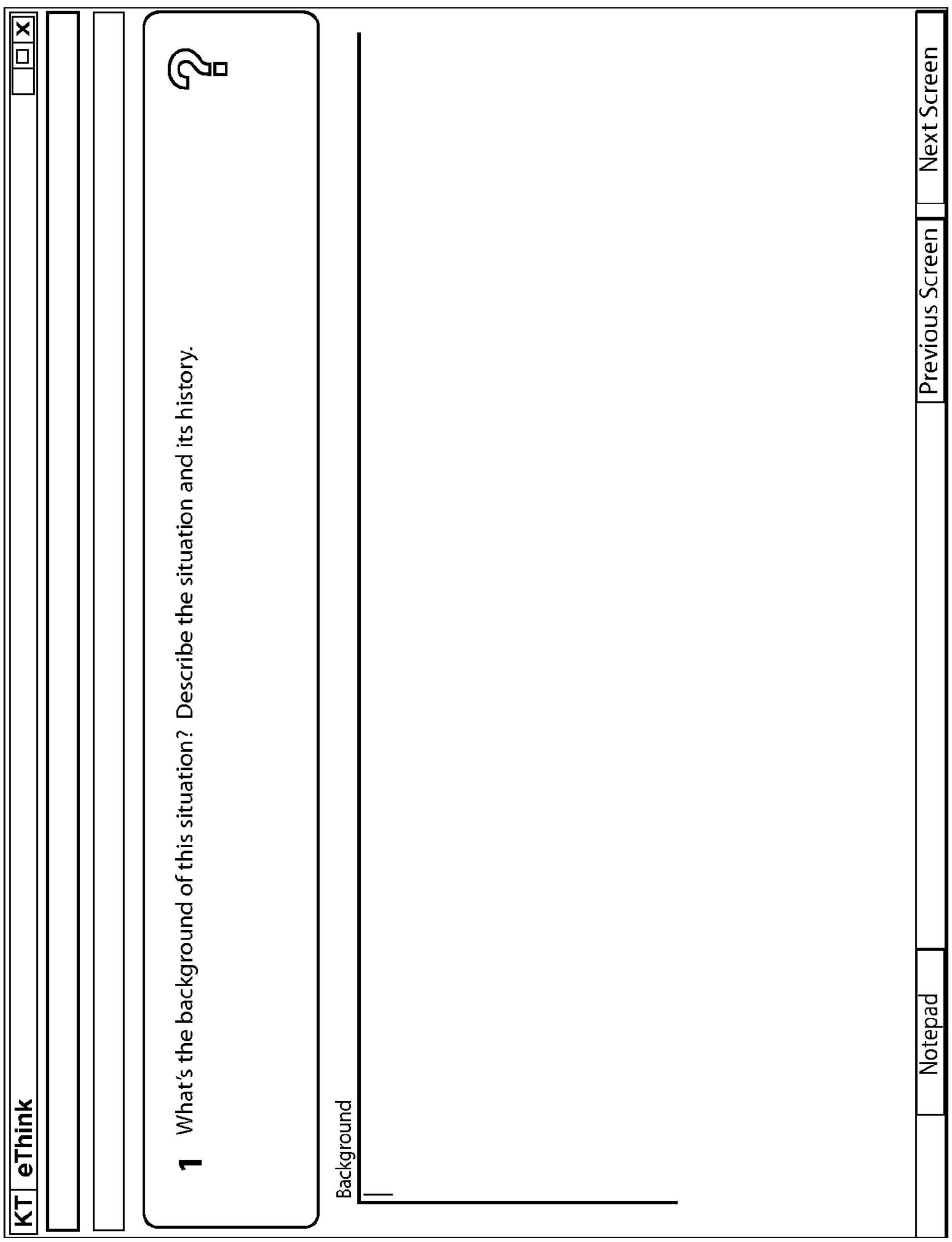
Figure 59:
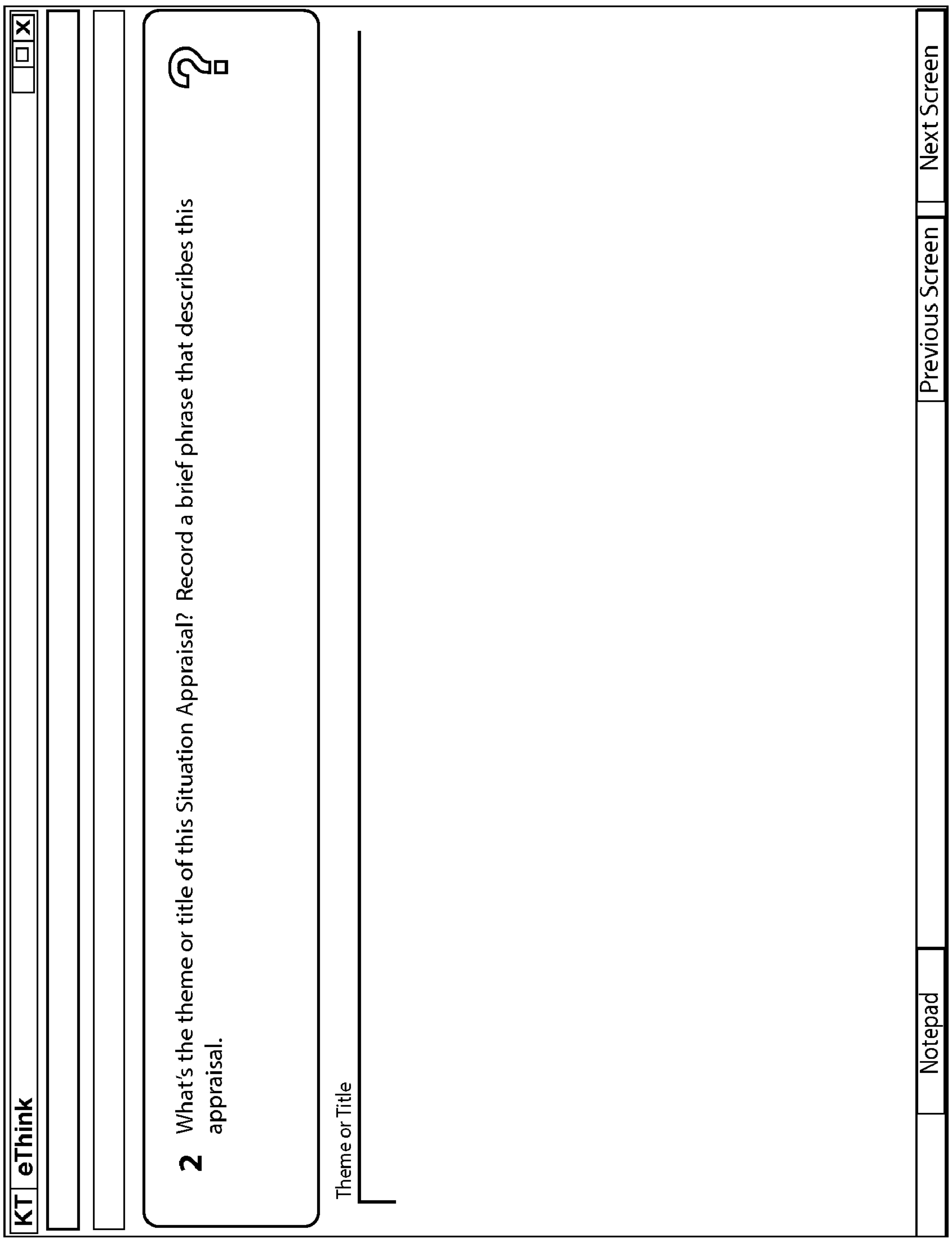
Figure 60:
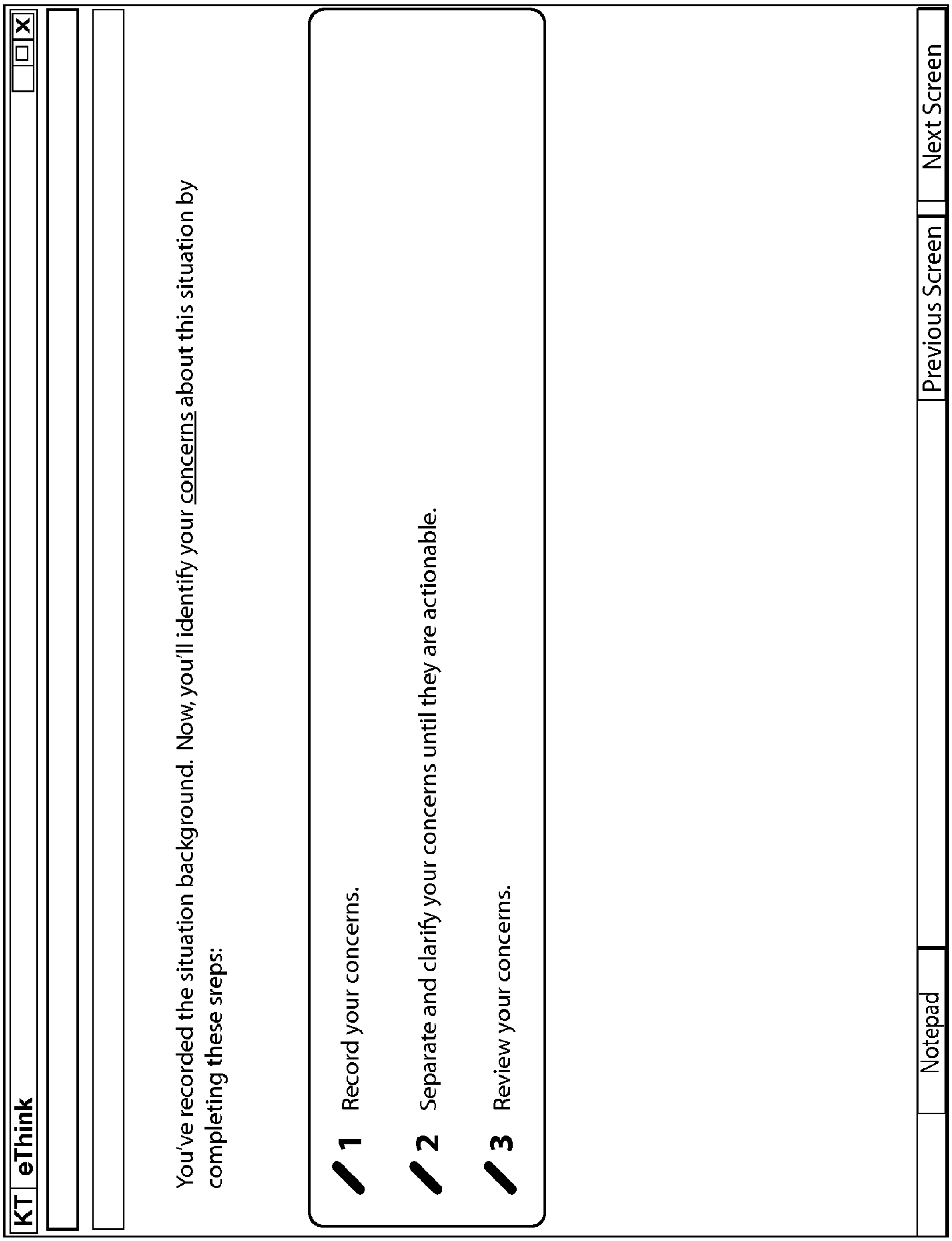
Figure 61:
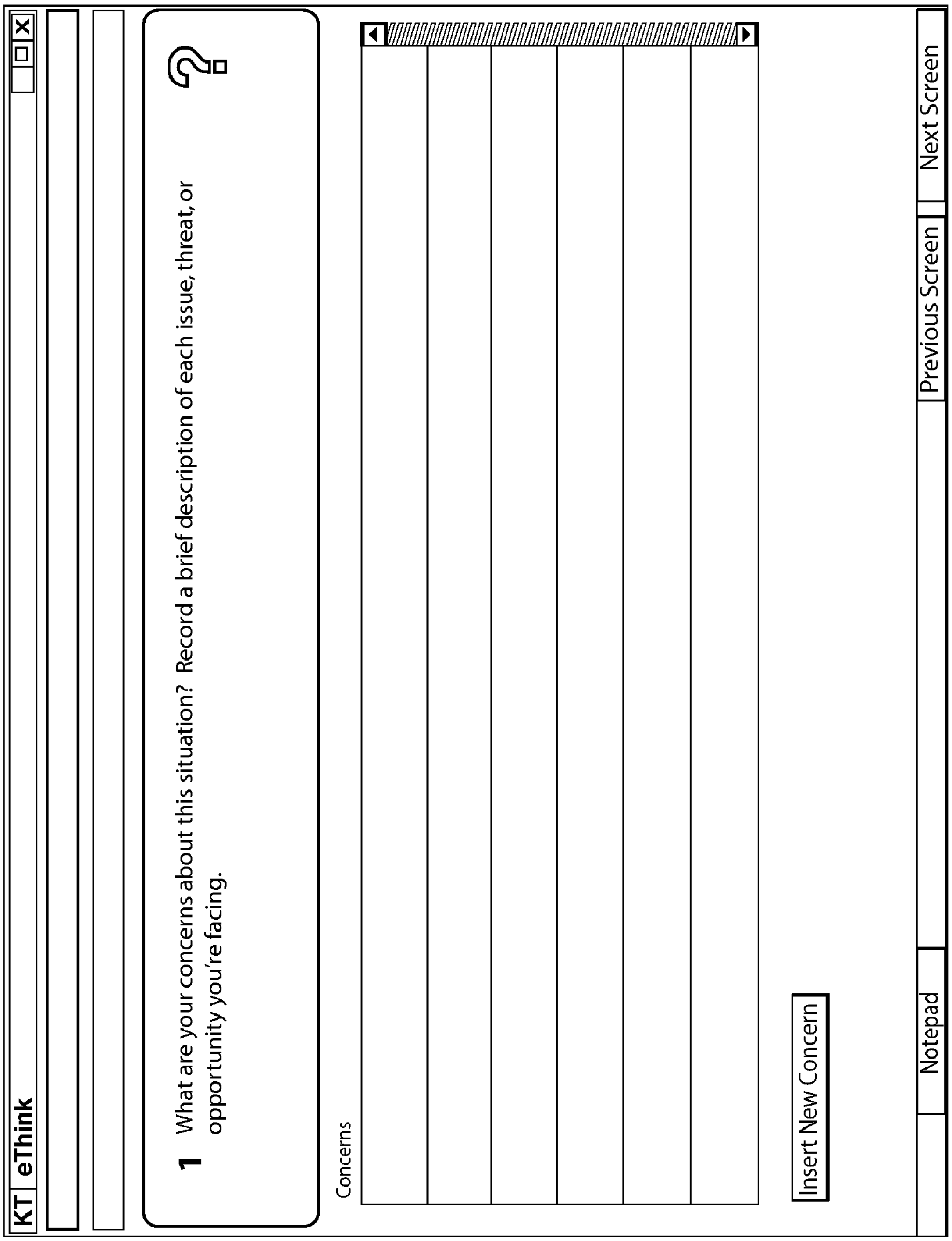
Figure 62:
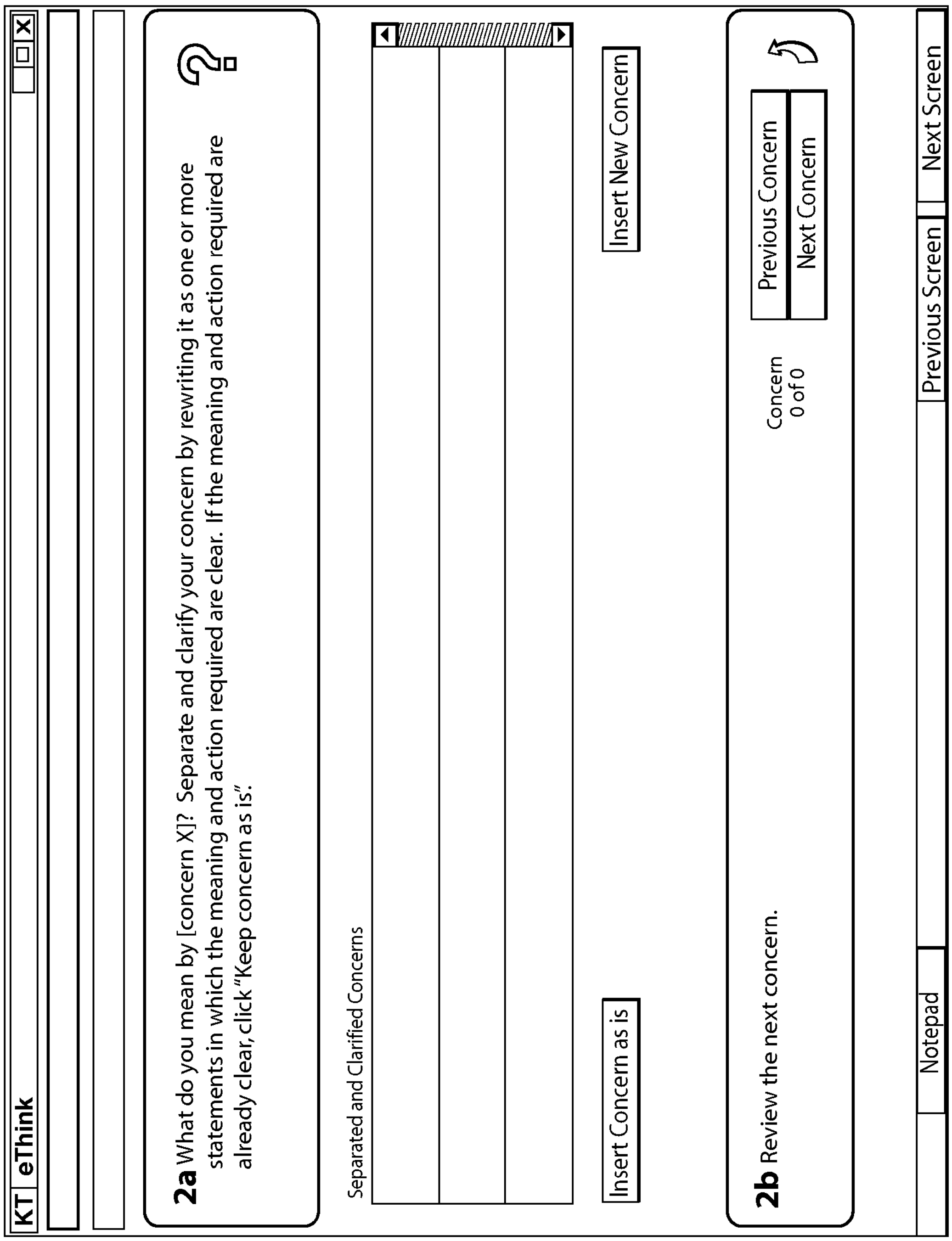
Figure 63:
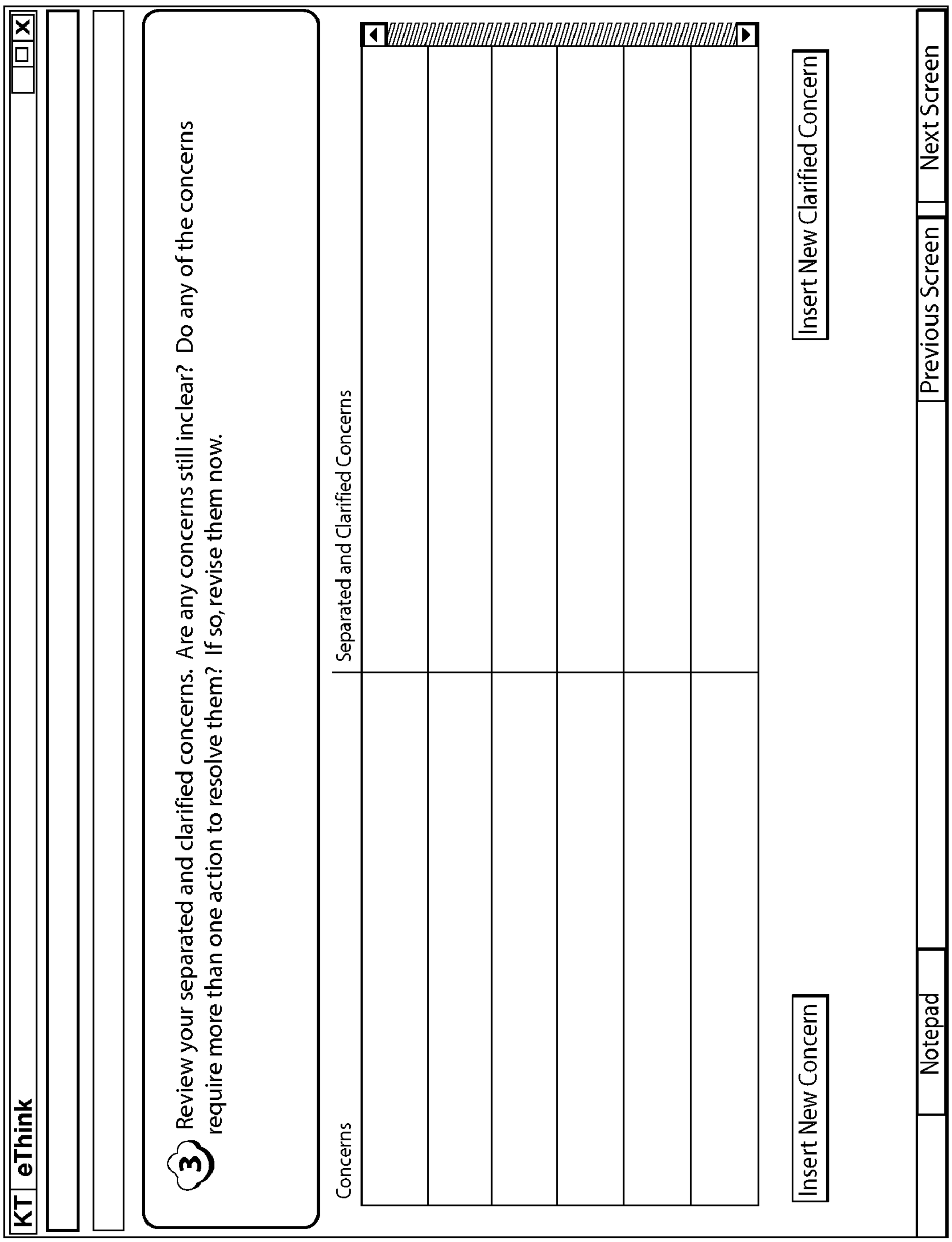
Figure 64:
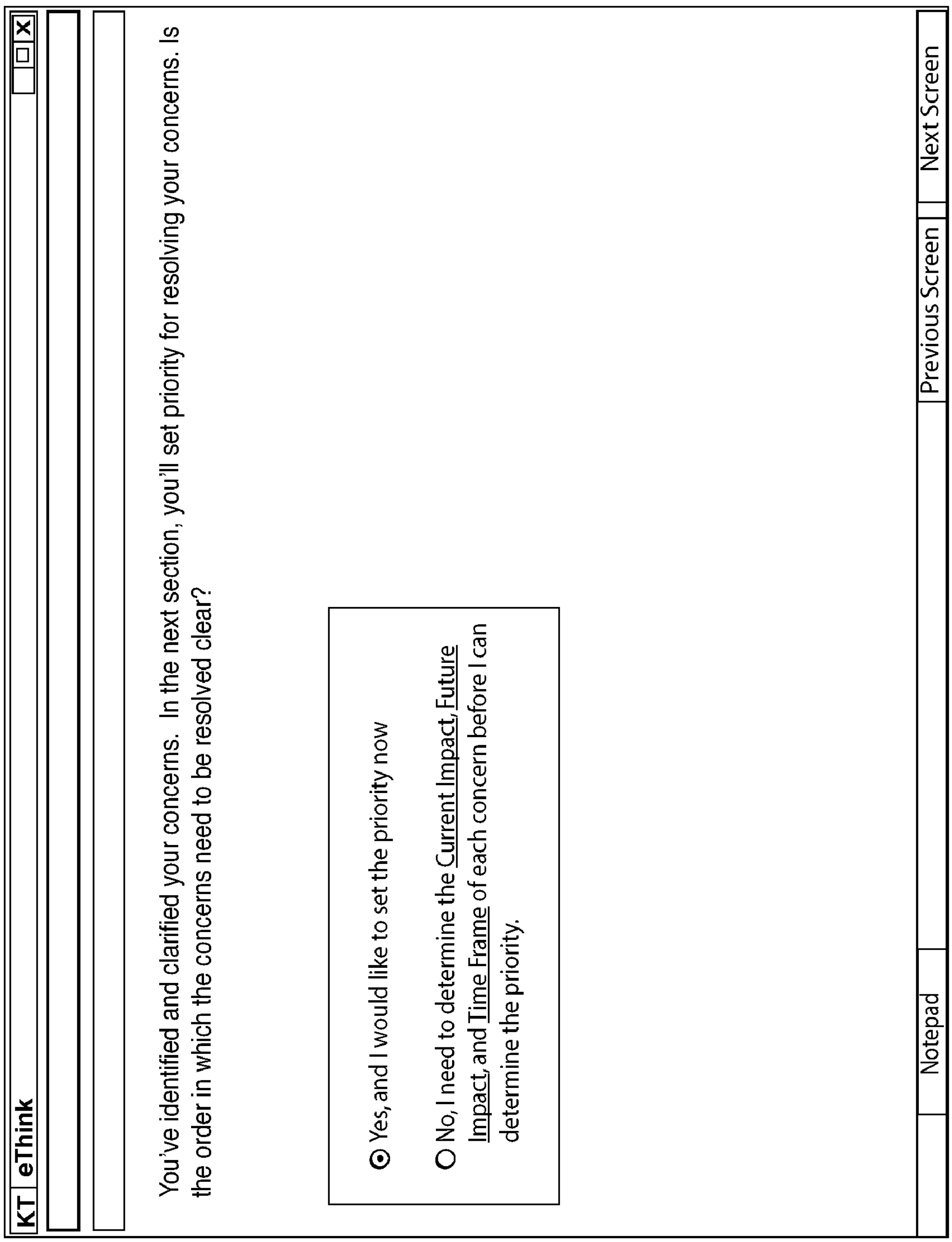
Figure 65:
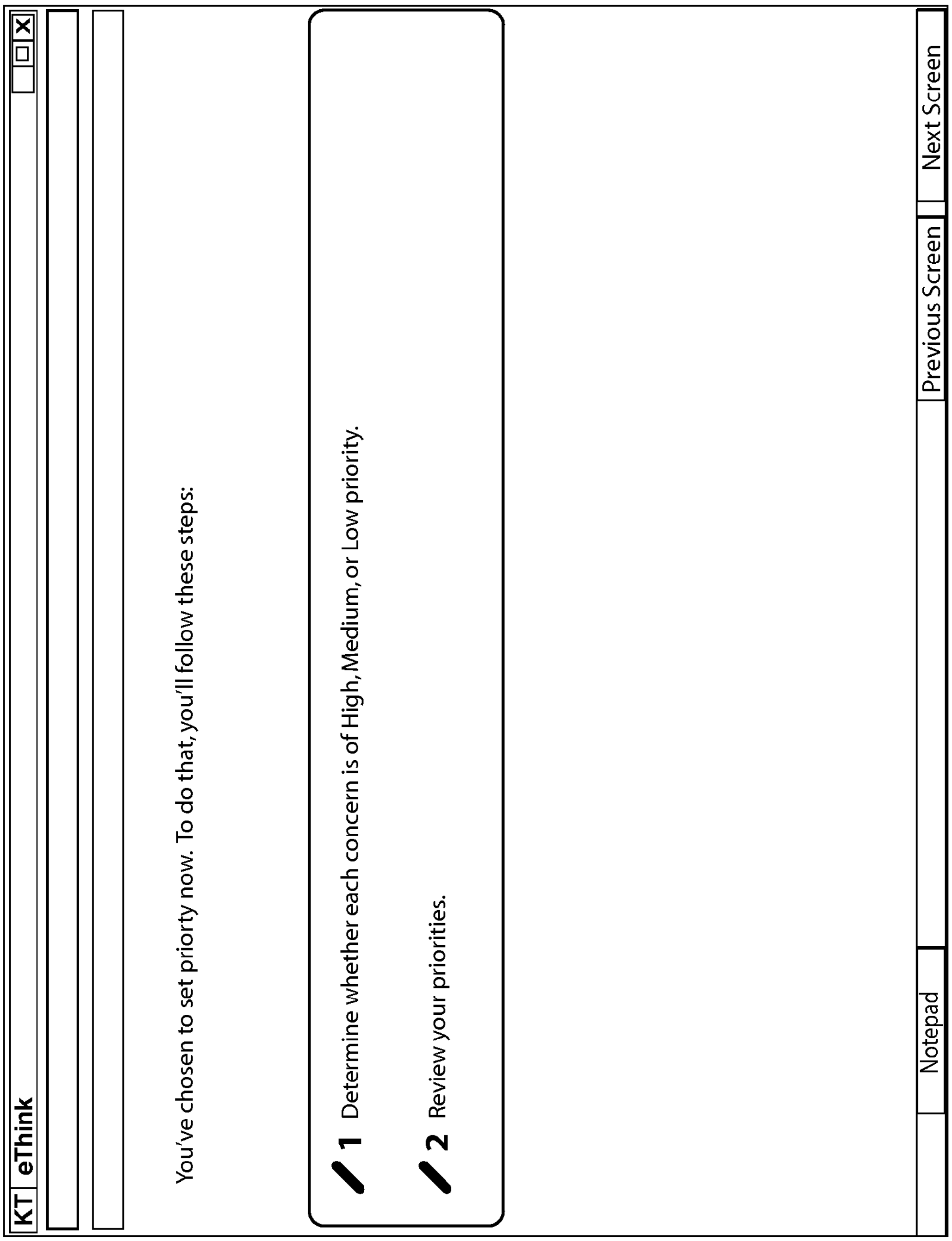
Figure 66:
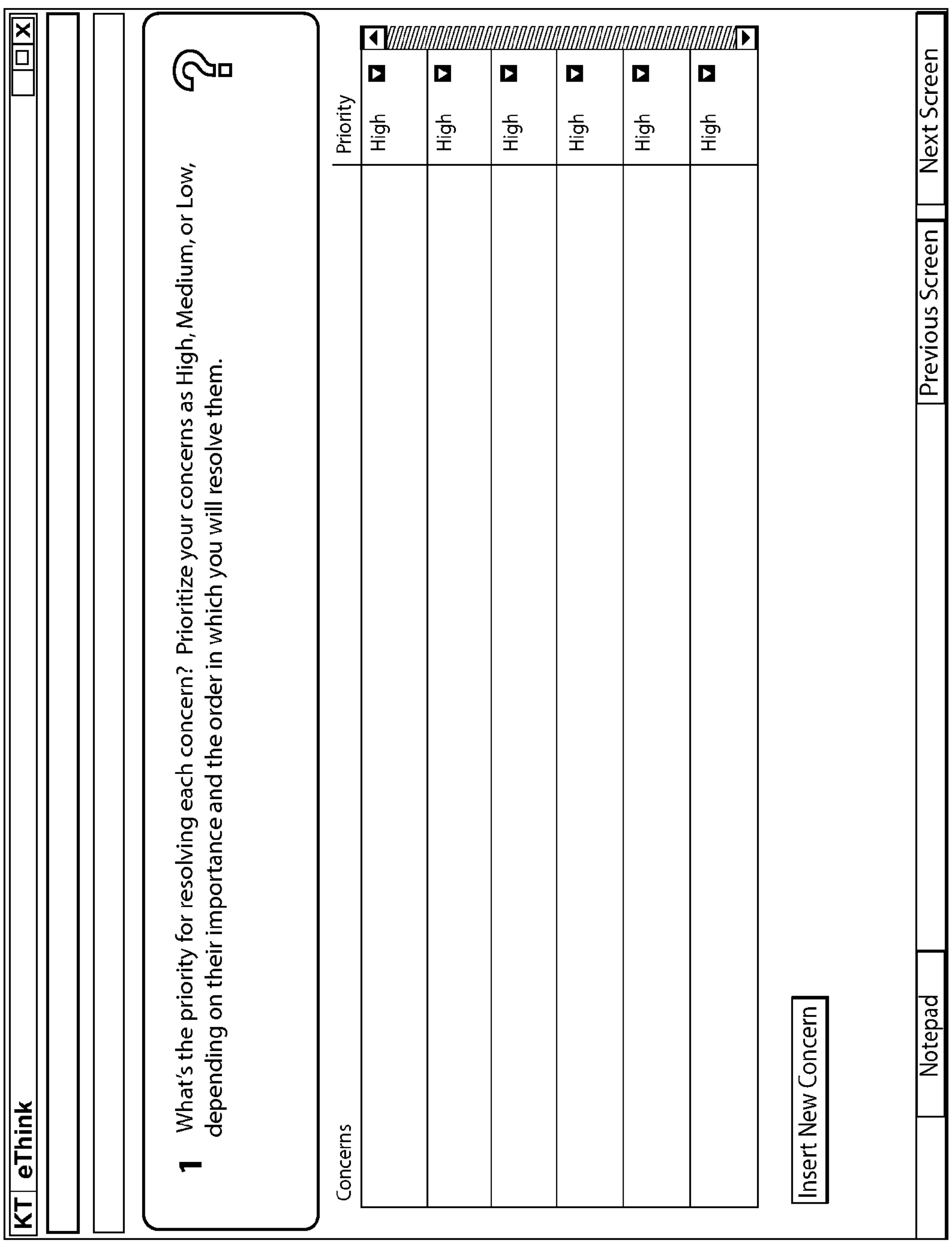
Figure 67:
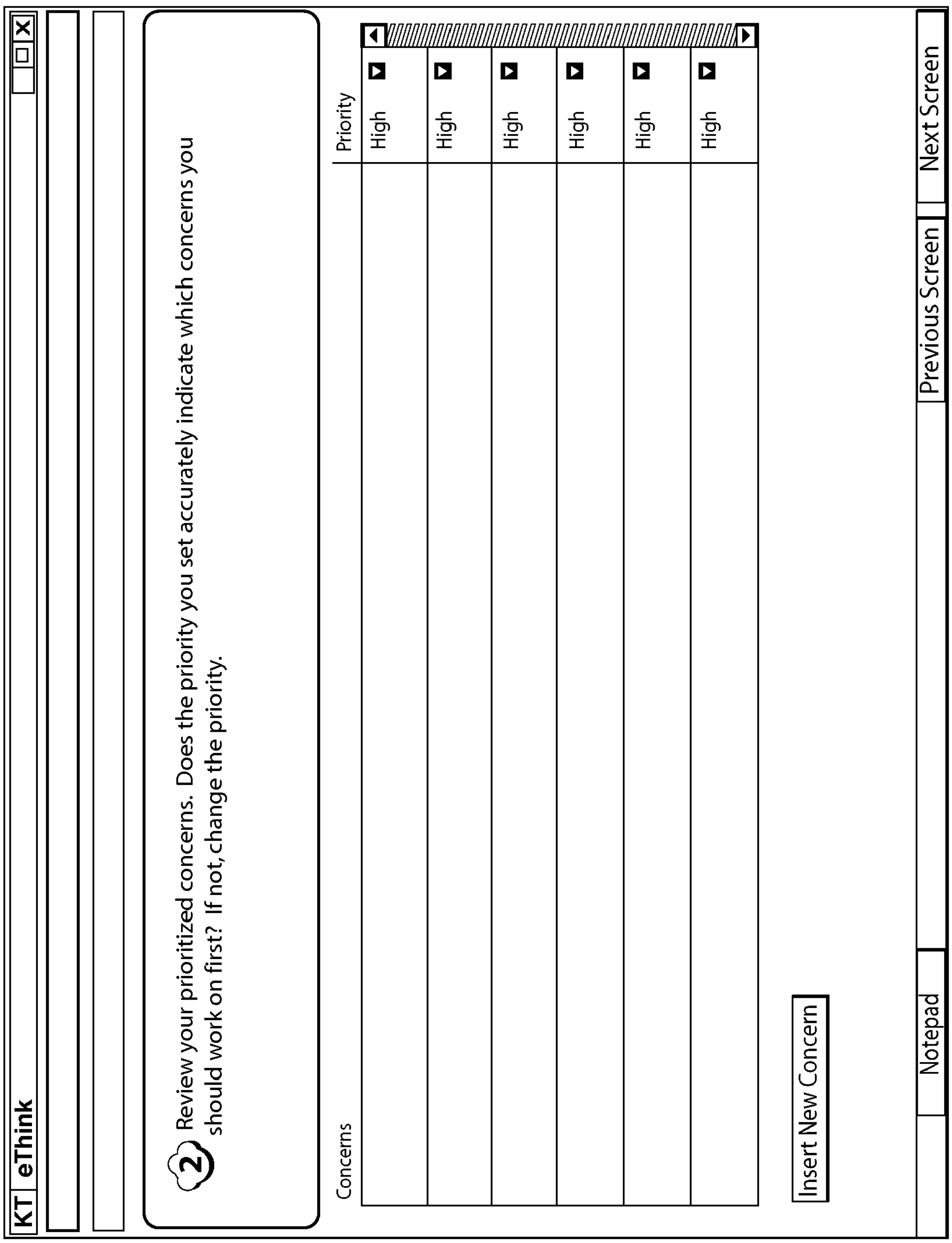
Figure 68:
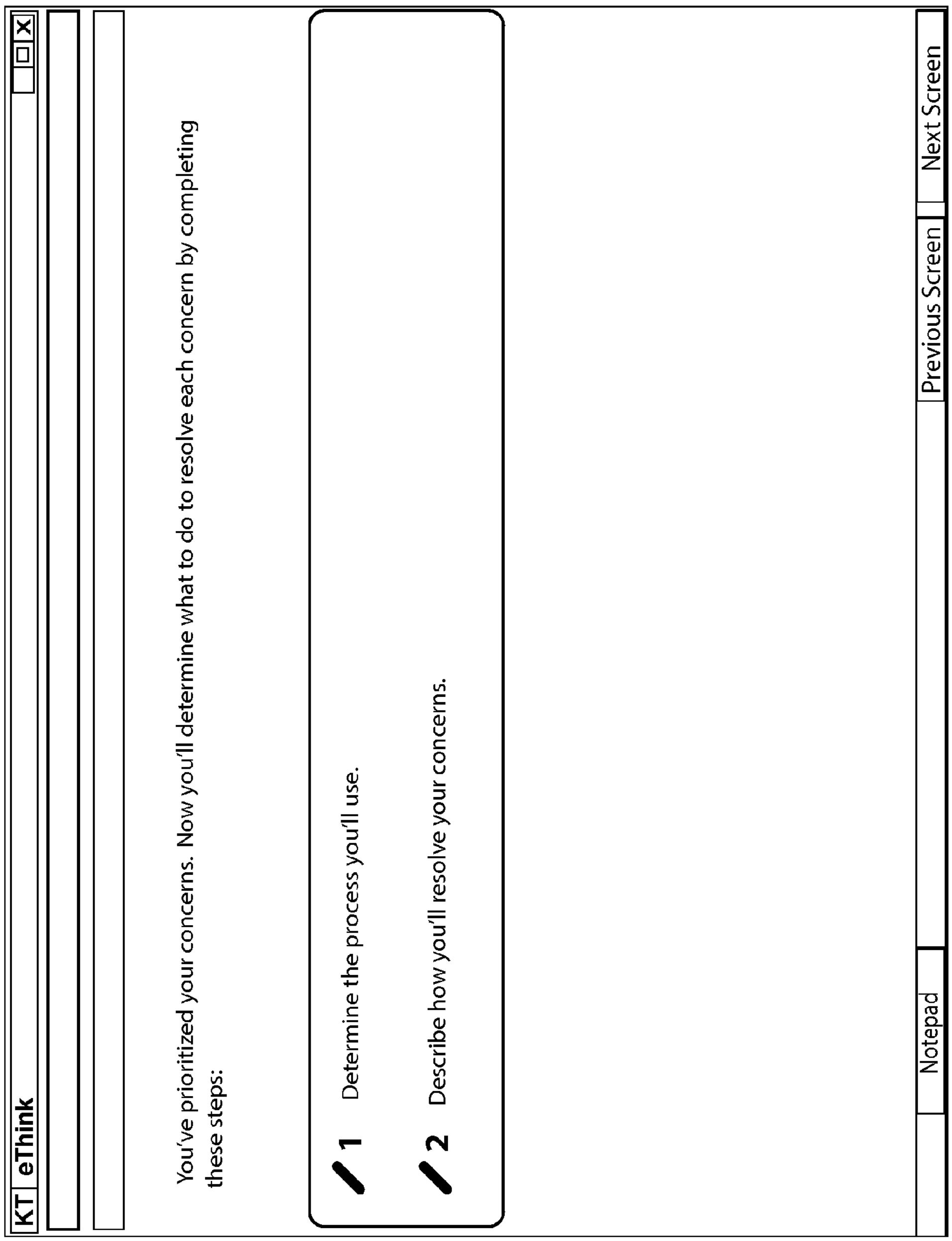
Figure 69:
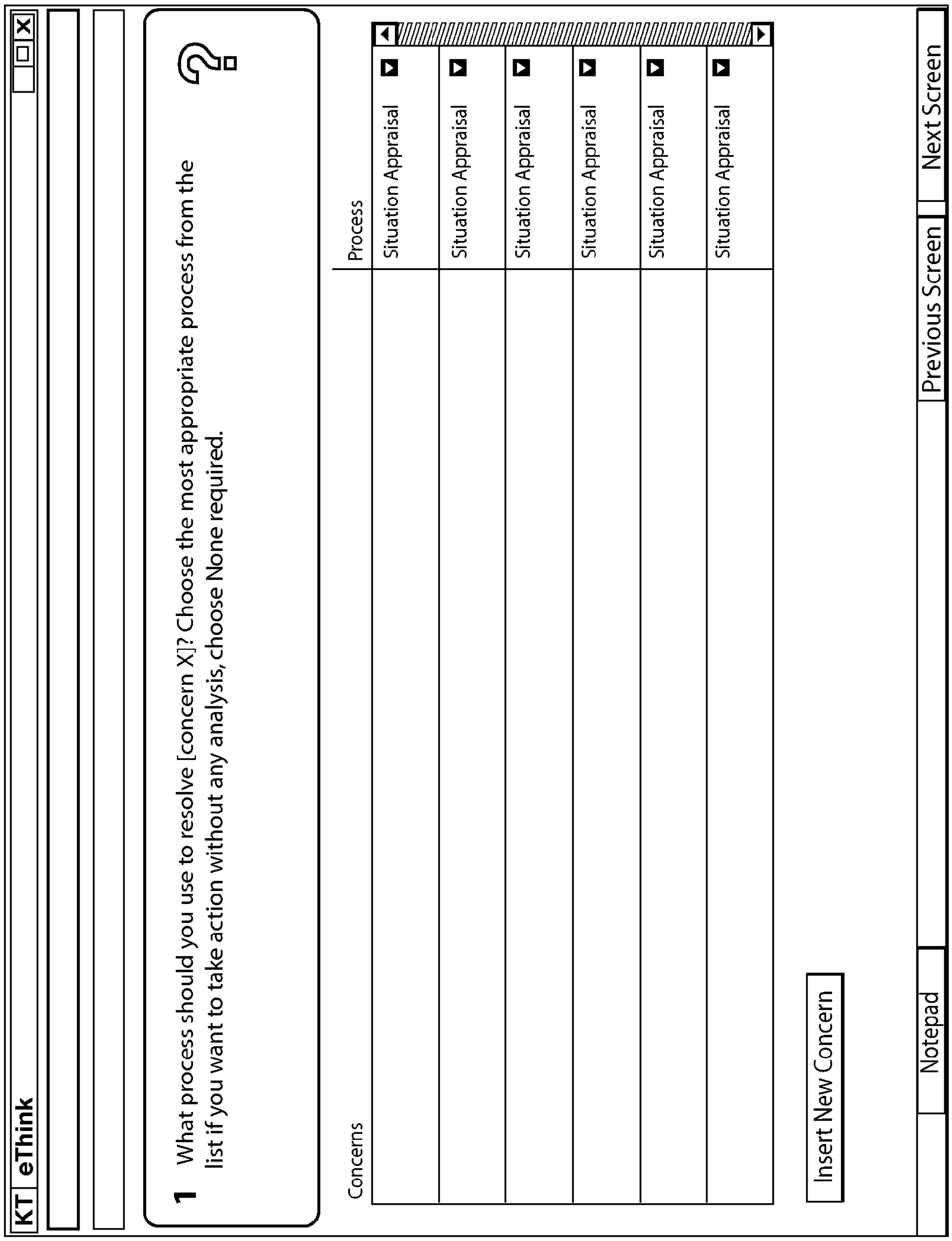
Figure 70:
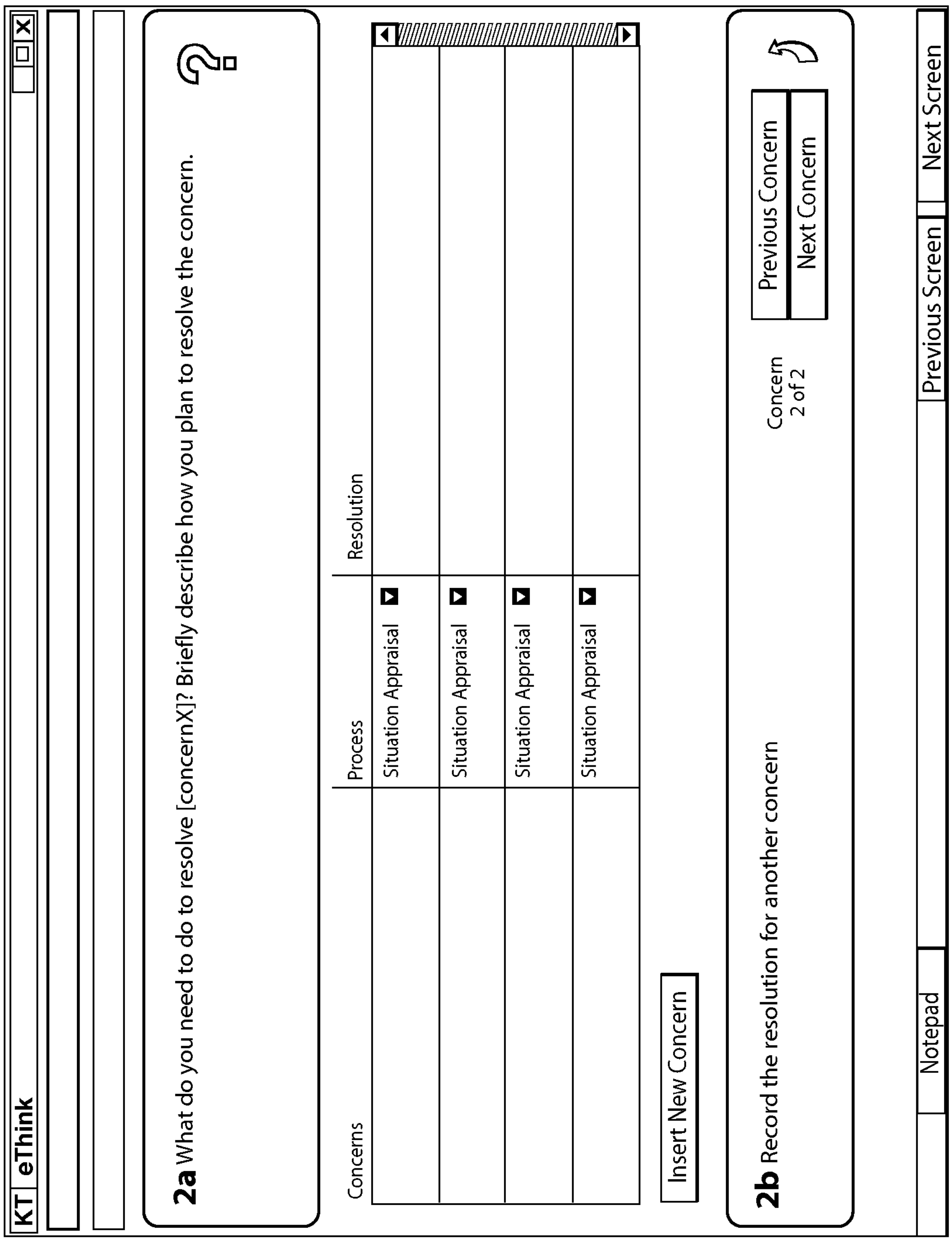
Figure 71:
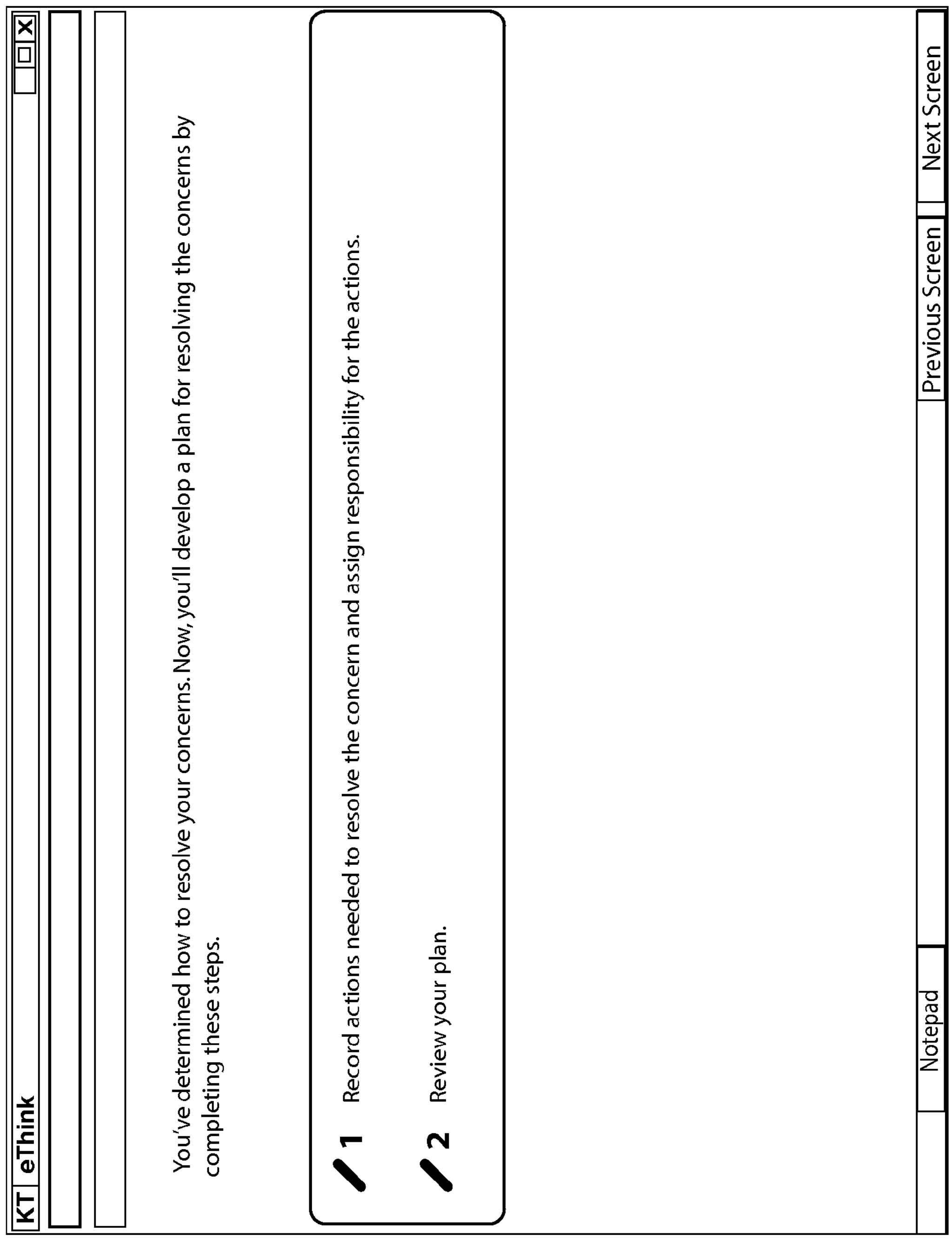
Figure 72:
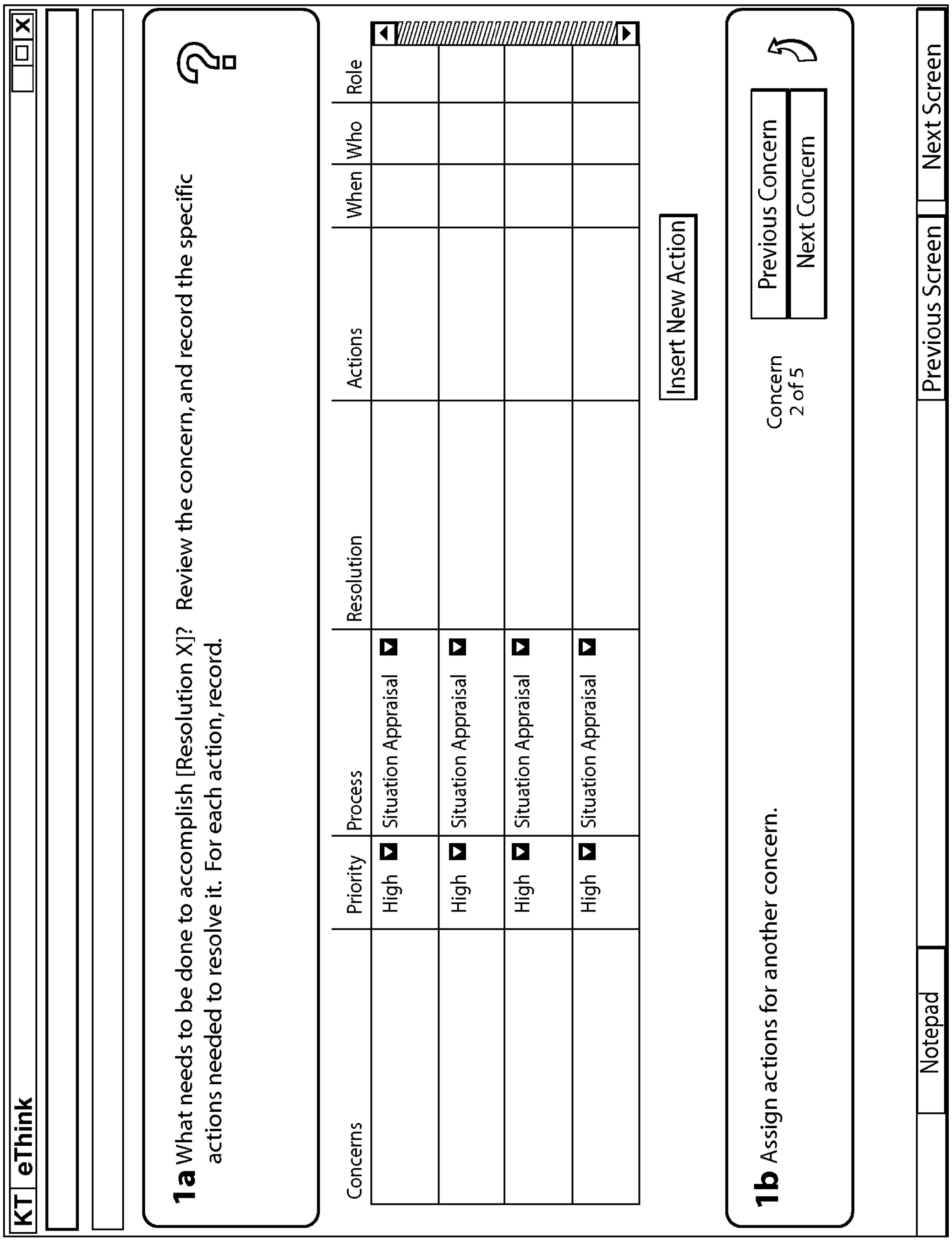
Figure 73:
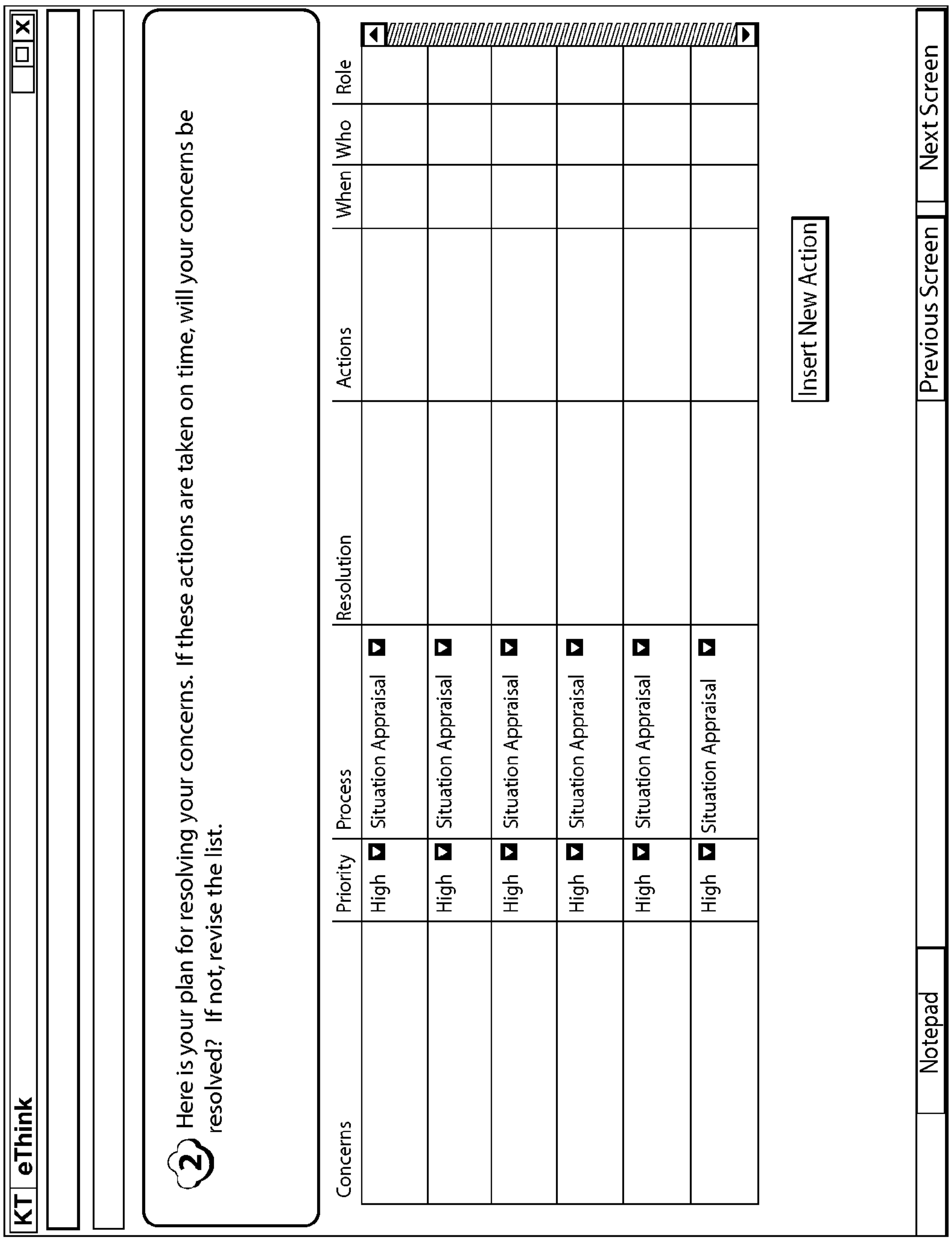
Figure 74:
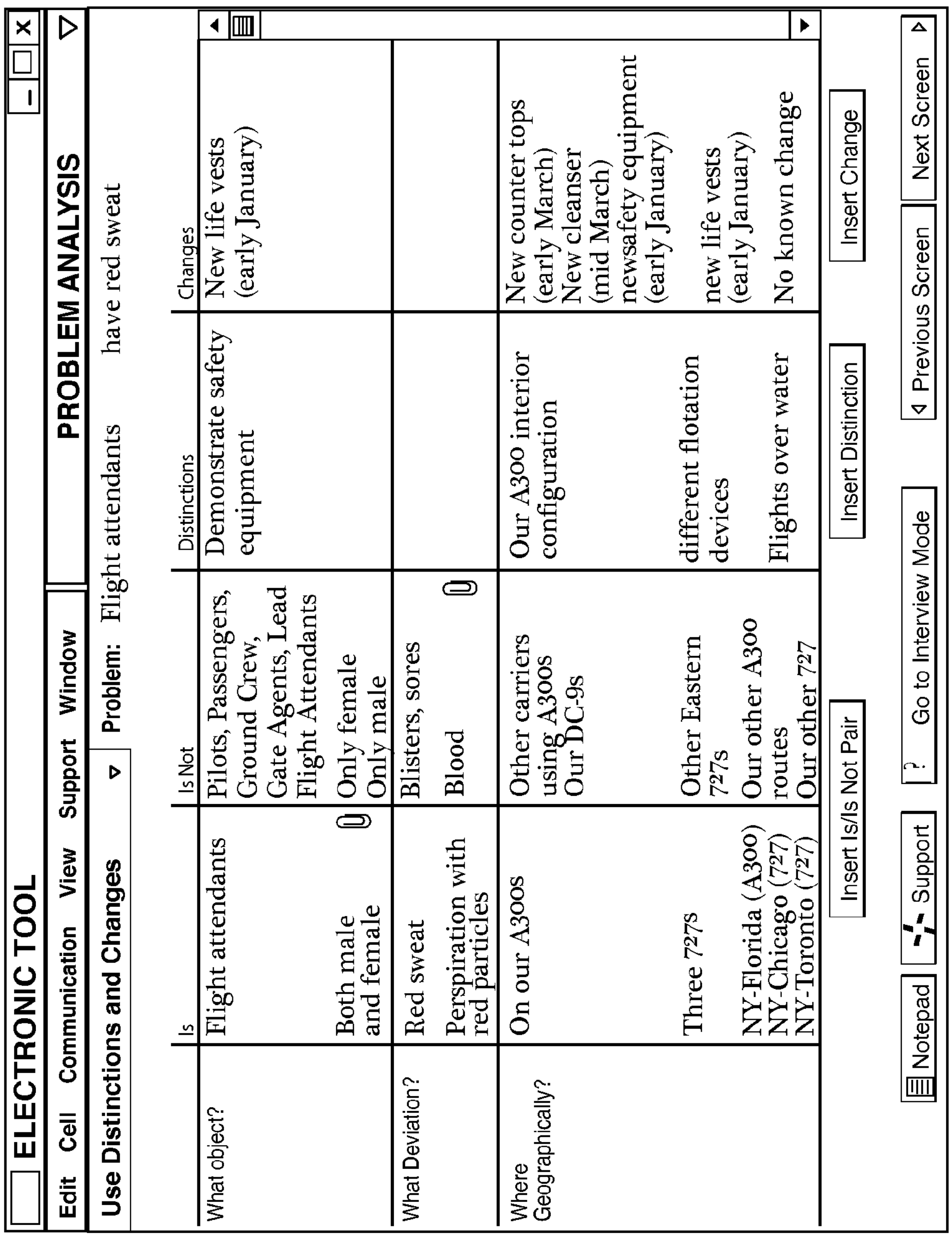
FIGS. 74–84 show a first alternative embodiment of the GUI screens of the problem analysis process screen sequence.
Figure 75:
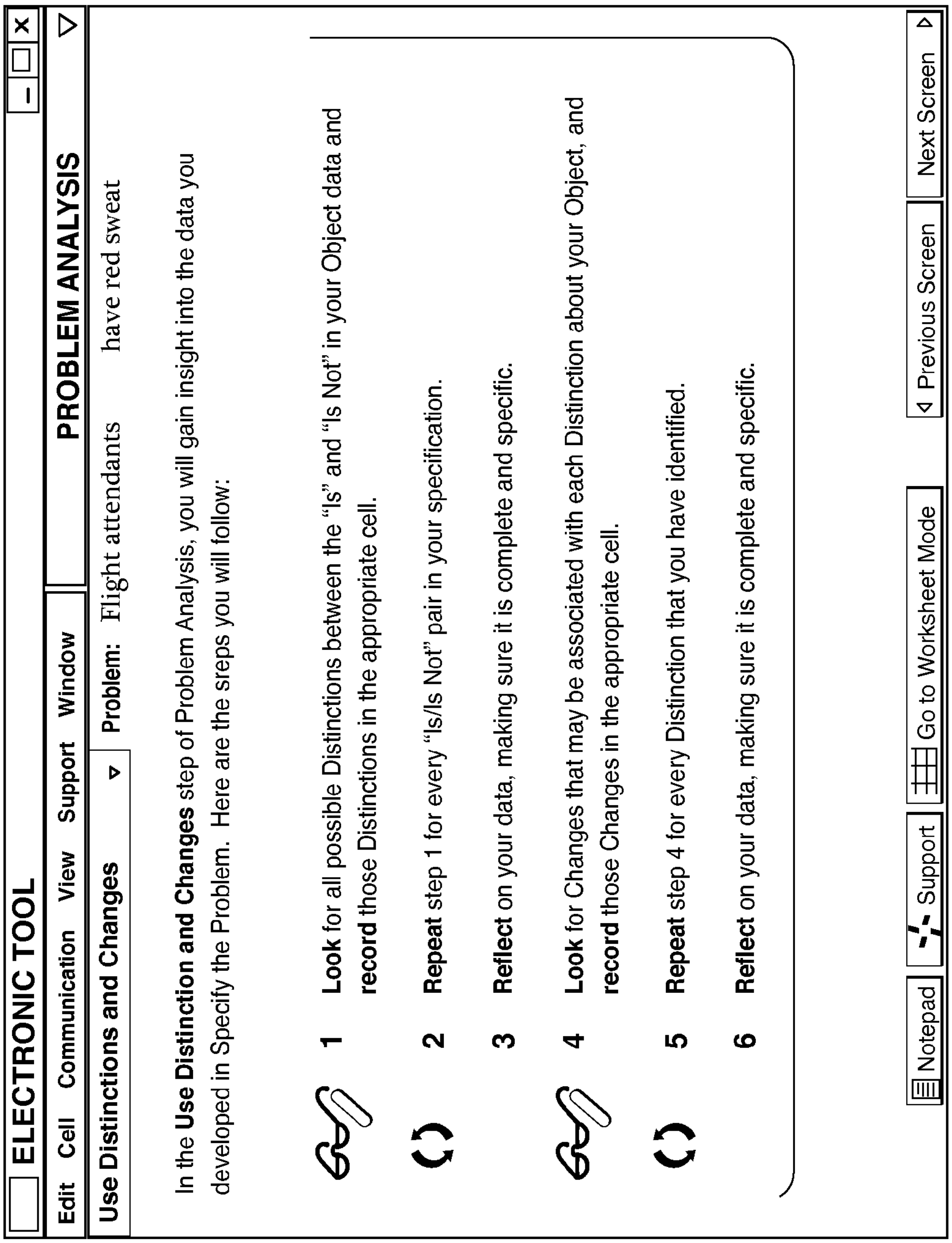
Figure 76:
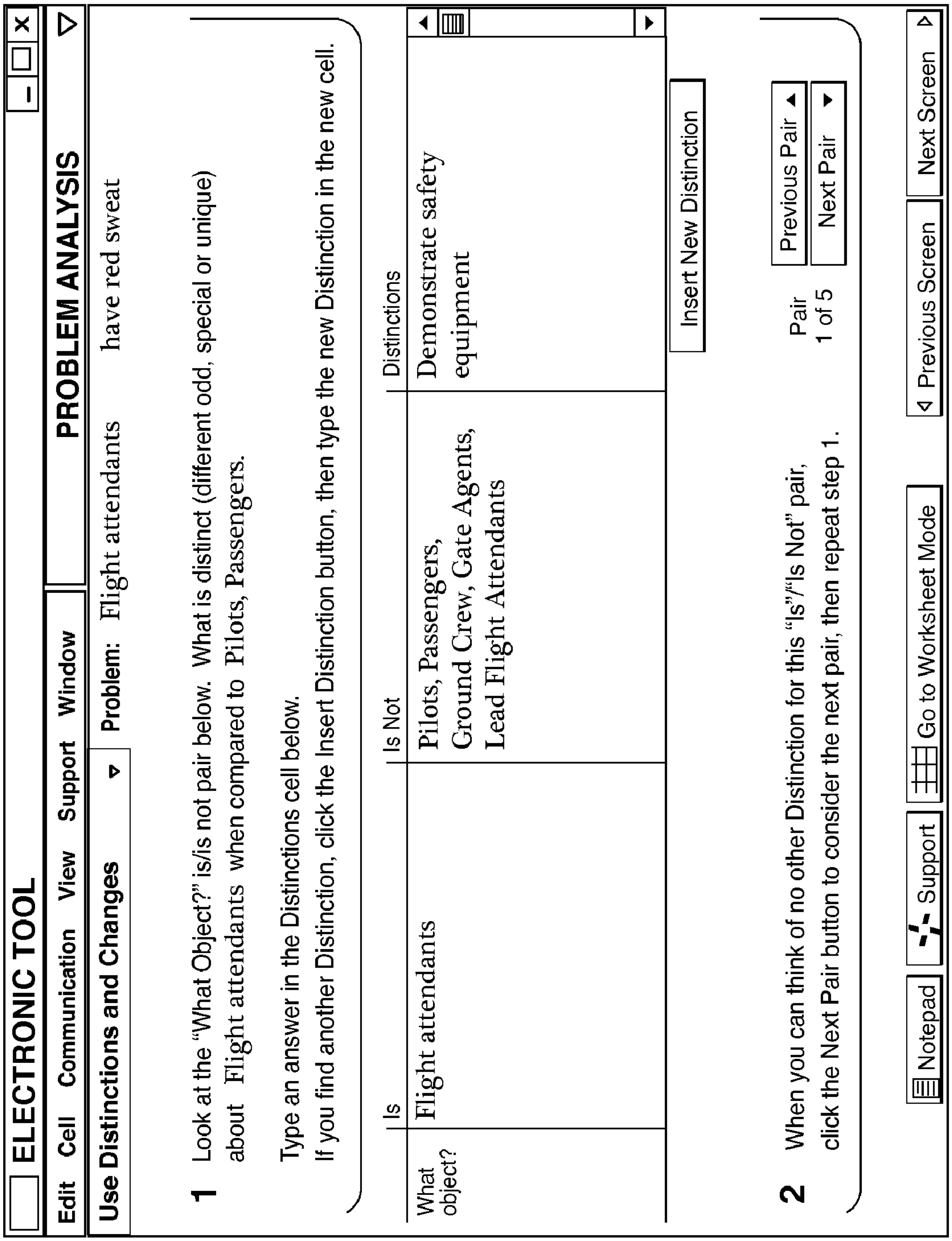
Figure 77:
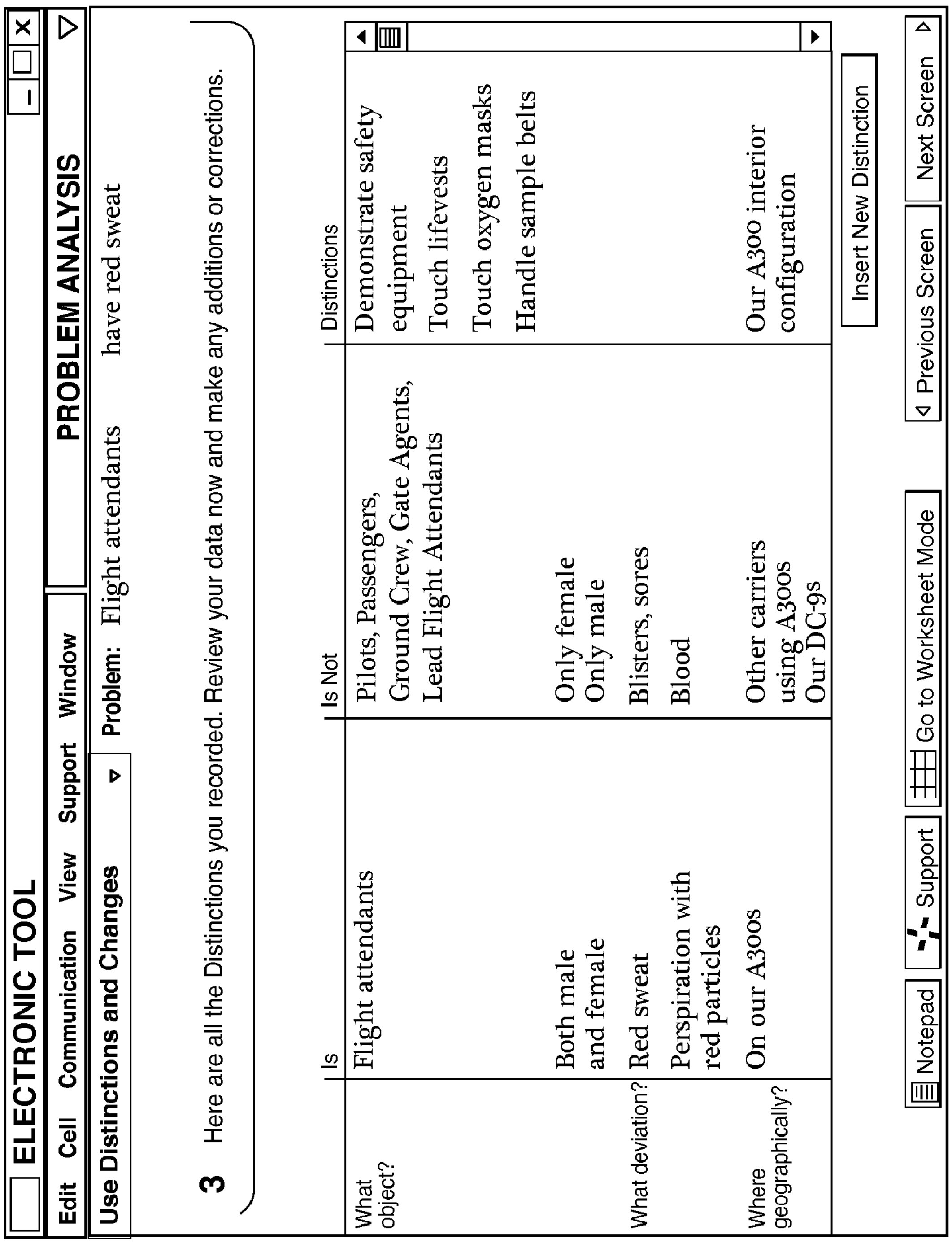
Figure 78:
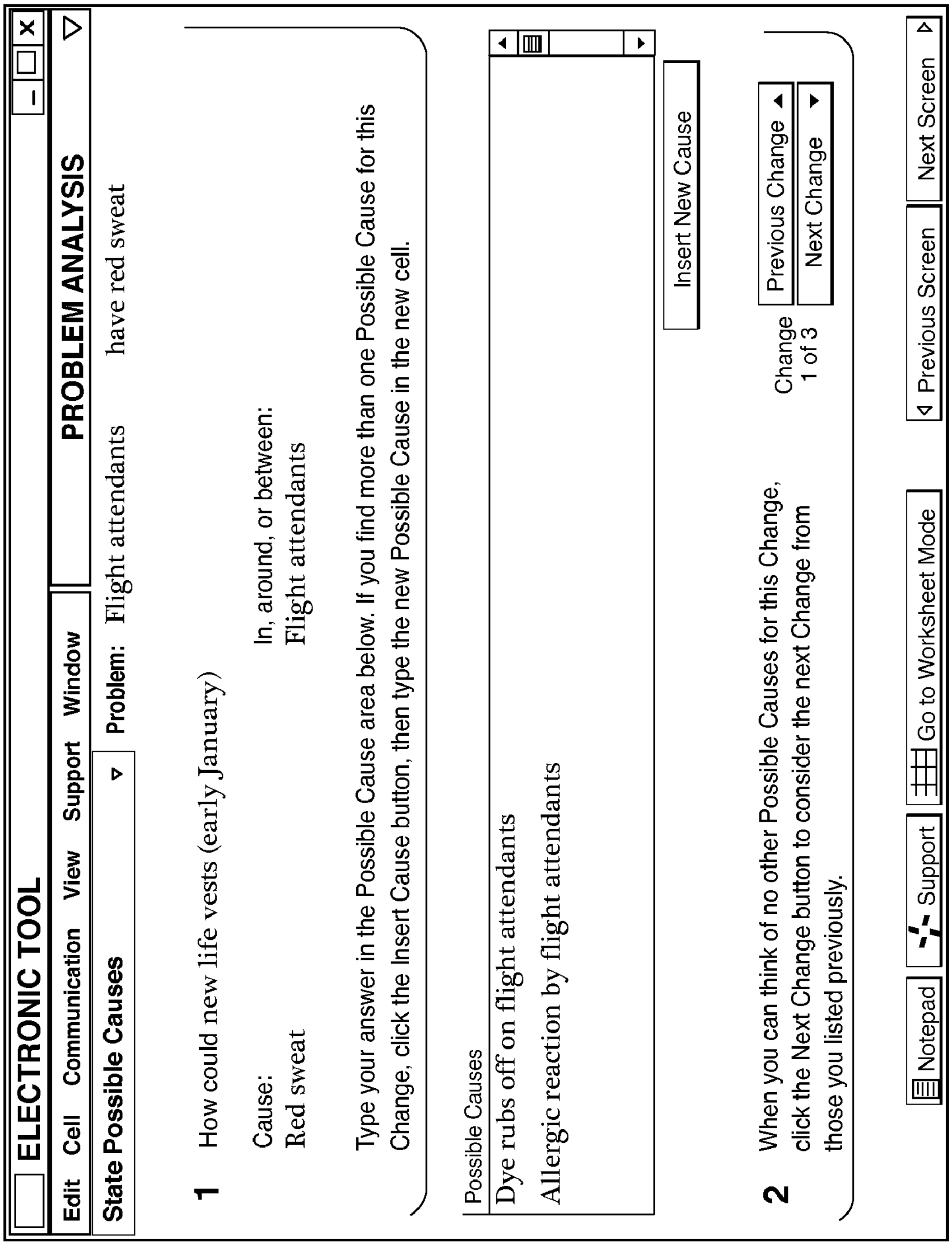
Figure 79:
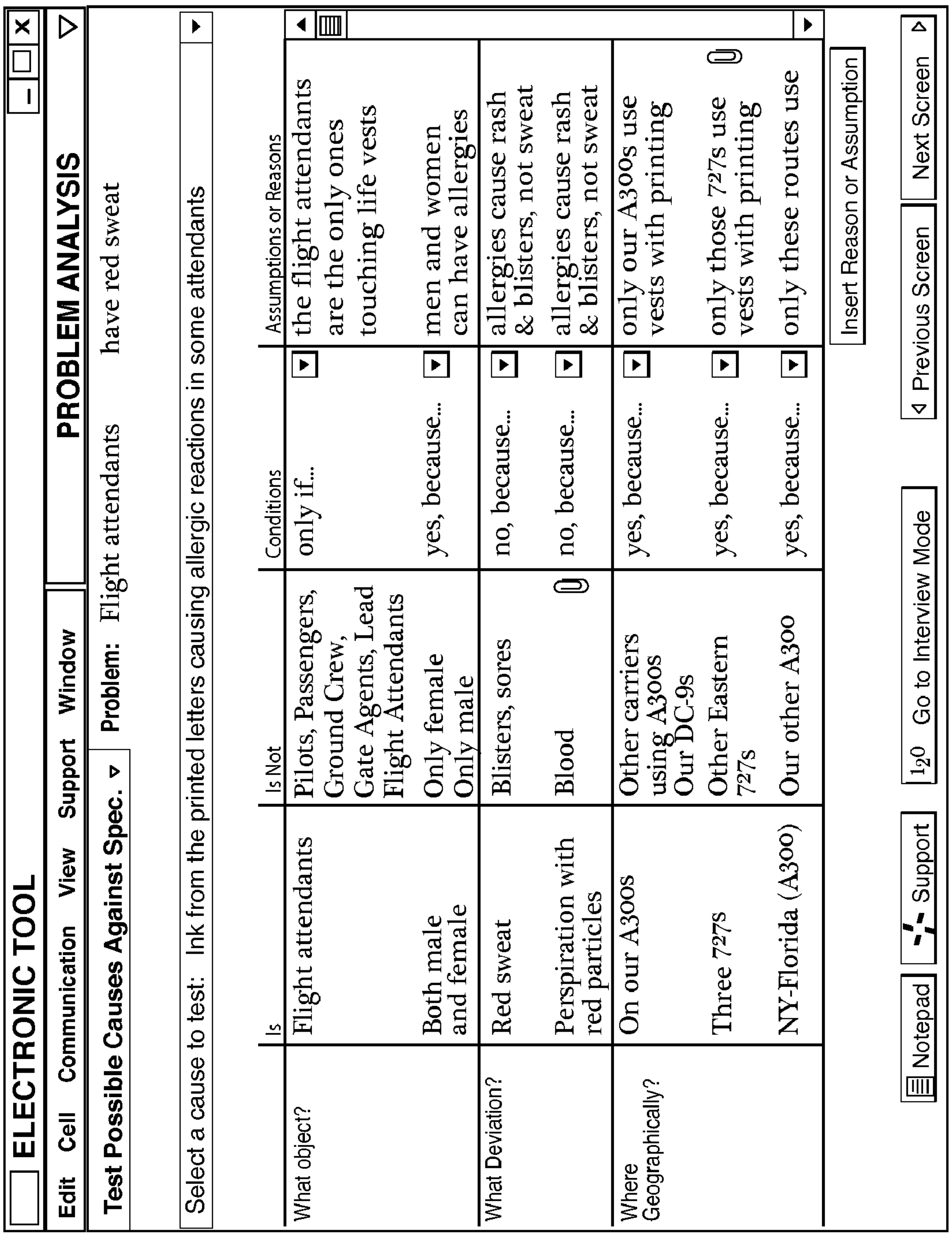
Figure 80:
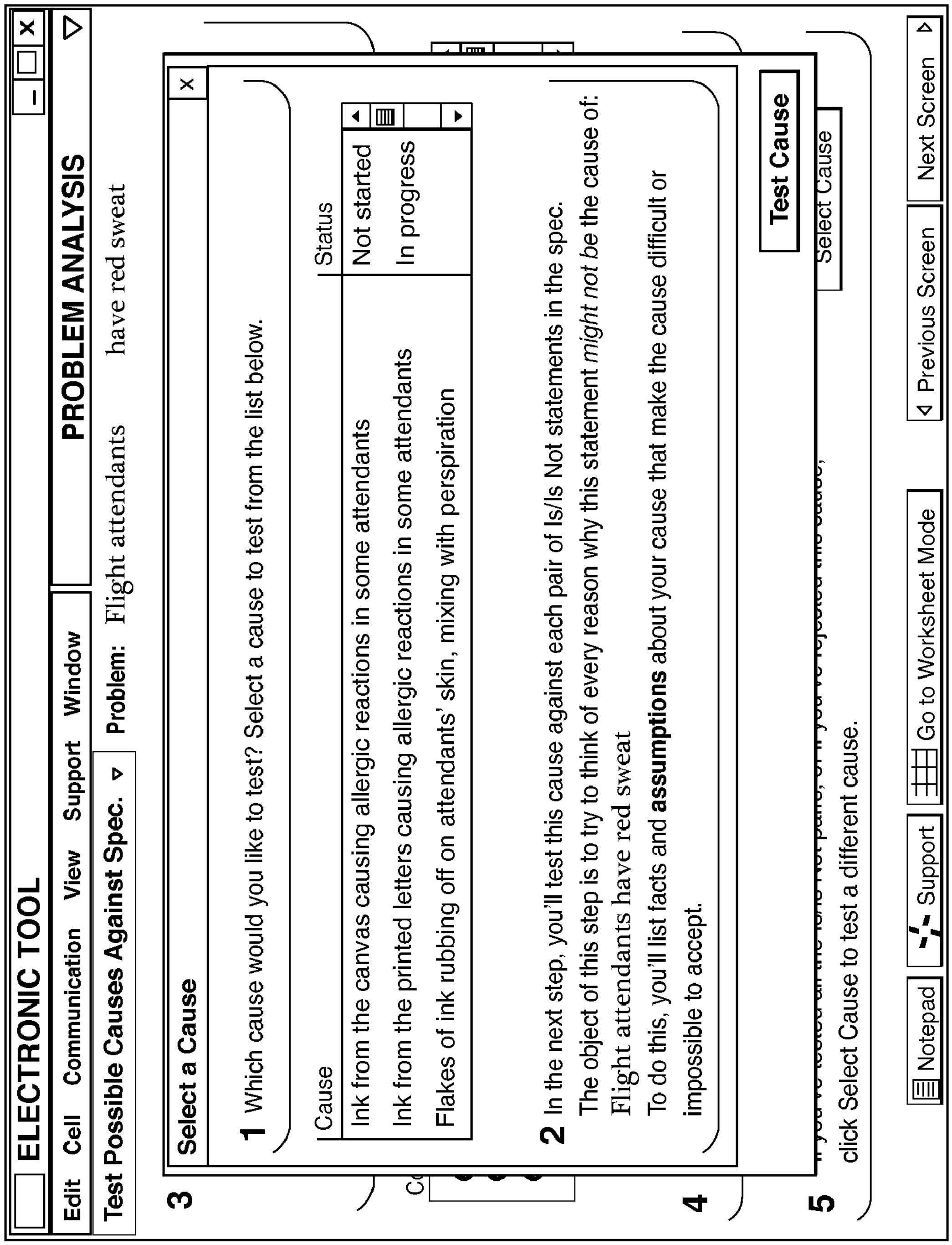
Figure 81:
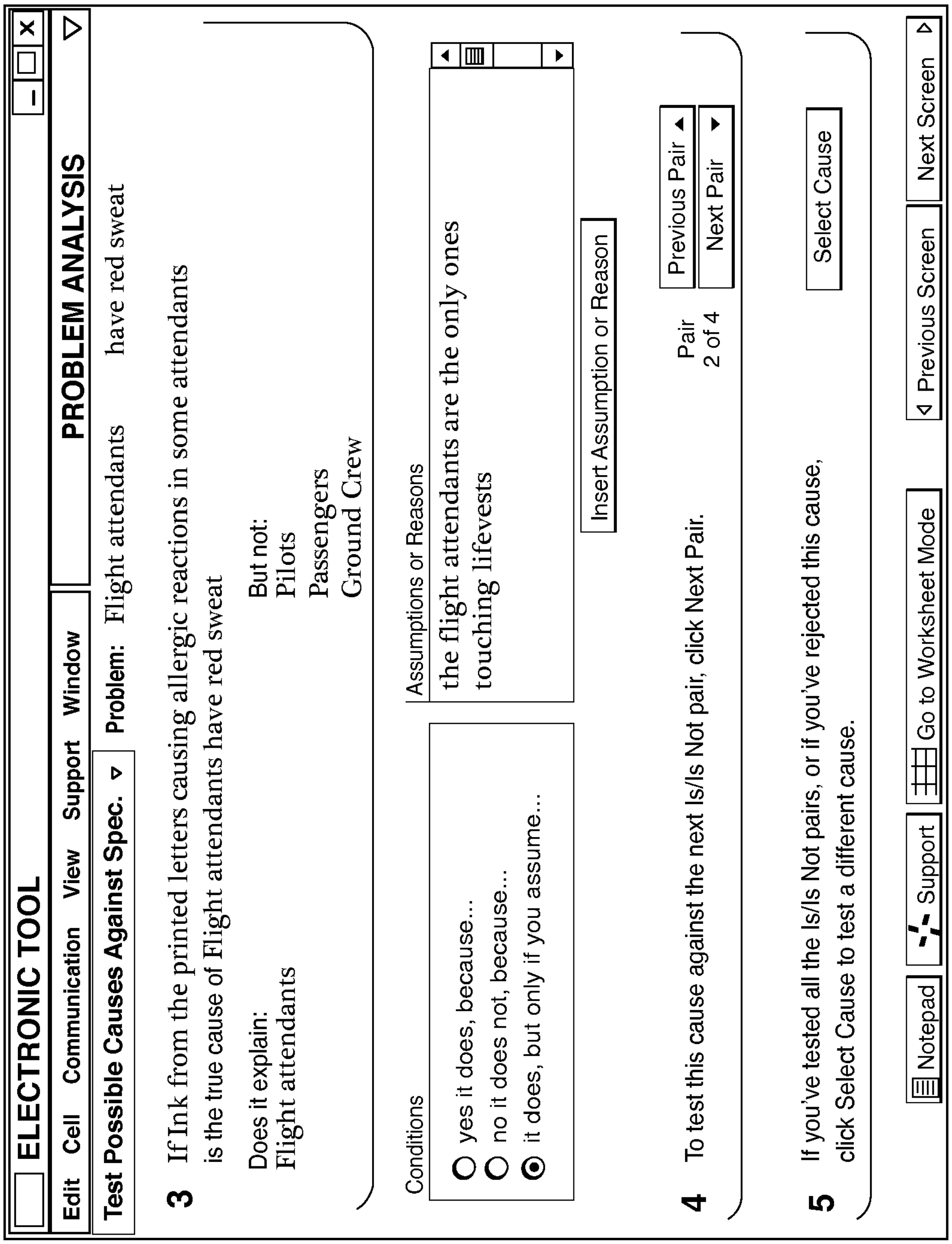
Figure 82:
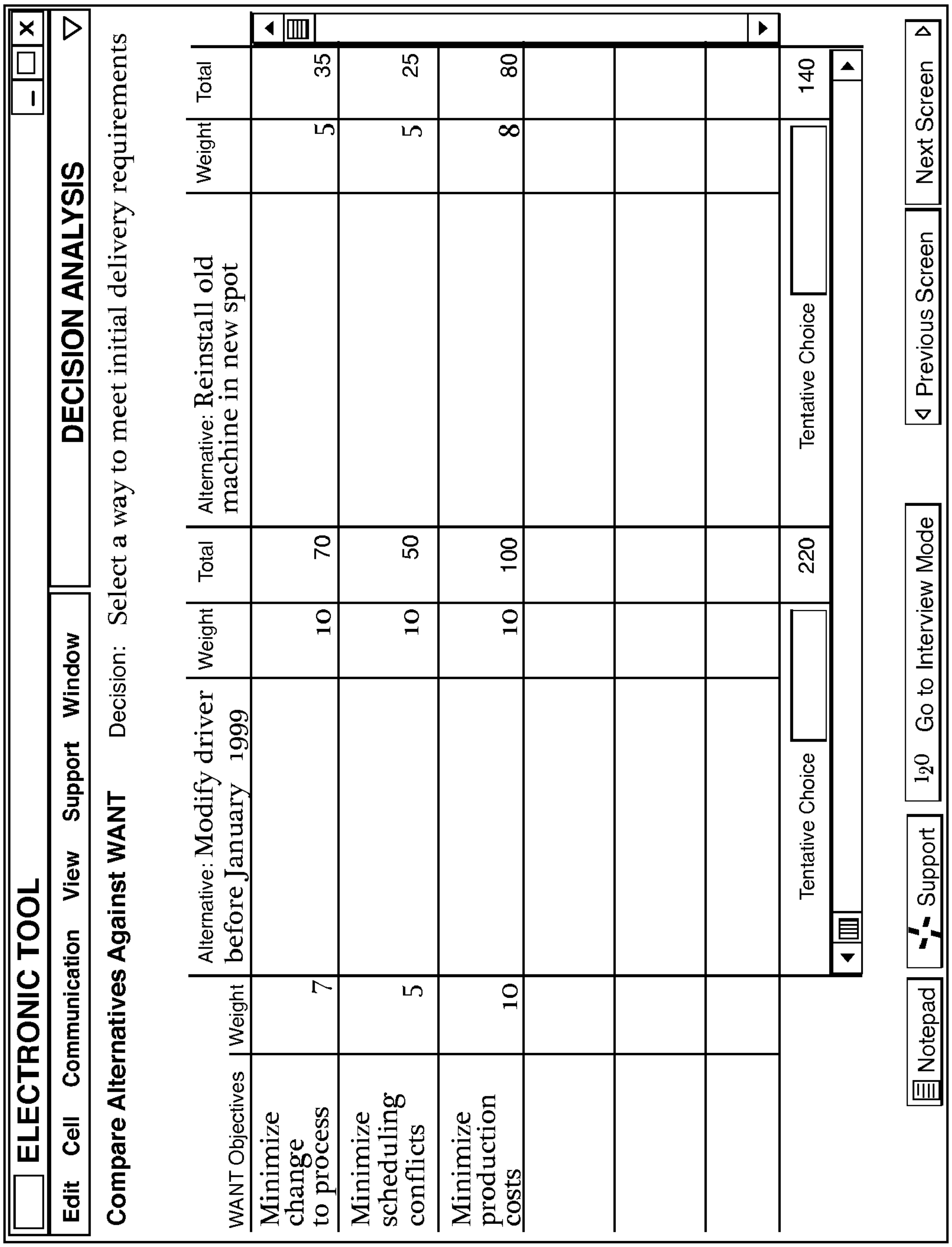
Figure 83:
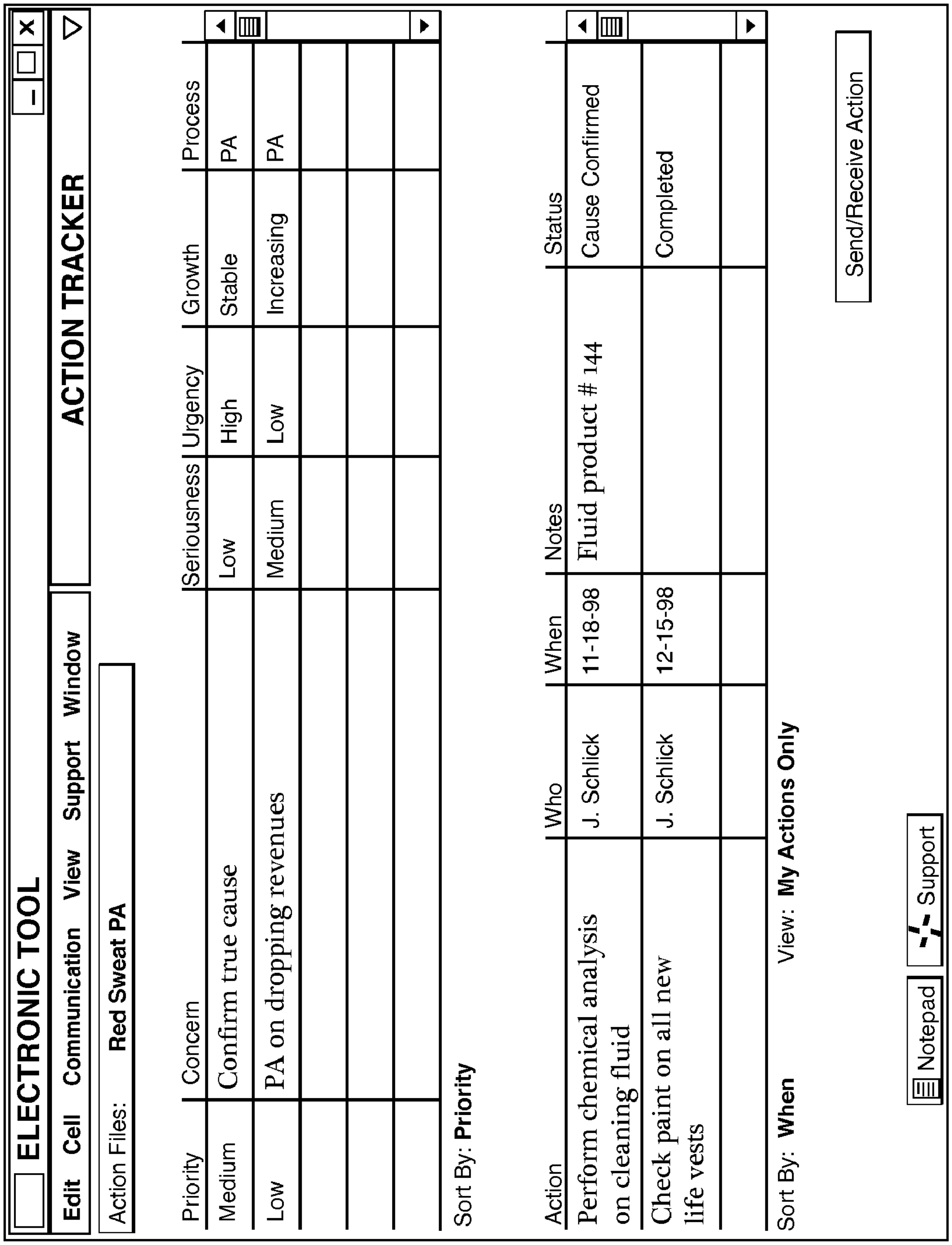
Figure 84:
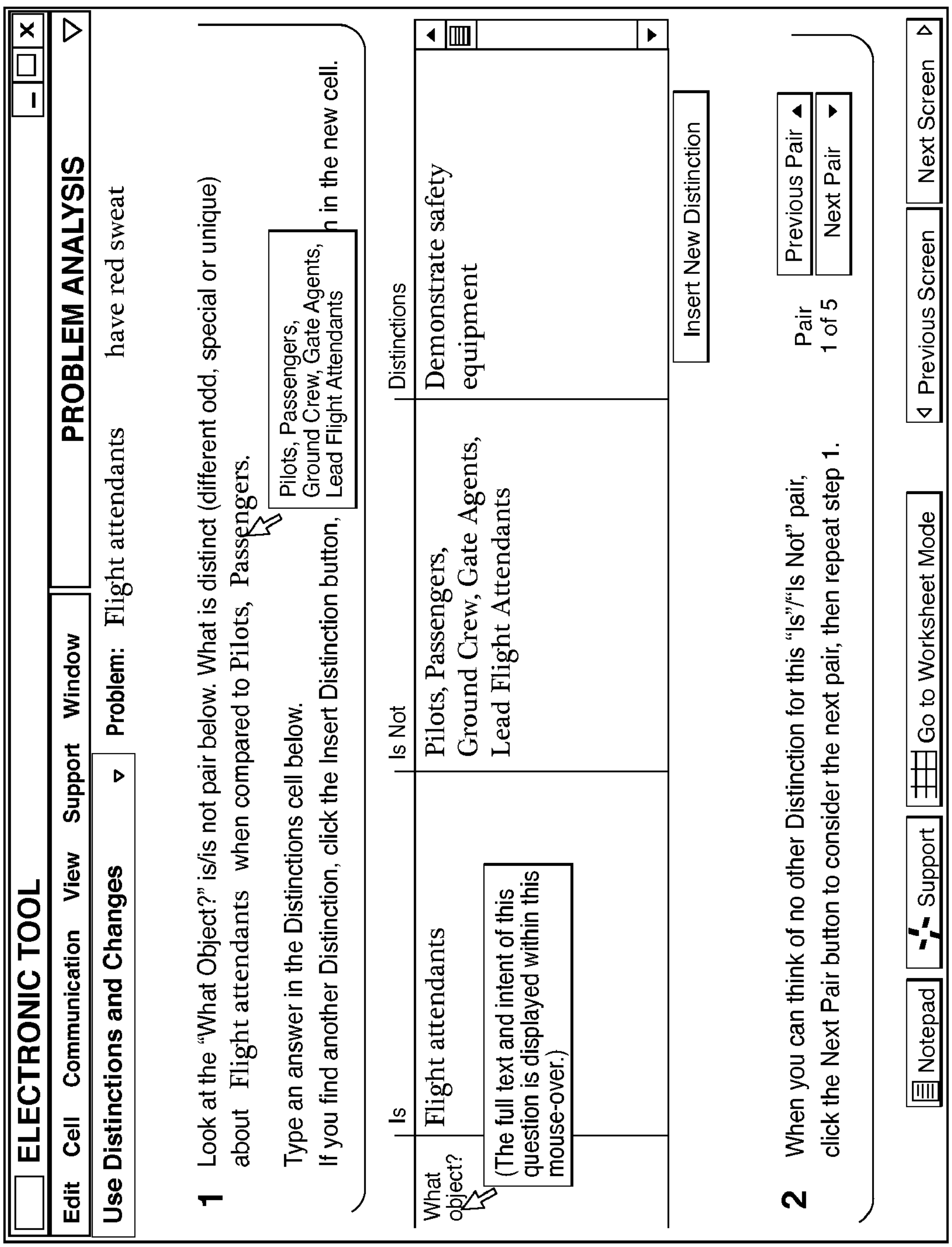
Figure 85:
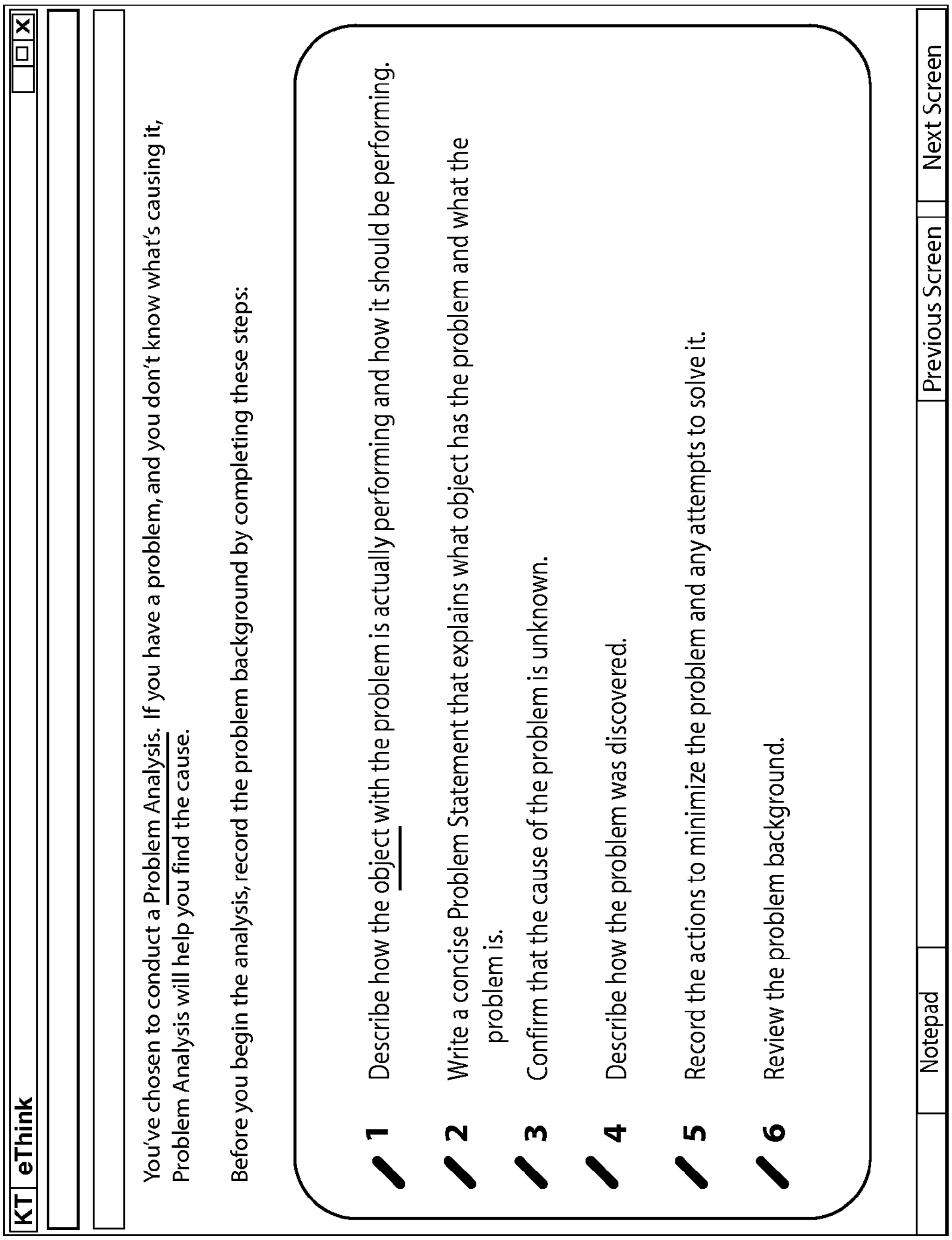
FIGS. 85–137 show a second alternative embodiment of the GUI screens of the problem analysis process screen sequence.
Figure 86:
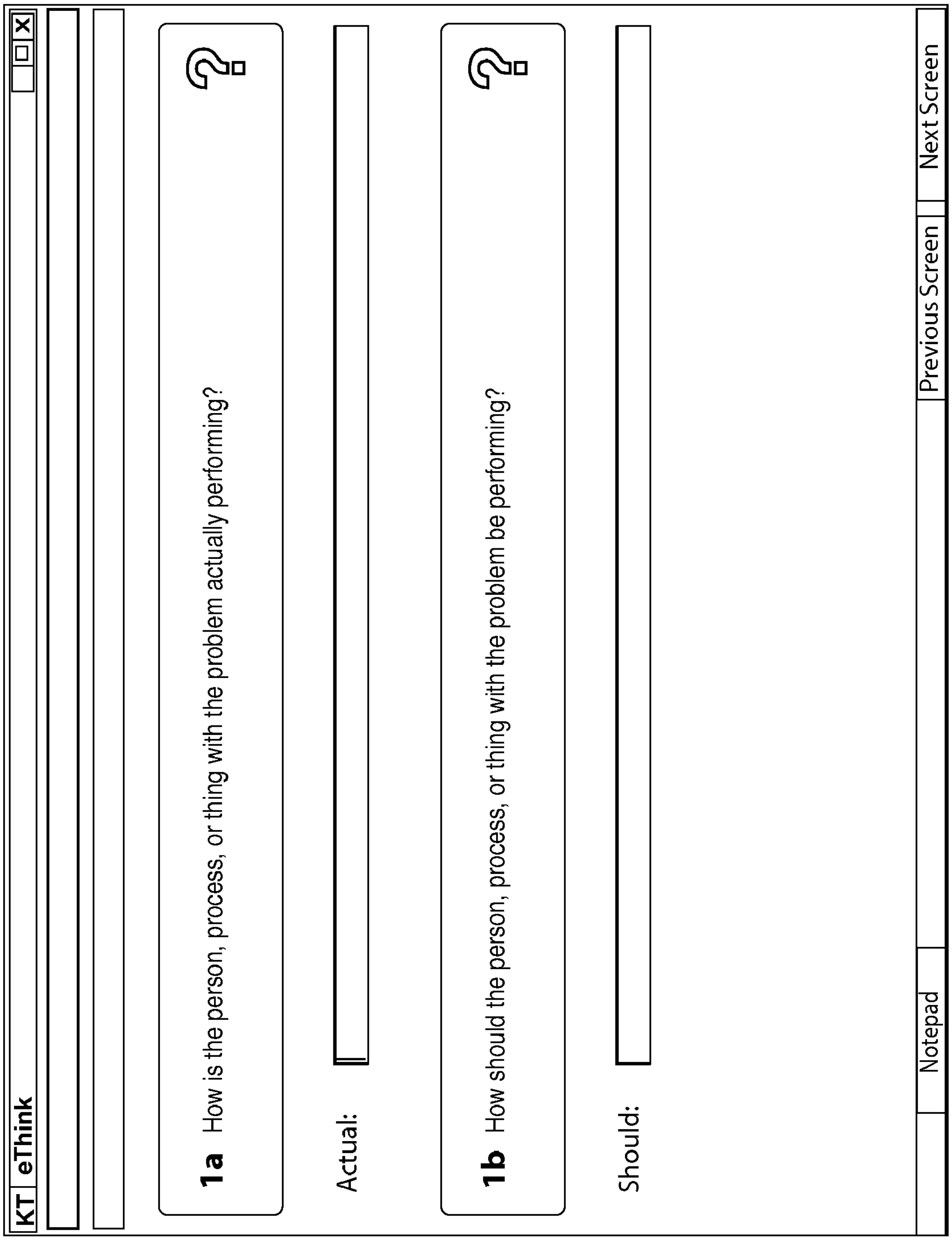
Figure 87:
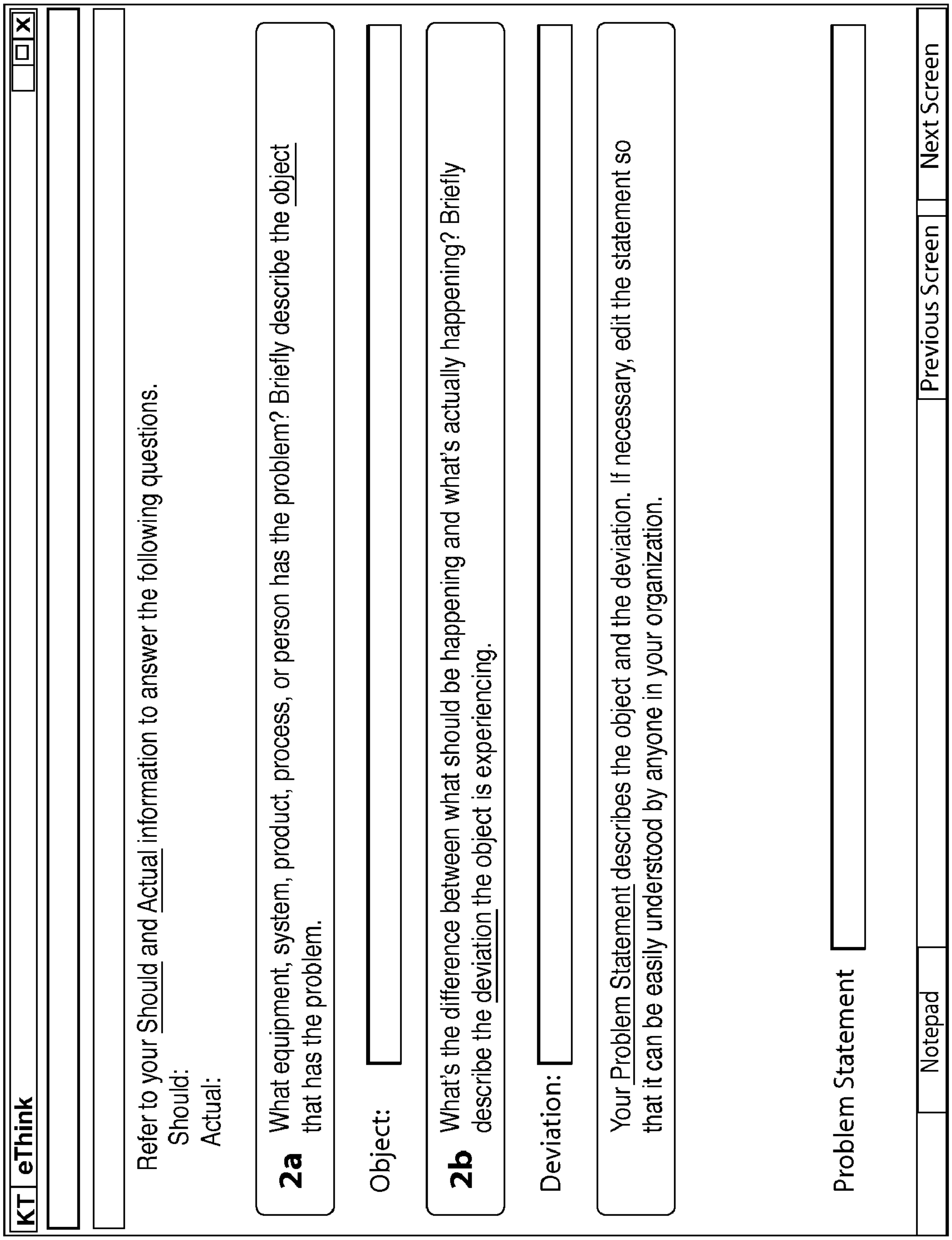
Figure 88:
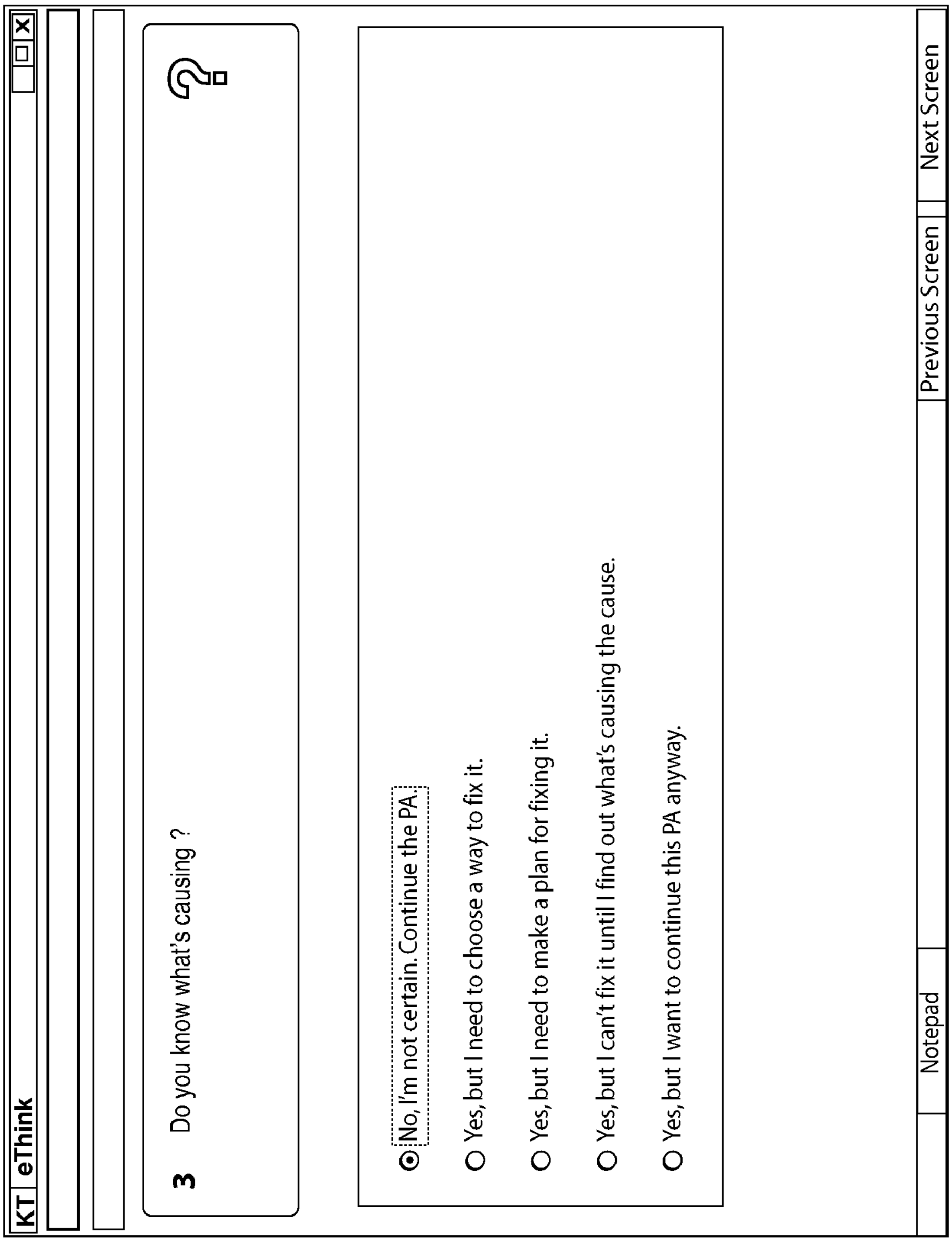
Figure 89:
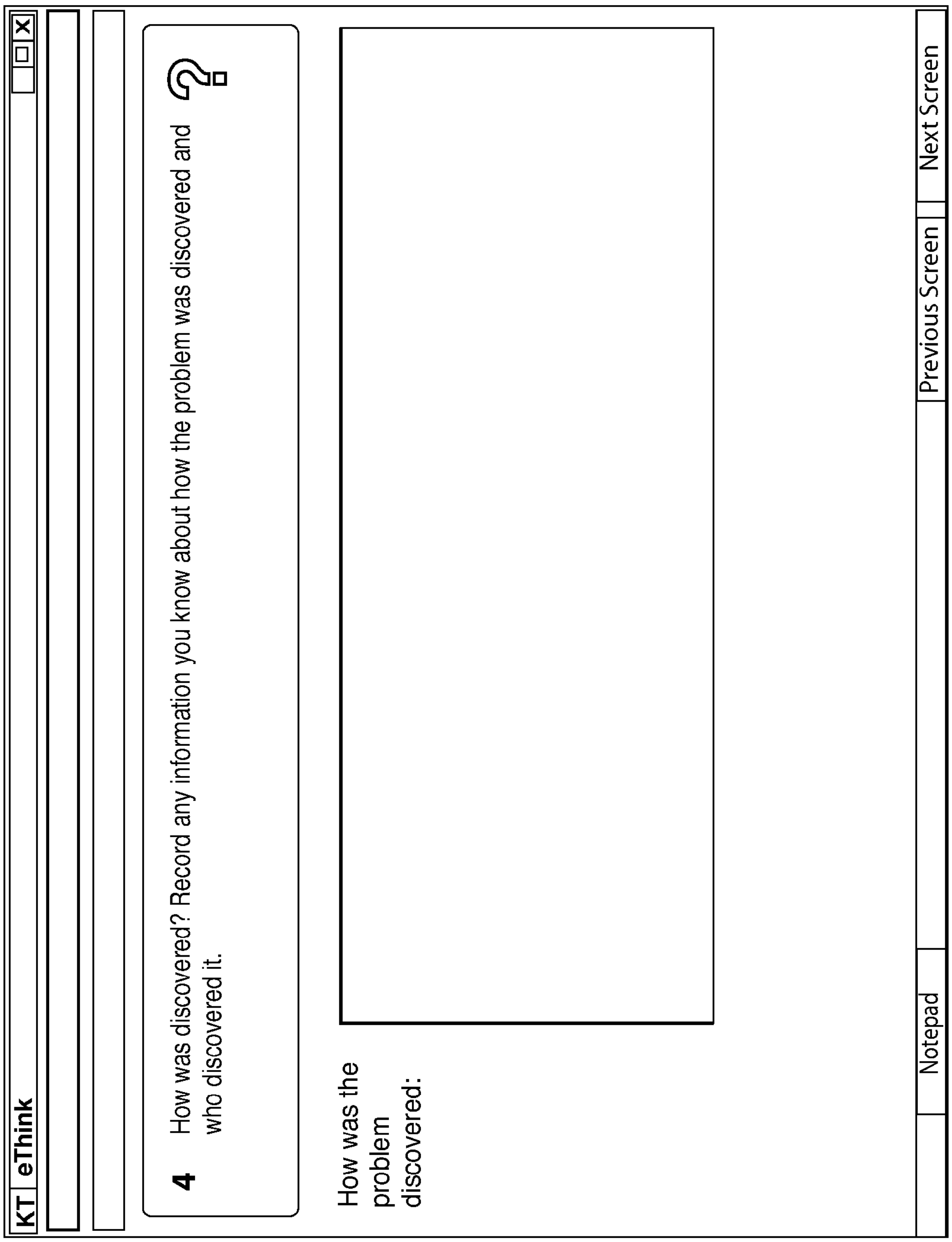
Figure 90:
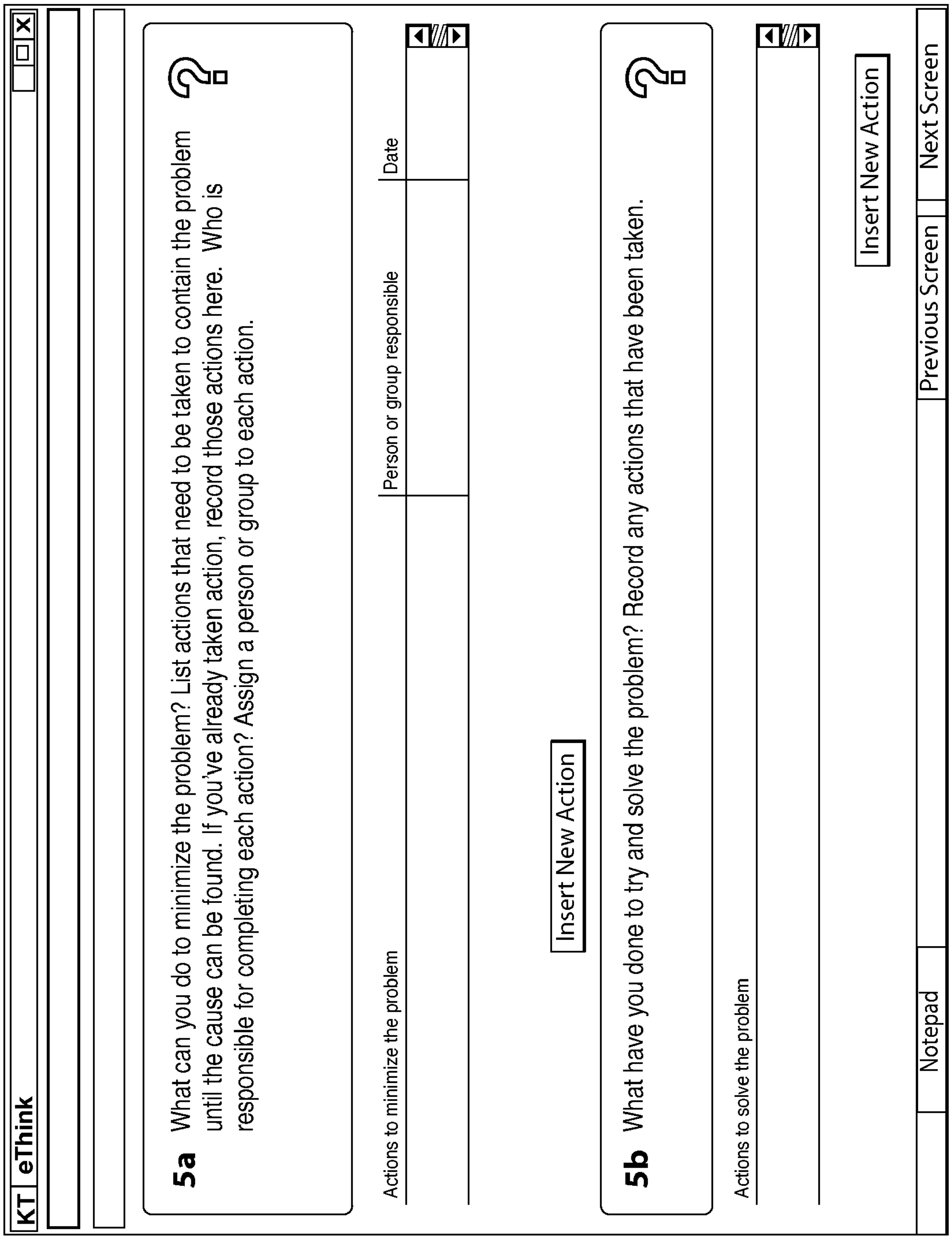
Figure 91:
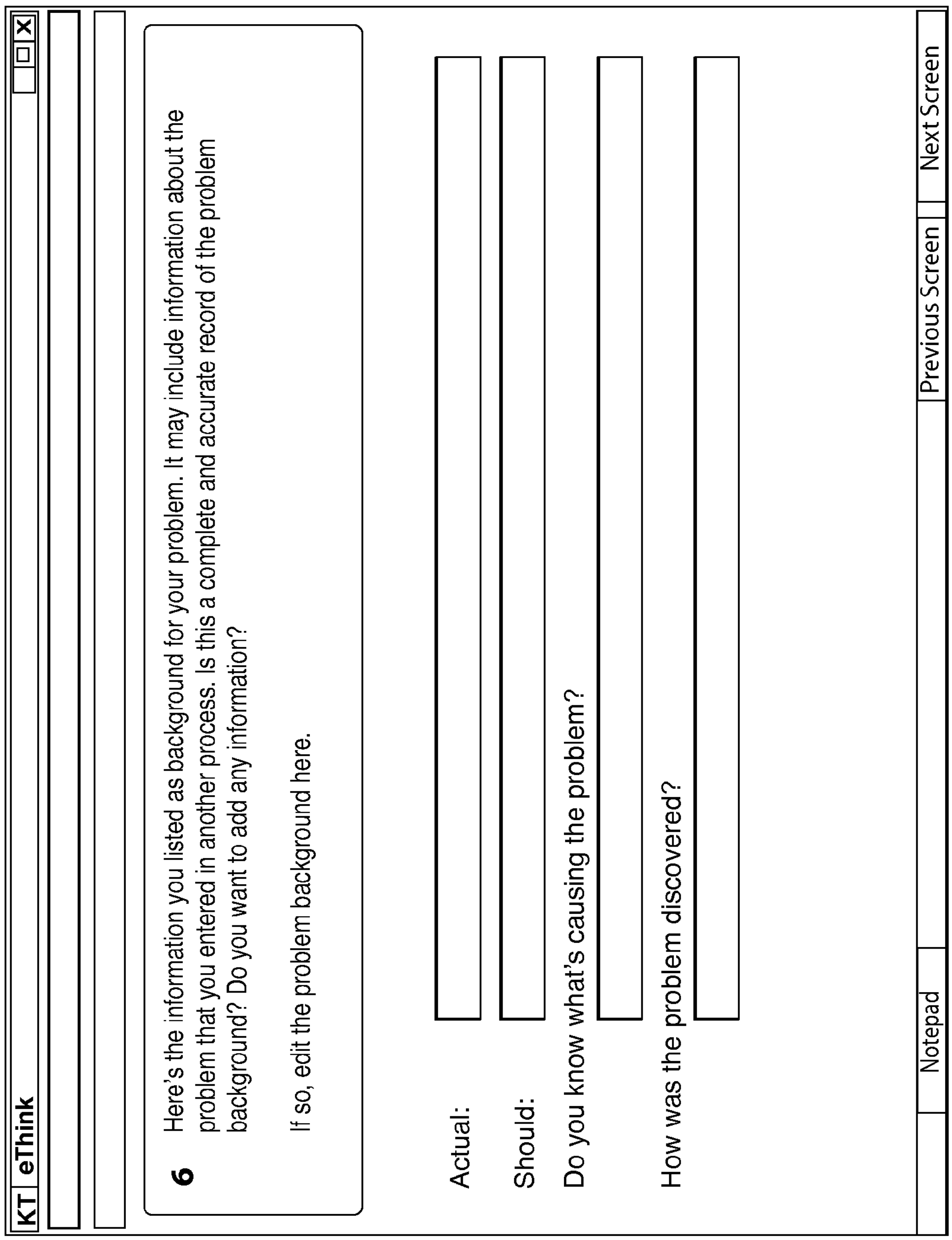
Figure 92:
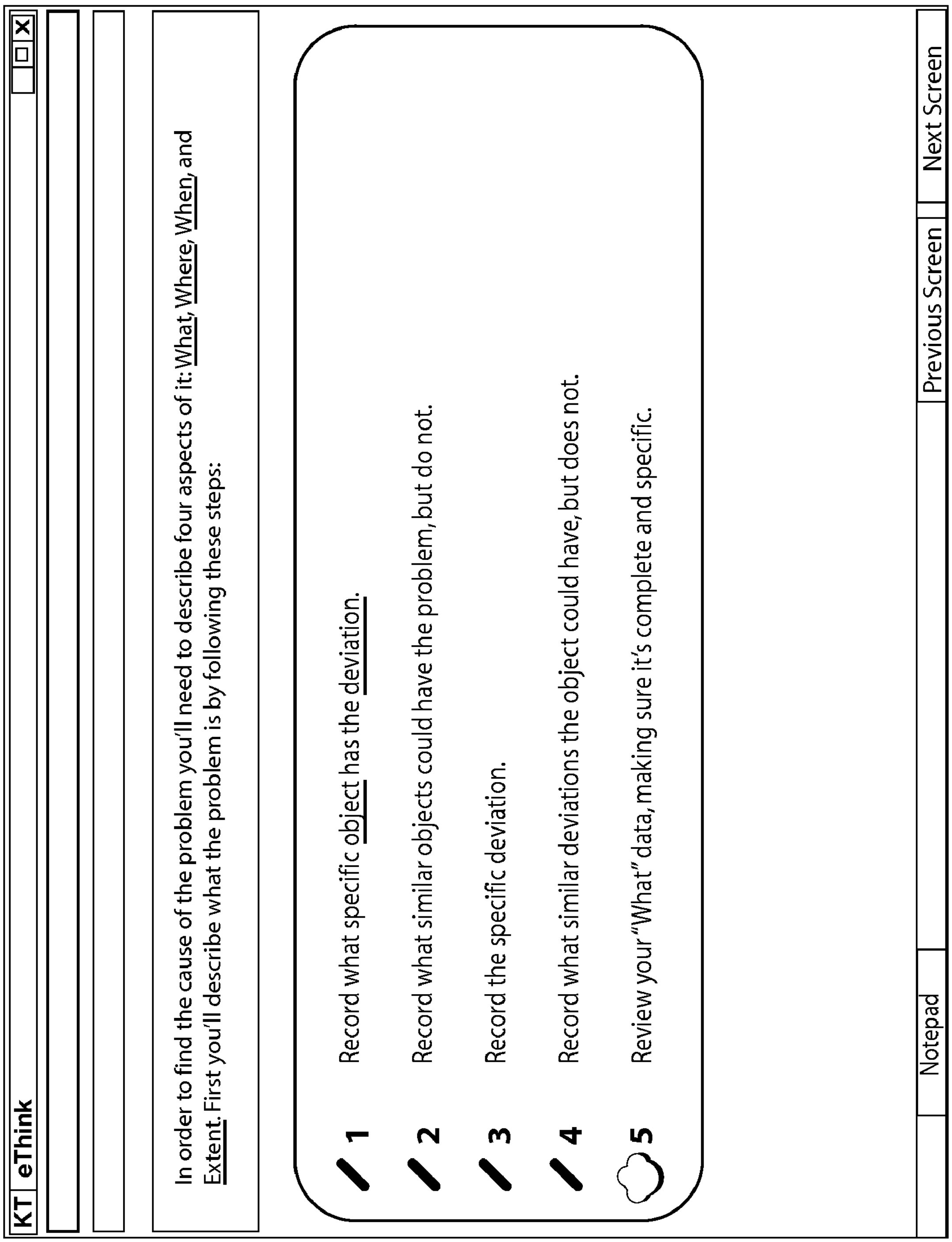
Figure 93:
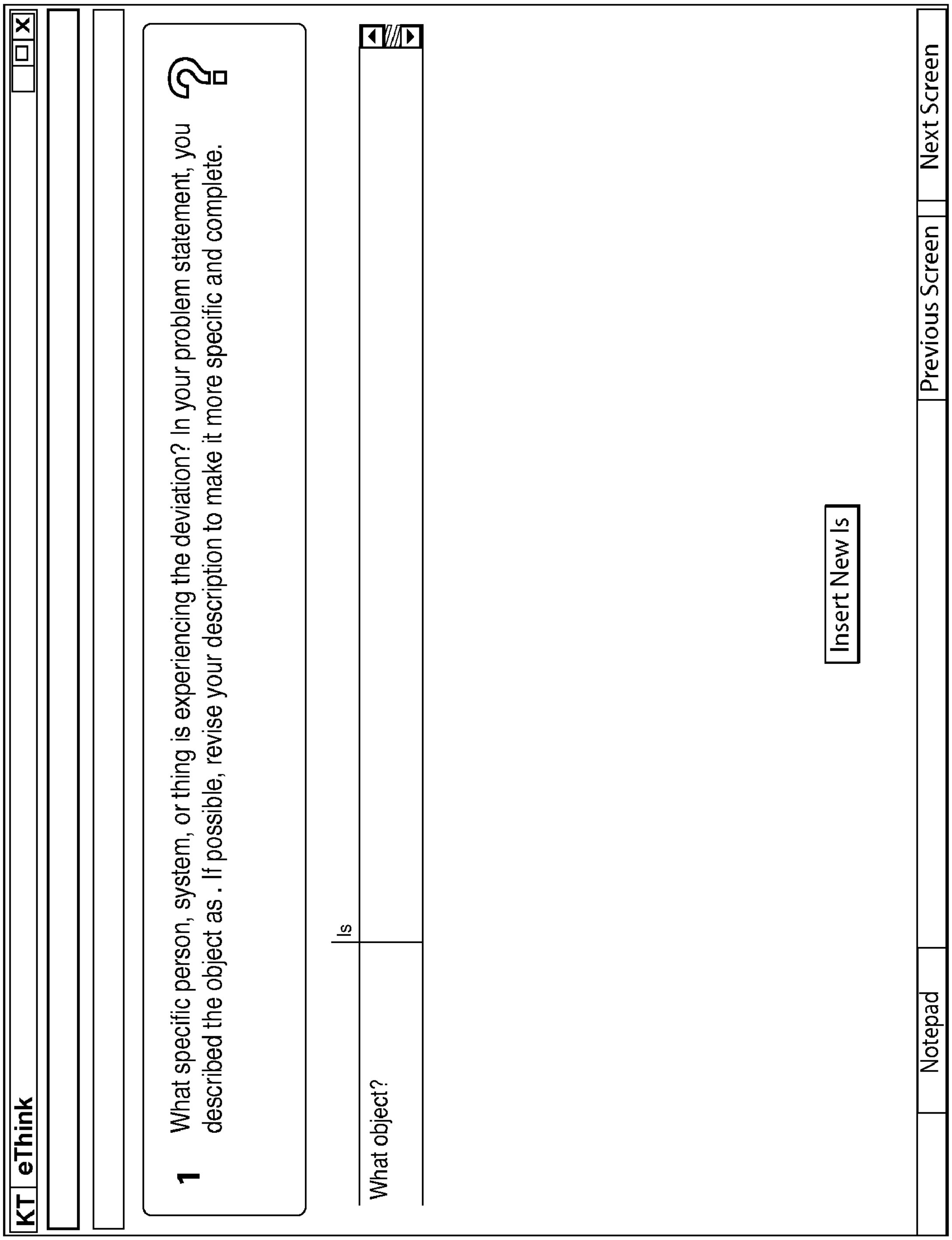
Figure 94:
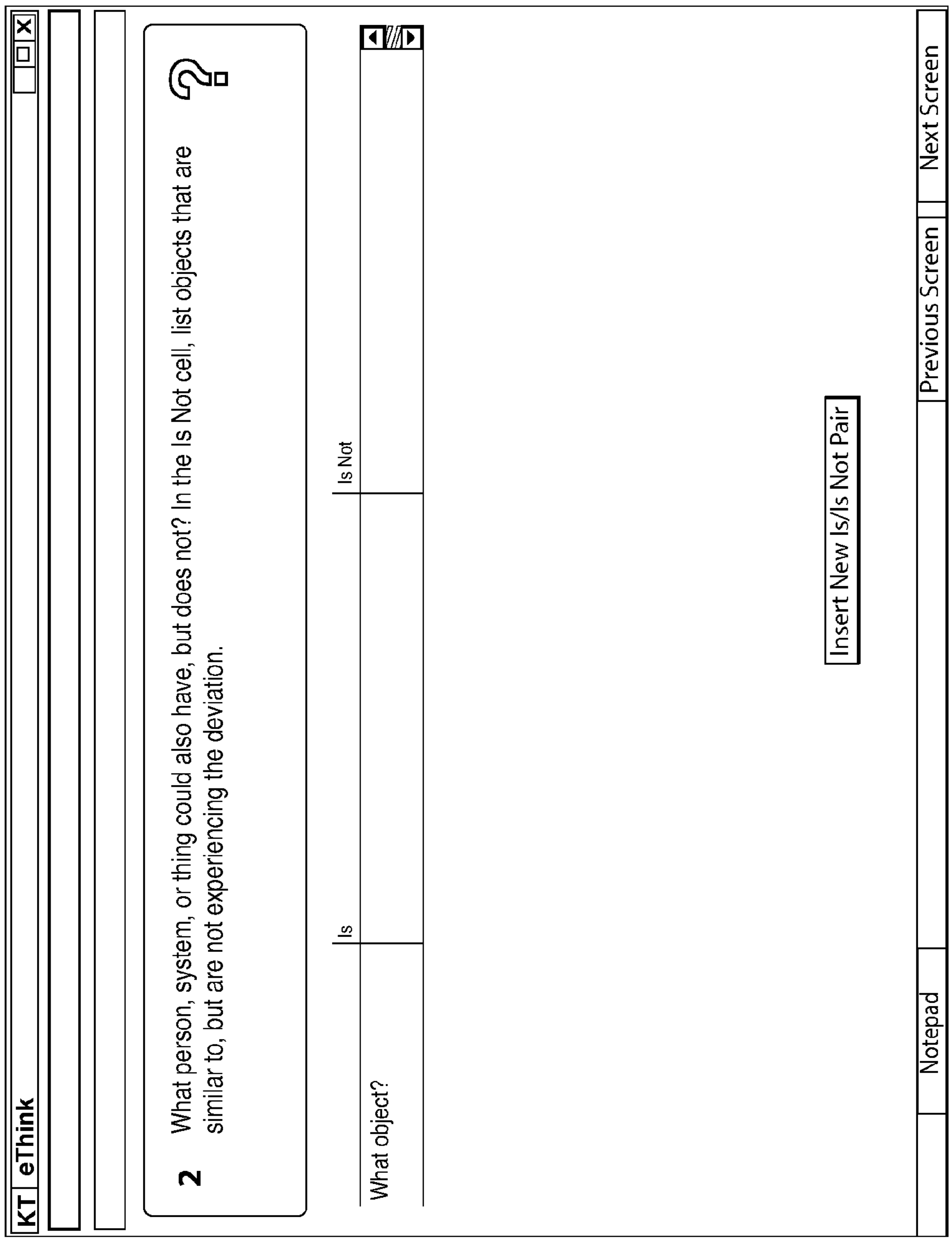
Figure 95:
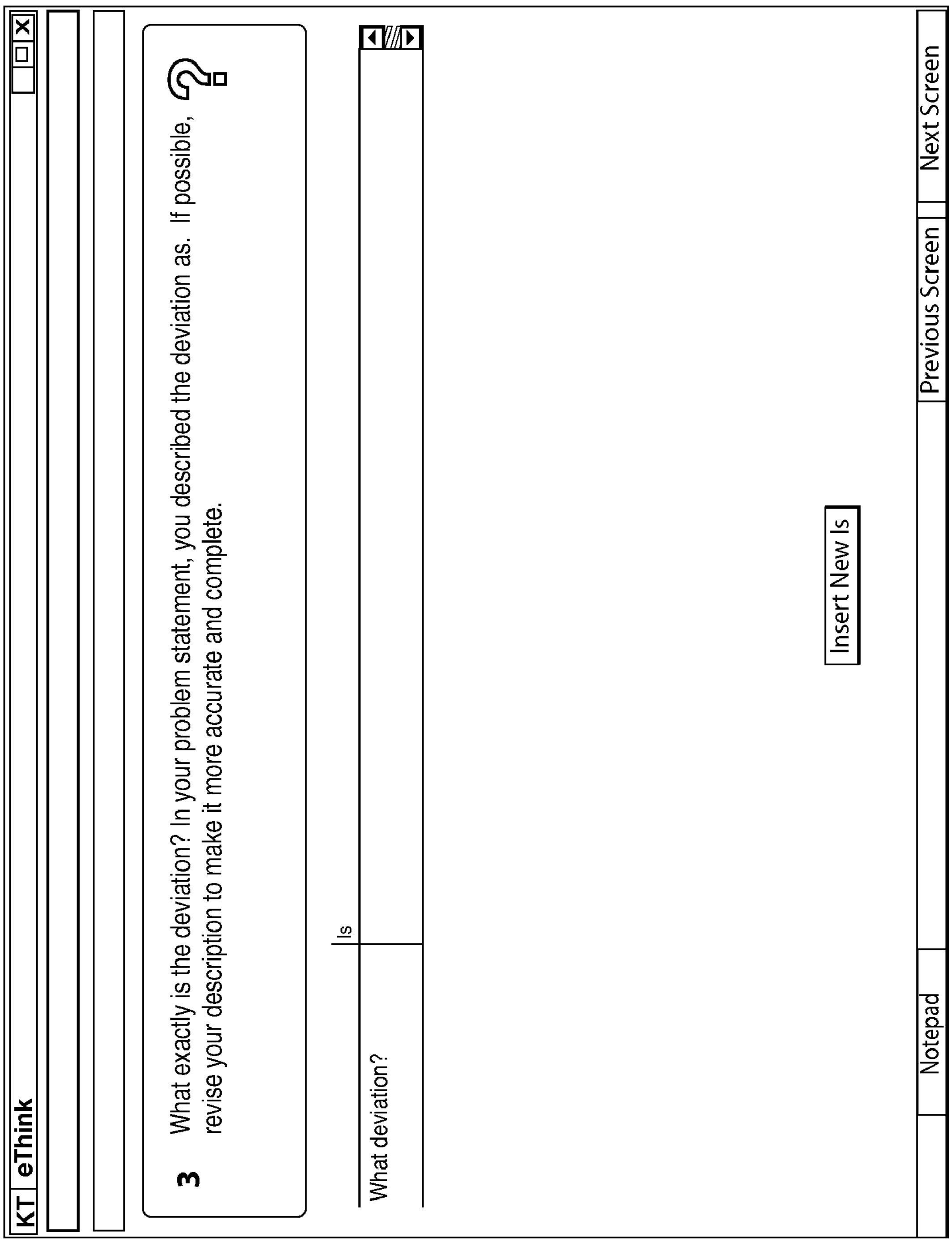
Figure 96:
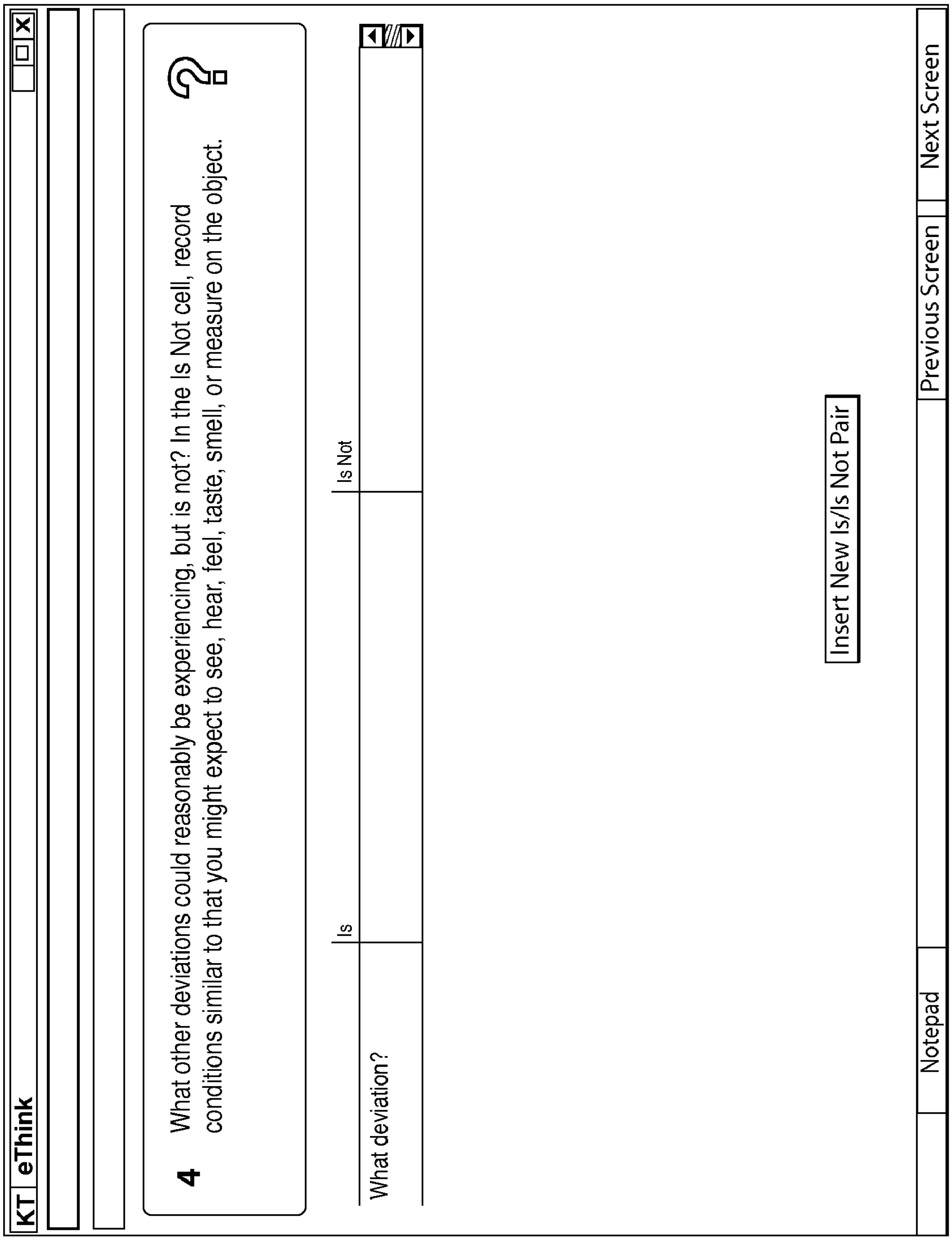
Figure 97:
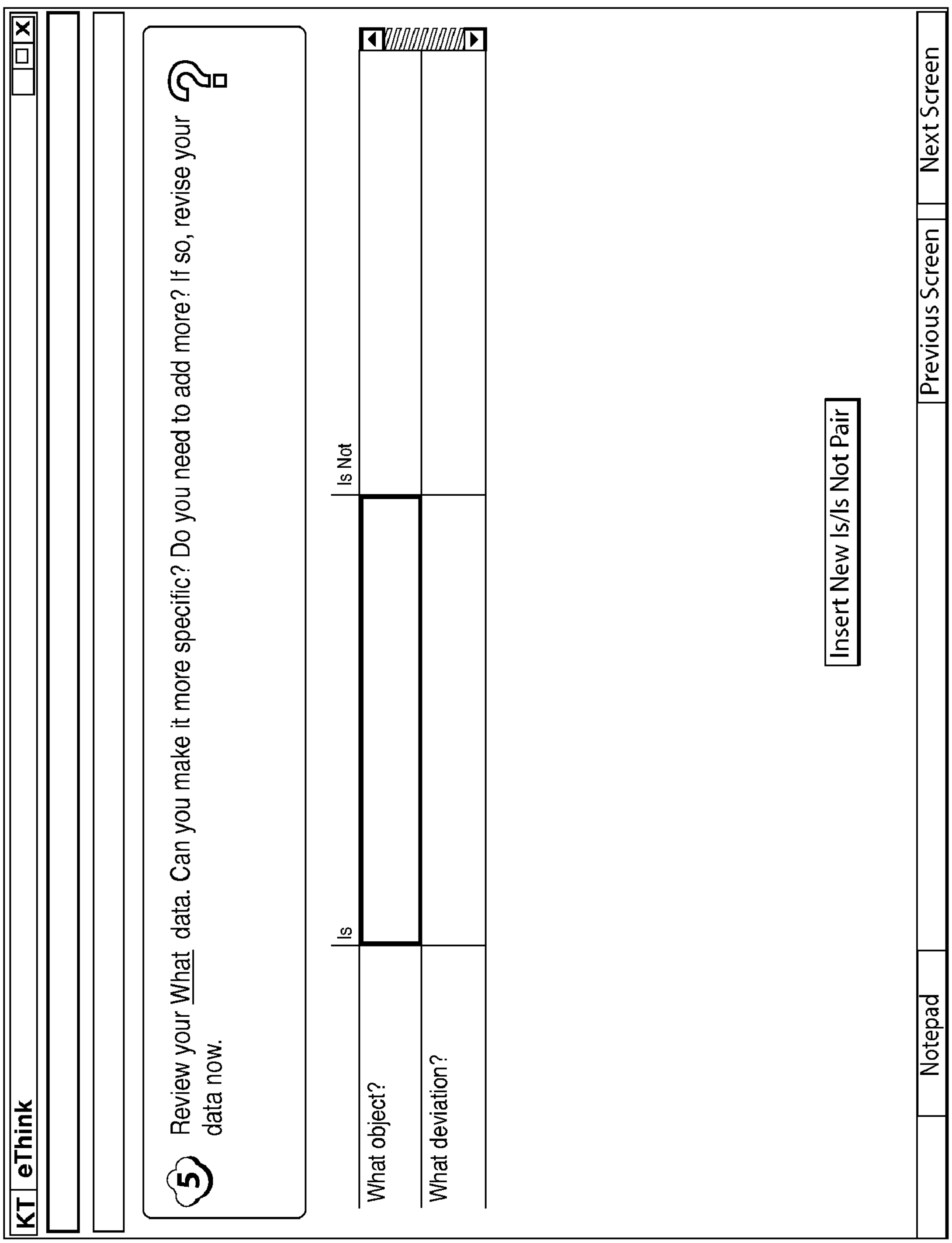
Figure 98:
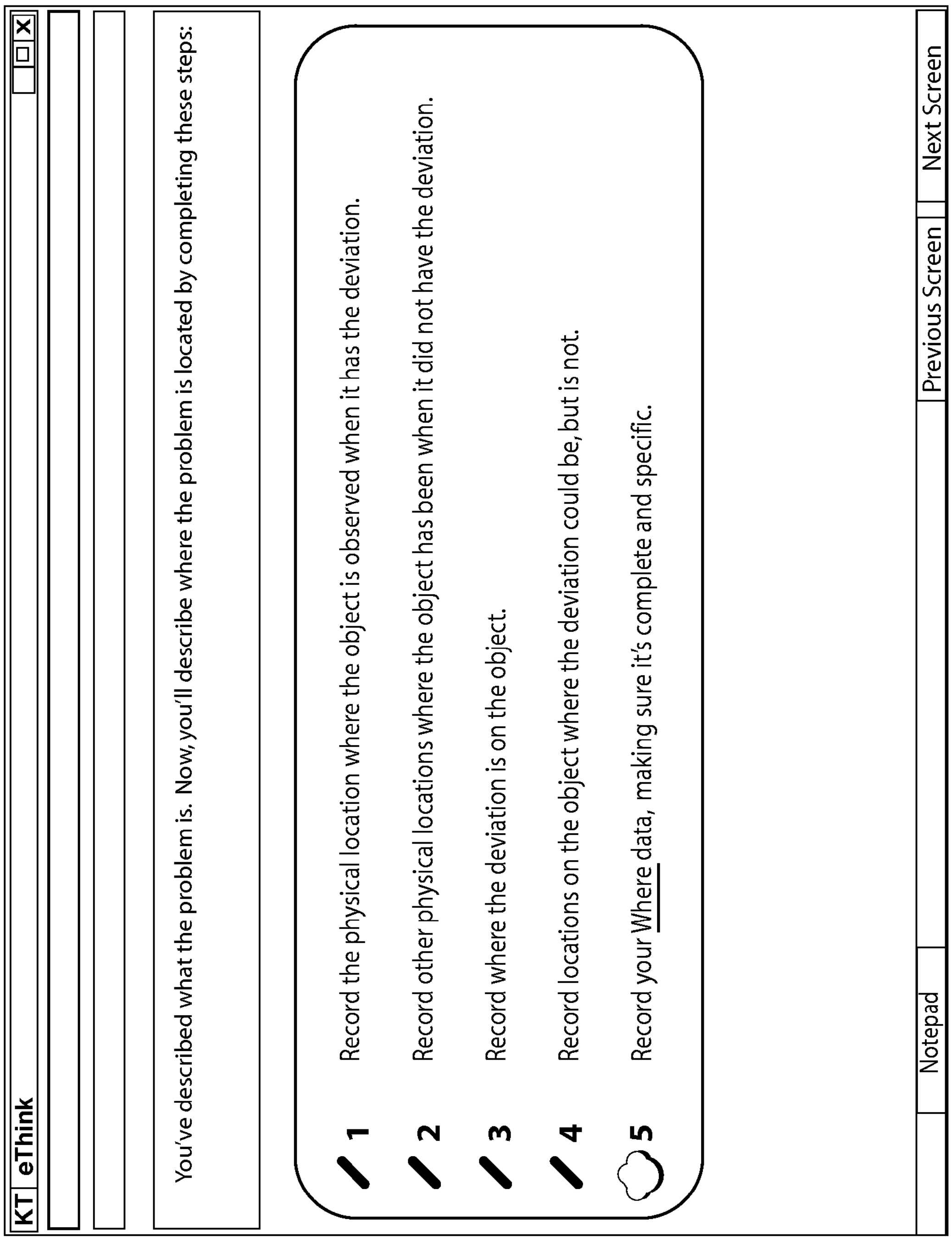
Figure 99:
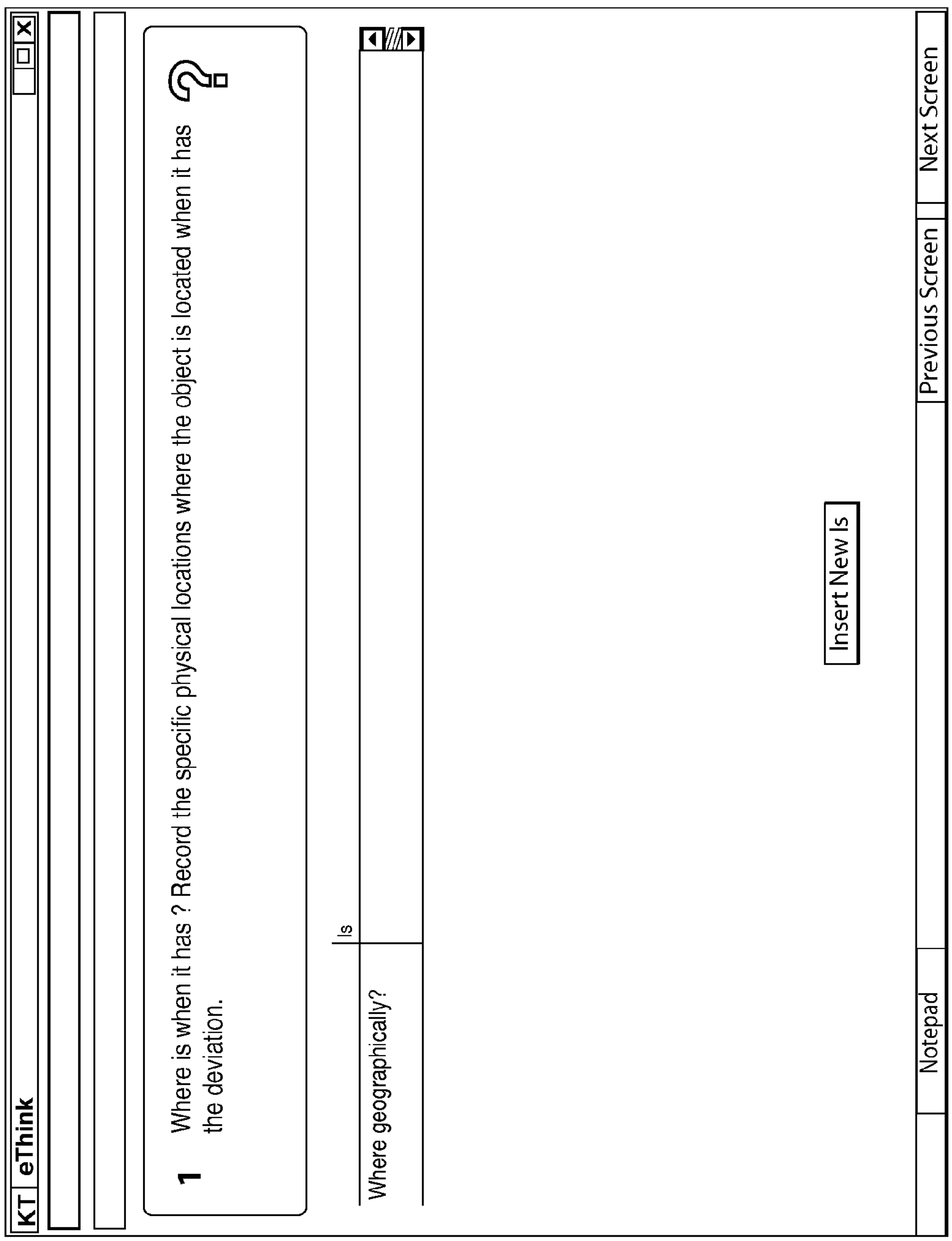
Figure 100:
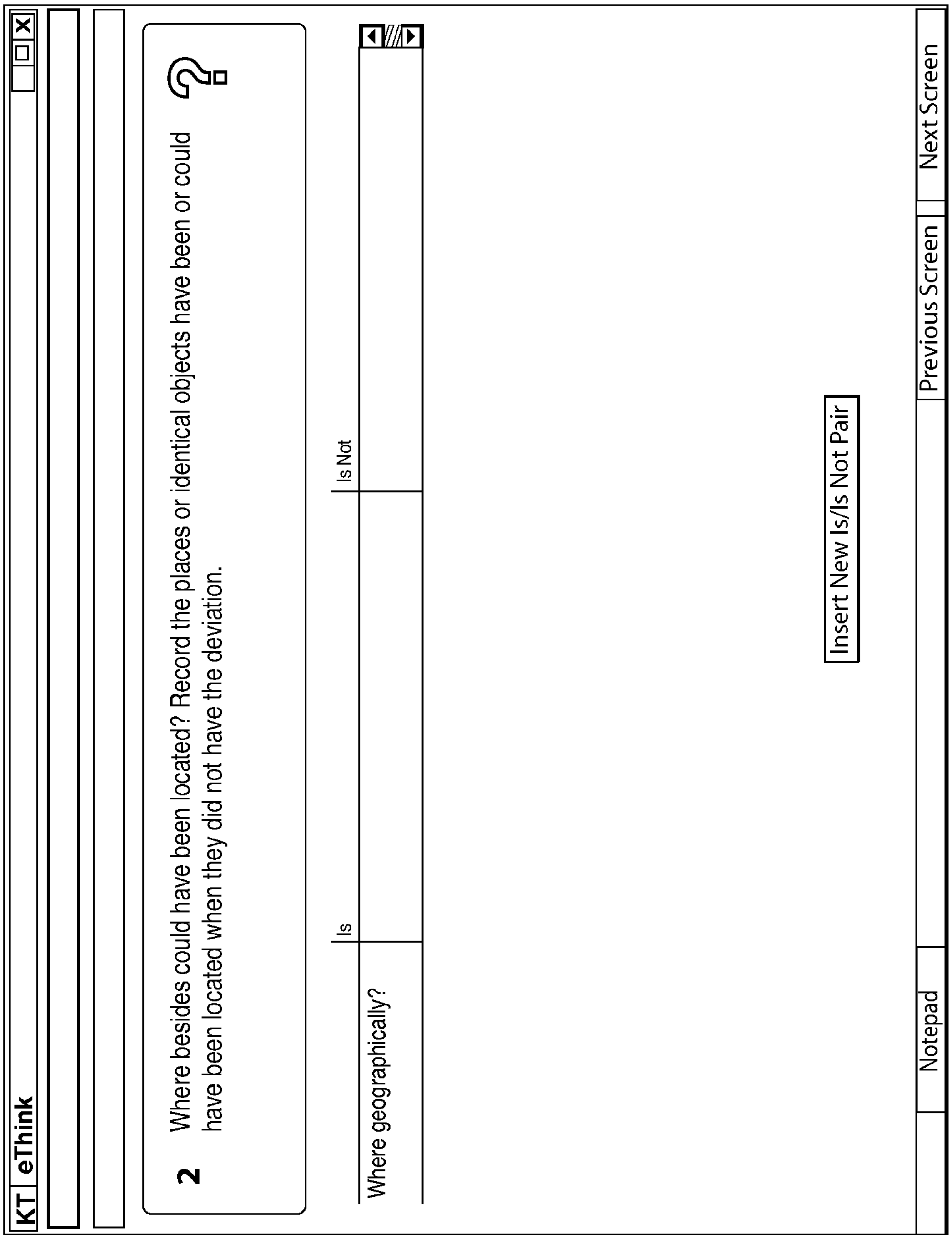
Figure 101:
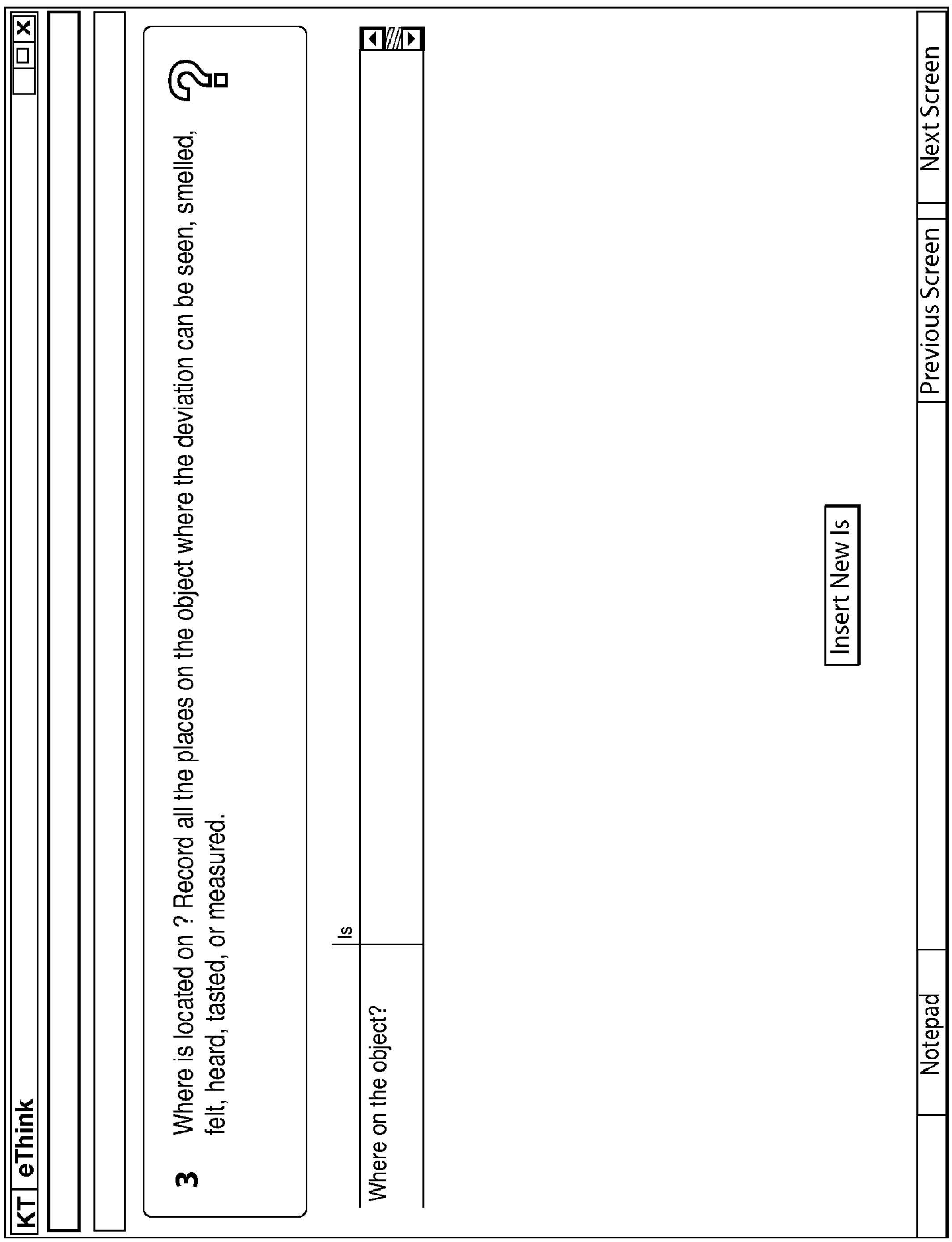
Figure 102:
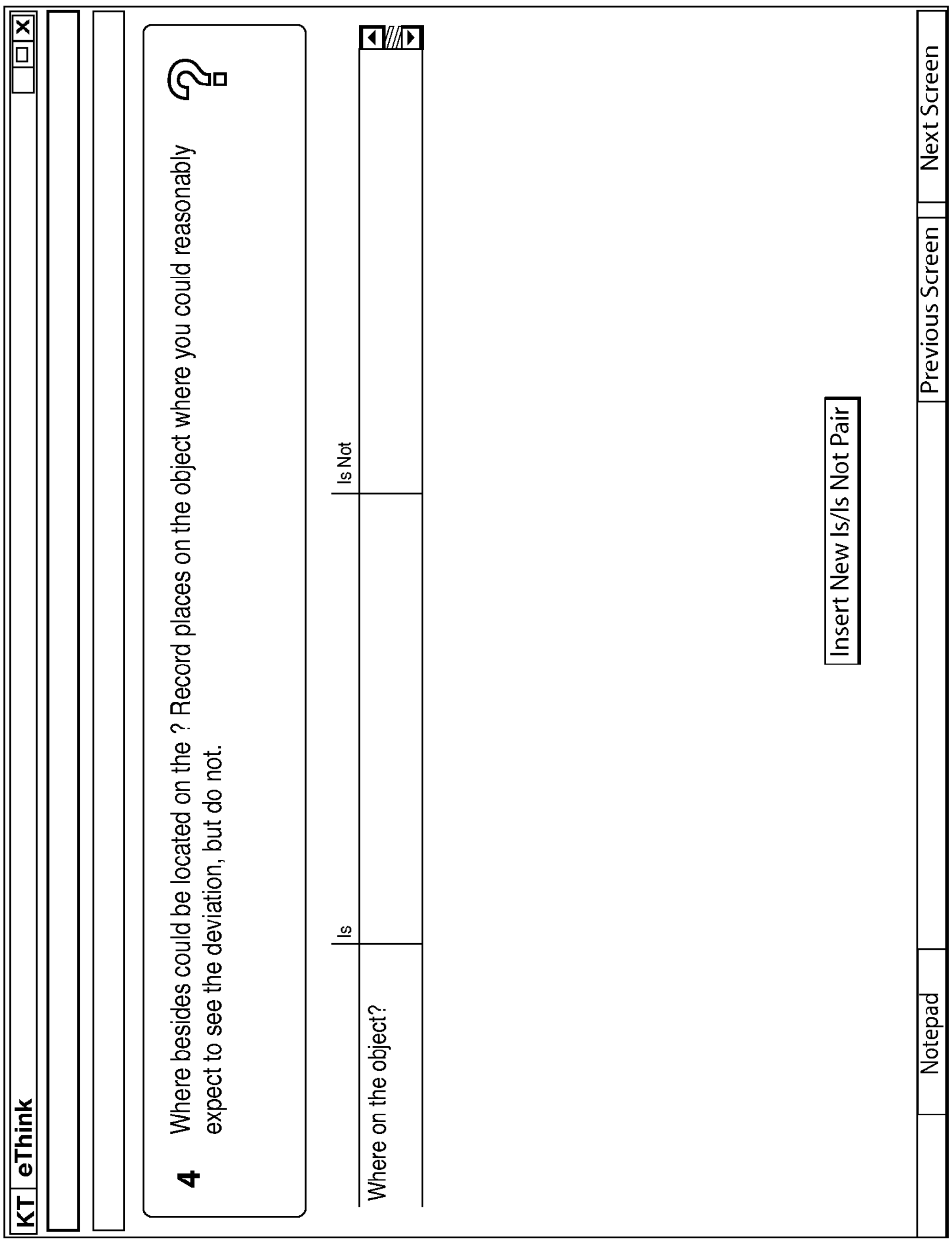
Figure 103:
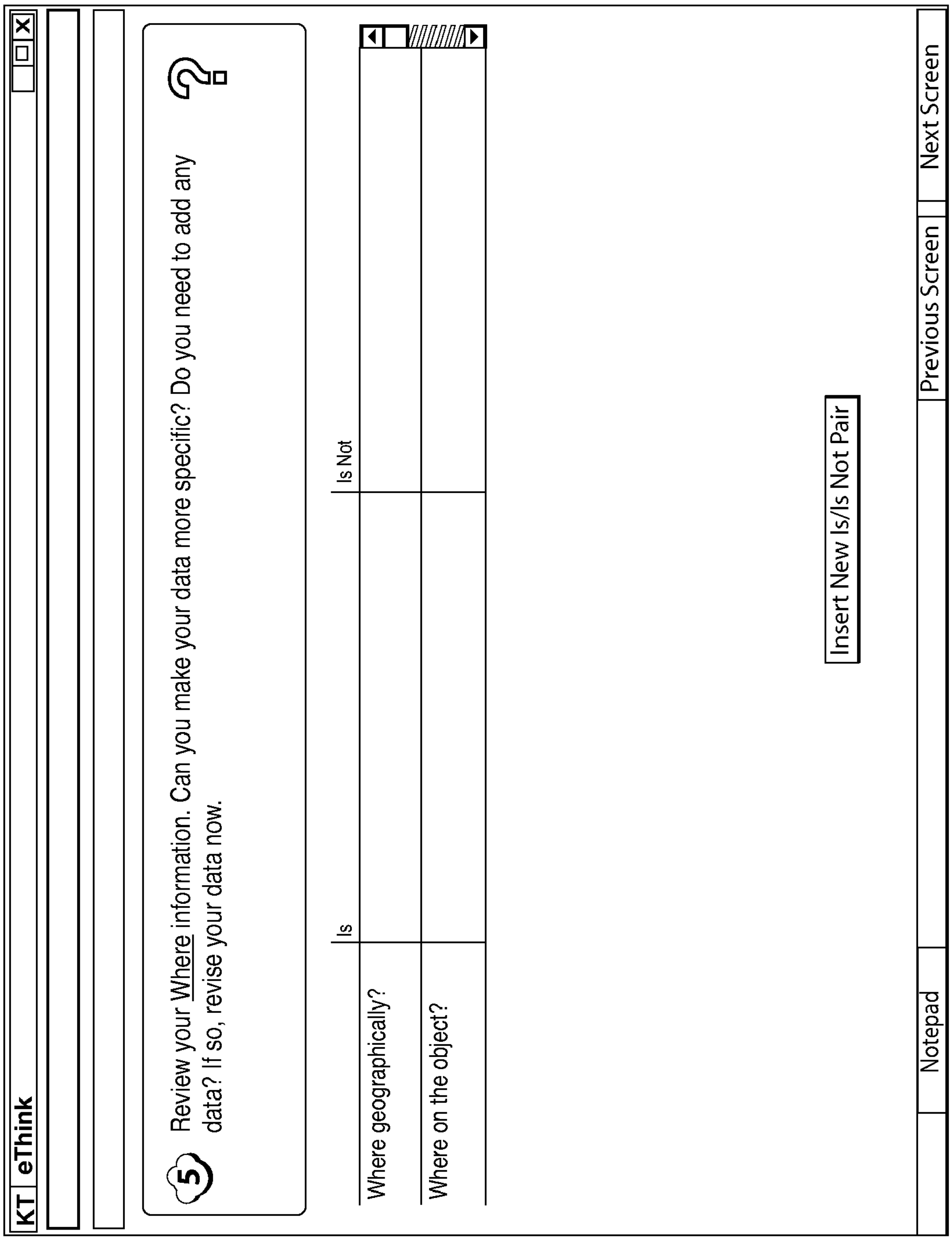
Figure 104:
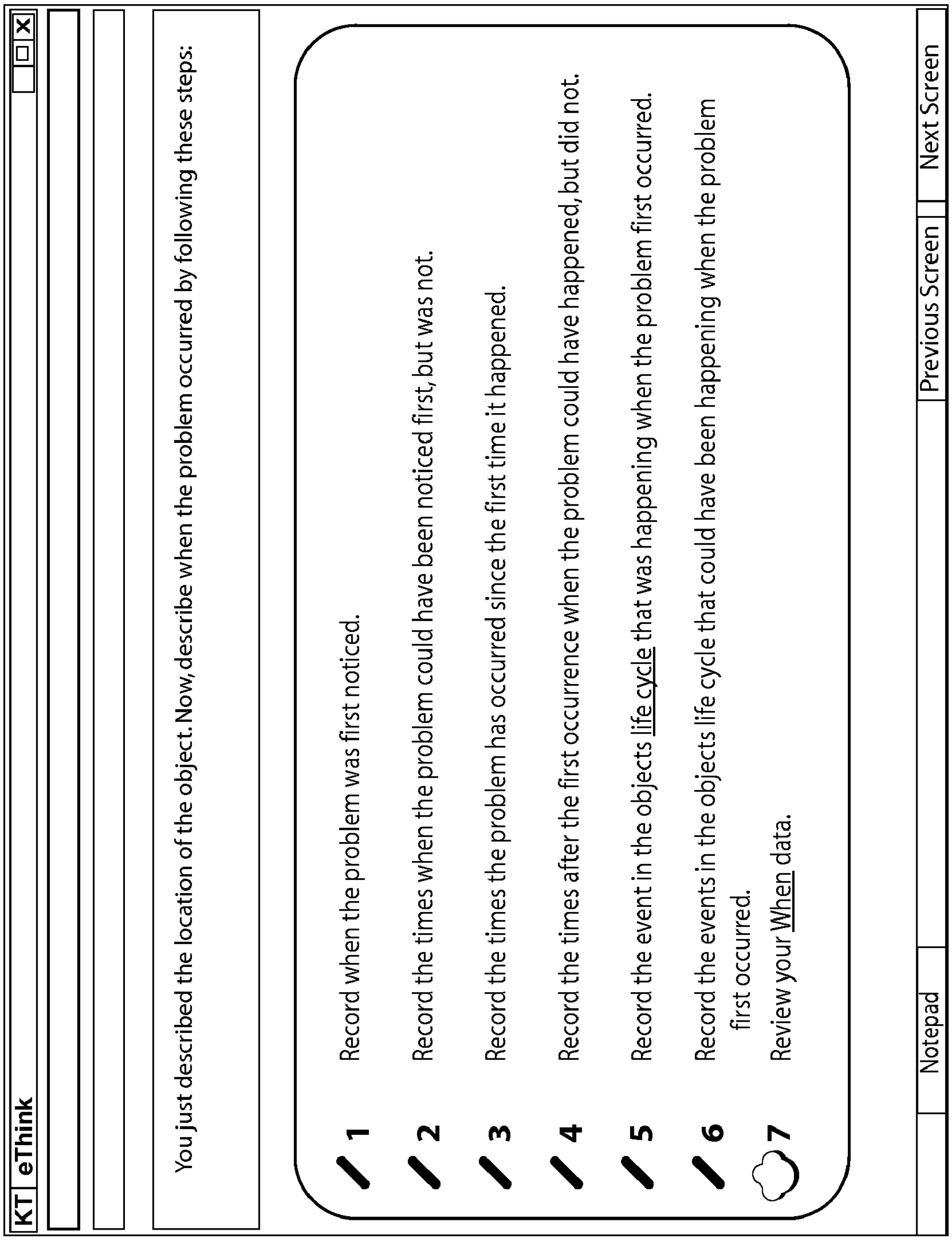
Figure 105:
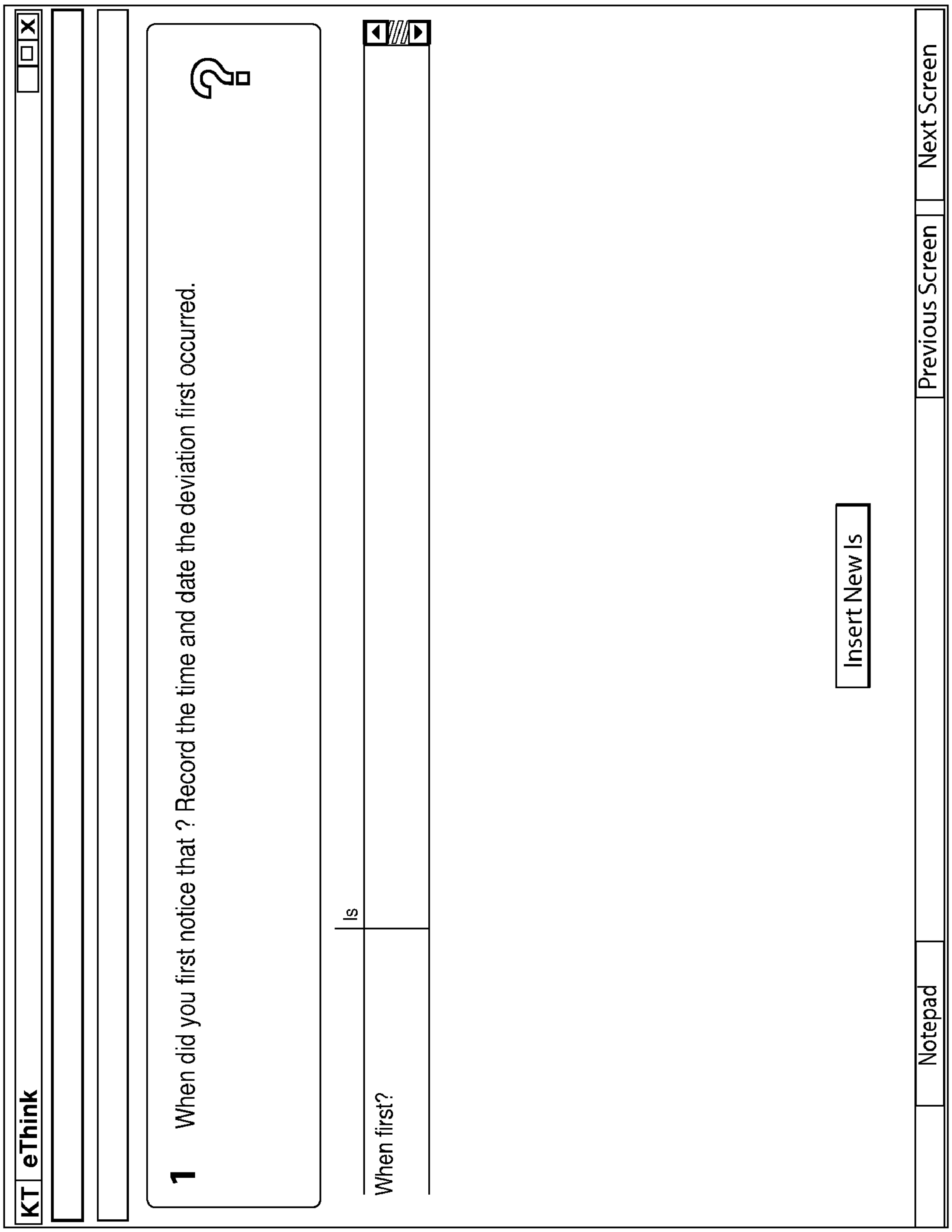
Figure 106:
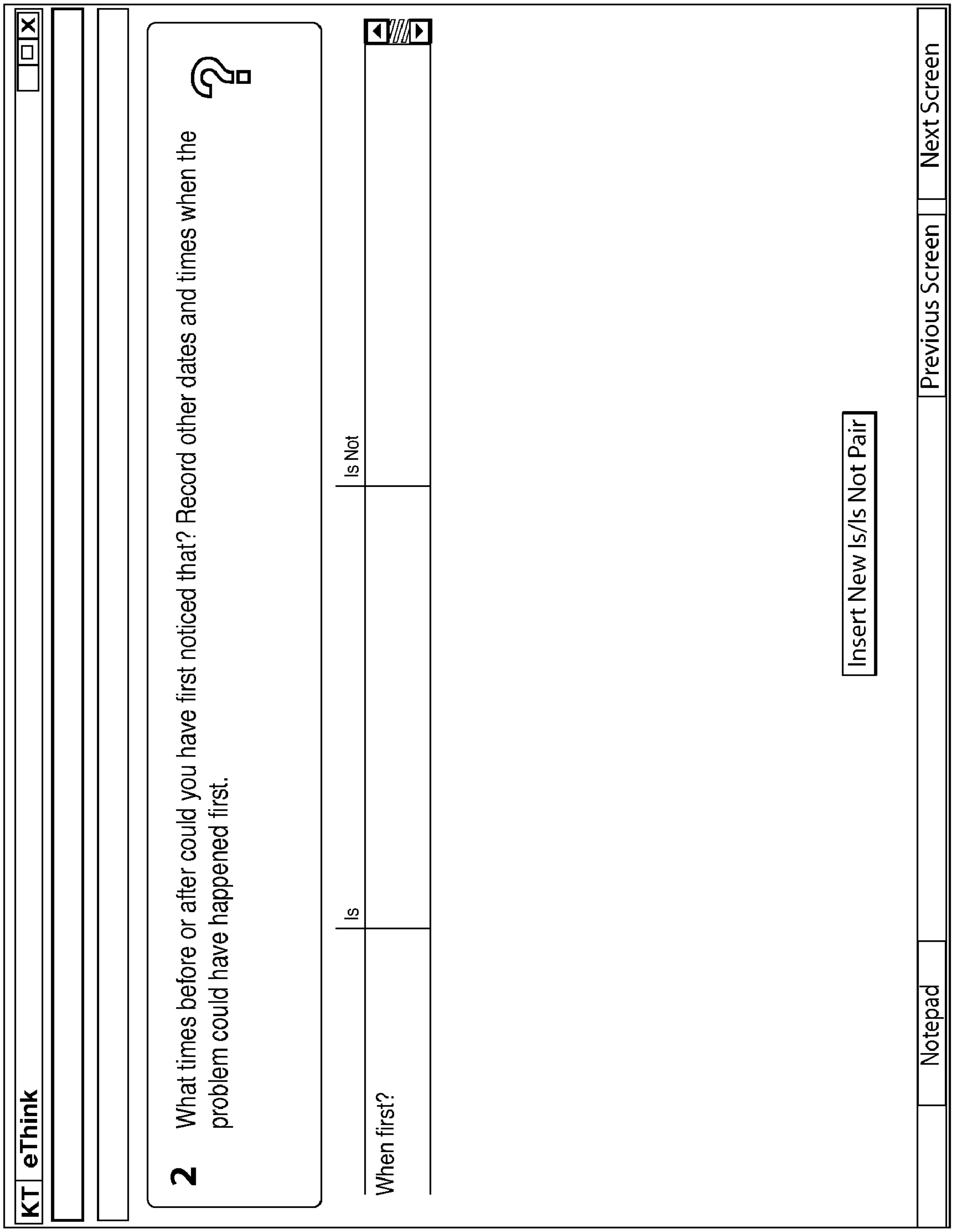
Figure 107:
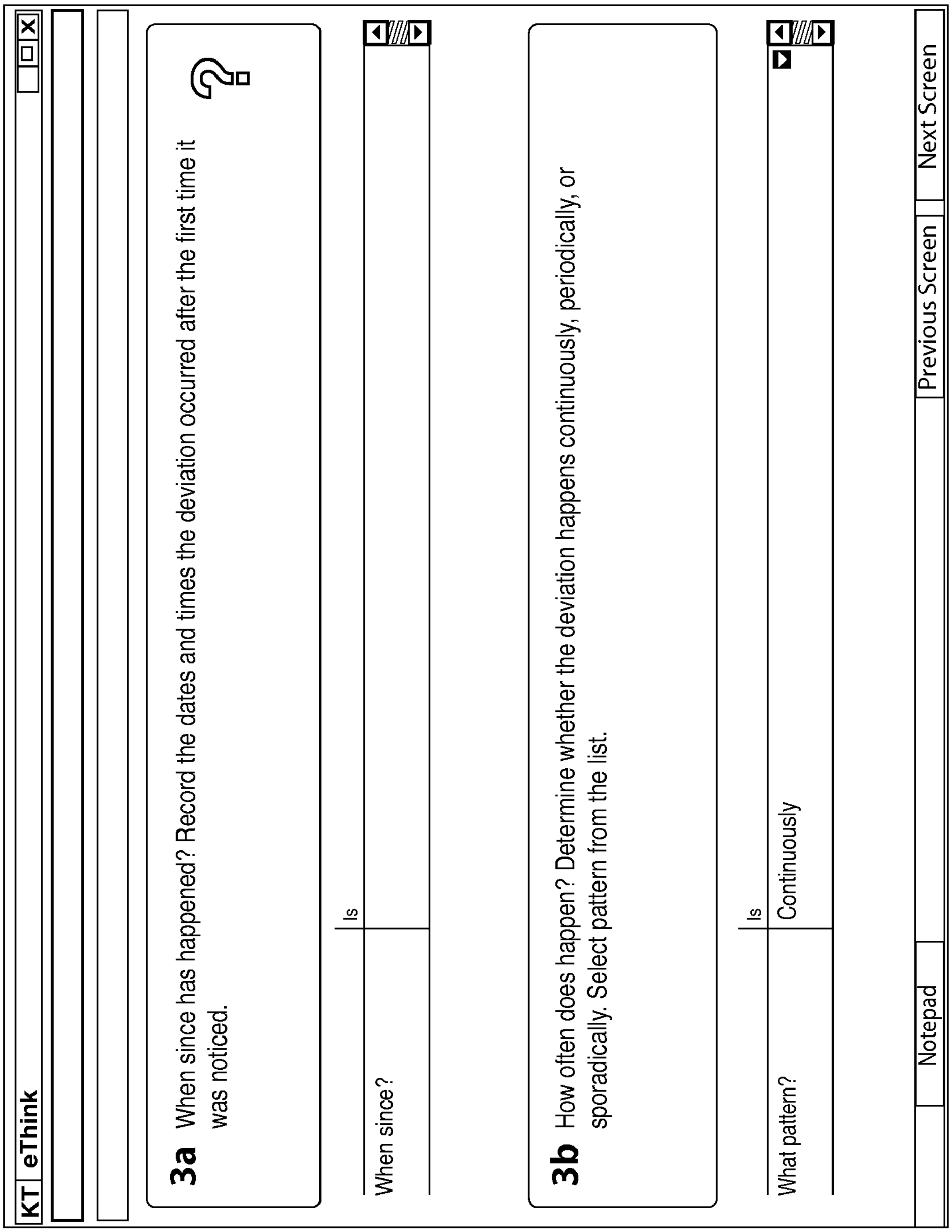
Figure 108:
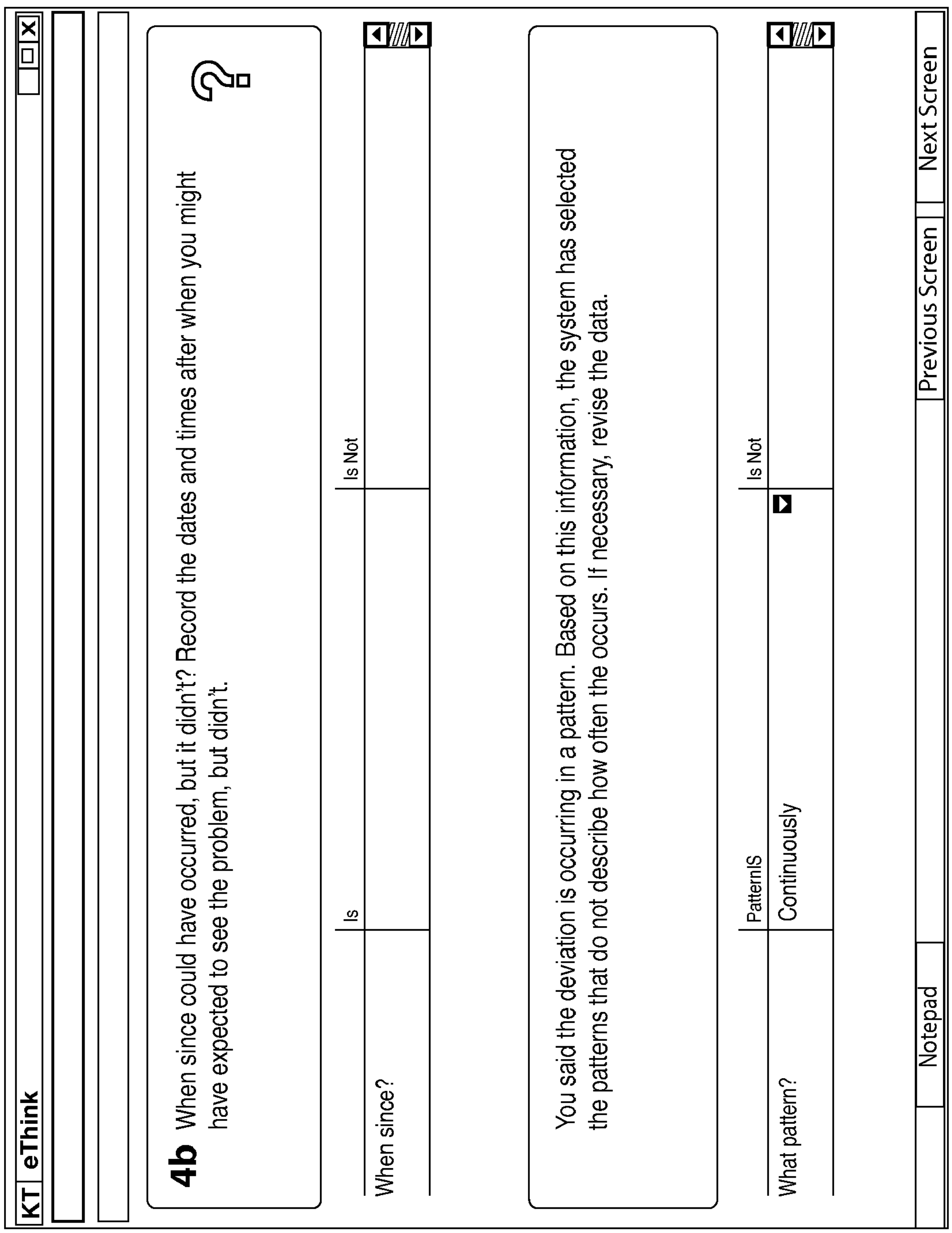
Figure 109:
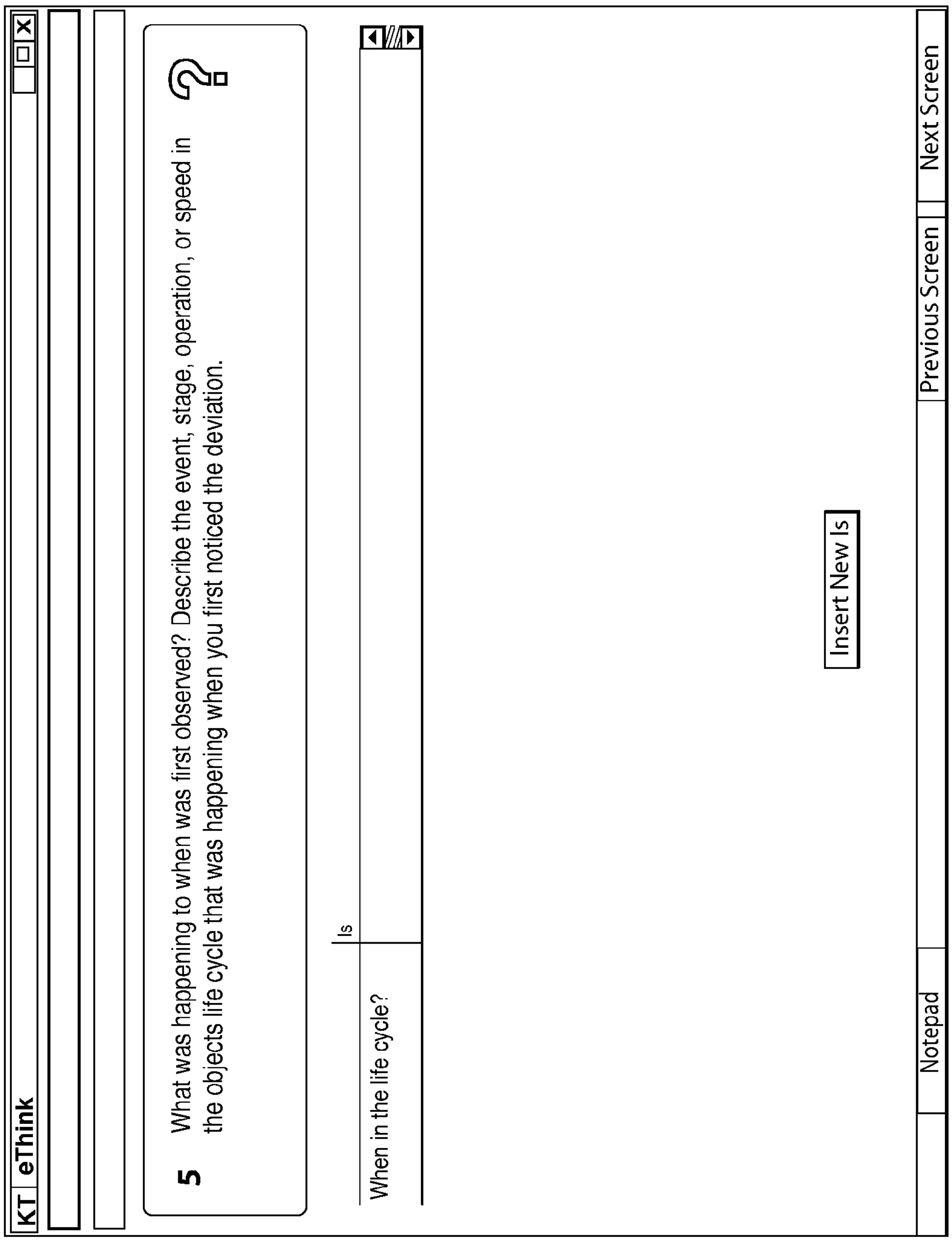
Figure 110:
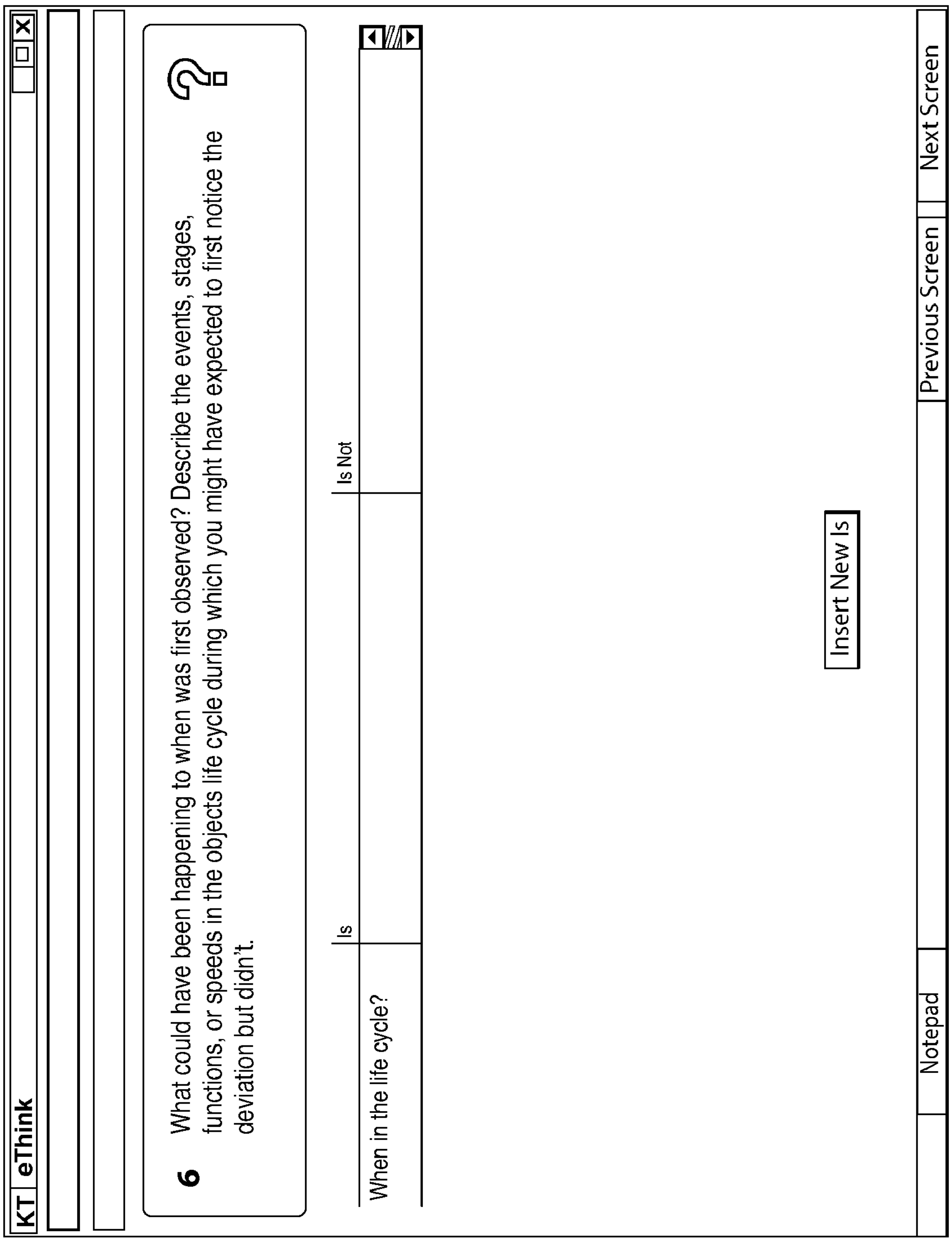
Figure 111:
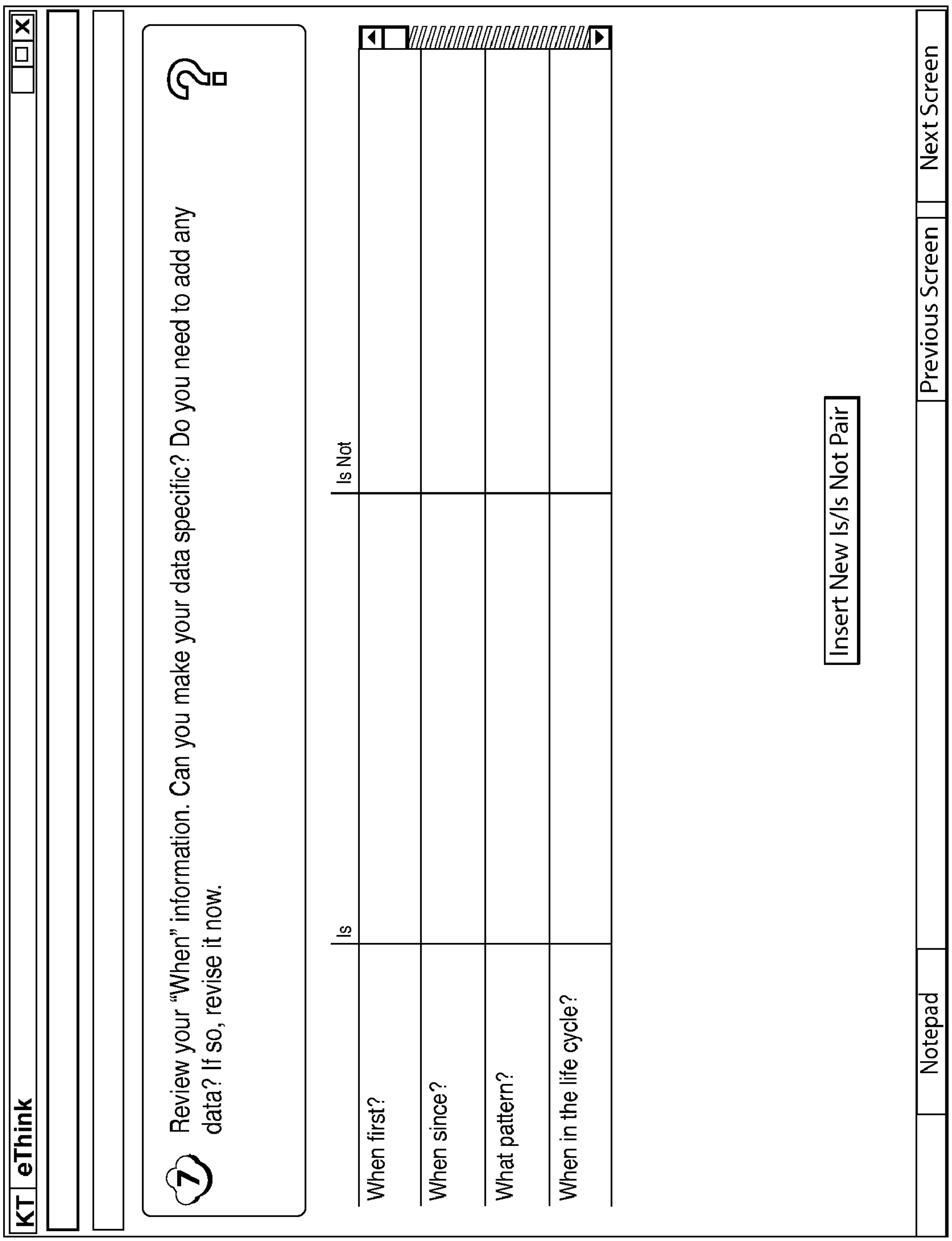
Figure 112:
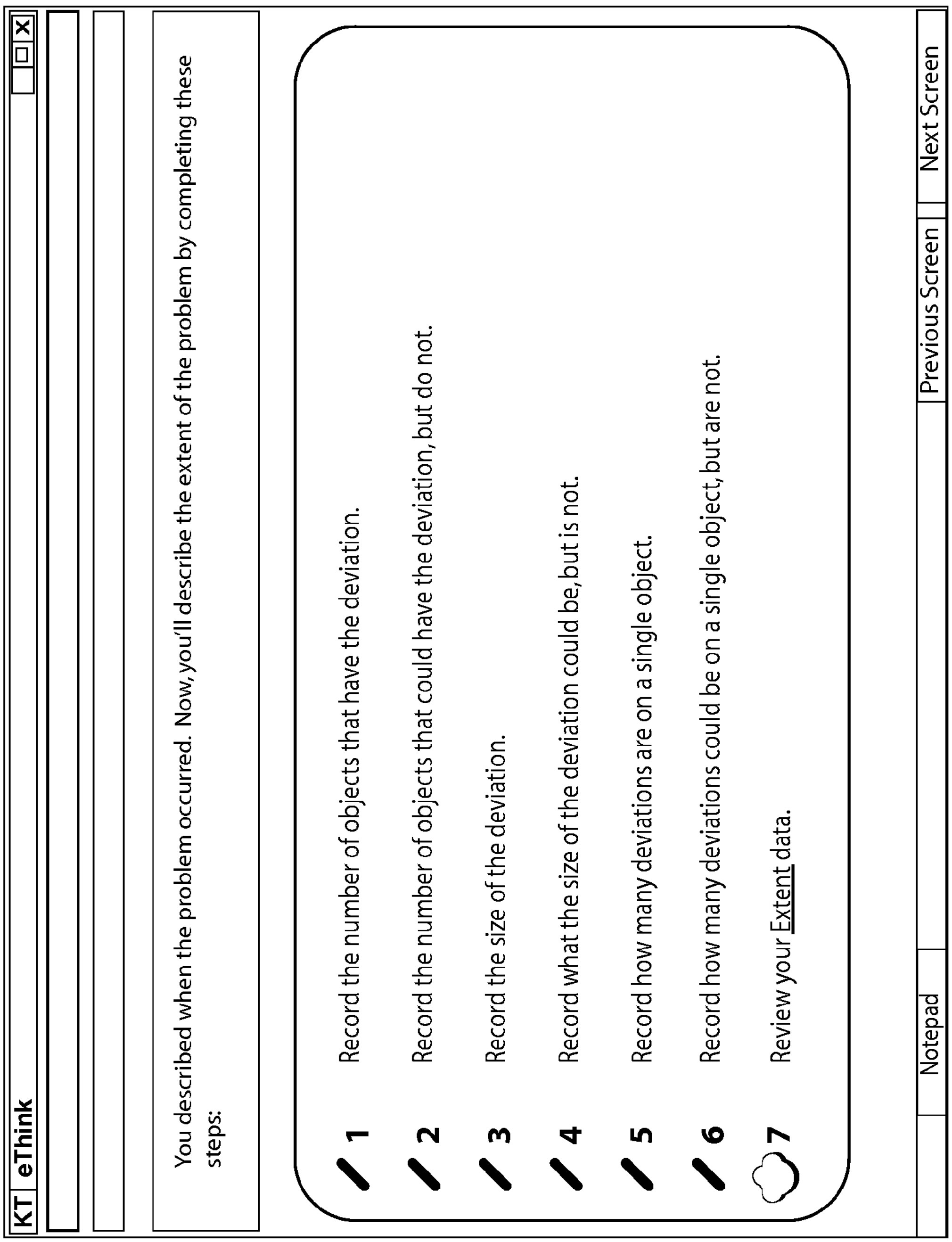
Figure 113:
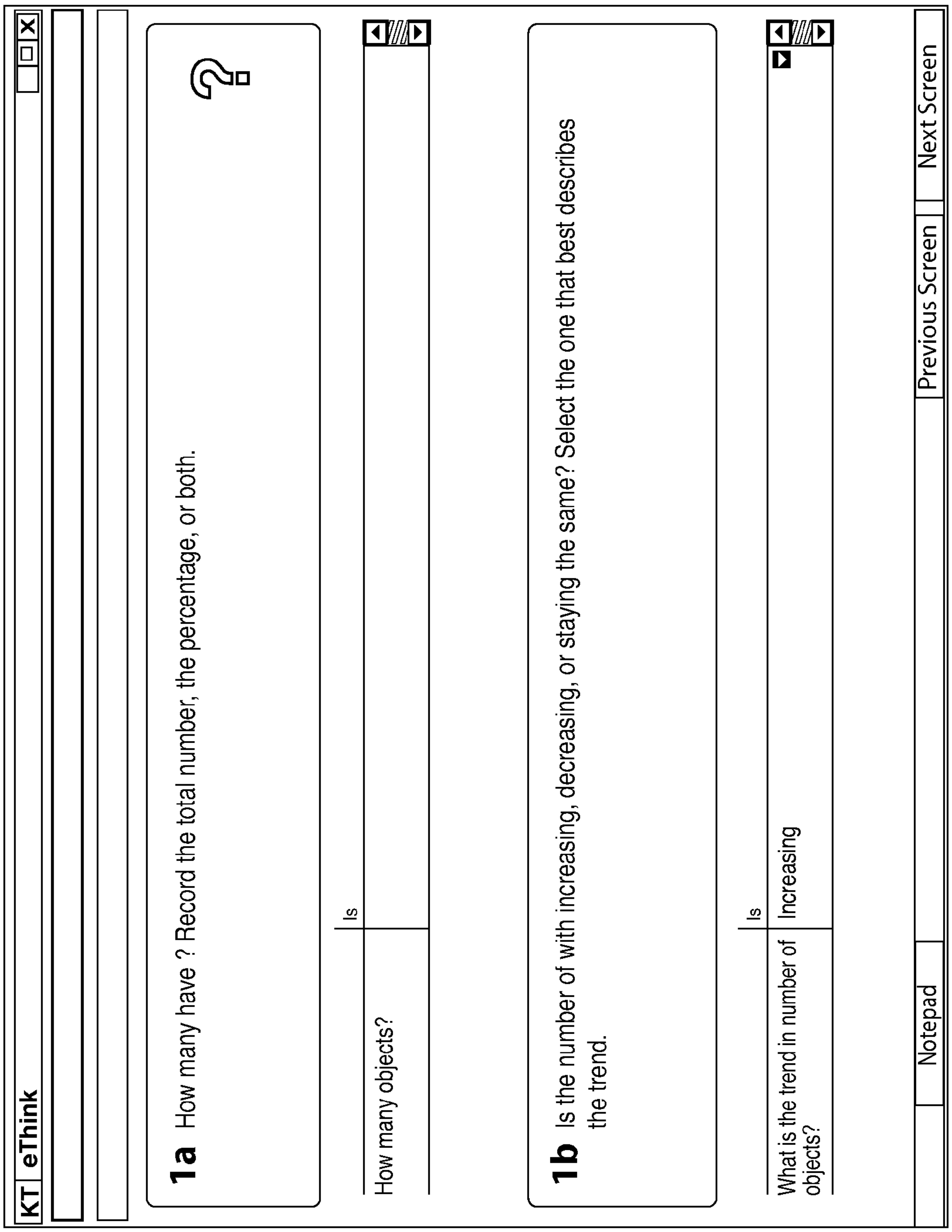
Figure 114:
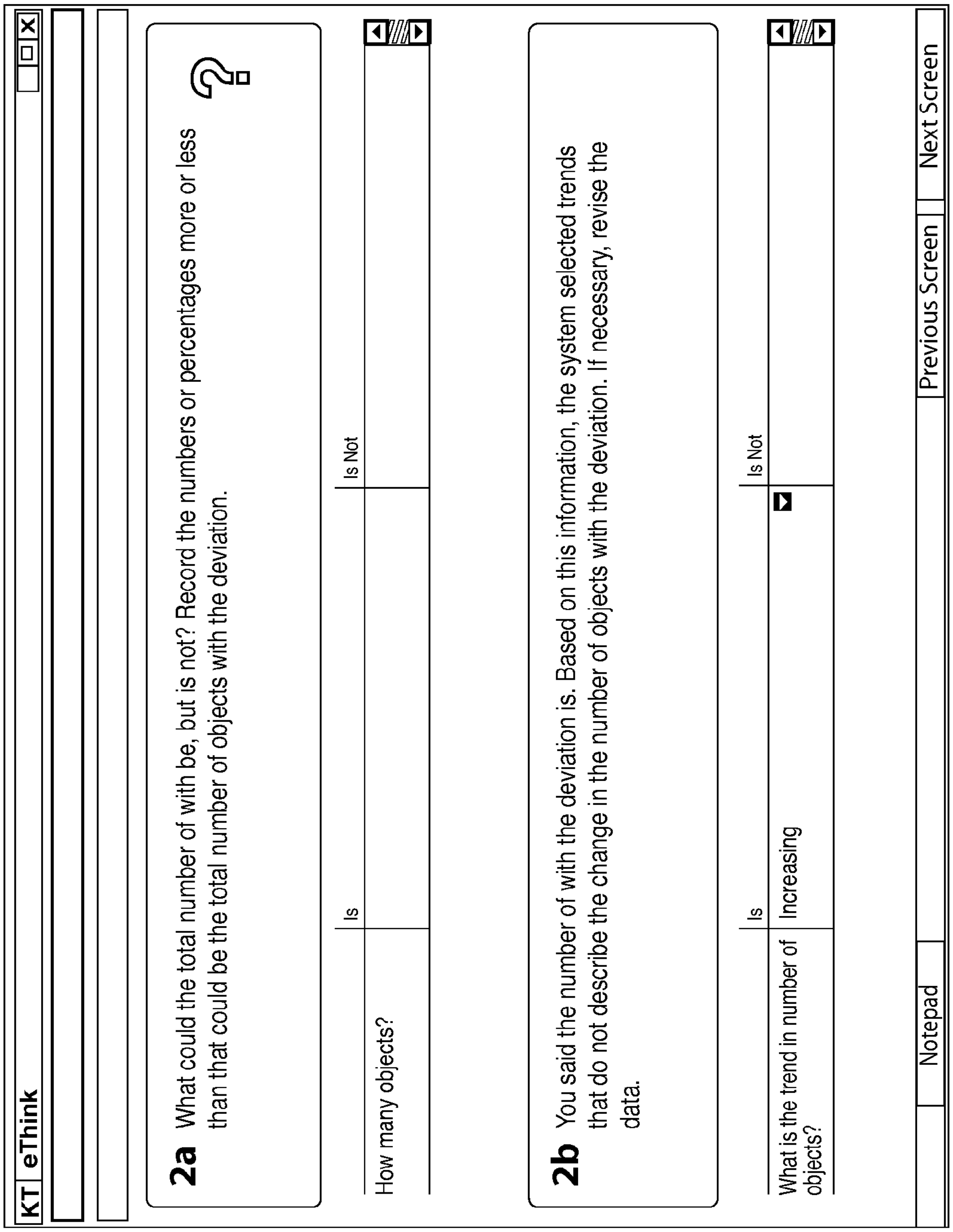
Figure 115:
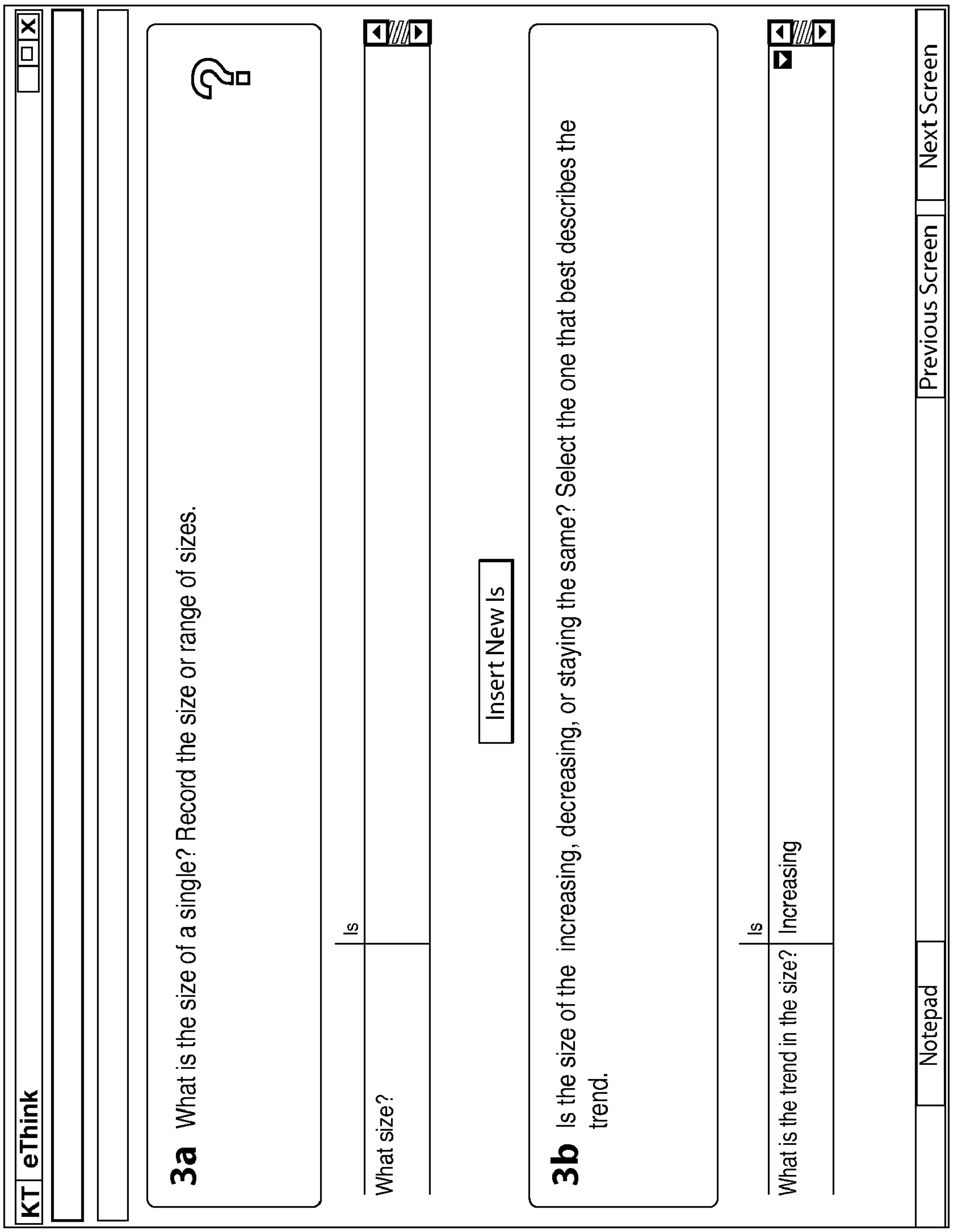
Figure 116:
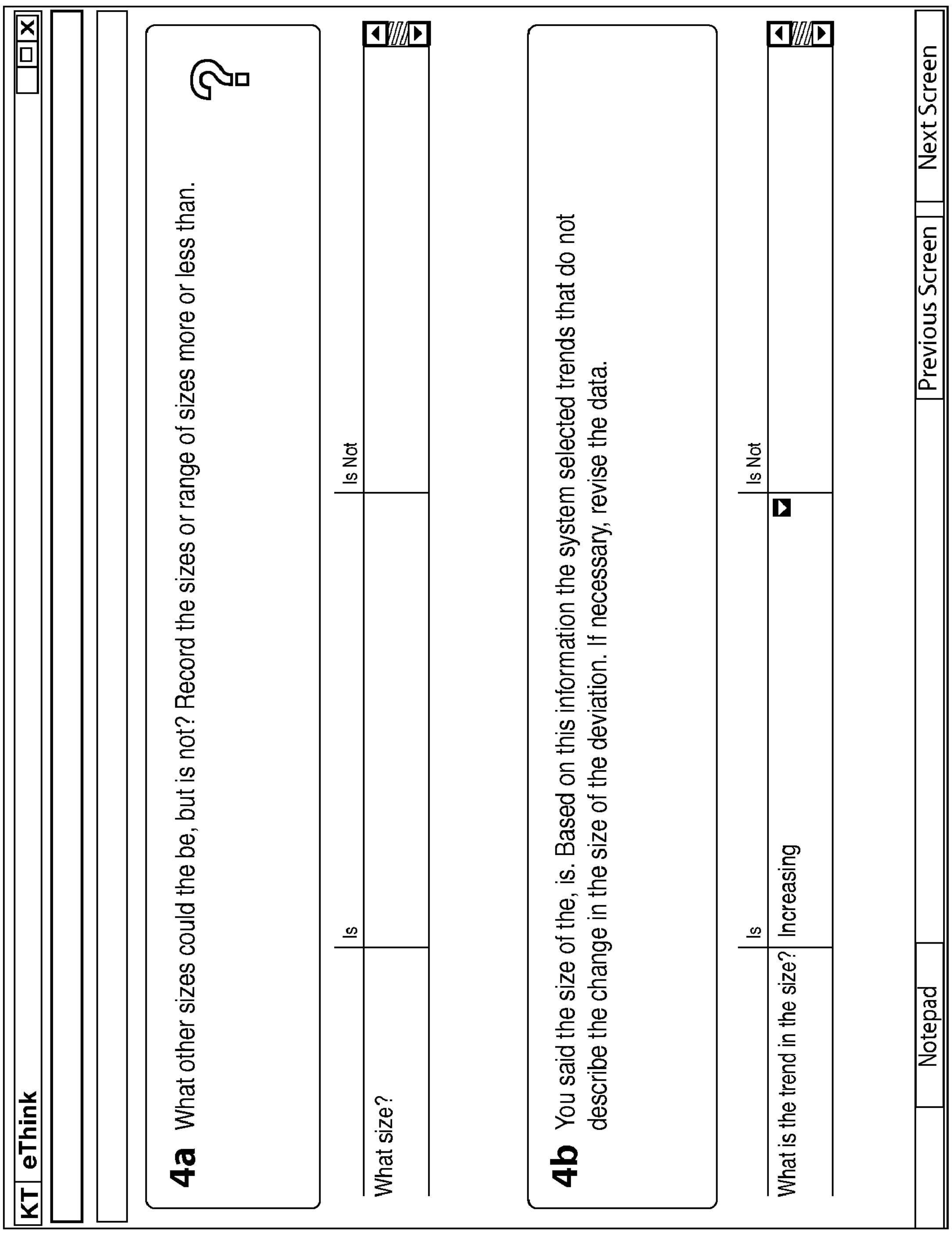
Figure 117:
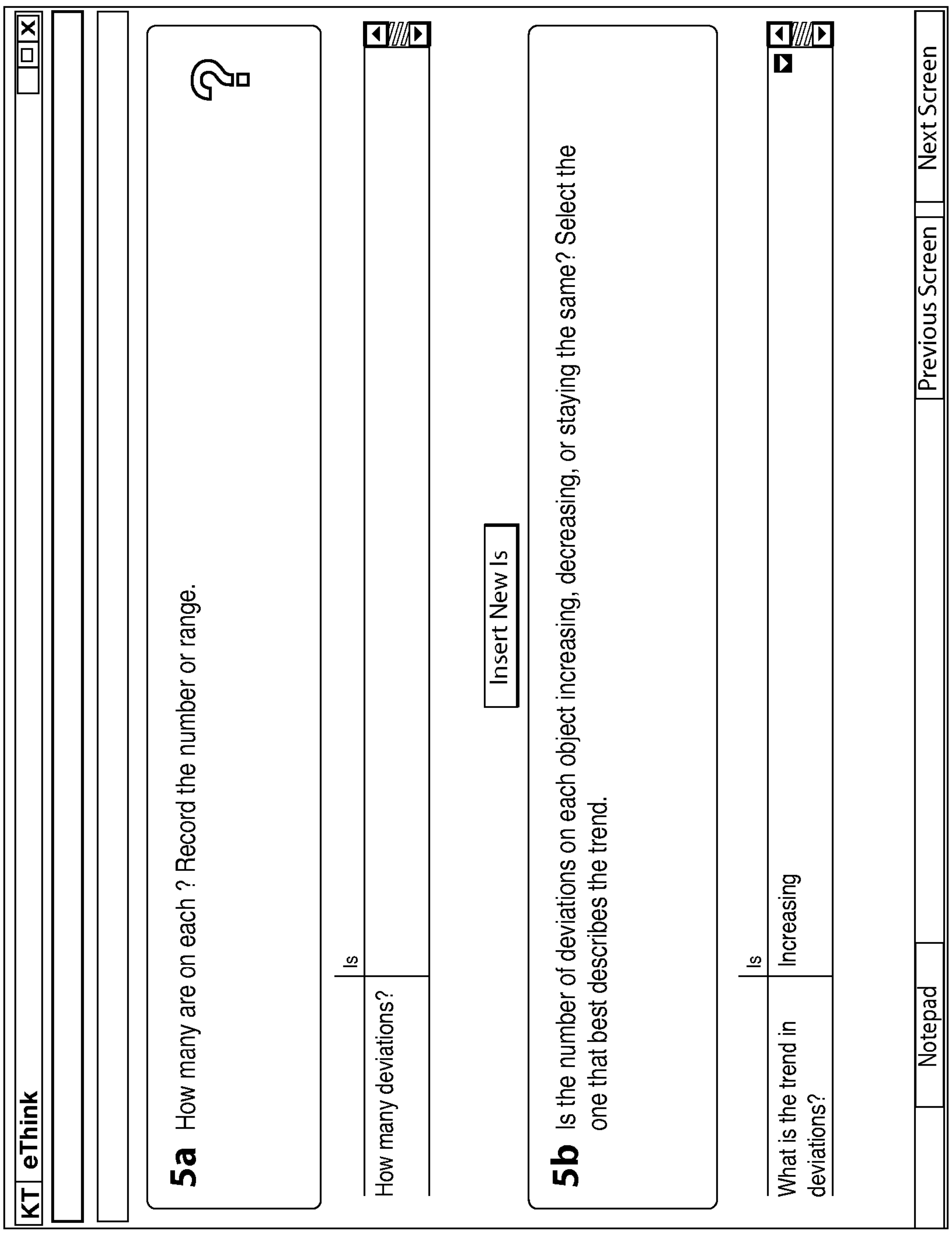
Figure 118:
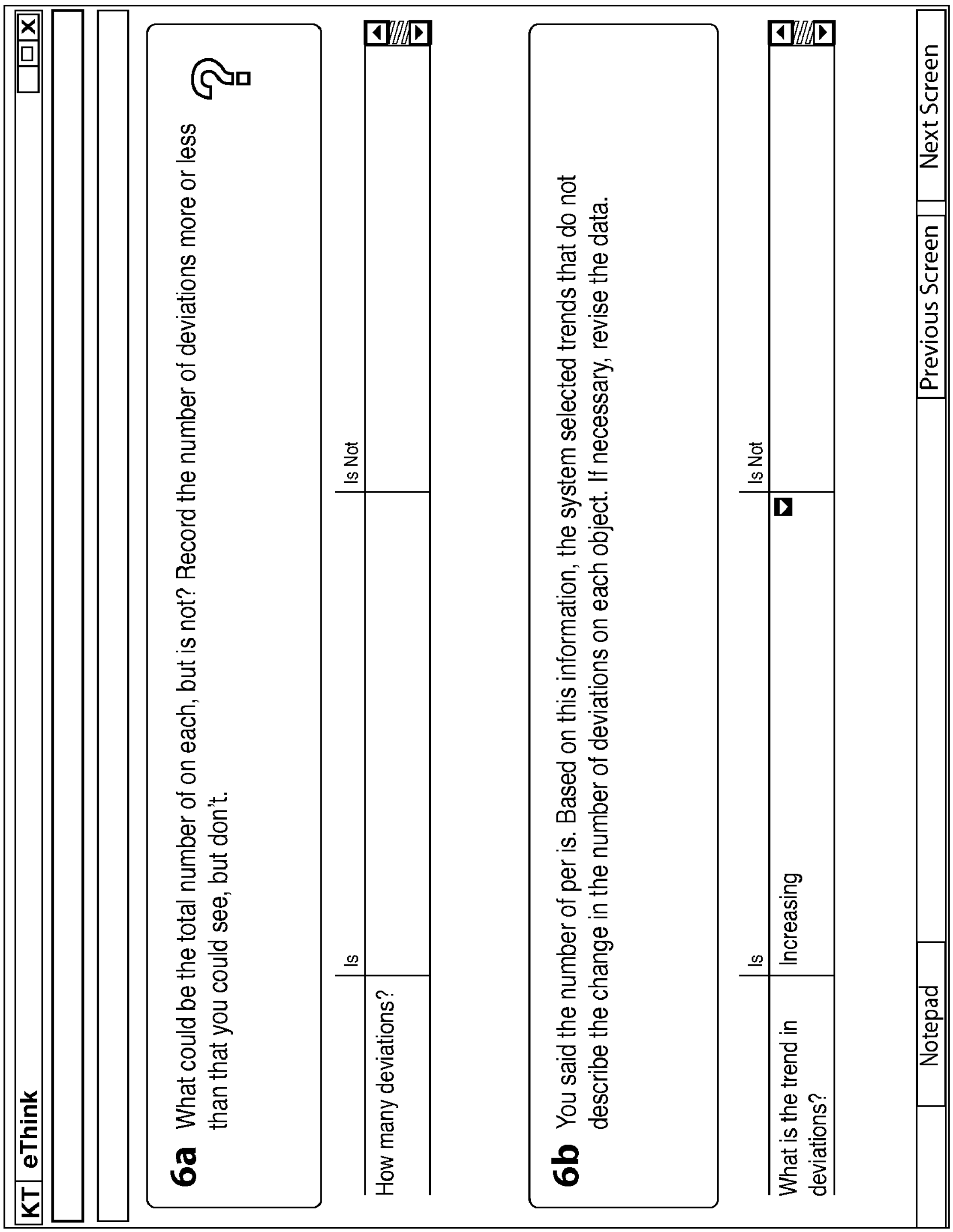
Figure 119:
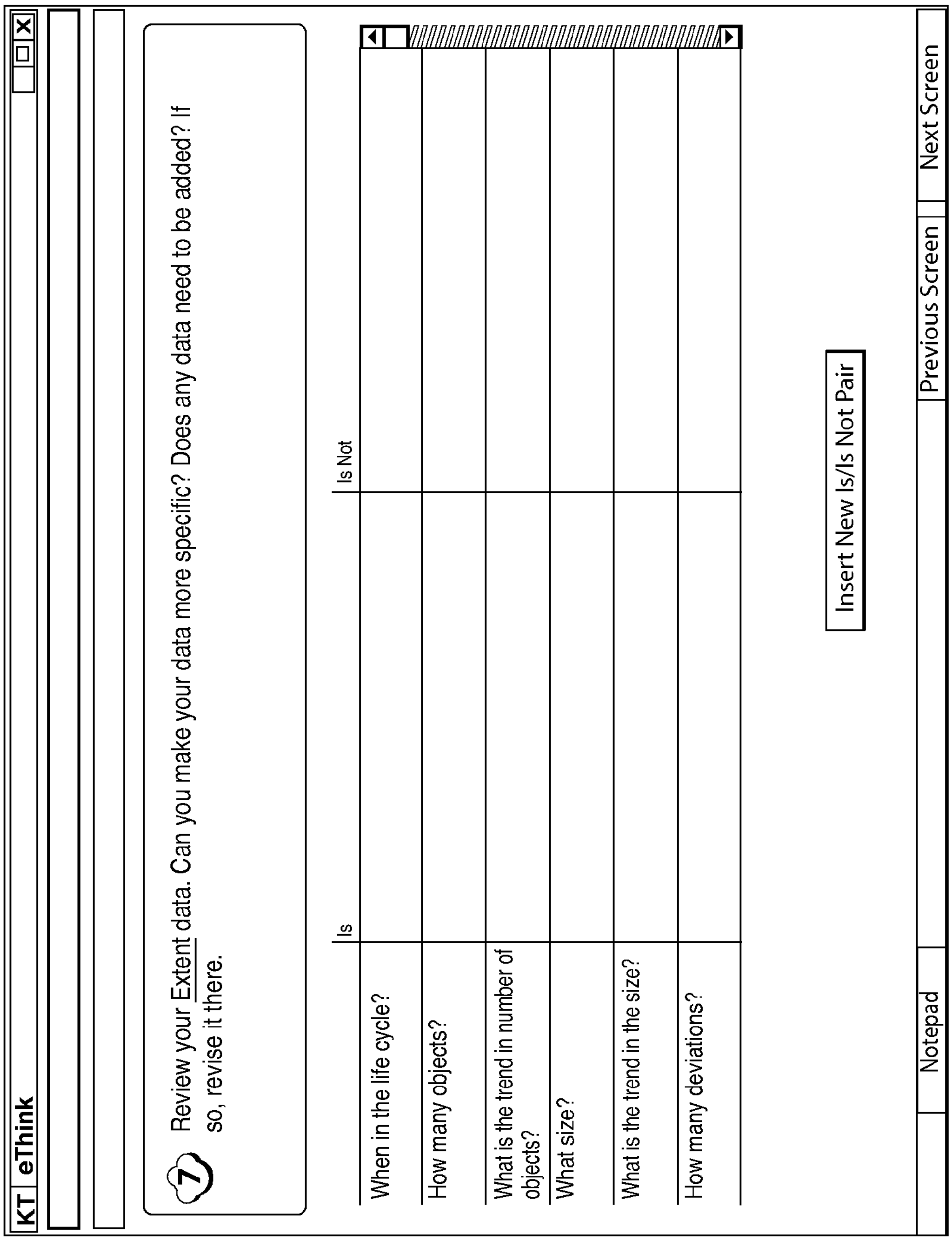
Figure 120:
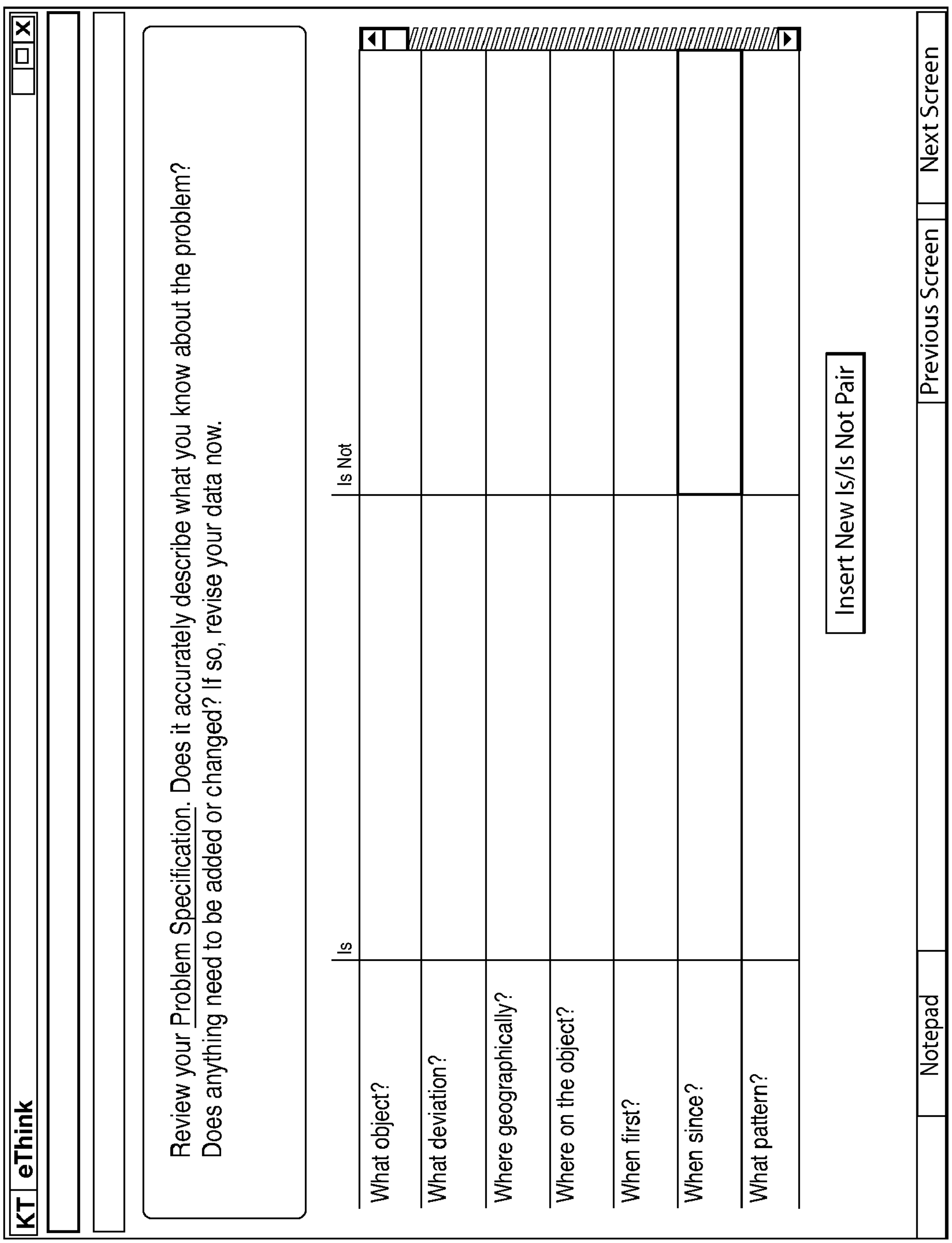
Figure 121:
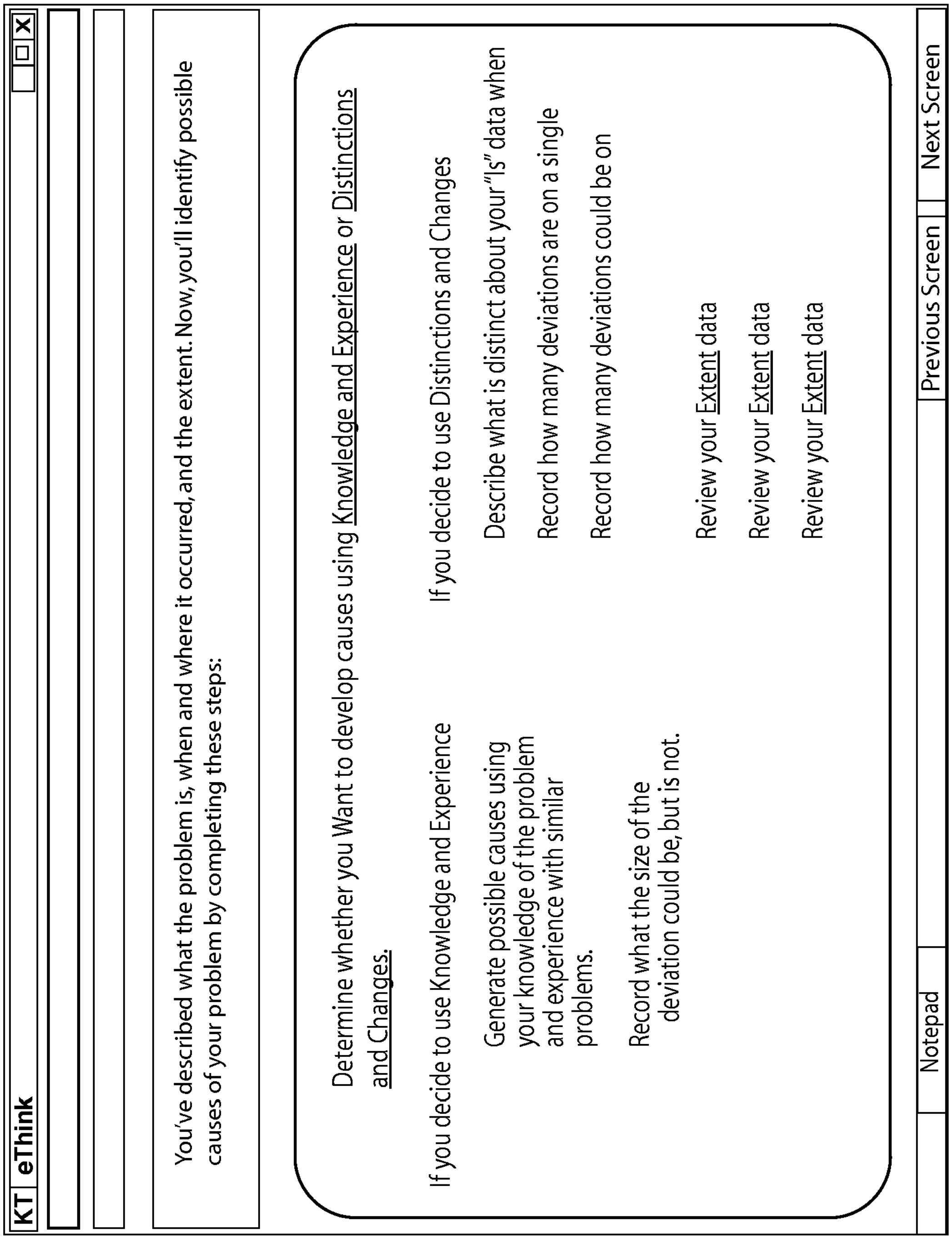
Figure 122:
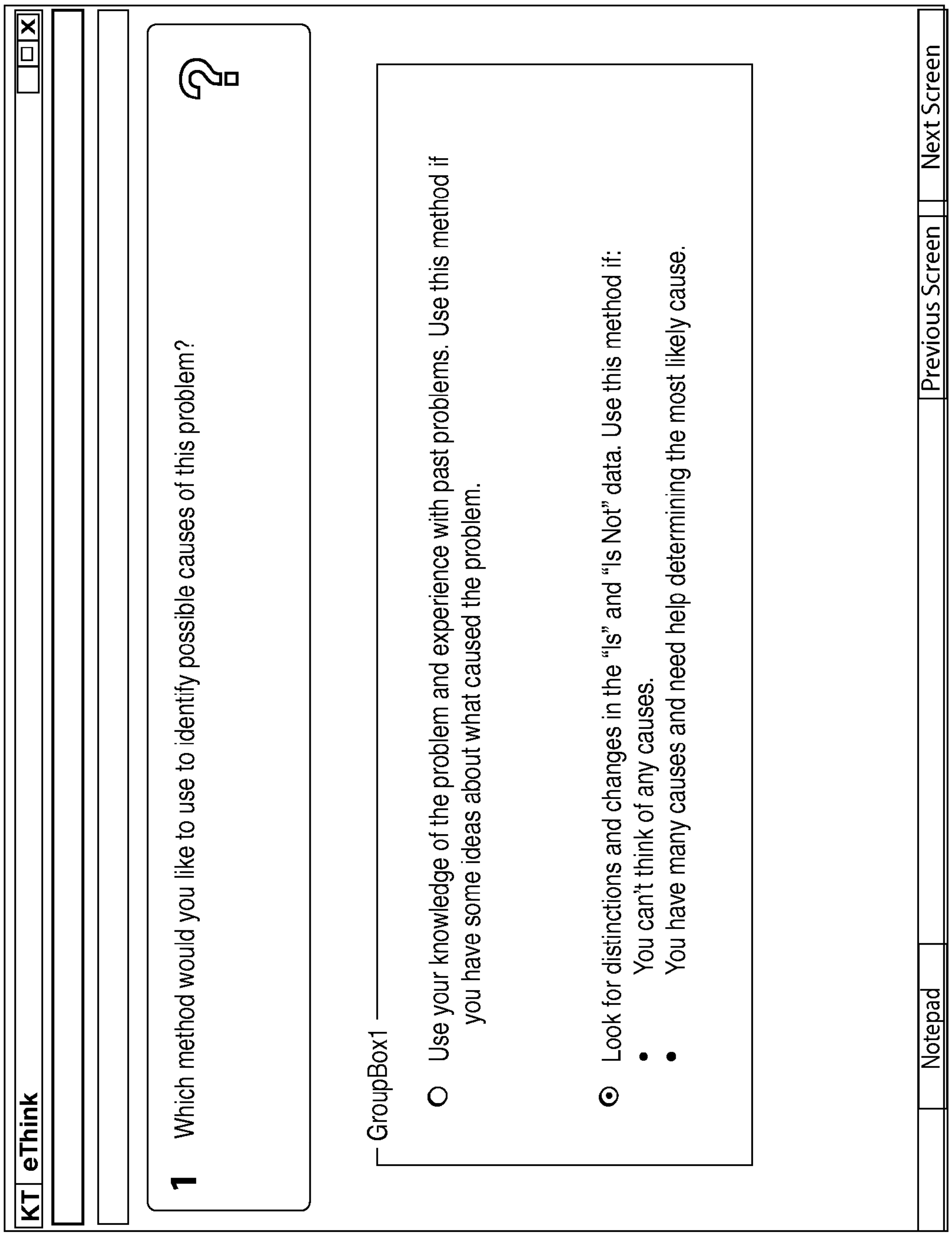
Figure 123:
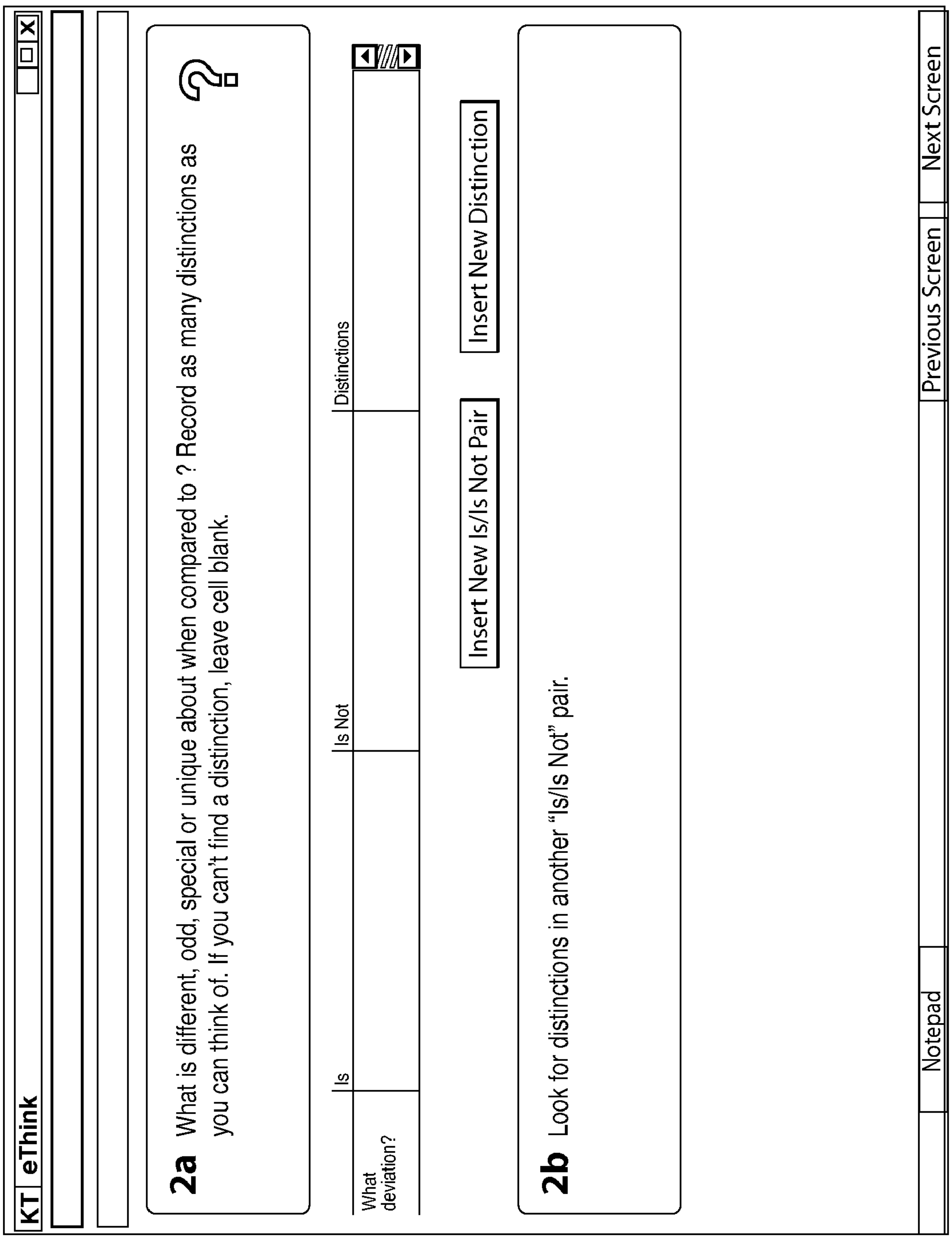
Figure 124:
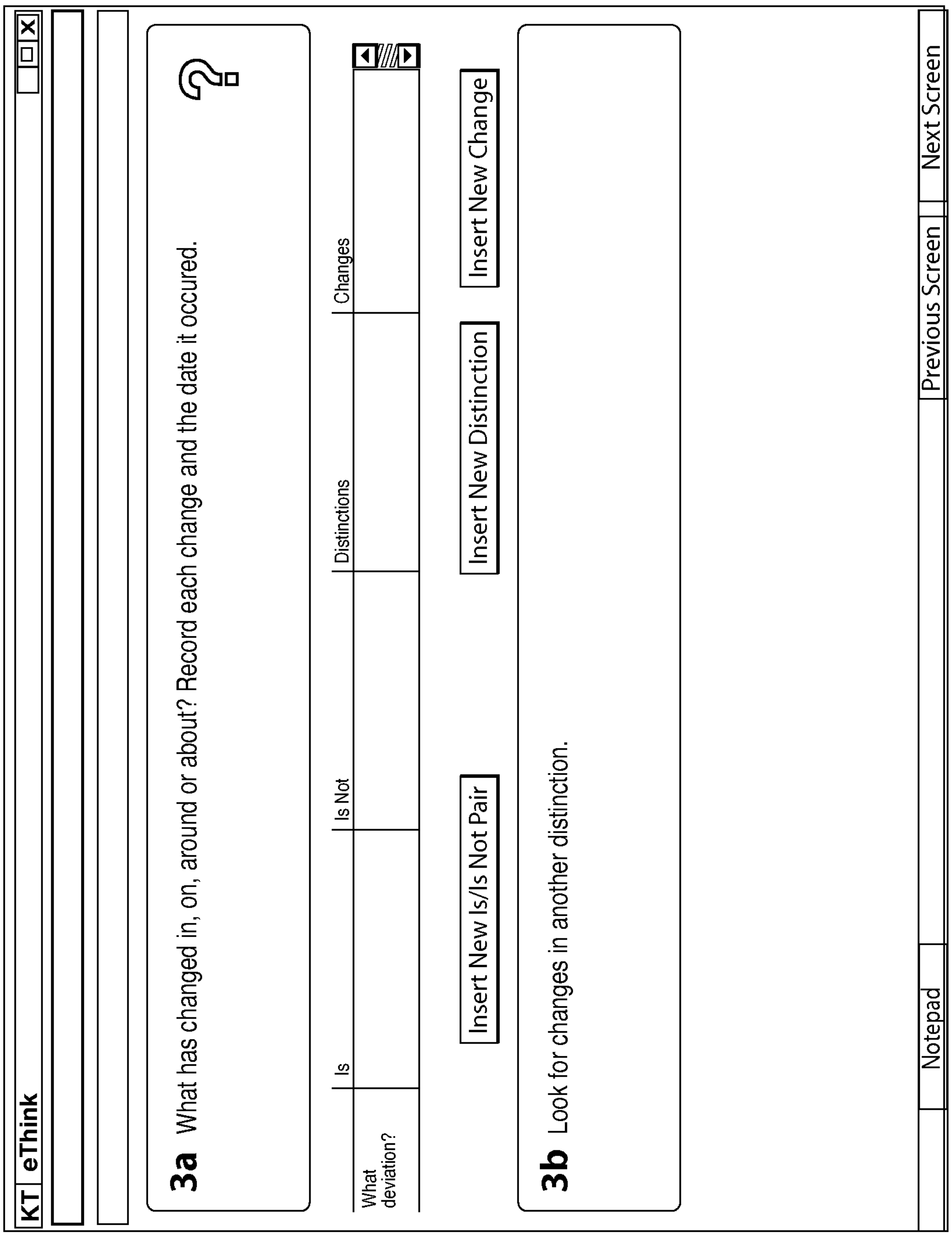
Figure 125:
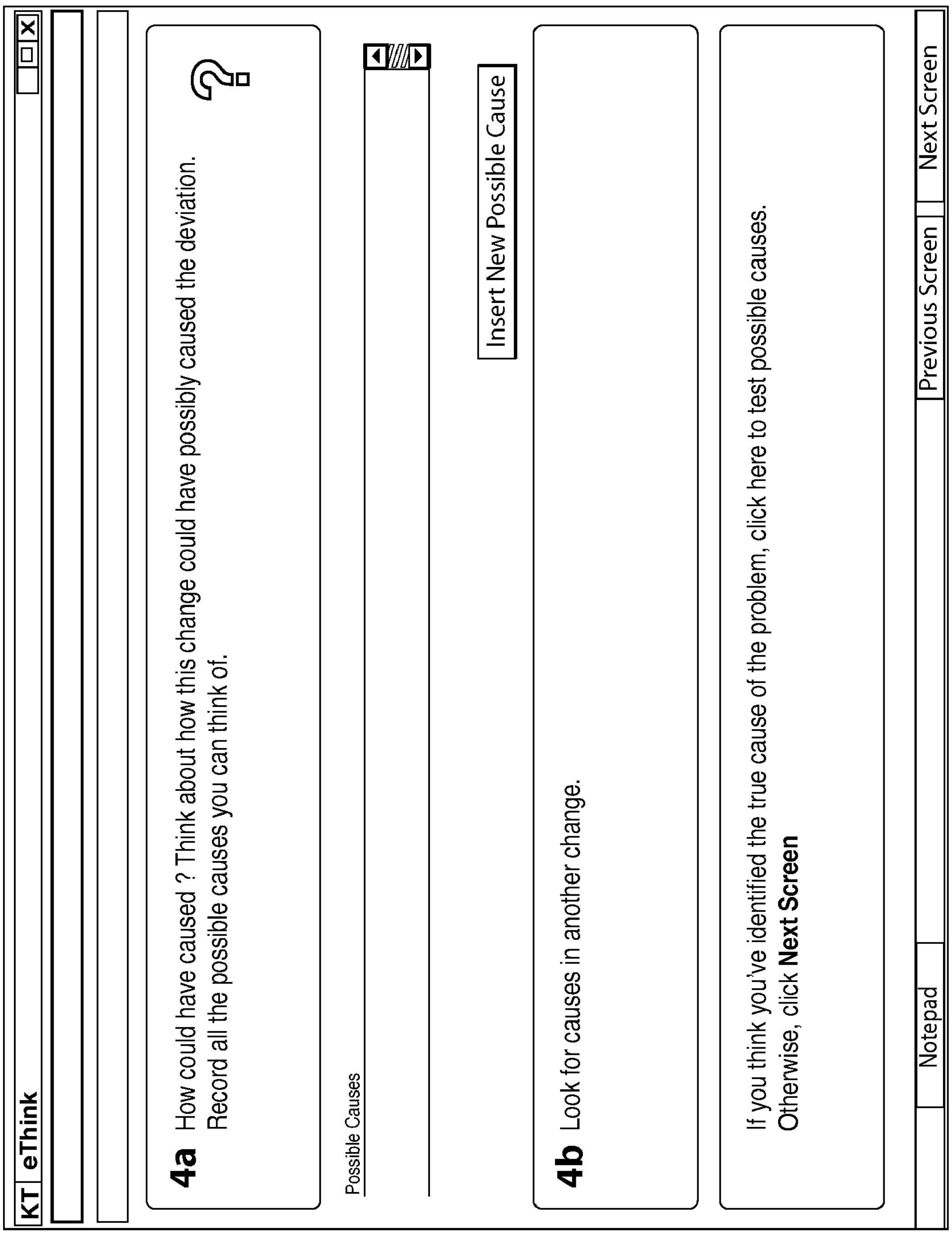
Figure 126:
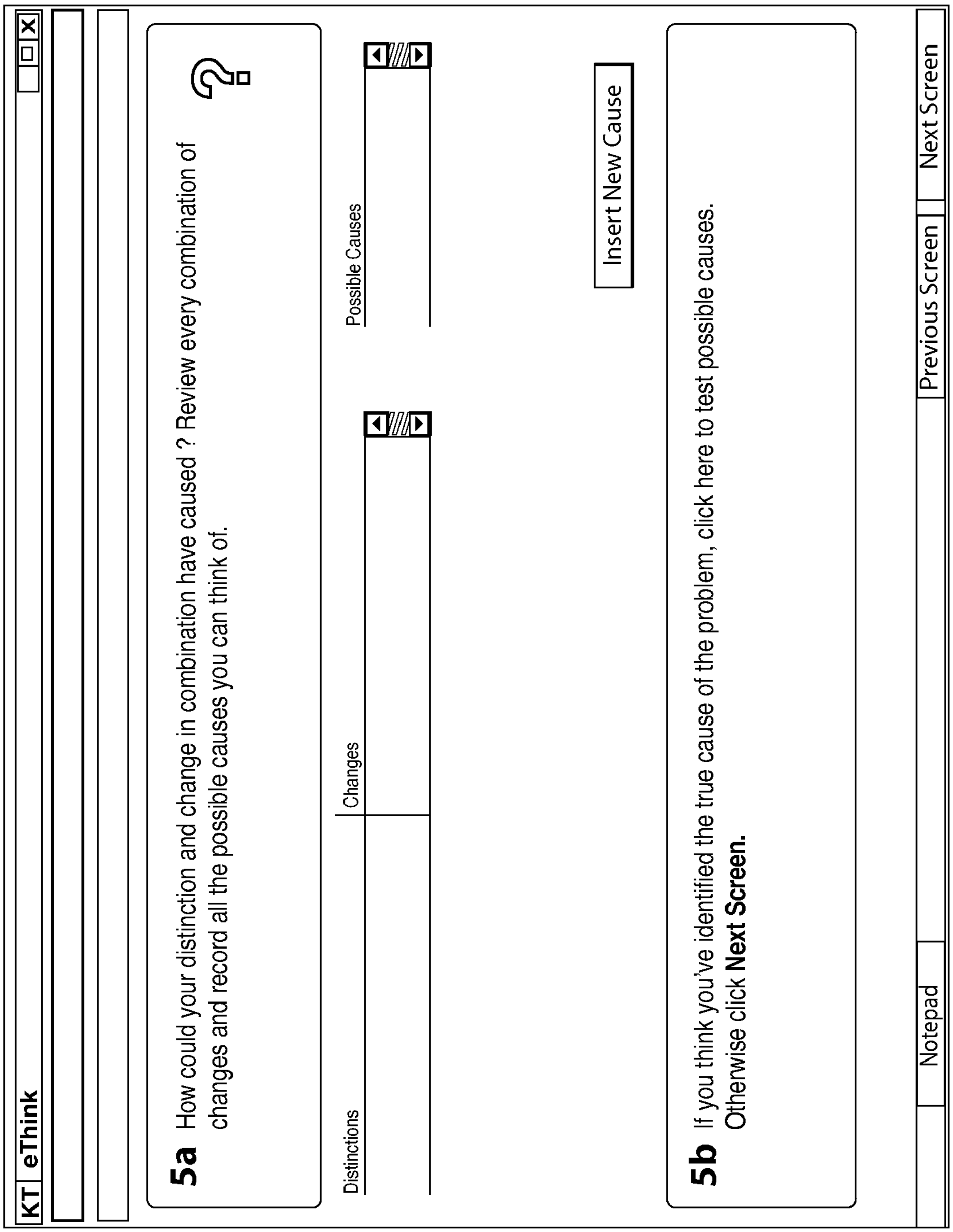
Figure 127:
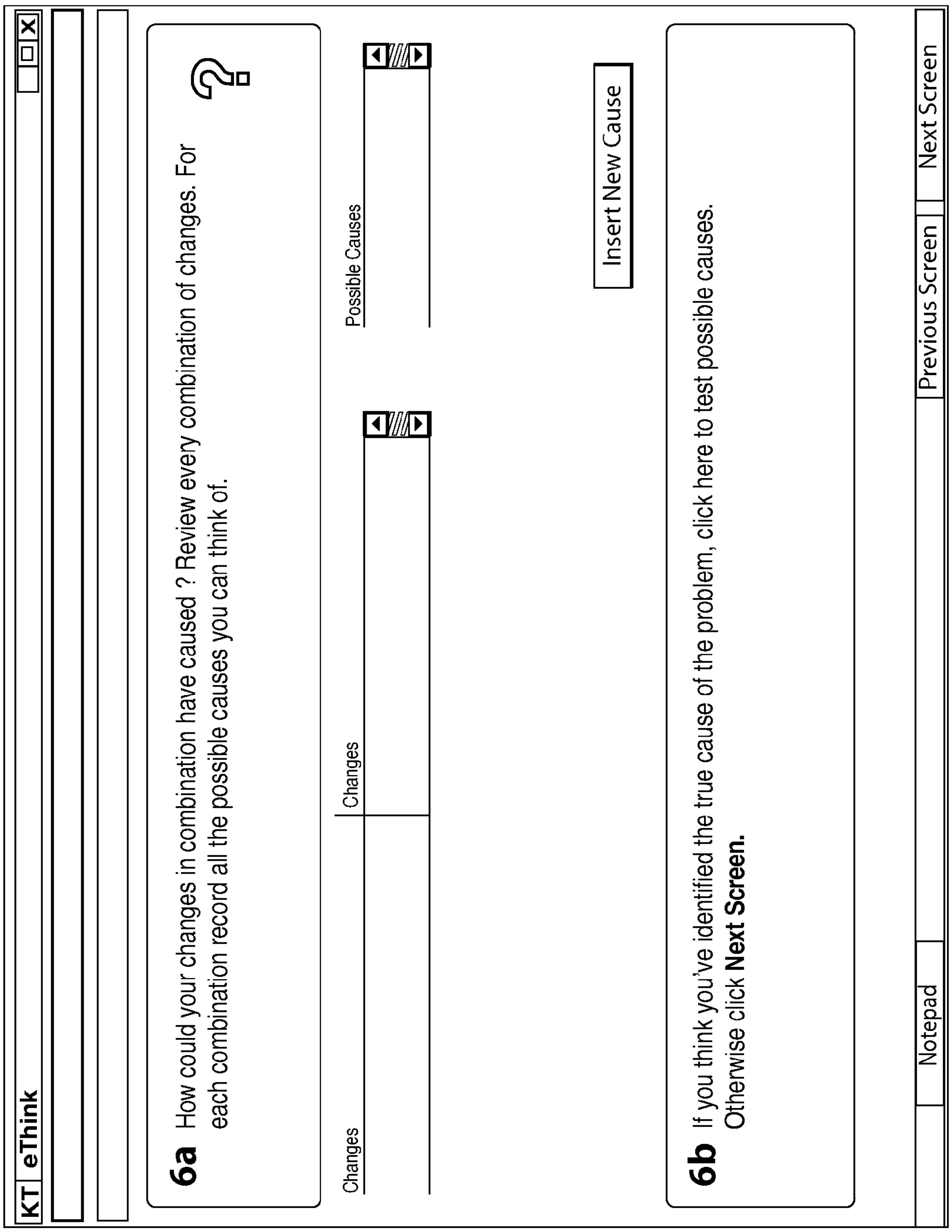
Figure 128:
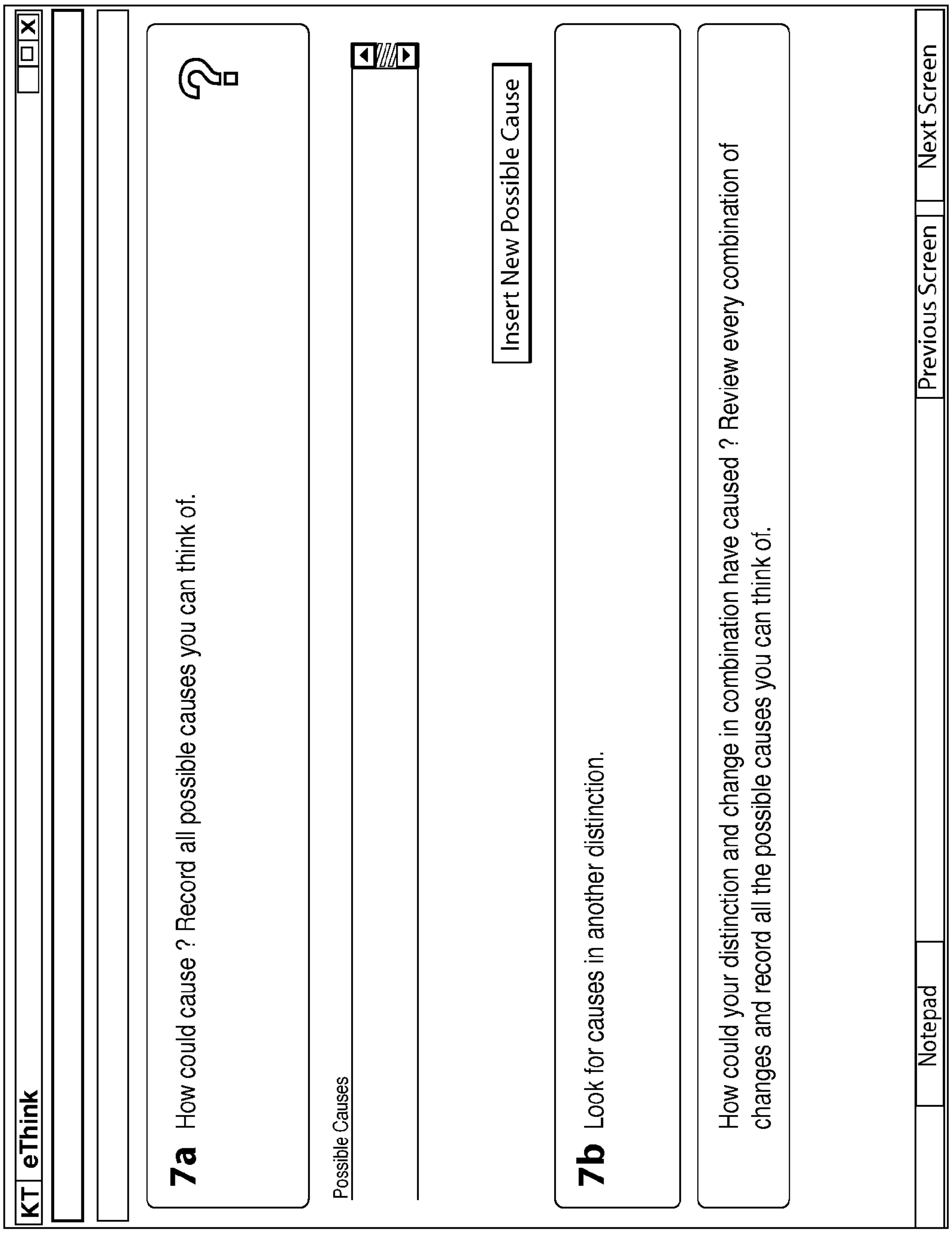
Figure 129:
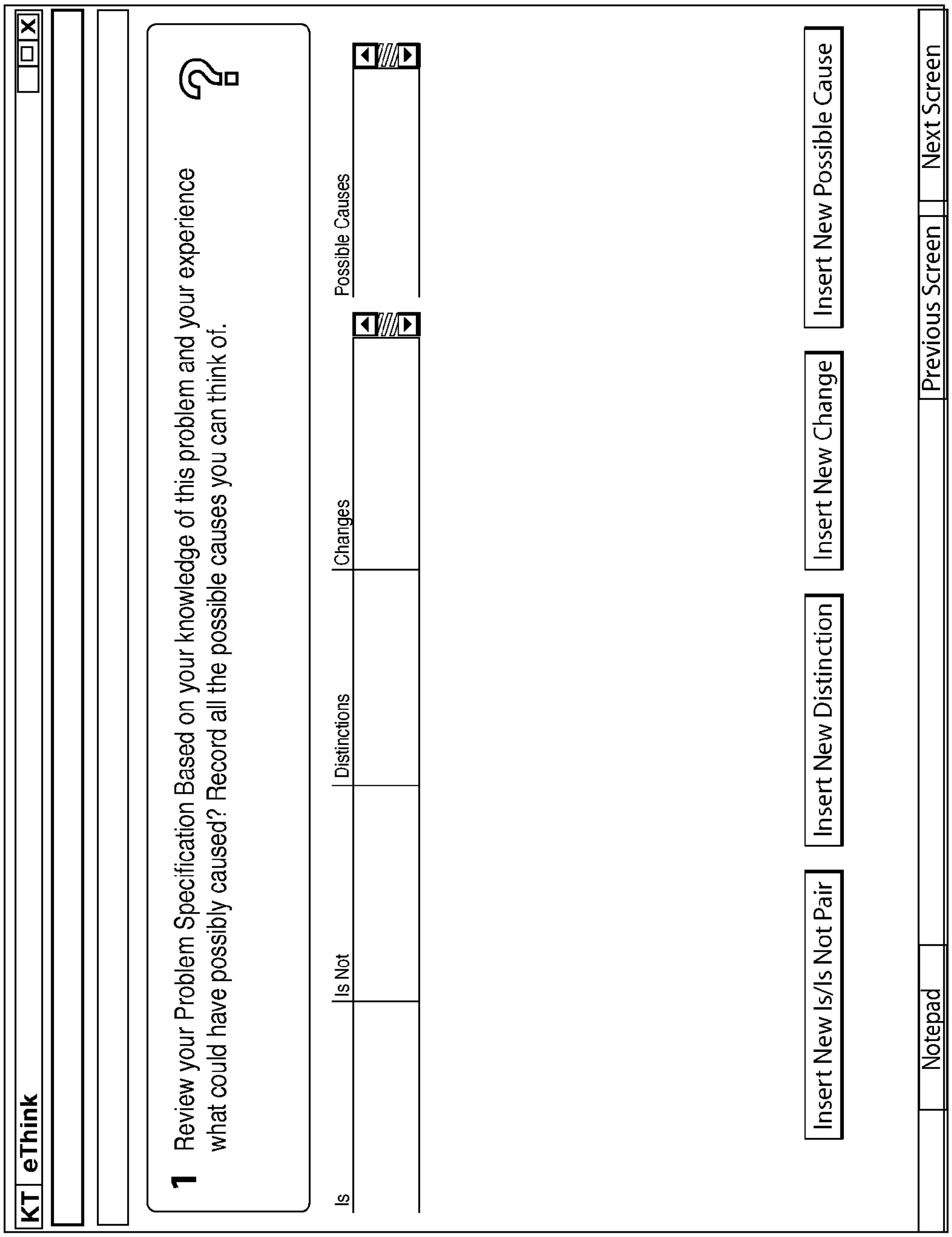
Figure 130:
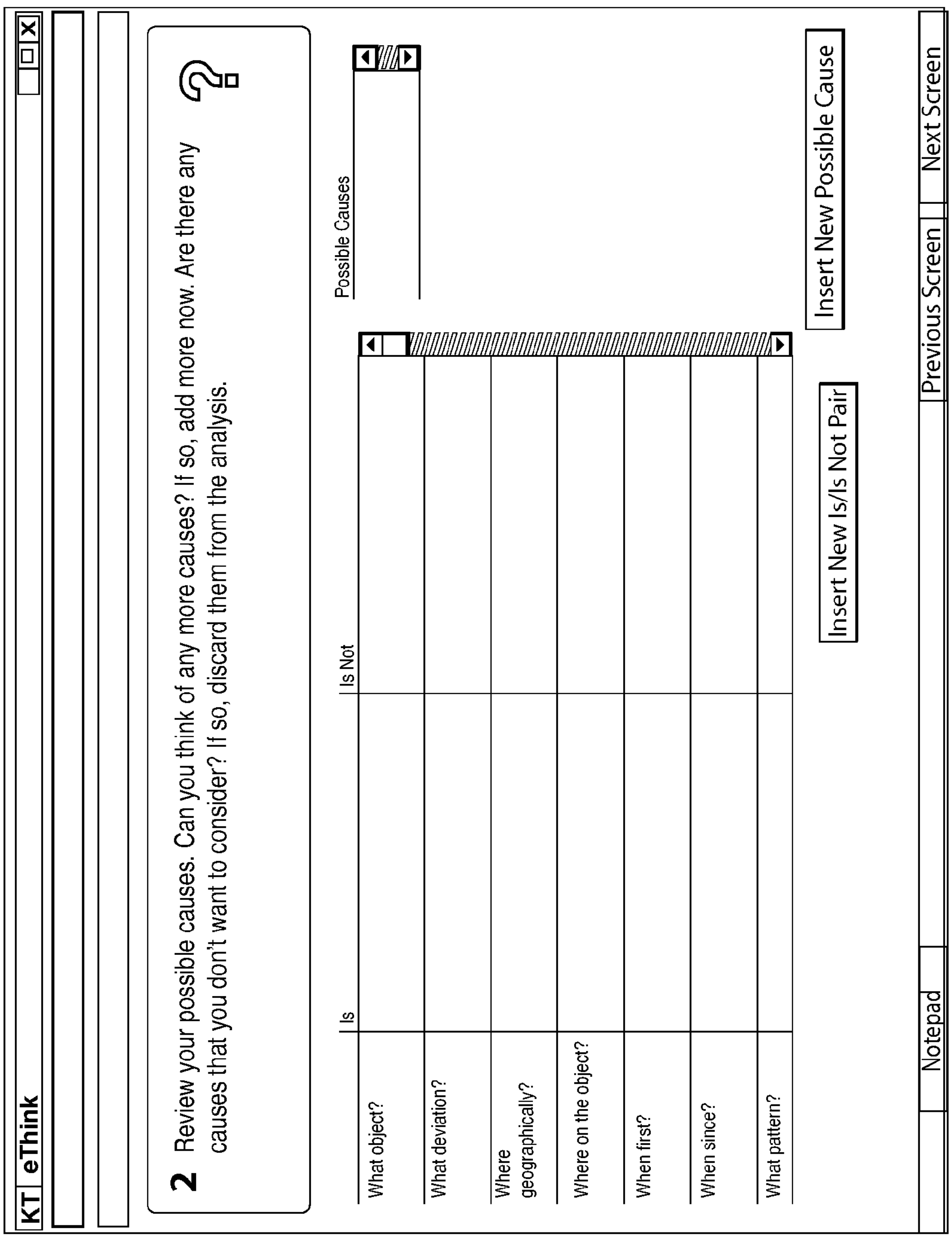
Figure 131:
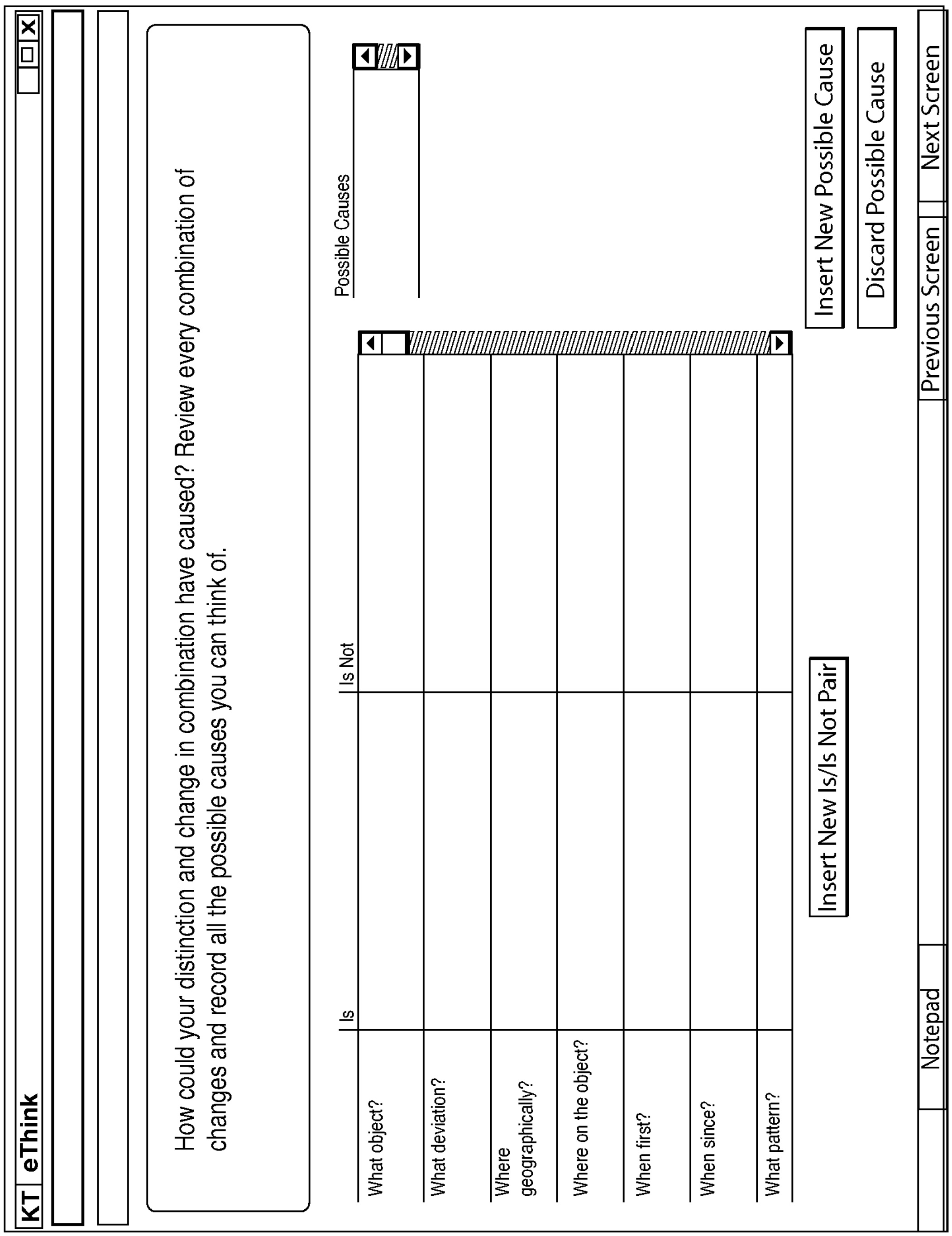
Figure 132:
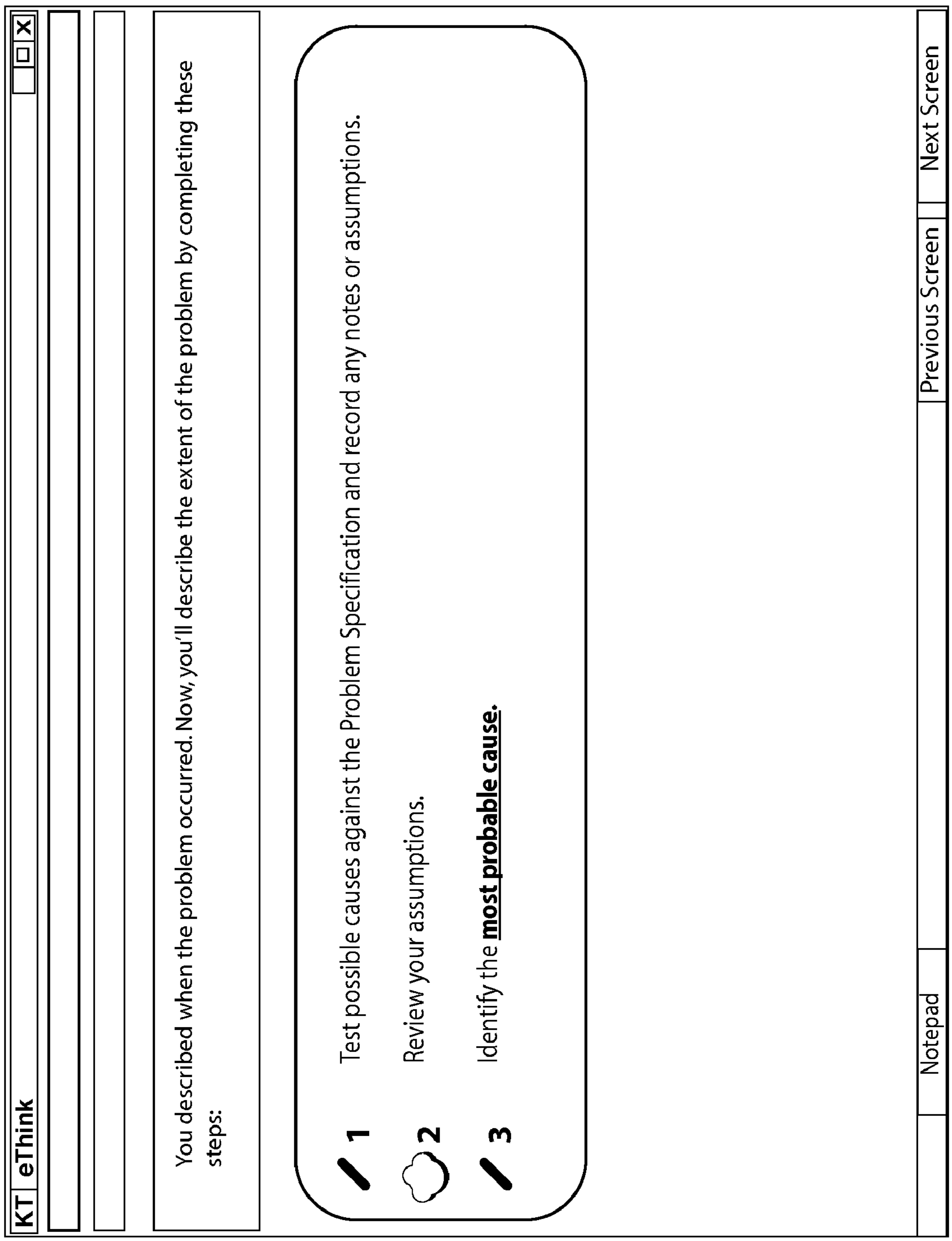
Figure 133:
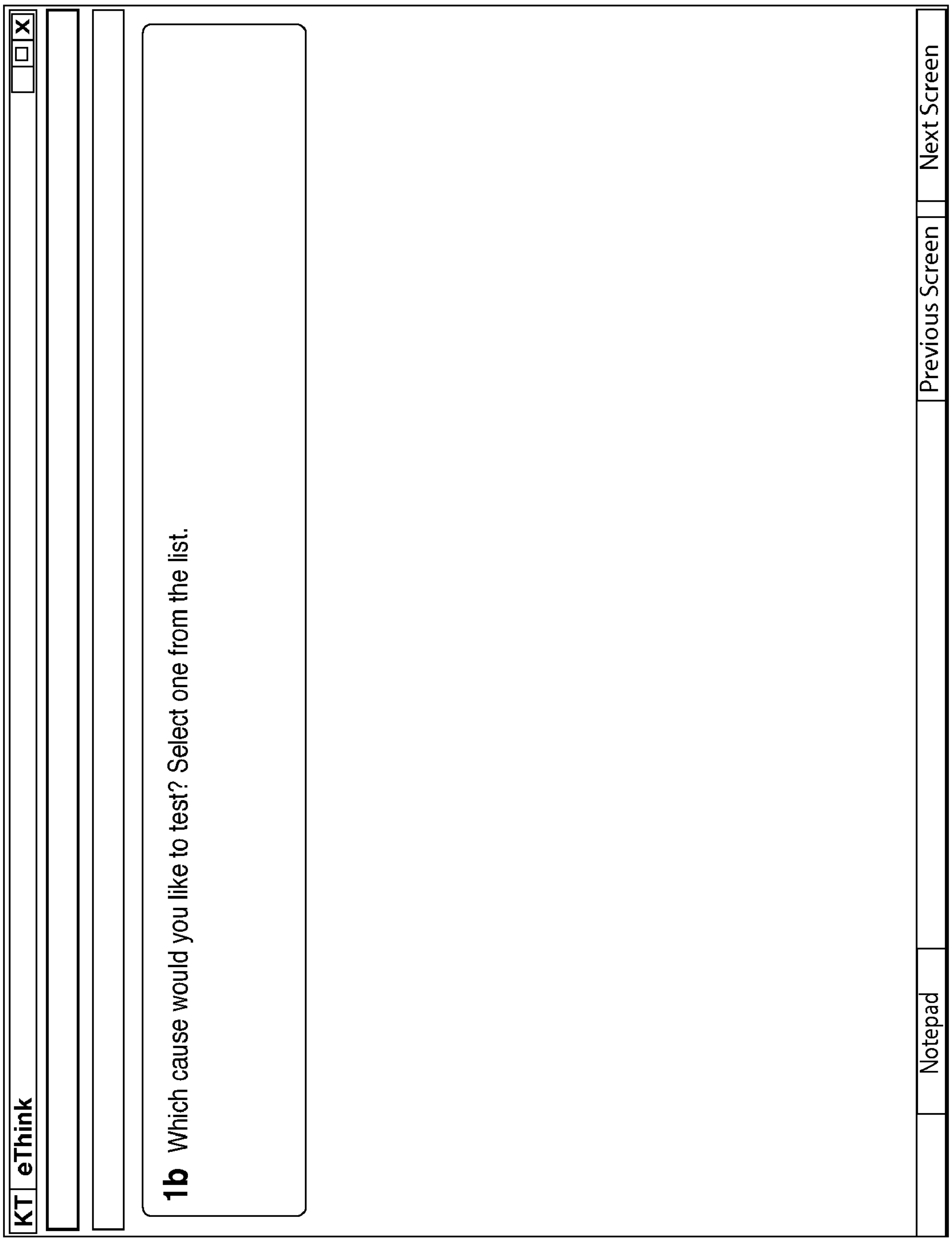
Figure 134:
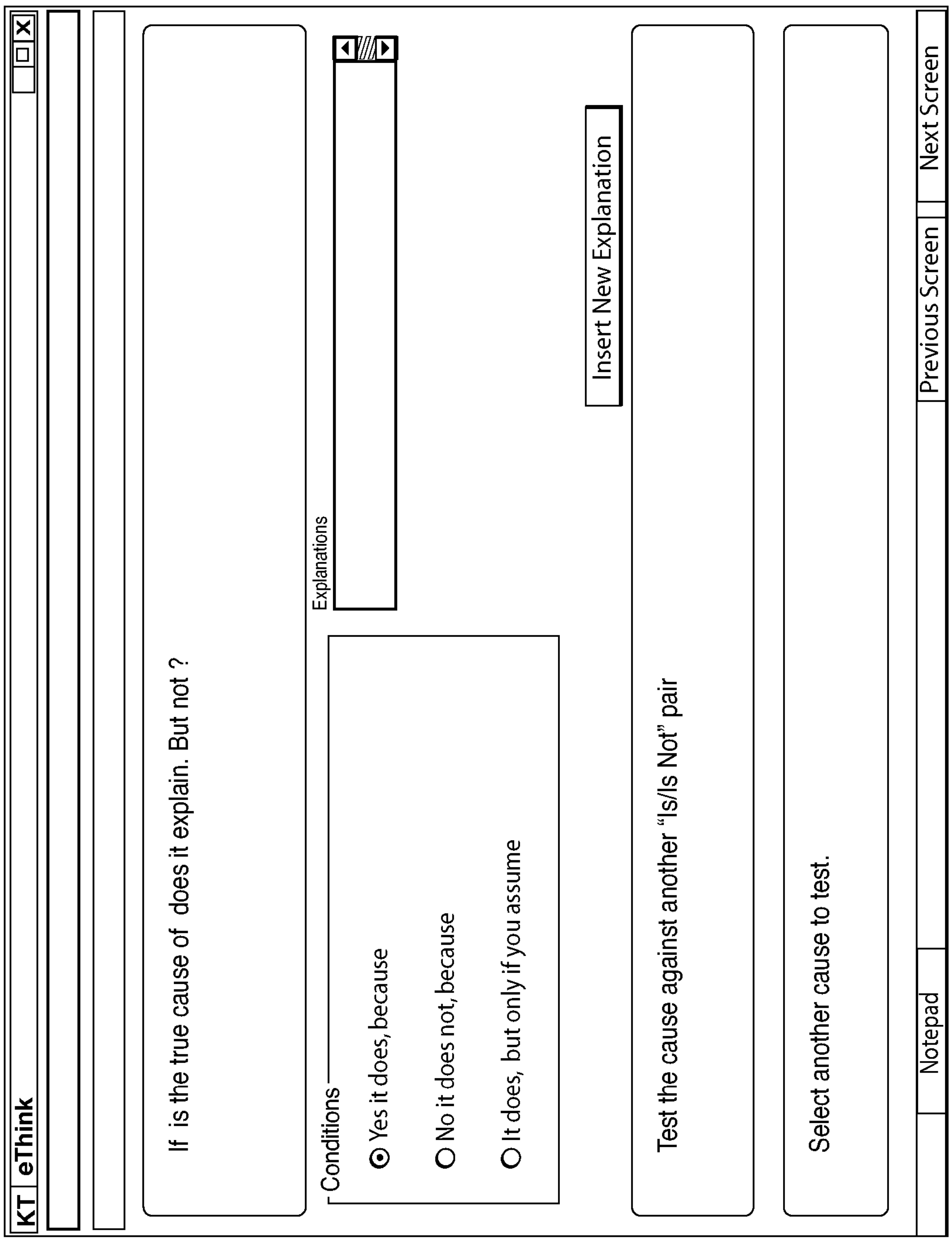
Figure 135:
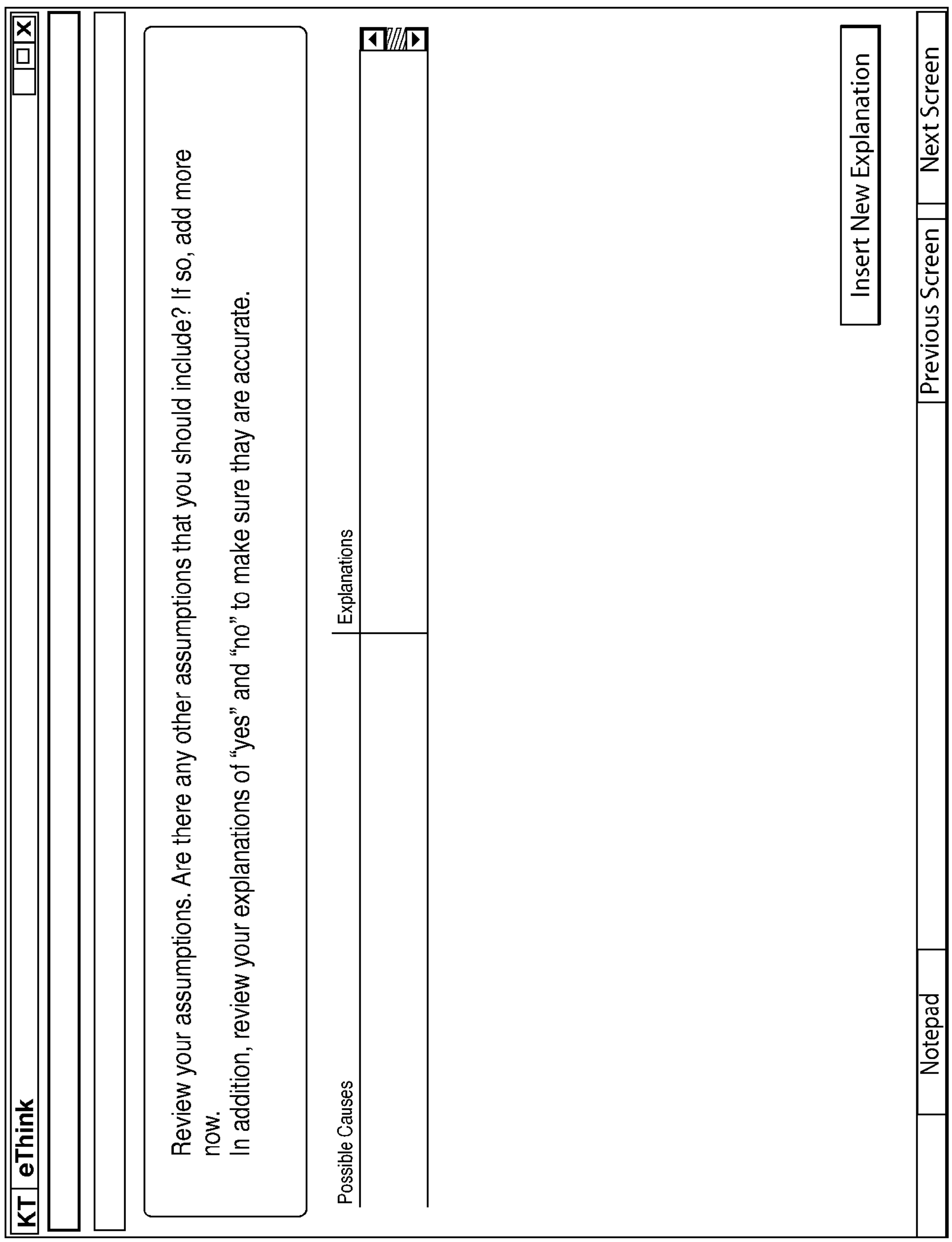
Figure 136:
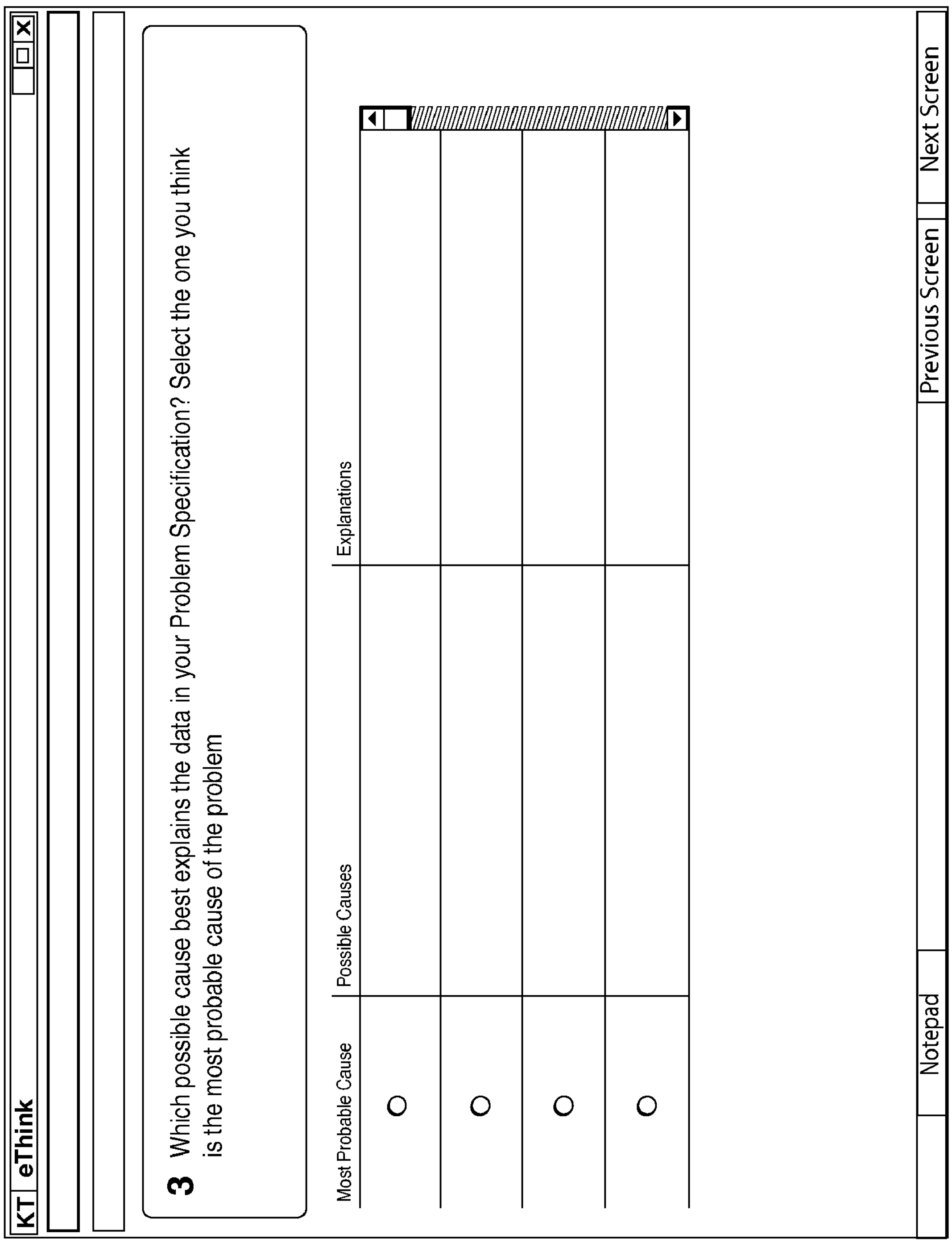
Figure 137:
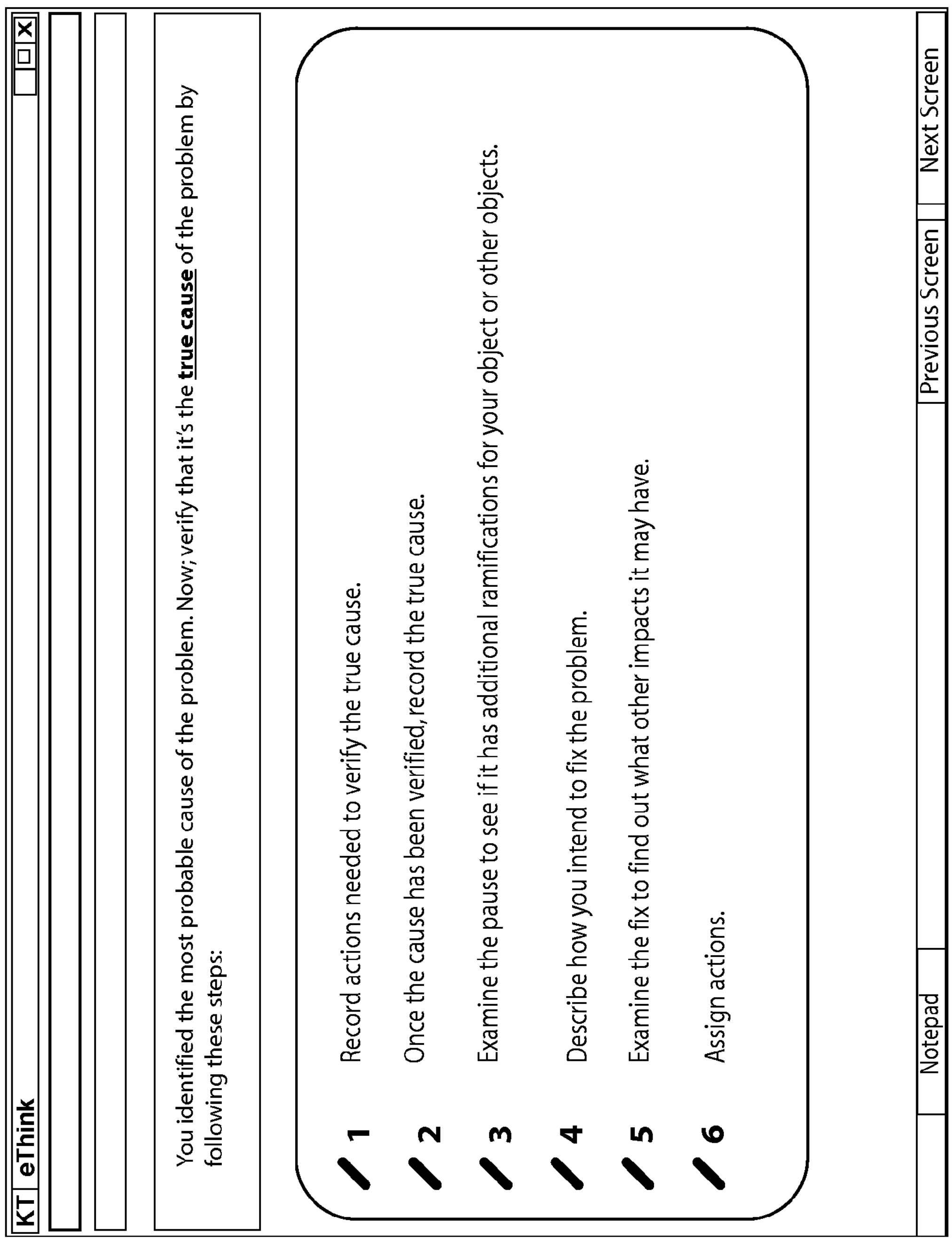

Clicking on a CONCERN cell 502 displays all actions currently entered for that concern in the ACTION cells 516, for review and/or modification. Additional actions may be added to those uploaded from the action file. WHO cell 518 specifies the group or individuals responsible for executing the task specified in the action cell, and may be modified through a pull-down list of names and groups. Multiple names may be entered, and new names not in the pull-down may be added. WHEN cell 520 indicates the expected completion date of the action. STATUS cell 524 provides a discrete indication of milestones reached concerning the action, such as not started, in progress, late, action assigned, cancelled, on hold, cause confirmed. Additional status milestones may be added. NOTES cell 522 contains descriptive text concerning other information. ACTION SORT pull-down 526 allows the listed actions to be sorted by various fields such as ACTION, WHO, WHEN, NOTES, or STATUS. Actions may automatically be mailed electronically to others, including to recipients who are not users of the system. Alternative screen formats for the various GUI screens disclosed herein are listed in FIGS. 56–137.

Knowledge Base Structure

An entity-relationship (ER) diagram of the knowledge base accumulated through the various process screen sequences as defined herein is shown in FIGS. 38–42. In addition, the knowledge base links process applications and tracks changes made on a user-by-user basis.

Figure 38:
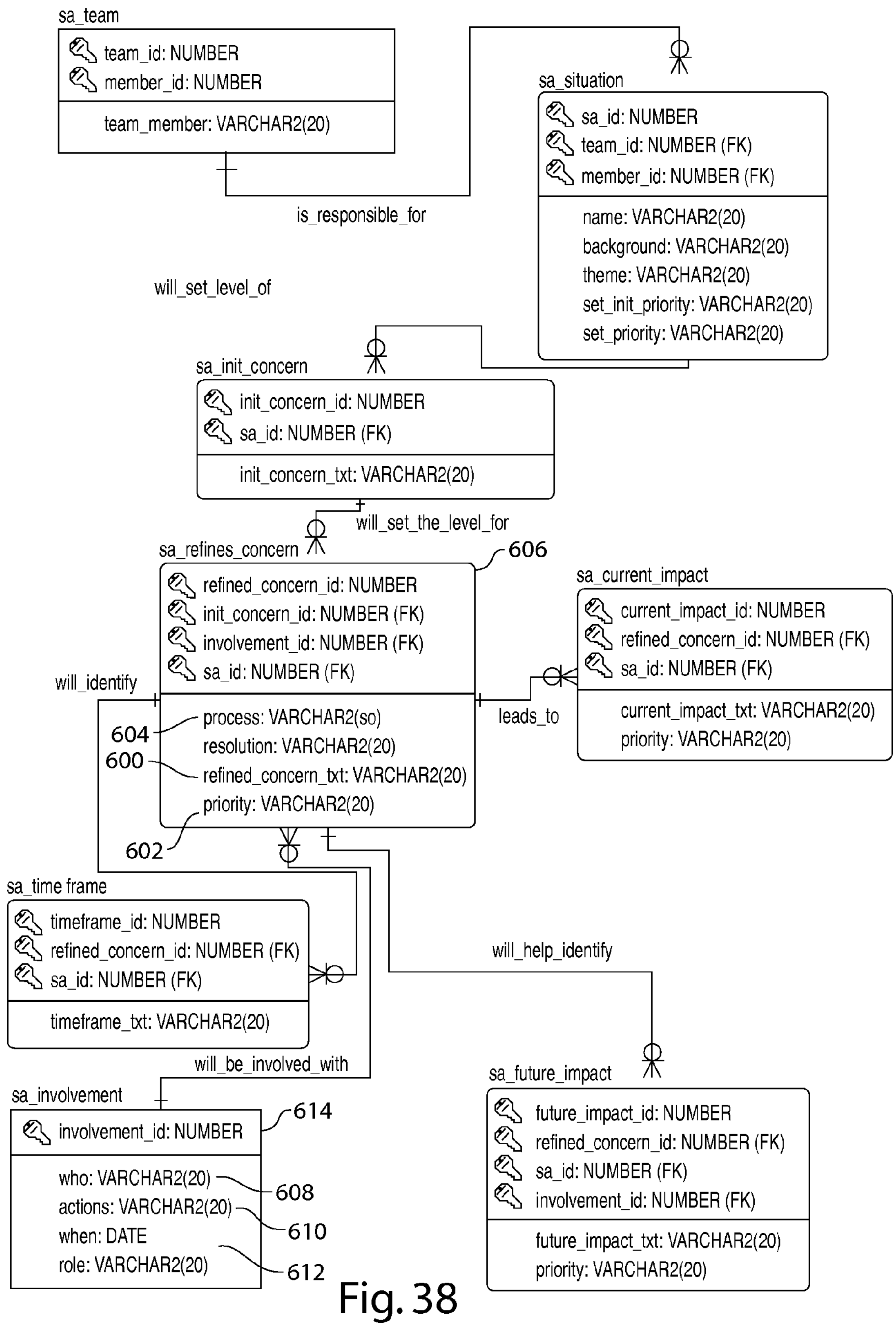
FIG. 38 shows the situation appraisal knowledge base ER diagram.

Situation appraisal ER diagram is shown in FIG. 38, and contains cells for storing the information entered in the cells during the situation appraisal process screen sequence. CONCERN 600, PRIORITY 602, and the PROCESS 604 to be used for further analysis are stored in refined CONCERN entity 606. ACTION TRACKER cells WHO 608, ACTION 610, and WHEN 612 are stored in INVOLVEMENT entity 614.

Figures 1, 39:
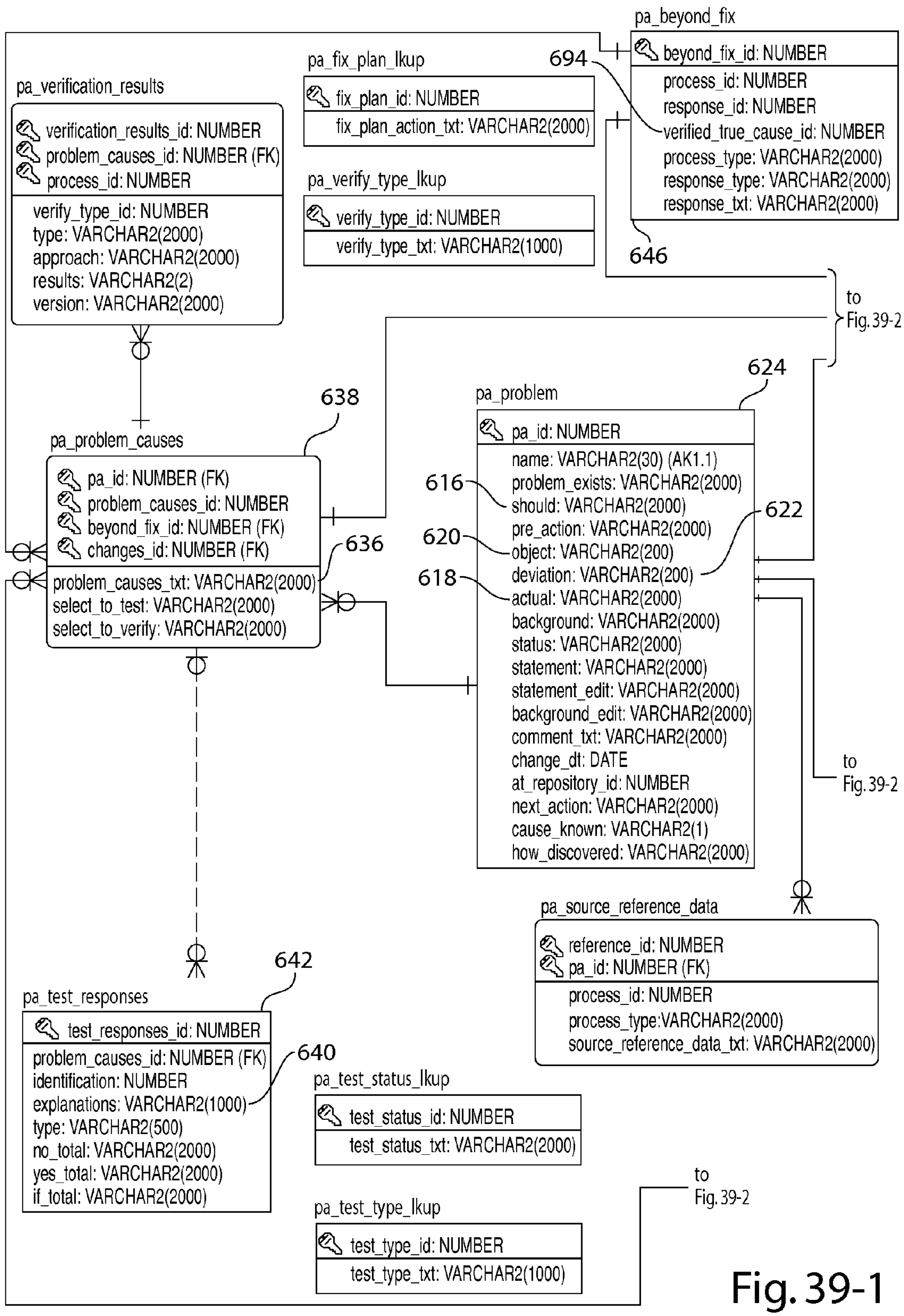
FIG. 39 shows the problem analysis knowledge base ER diagram.
Figures 2, 39:
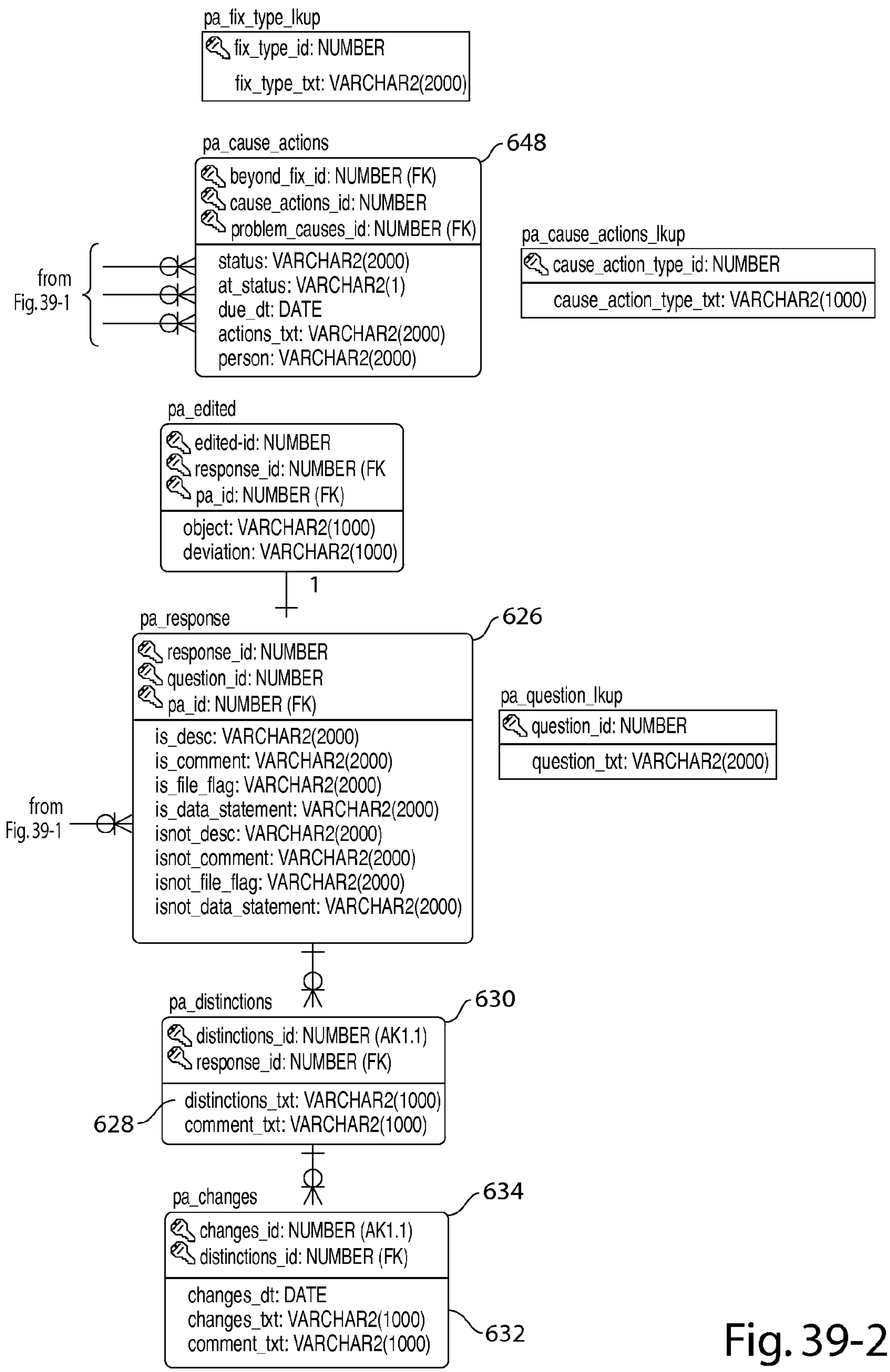

FIG. 39 shows the problem analysis ER diagram, and contains cells pertinent to the problem analysis process screen sequence. SHOULD BE HAPPENING 616, ACTUALLY HAPPENING 618, OBJECT 620, and DEVIATION 622 are stored in PROBLEM entity 624. IS/IS not cells are stored in RESPONSE entity 626. DISTINCTIONS 628 are stored in DISTINCTIONS entity 630. CHANGES 632 are stored in CHANGES entity 634. POSSIBLE CAUSES 636 are stored in PROBABLE CAUSES entity 638. CONDITIONS AND ASSUMPTIONS 640 are stored in TEST RESPONSES entity 642. CONFIRMED TRUE CAUSE 644 is stored in BEYOND FIX 646. ACTION TRACKER cells are stored in CAUSE ACTIONS entity 648.

Figure 40:
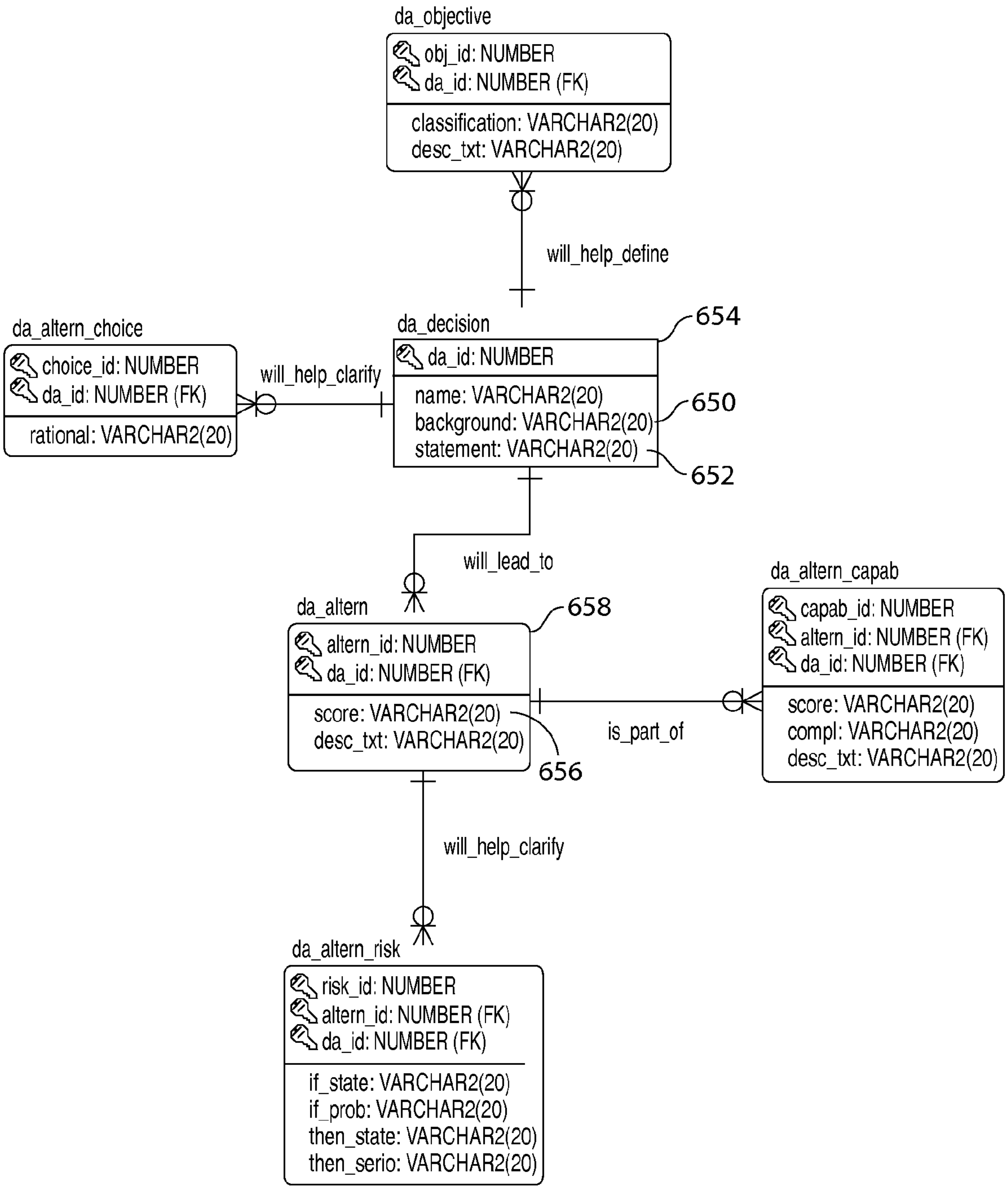
FIG. 40 shows the decision analysis knowledge base ER diagram.

FIG. 40 shows the decision analysis ER diagram. BACKGROUND 650 and STATEMENT 652 are stored in DECISION ENTITY 654. SCORES 656 for the various alternatives are stored in ALTERN 658.

Figure 41:
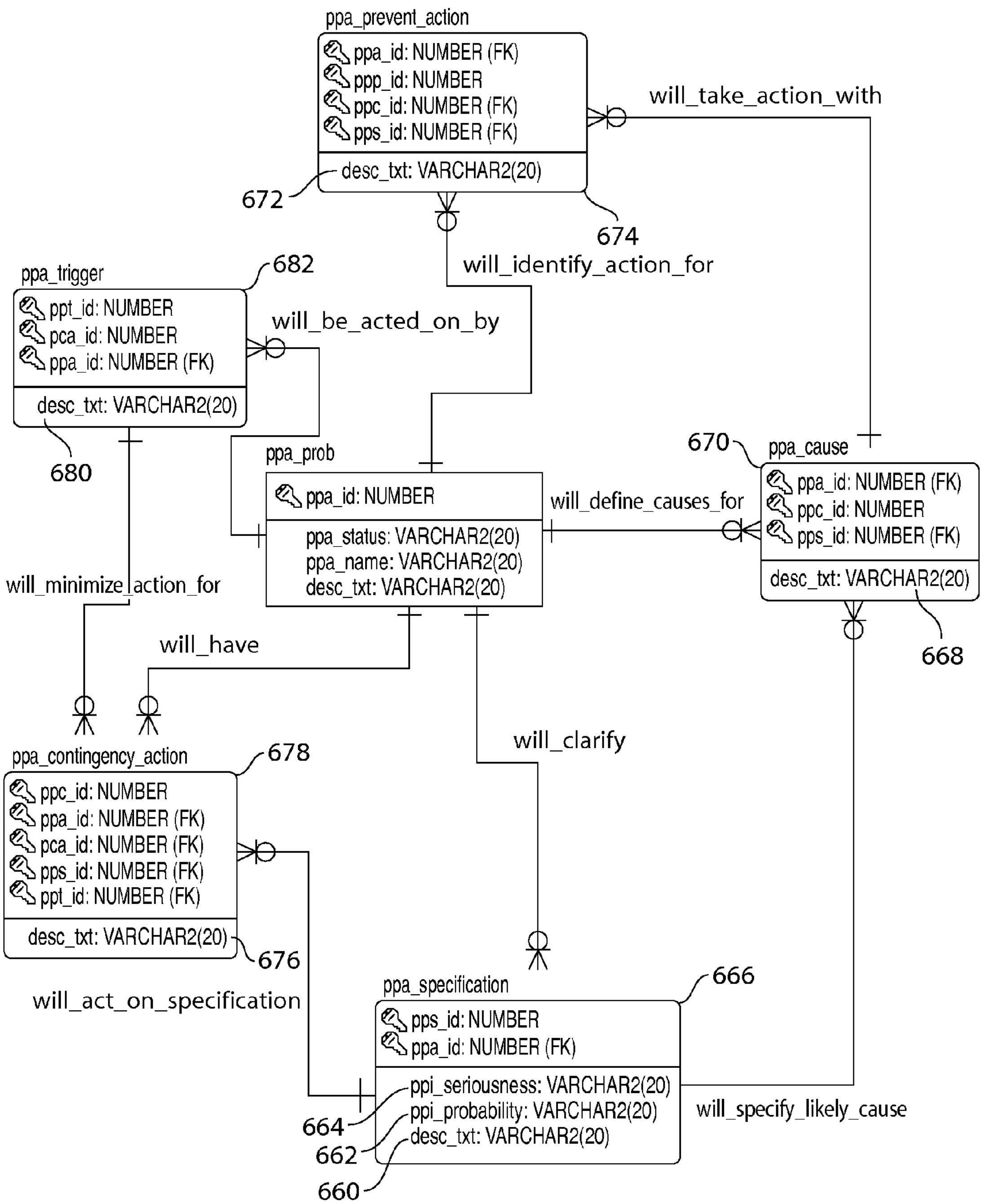
FIG. 41 shows the potential problem analysis knowledge base ER diagram.

Potential problem analysis ER diagram is shown in FIG. 41. POTENTIAL PROBLEM 660, SERIOUSNESS 664, and PROBABILITY 662 are stored in SPECIFICATION entity 666. LIKELY CAUSES 668 are stored in CAUSE entity 670. PREVENTATIVE ACTIONS 672 are stored in PREVENT ACTION entity 674. CONTINGENT ACTIONS 676 are stored in CONTINGENCY ACTION 678 entity, and corresponding TRIGGERS 680 are stored in TRIGGER entity 682.

Figure 41A:
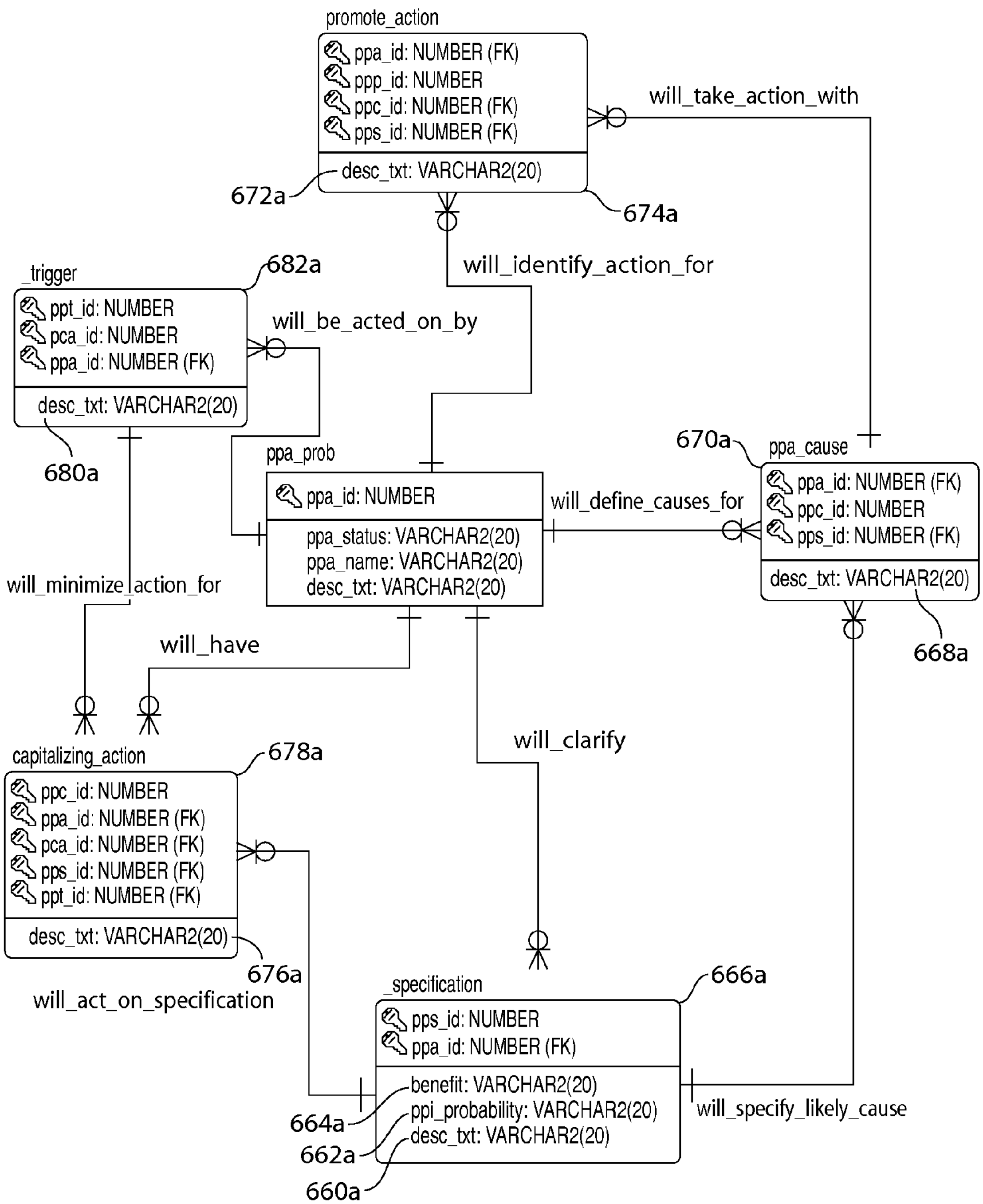
FIG. 41*a* shows the potential opportunity analysis base ER diagram.

Potential opportunity analysis ER diagram is shown in FIG. 41*a*, and is similar in structure to the potential problem analysis ER diagram shown in FIG. 41. Potential opportunity 660*a*, benefit 664*a*, and probability 662*a* are stored in SPECIFICATION entity 666*a*. Likely causes 668*a* are stored in CAUSE entity 670*a*. PROMOTING ACTIONS 672*a* are stored in PROMOTE ACTION entity 674*a*. Capitalizing actions 676*a* are stored in CAPITALIZING ACTION 678*a* entity, and corresponding triggers 680*a* are stored in TRIGGER entity 682*a*.

Figure 42:
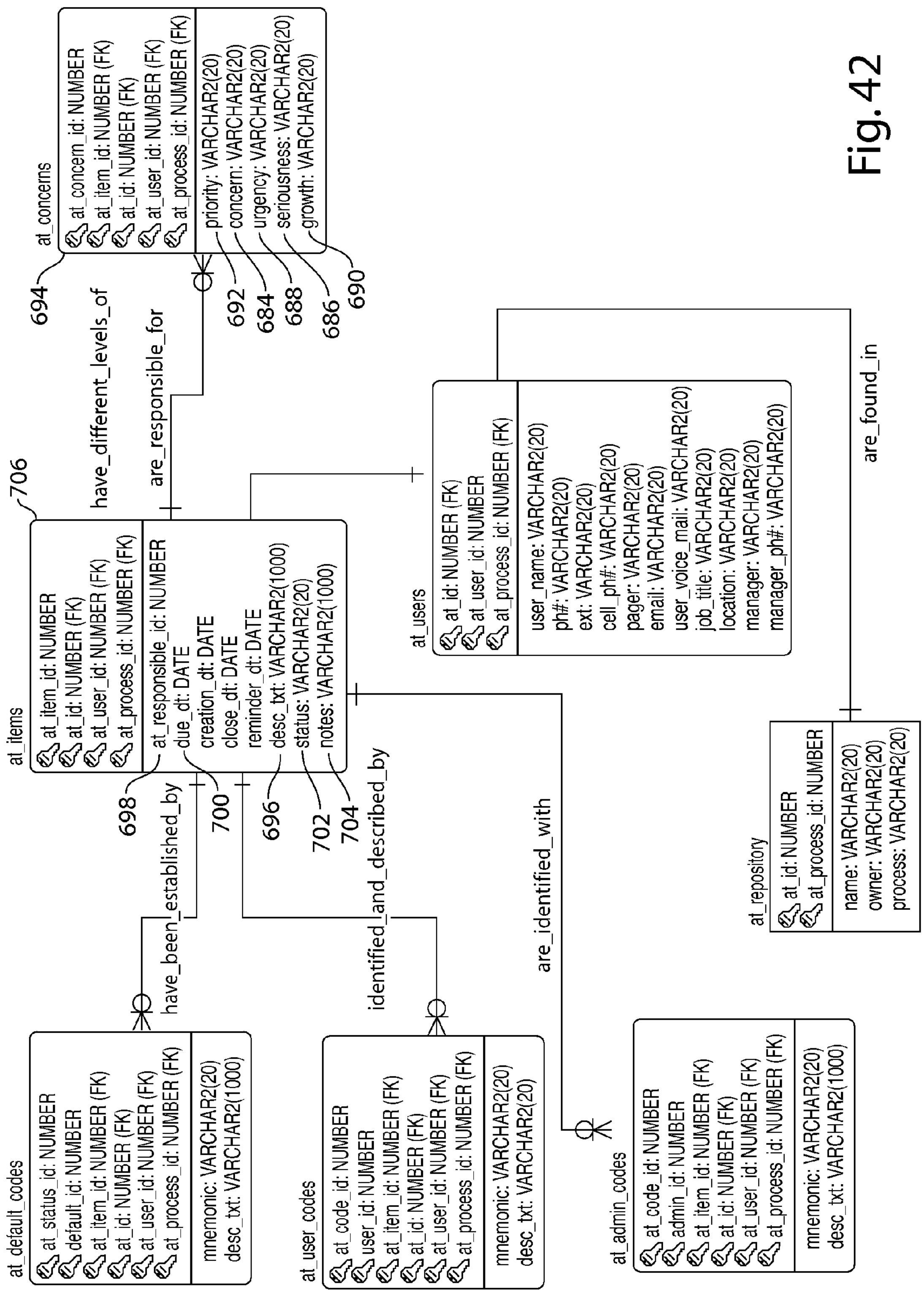
FIG. 42 shows the action tracker knowledge base ER diagram.

FIG. 42 shows the action tracker ER diagram. CONCERNS 684, SERIOUSNESS 686, URGENCY, 688, GROWTH 690, and PRIORITY 692 are stored in CONCERNS entity 694. ACTIONS 696, WHO 698, WHEN 700, NOTES 704, and STATUS 702 are stored in ITEMS entity 706.

The knowledge base as described above is populated with cells entered in the corresponding process screen sequences. This knowledge base may be queried during current process screen sequences to draw upon knowledge obtained from prior process screen sequences. Such queries and reports are through a standard SQL interface, and may be broad report-based statistical information, or specific keyword queries to pinpoint a specific process screen sequence. Such keyword queries are facilitated by the use of a master keyword table. Prior to saving any of the process screen sequences as defined herein, process records are parsed for occurrences of new keywords. New keywords not previously entered are displayed to the user, who is prompted to enter, categorize, and create associations for the keywords in the master keyword table.

These queries and reports may be predetermined, to address periodic status items such as displaying all unresolved problem analysis, or to list all decisions concerning a particular product line, or may be individual point-and-click queries using the individual knowledge base fields. An integrated database engine such as ORACLE® provides initial support for the knowledge base, however other database engines using SQL or other query language could be employed in alternative implementations or to customize an application to a particular user.

Class Hierarchy

The class inheritance graphs of the complex situation assessment application as defined herein are shown in FIGS. 43–48. Where applicable, connection links (A)—(N) are shown with the respective circled capital letters to indicate multiple sheet graphs.

Figures 1, 43:
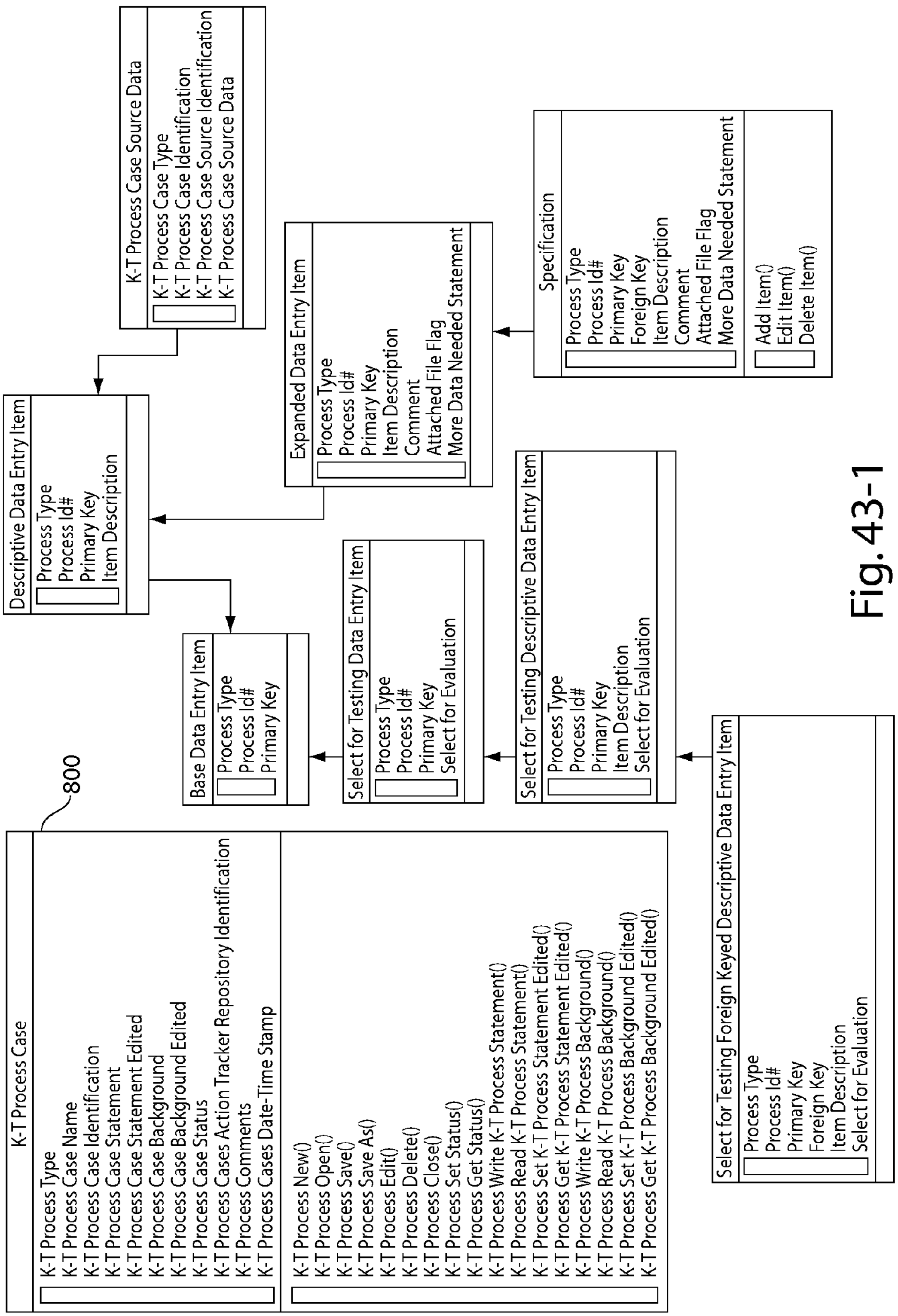
FIG. 43 shows the general process screen sequence class inheritance graph.
Figures 2, 43:
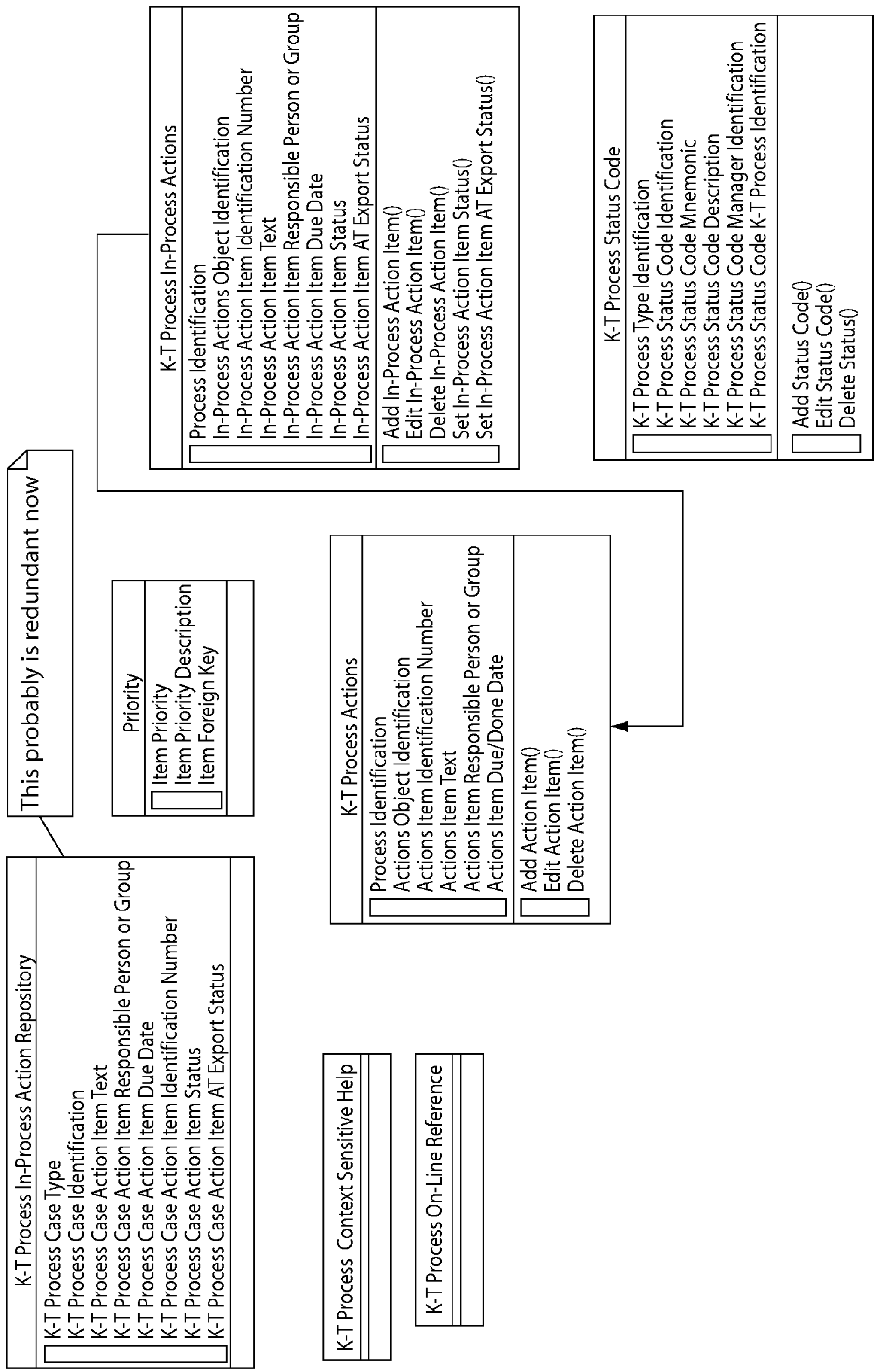
Figures 1, 44A:
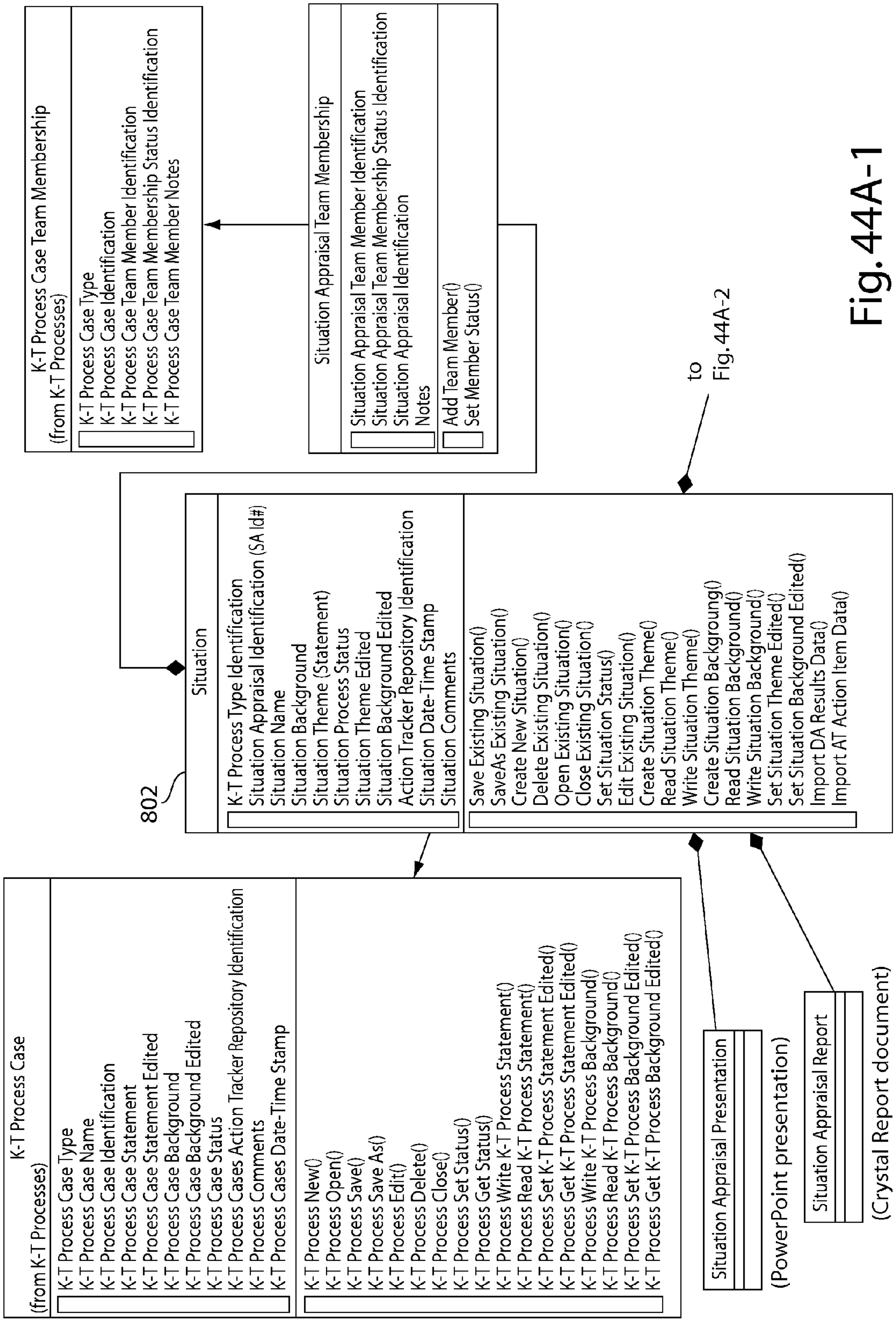
Figures 2, 44A:
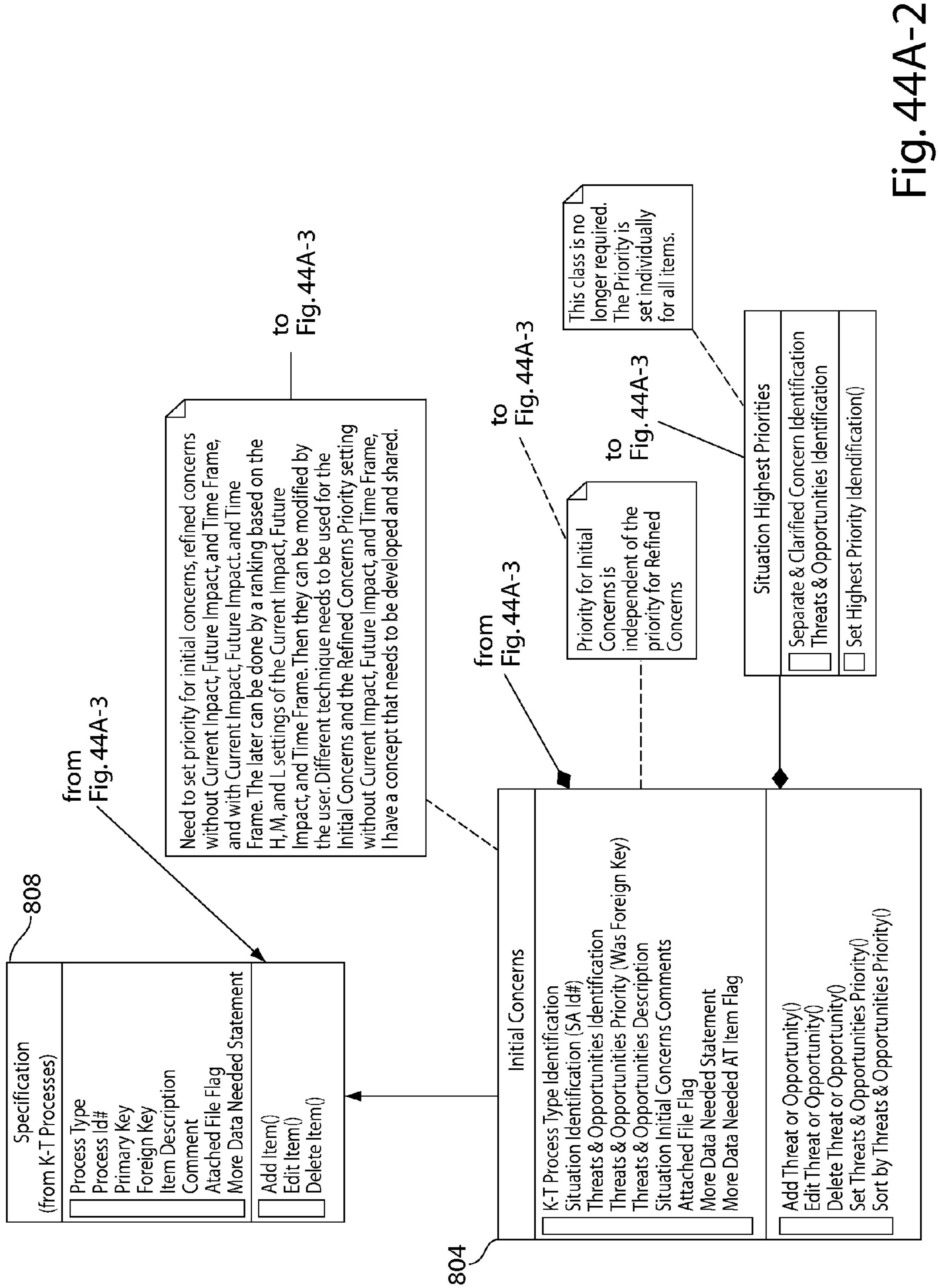
Figures 3, 44A:
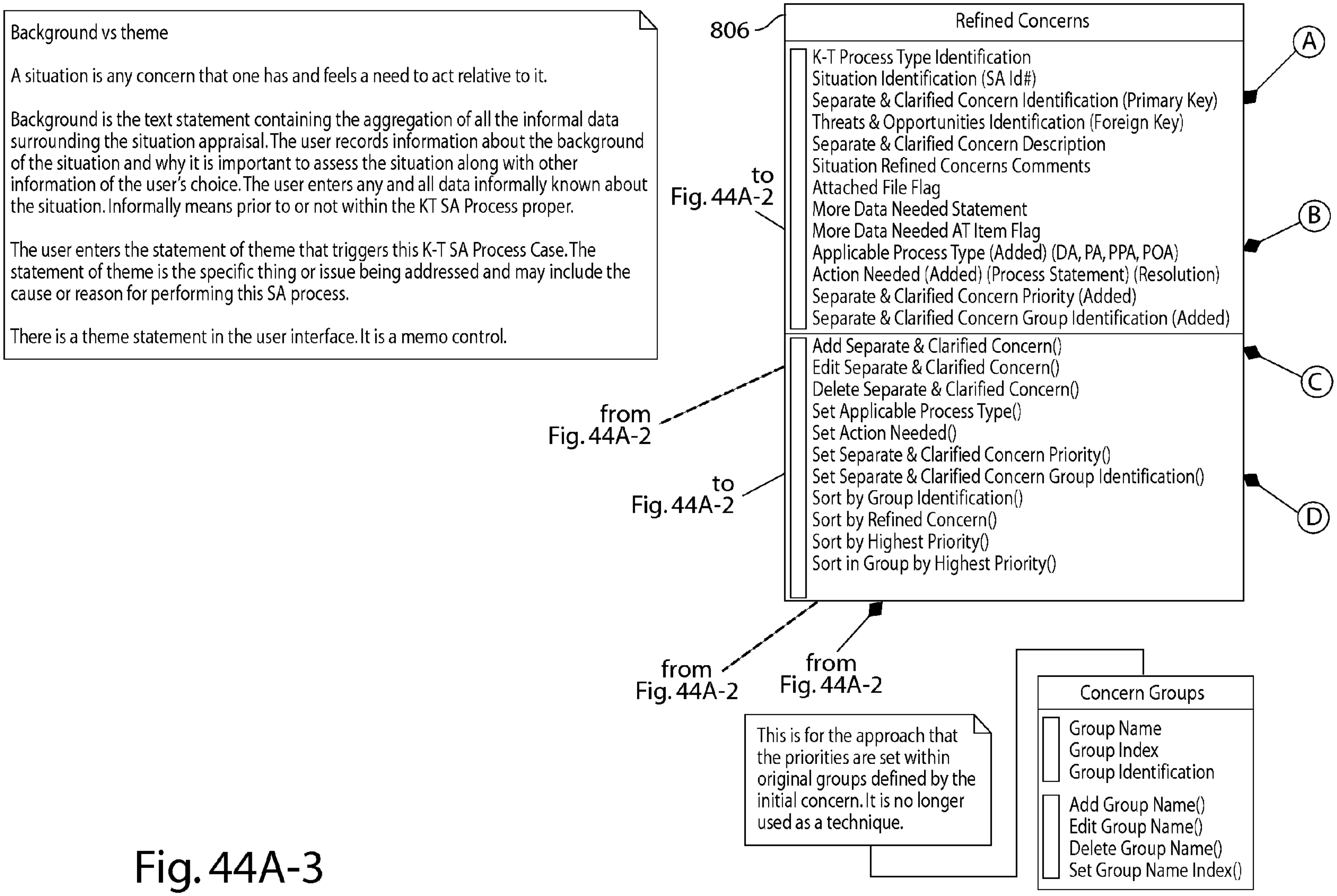
Figures 1, 44B:
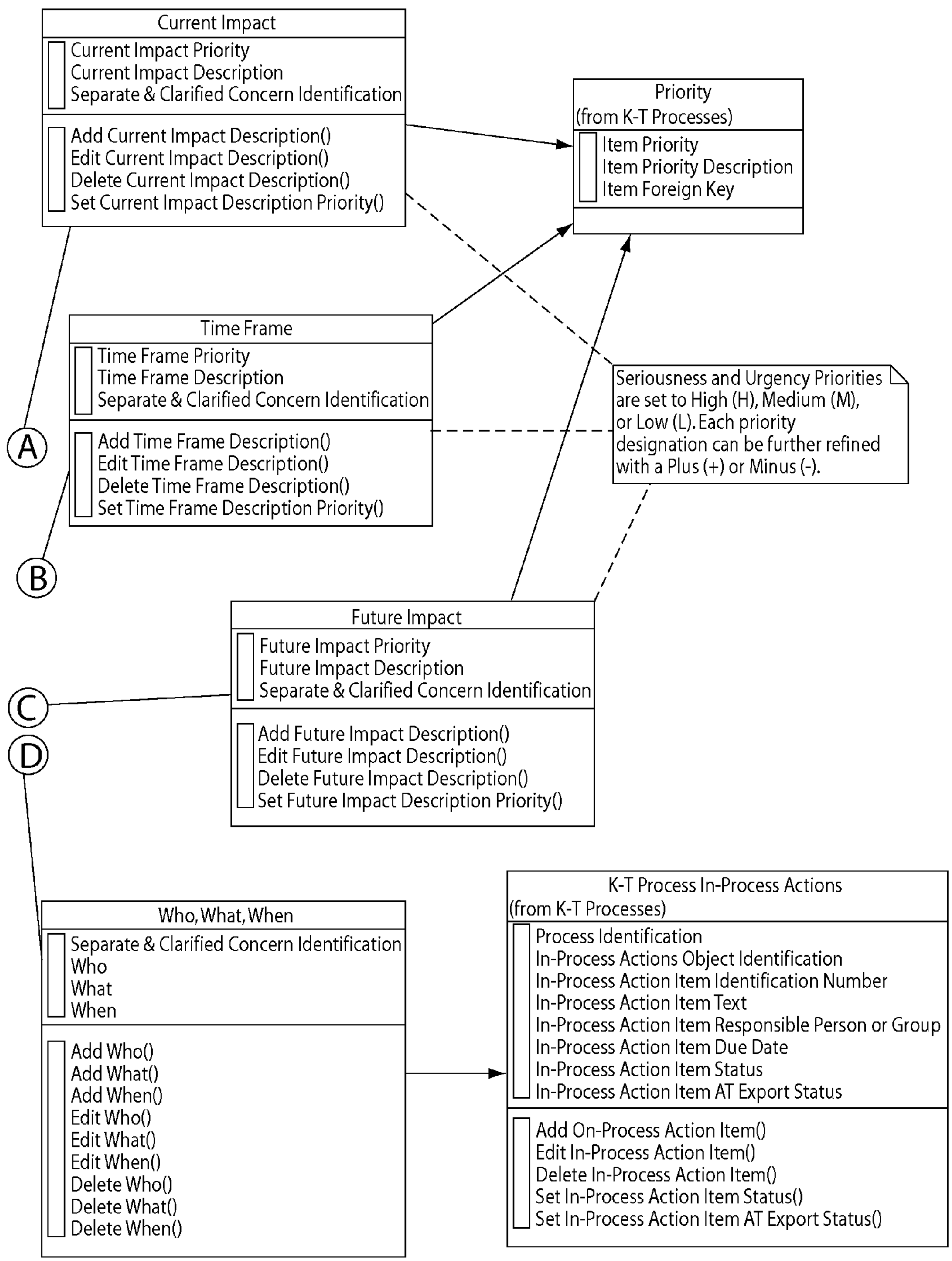
Figures 2, 44B:
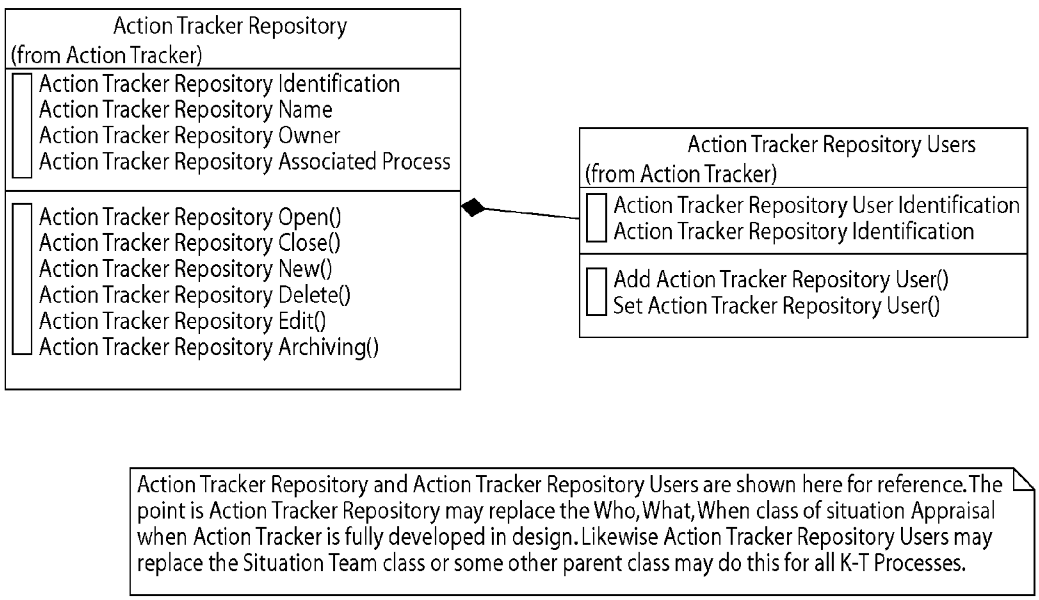
Figures 1, 45A:
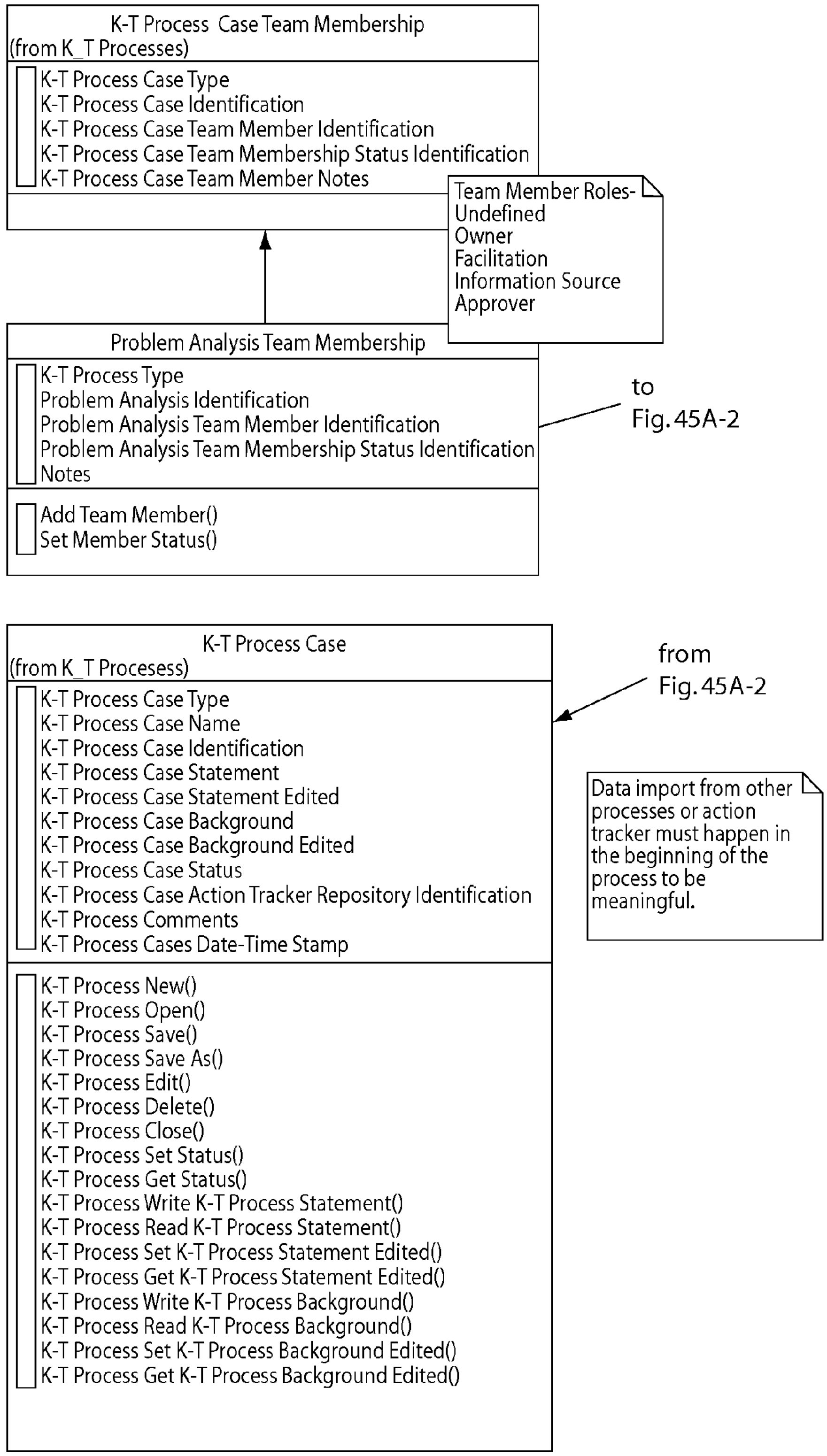
FIGS. 45*a*–45*d* show the problem analysis class inheritance graph.
Figures 2, 45A:
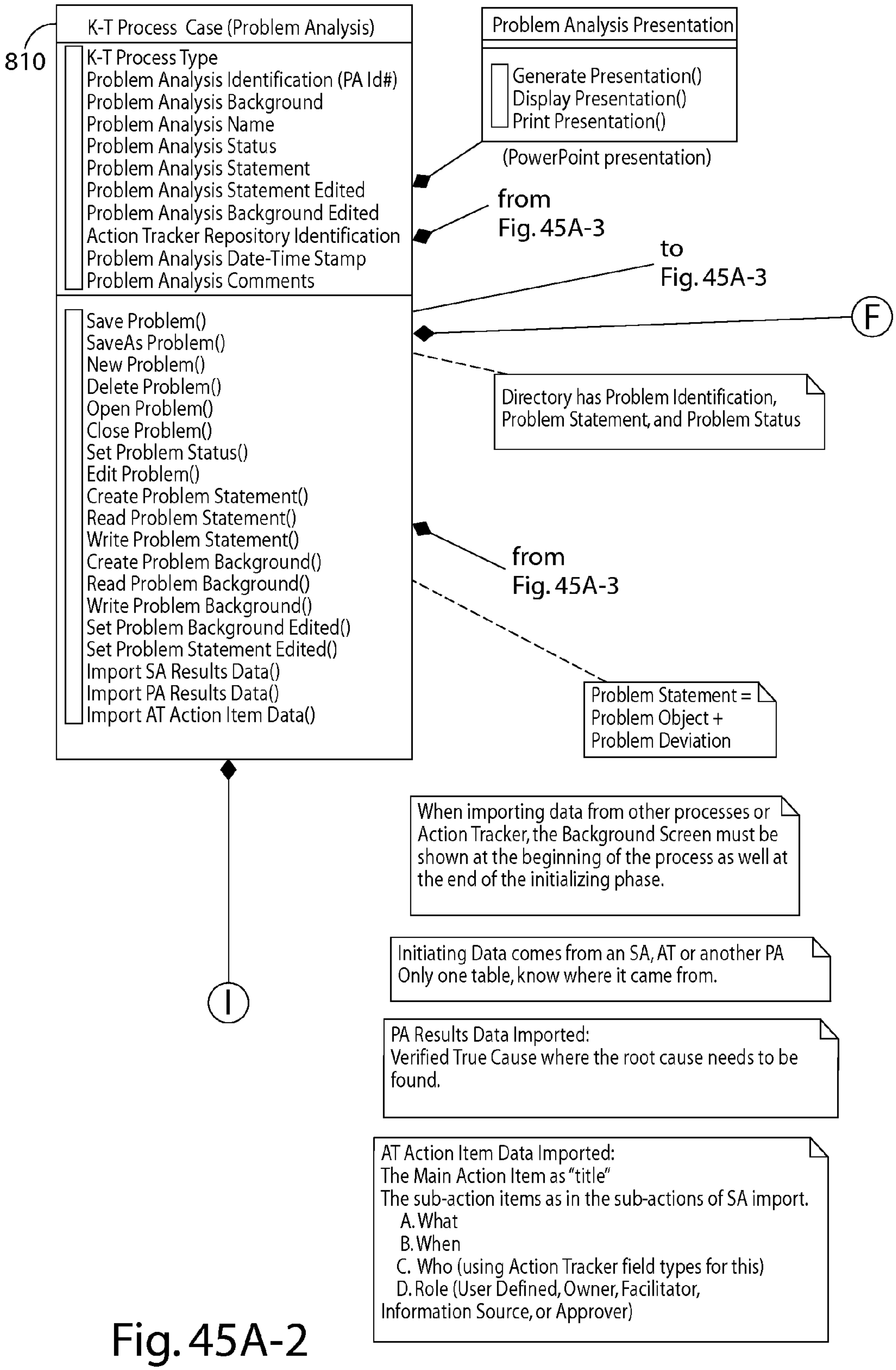
Figures 3, 45A:
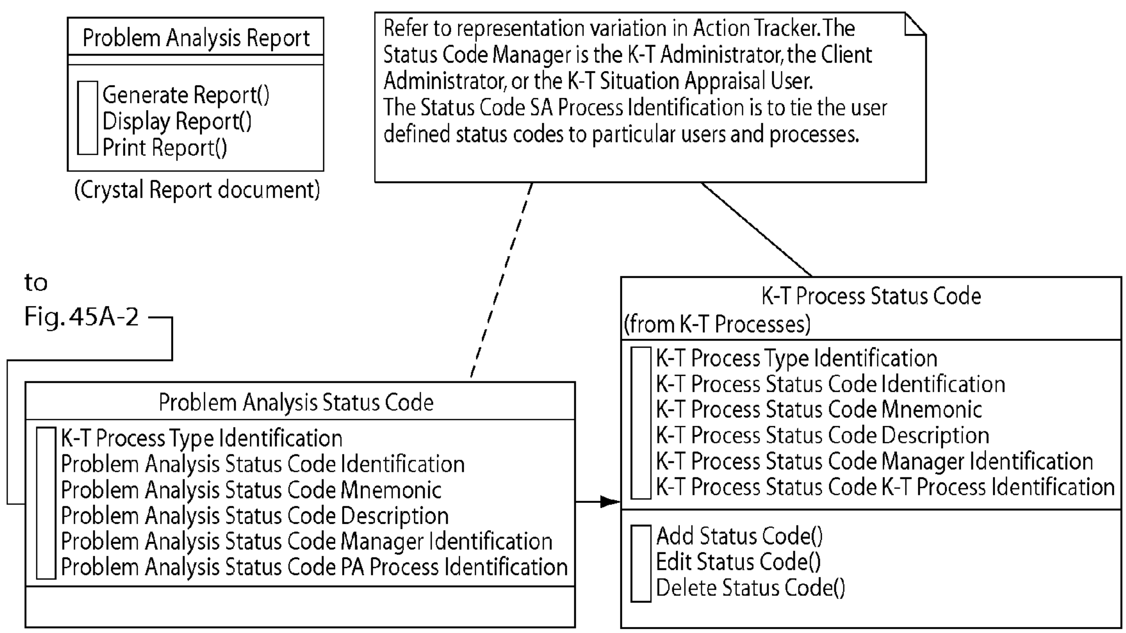
Figures 4, 45A:
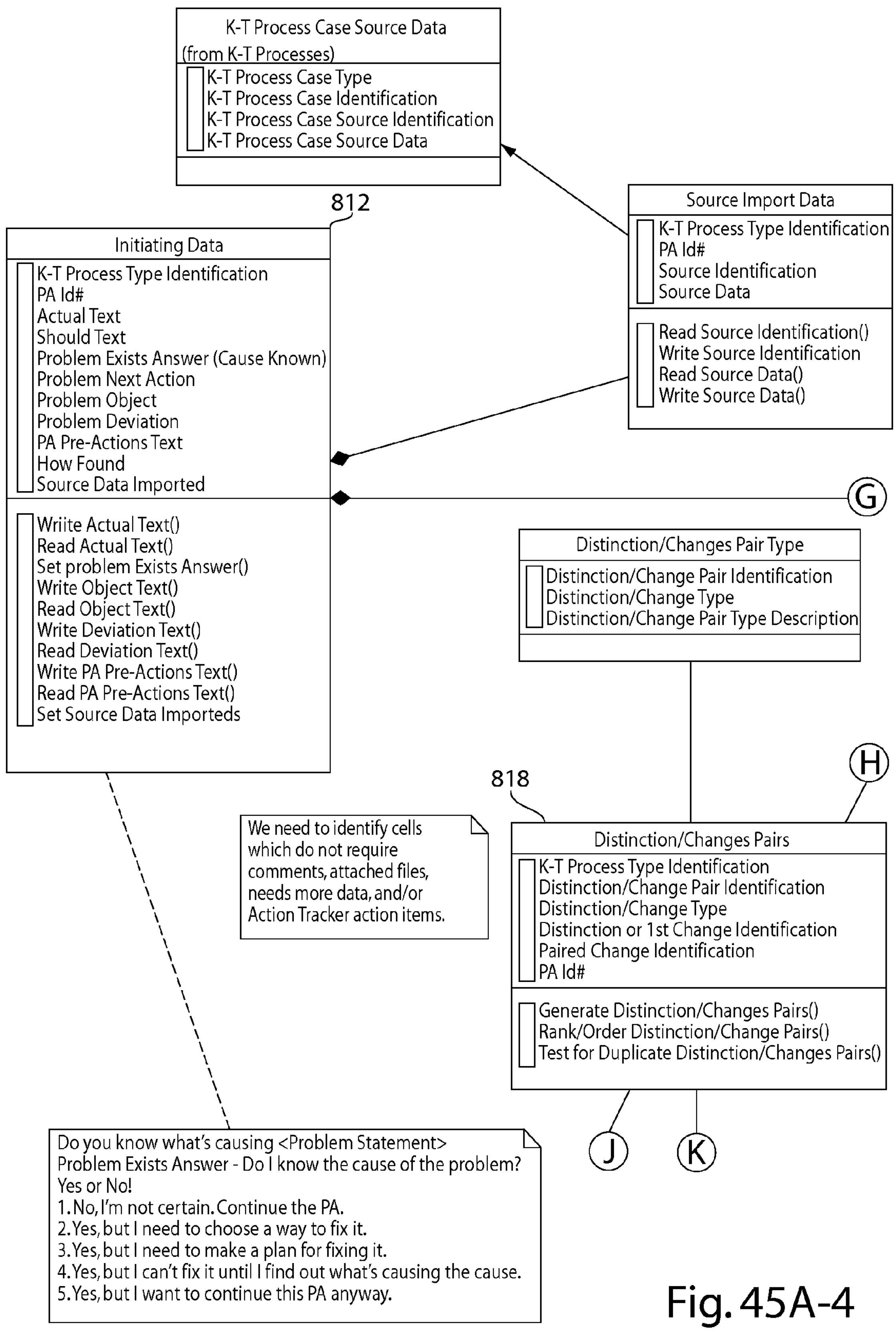
Figures 1, 45B:
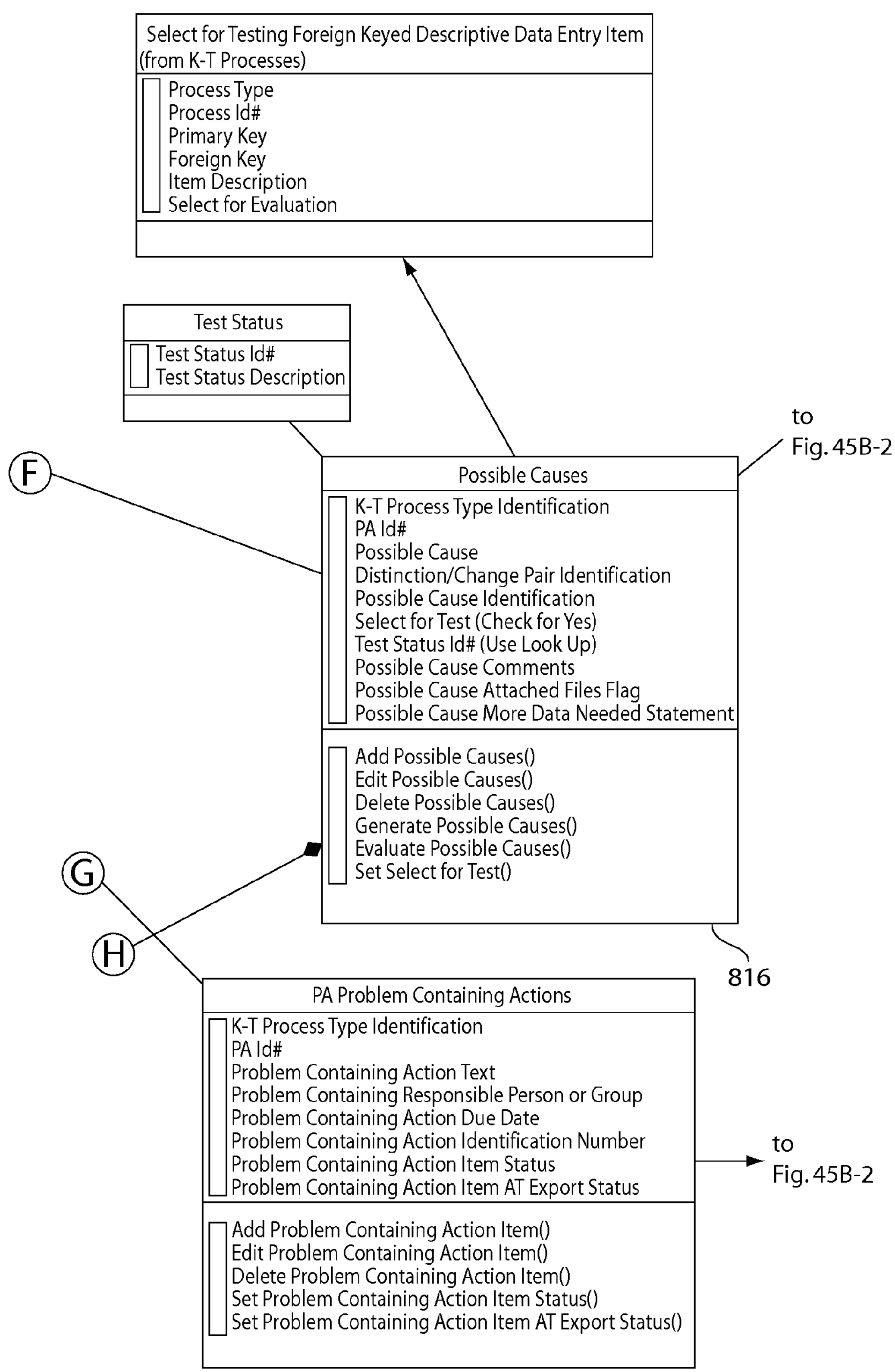
Figures 2, 45B:
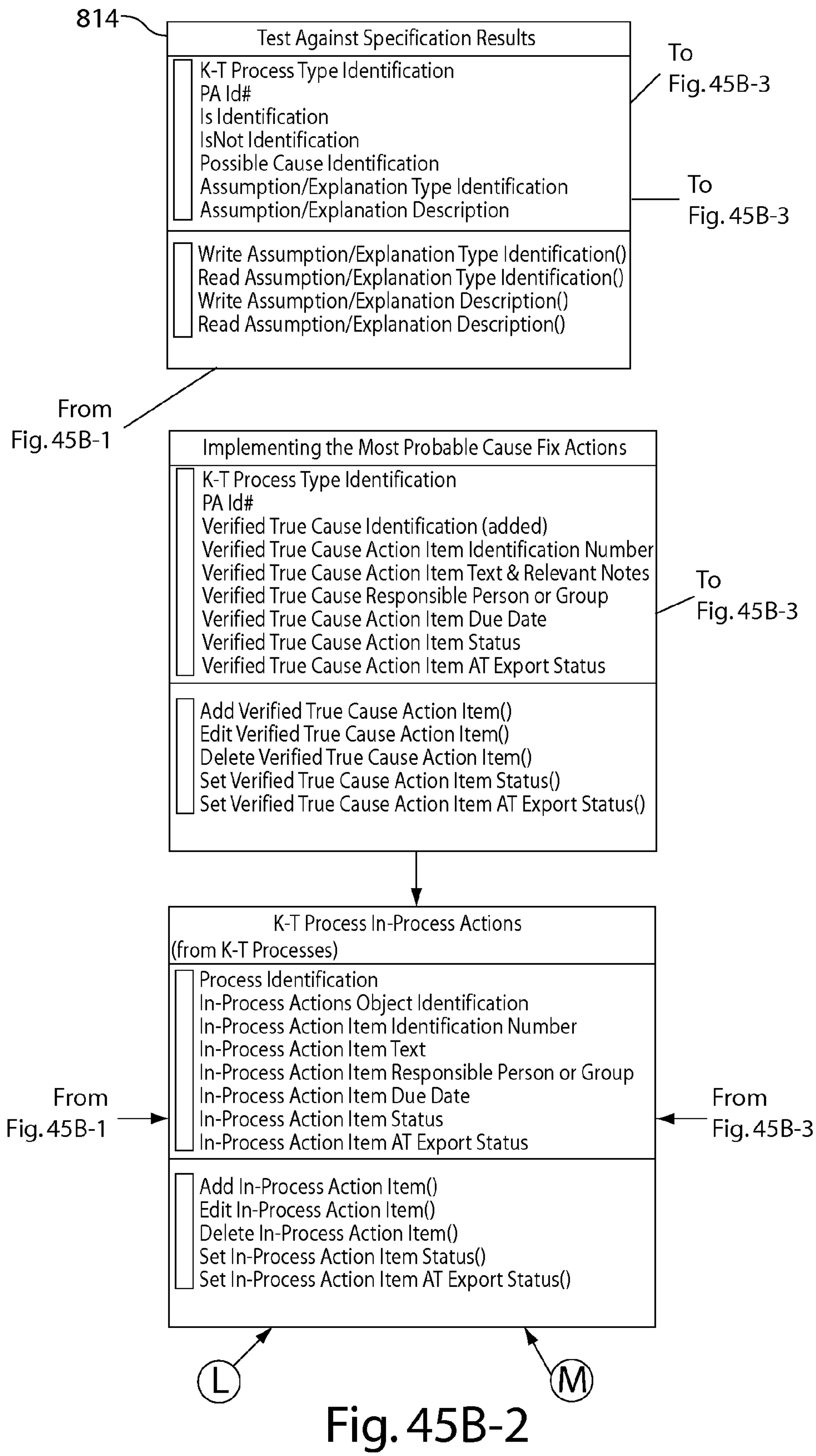
Figures 3, 45B:
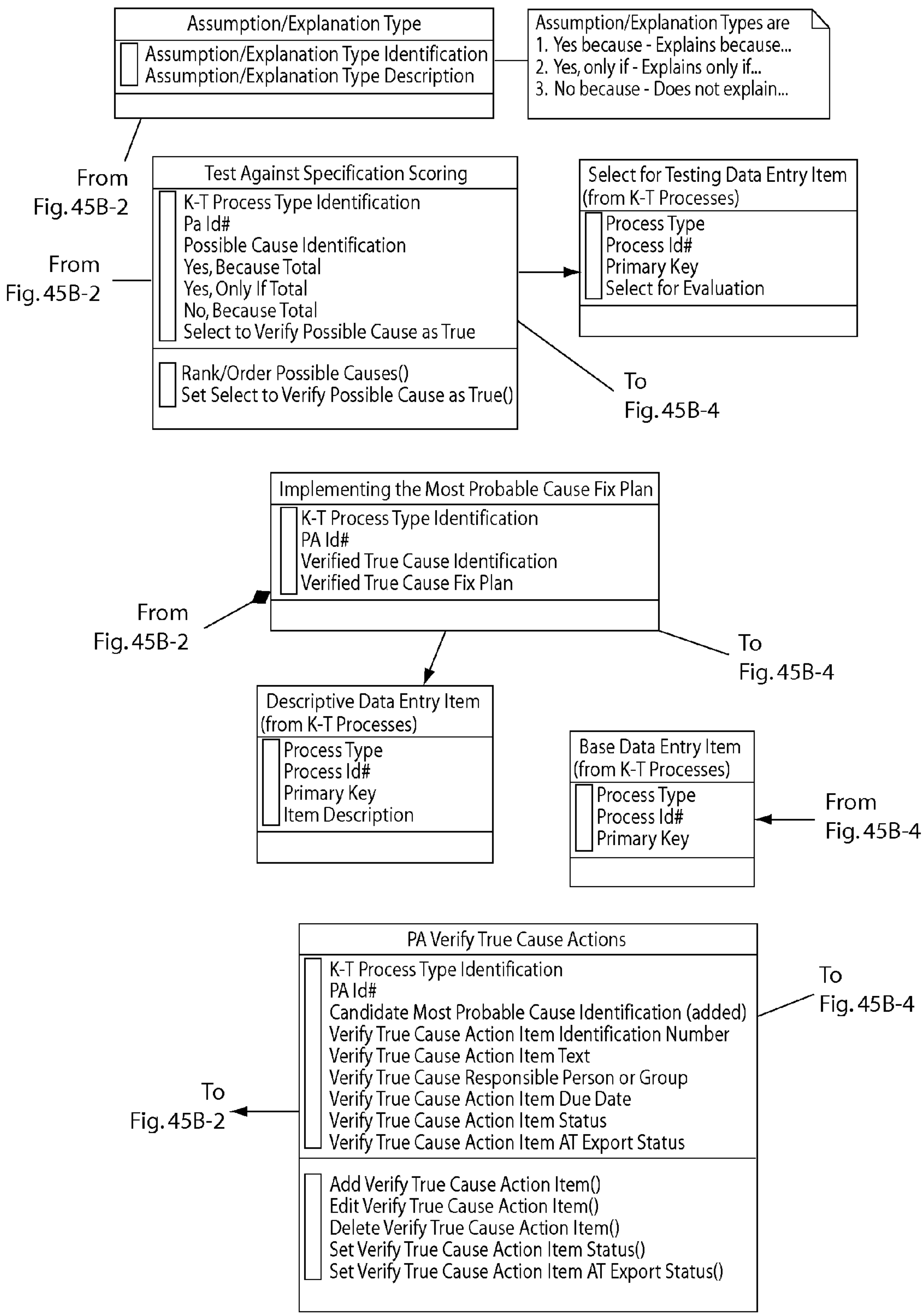
Figures 4, 45B:
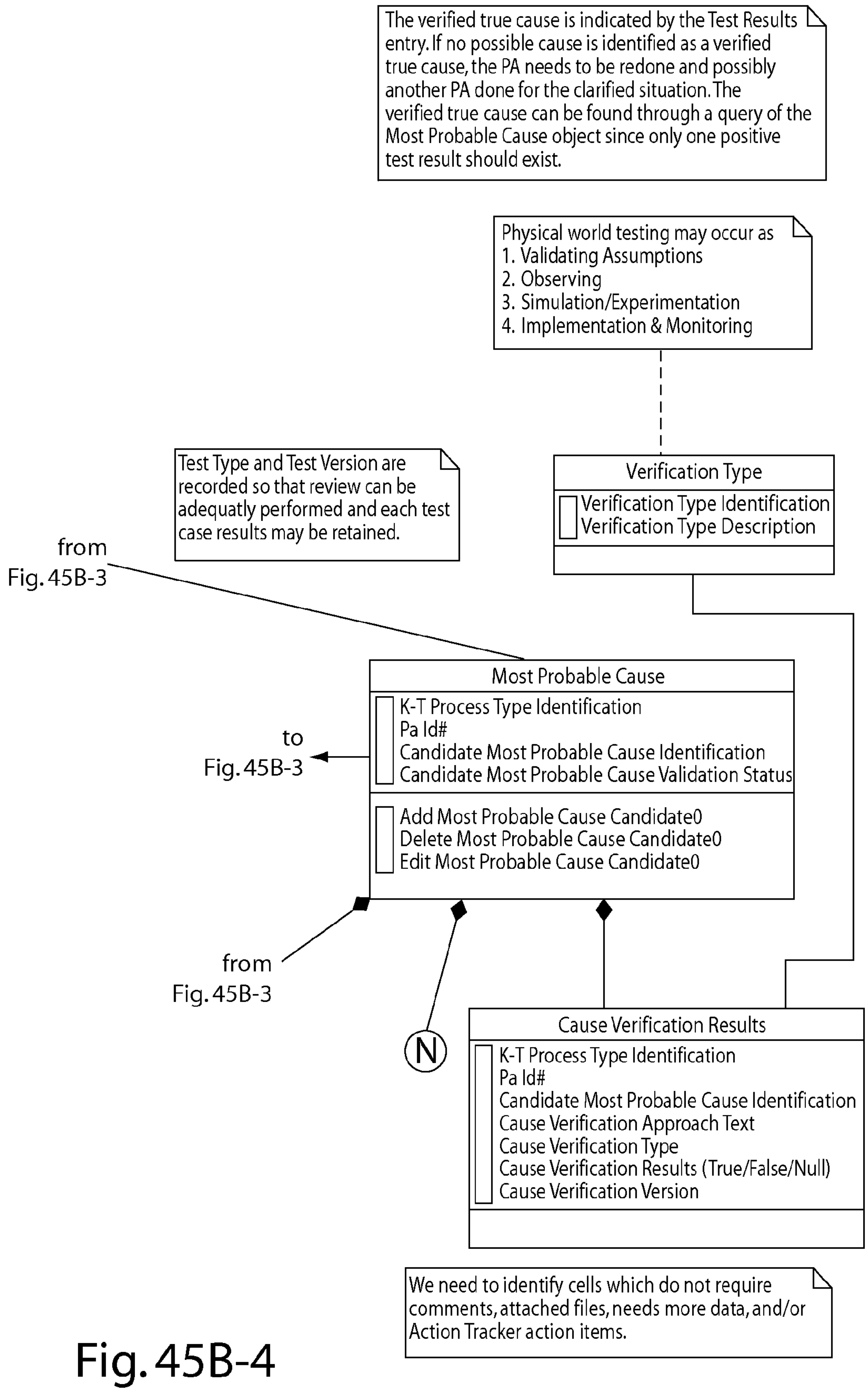
Figures 1, 45C:
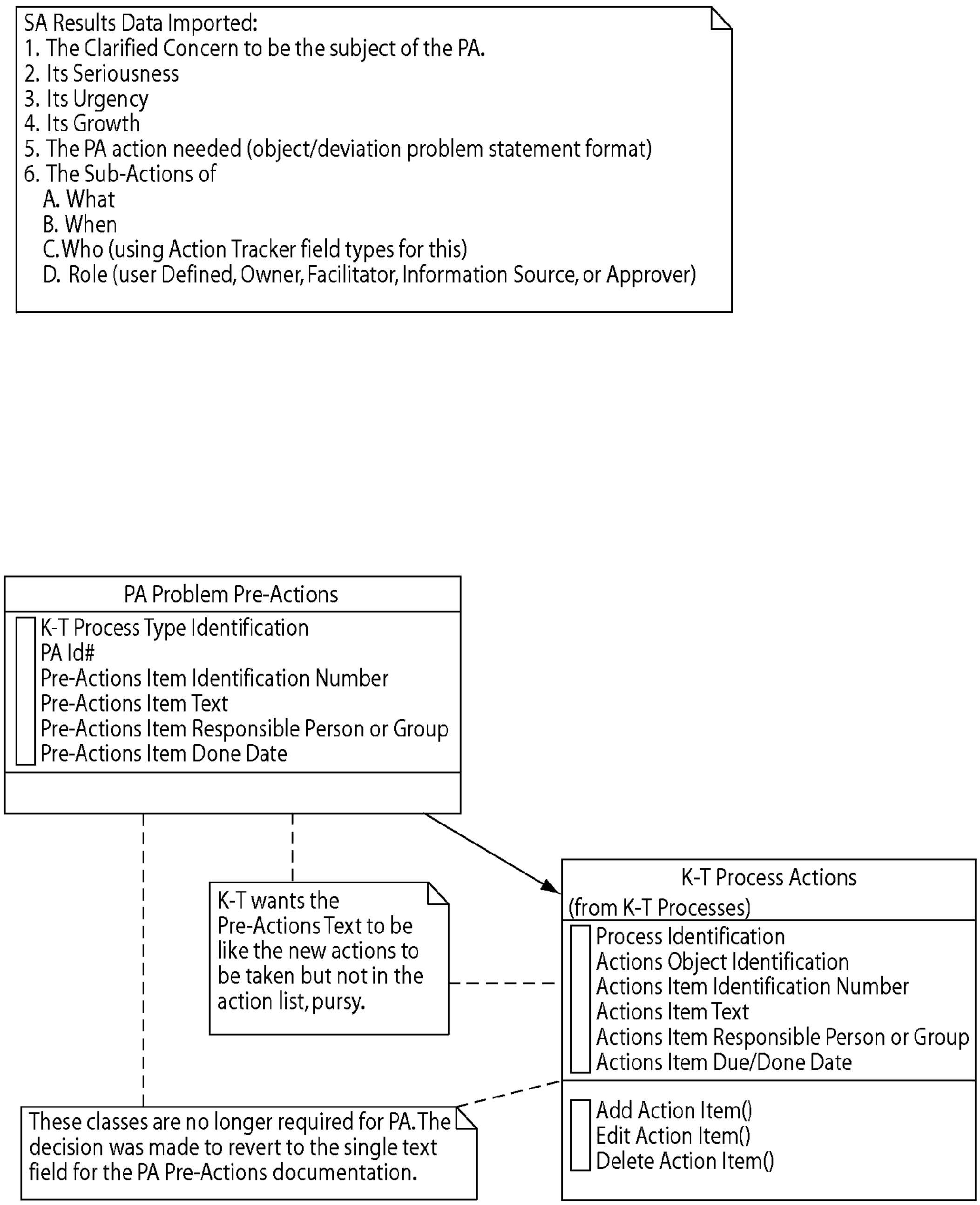
Figures 2, 45C:
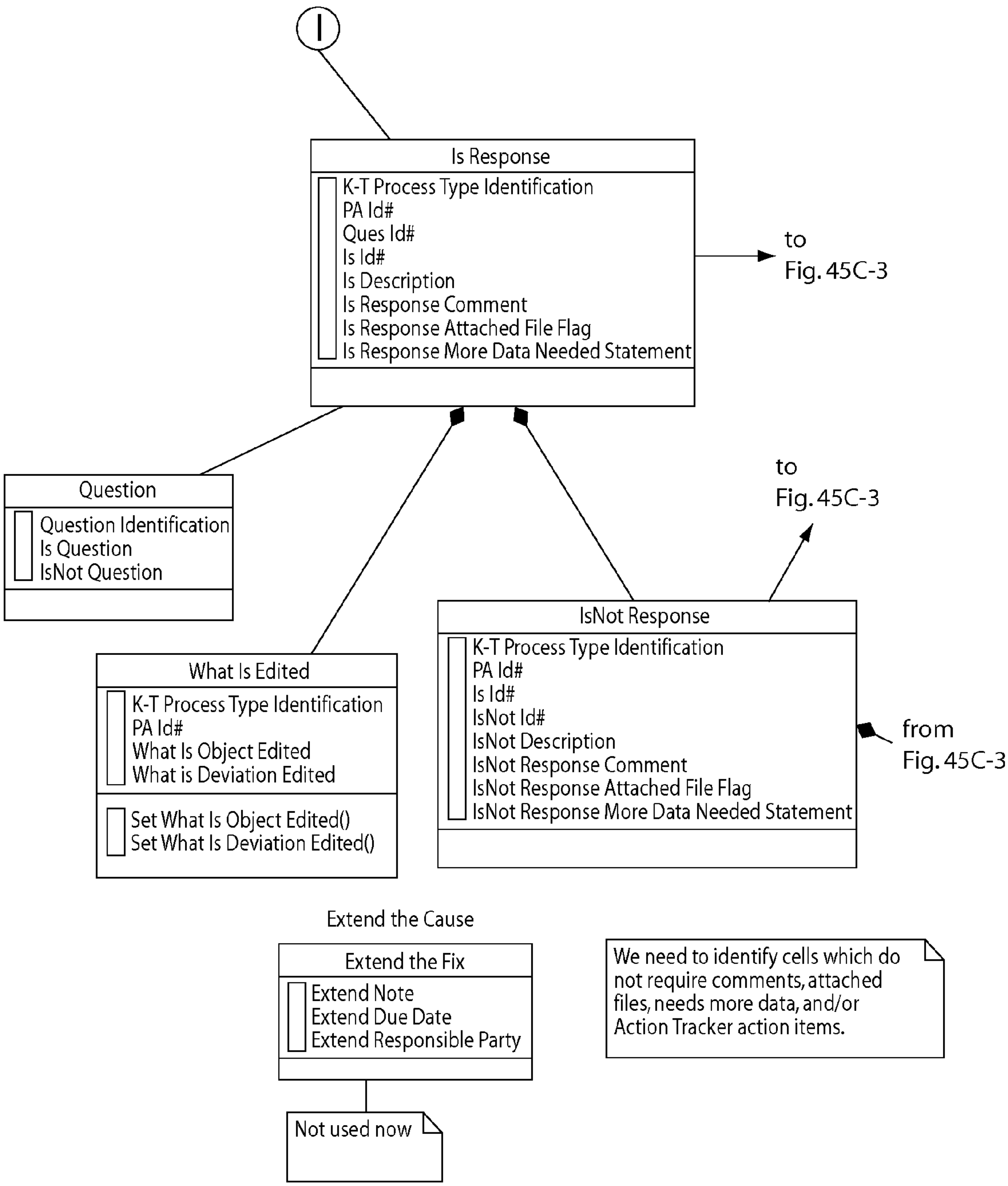
Figures 3, 45C:
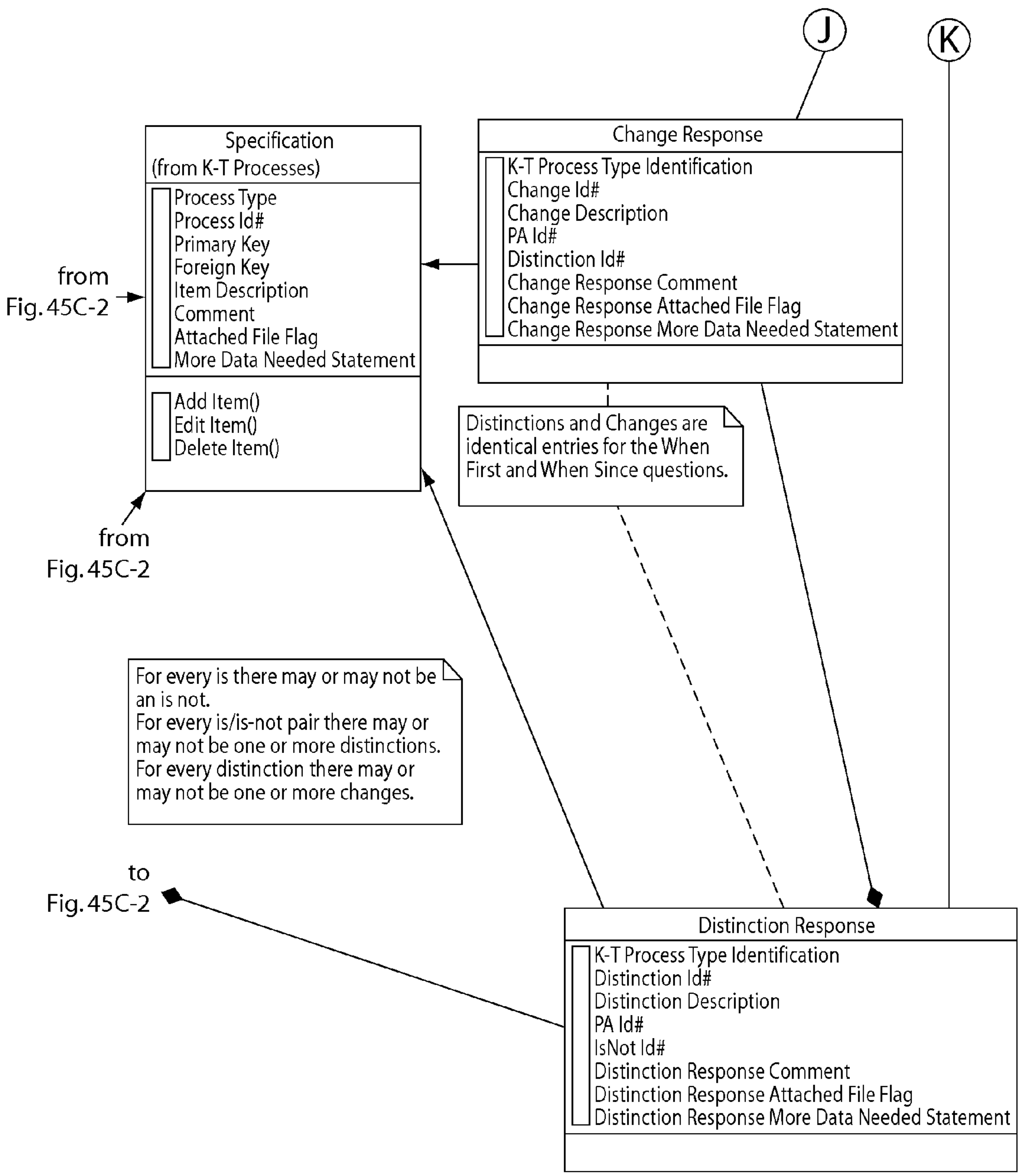
Figures 4, 45C:
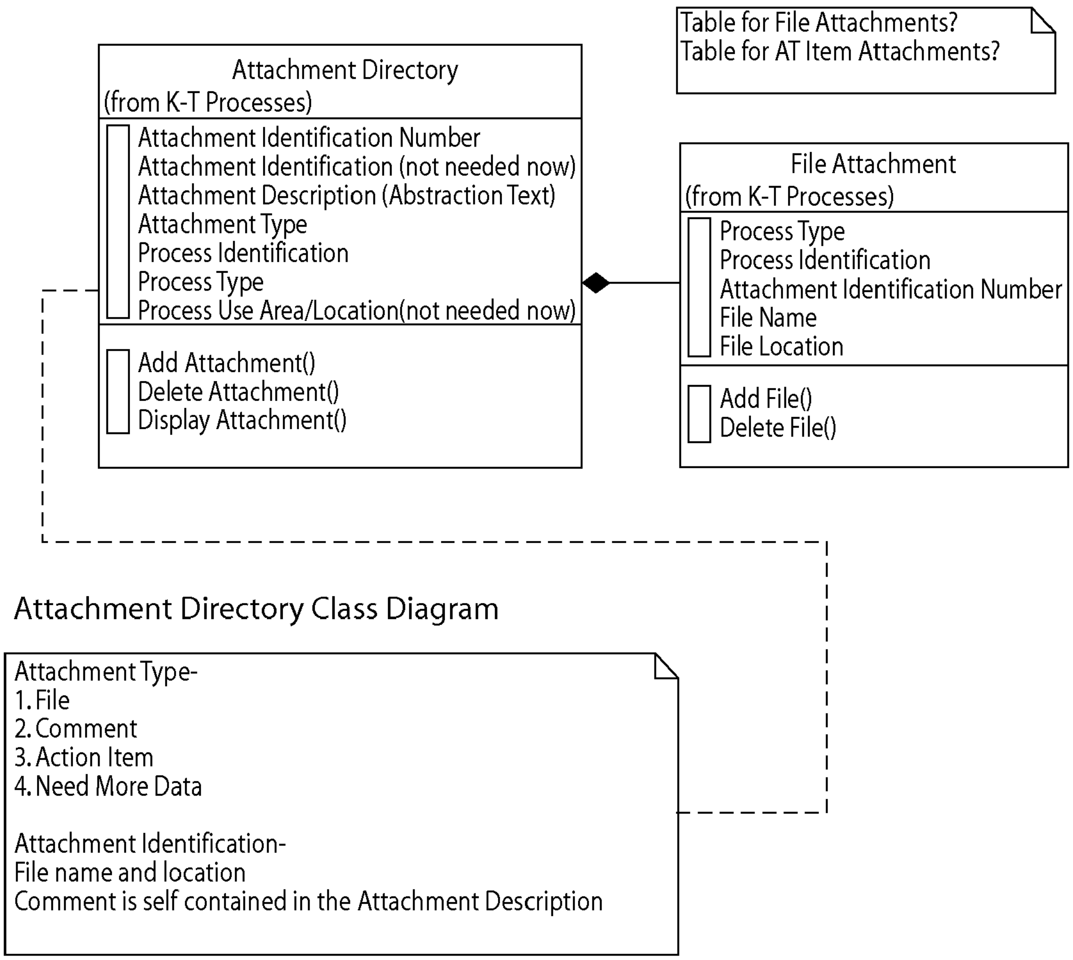
Figures 1, 45D:
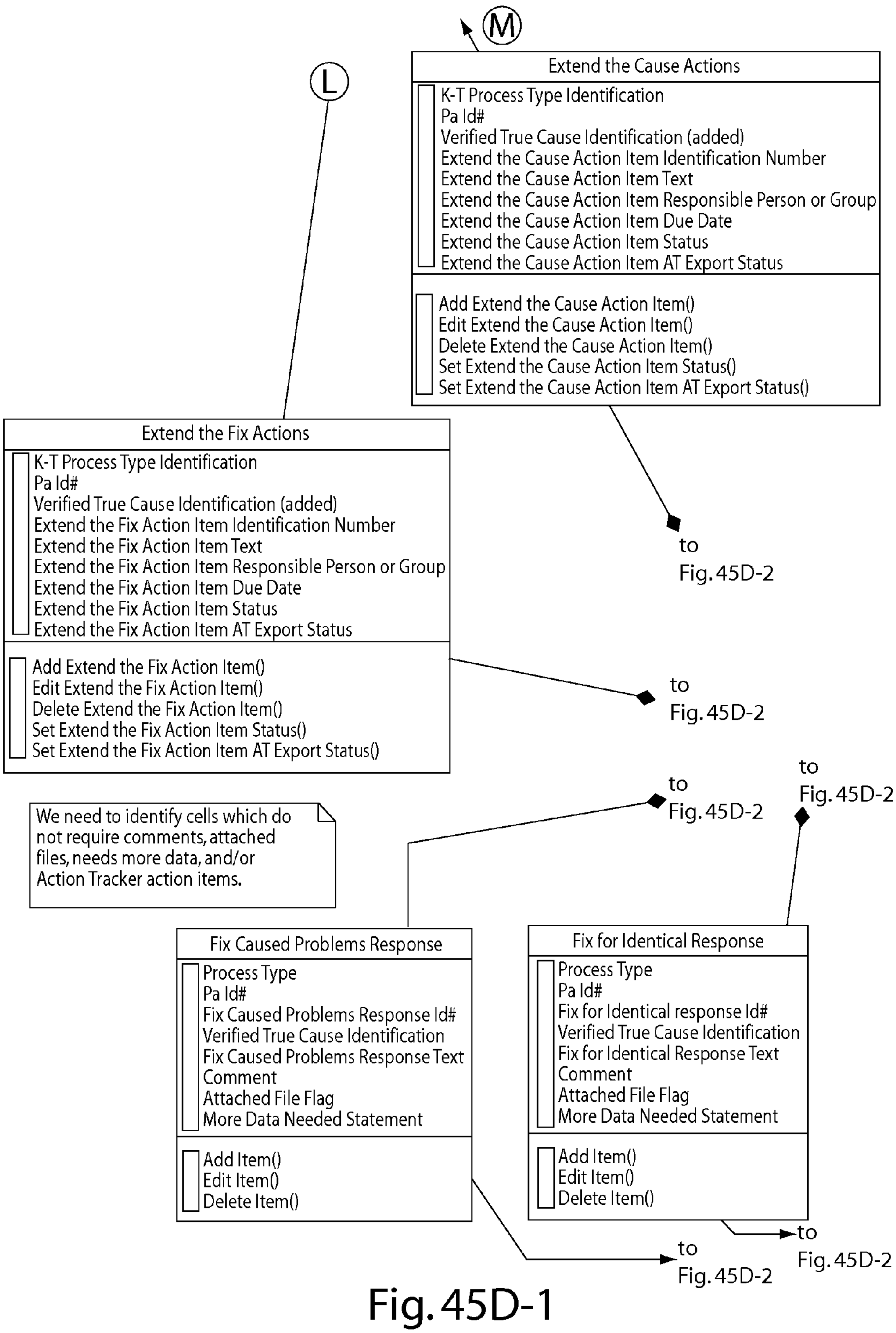
Figures 2, 45D:
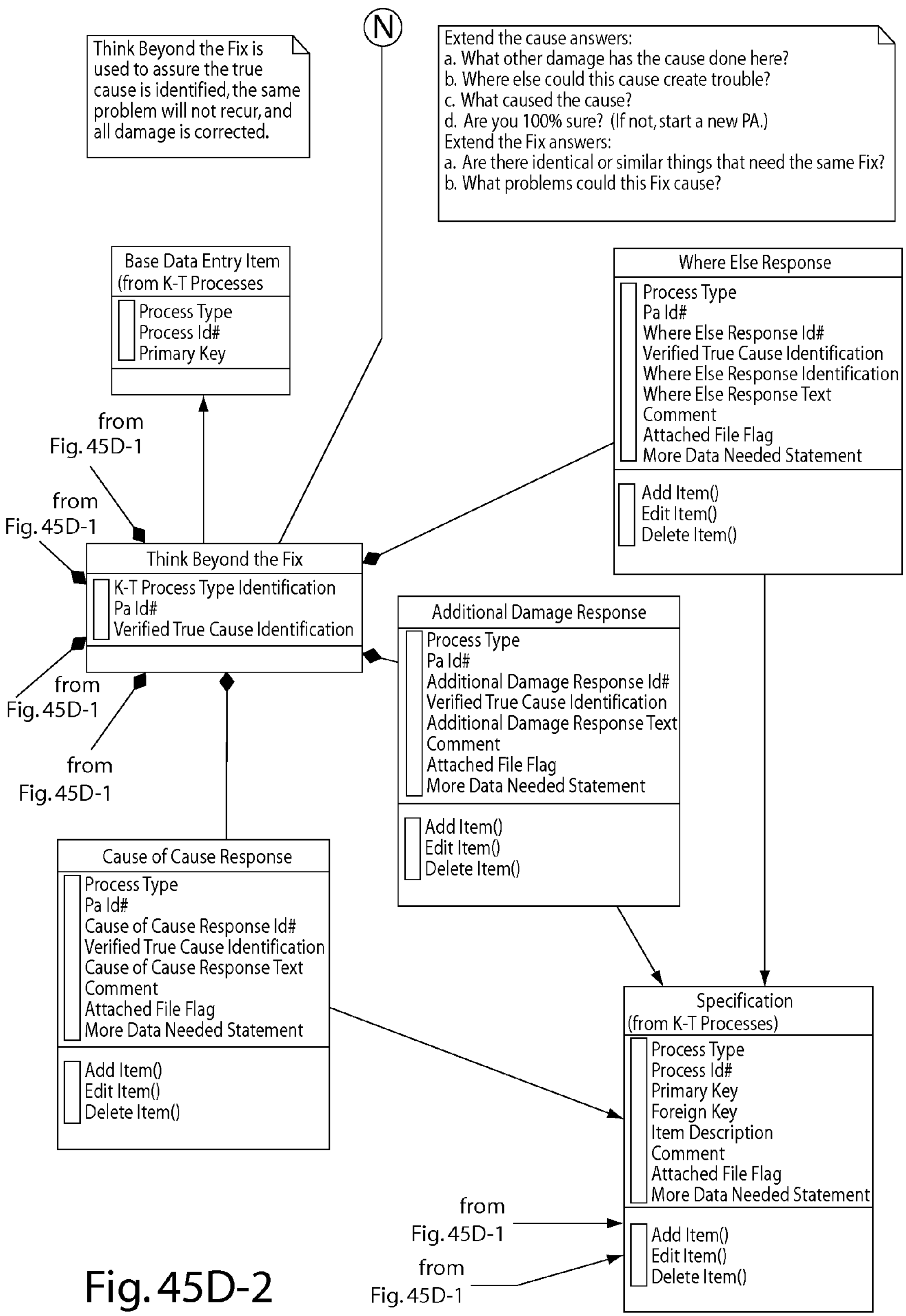

The general process screen sequence class inheritance graph 800 is shown in FIG. 43. This graph defines the general process class common to the process screen sequences defined above. Situation appraisal inheritance graph is shown on FIGS. 44*a*–44*c*. Situation class 802 is derived from the general process class, and manipulates situation background and general information. Concerns are manipulated by initial CONCERNS class 804 and REFINED CONCERNS class 806. Analysis needed is manipulated by SPECIFICATION class 808.

Referring to FIGS. 45*a*–45*d*, the problem analysis inheritance graph is shown. PROBLEM ANALYSIS analysis class 810 is derived from the general PROCESS class 800 (FIG. 43). INITIATING DATA class 812 manipulates the problem object and the problem deviation. Test against SPECIFICATION class 814 manipulates is/is not information. POSSIBLE CAUSE class 816 manipulates possible causes. Changes and distinctions are handled by DISTINCTION/CHANGES pairs class 818.

Figures 1, 46:
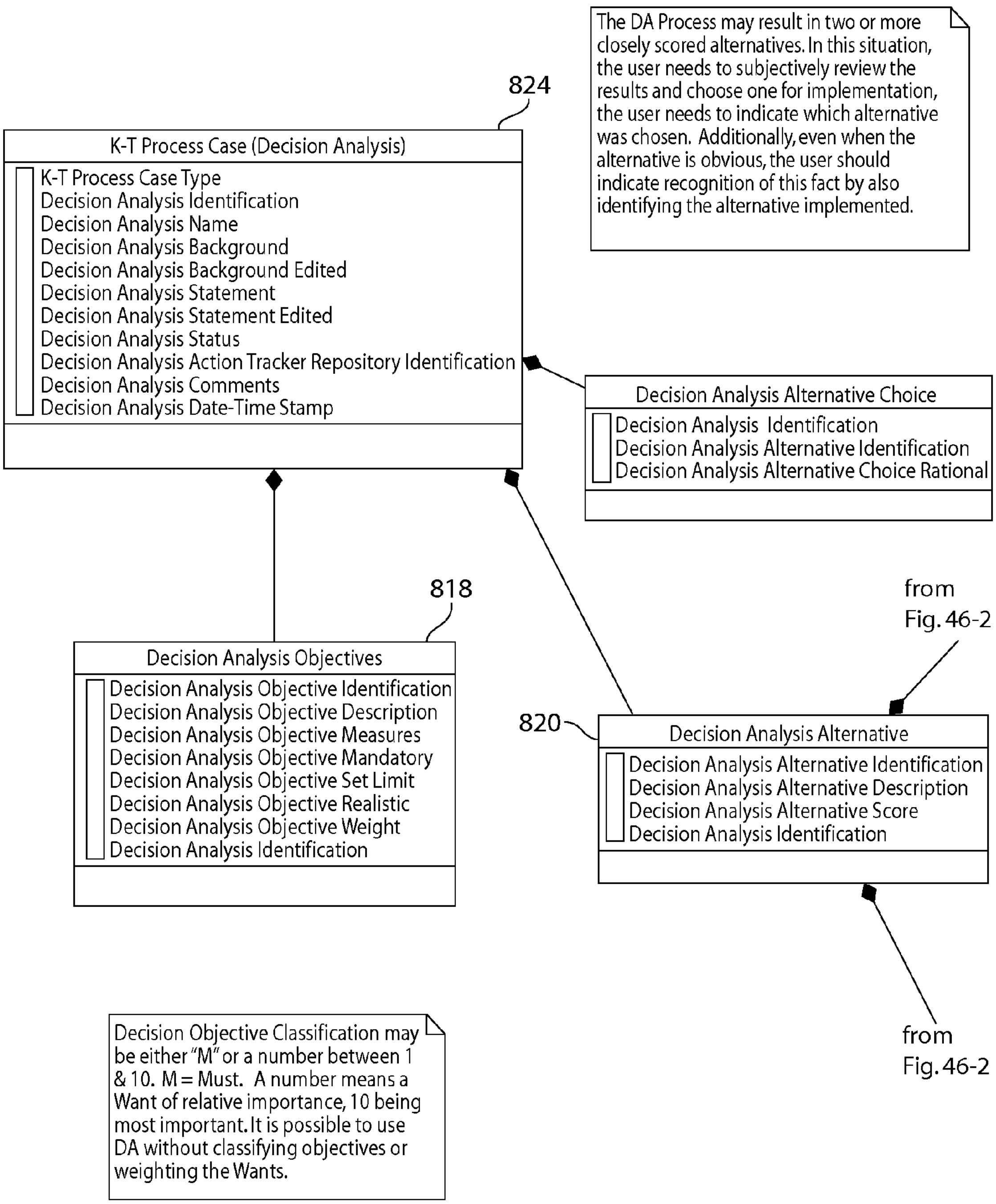
FIG. 46 shows the decision analysis class inheritance graph.
Figures 2, 46:
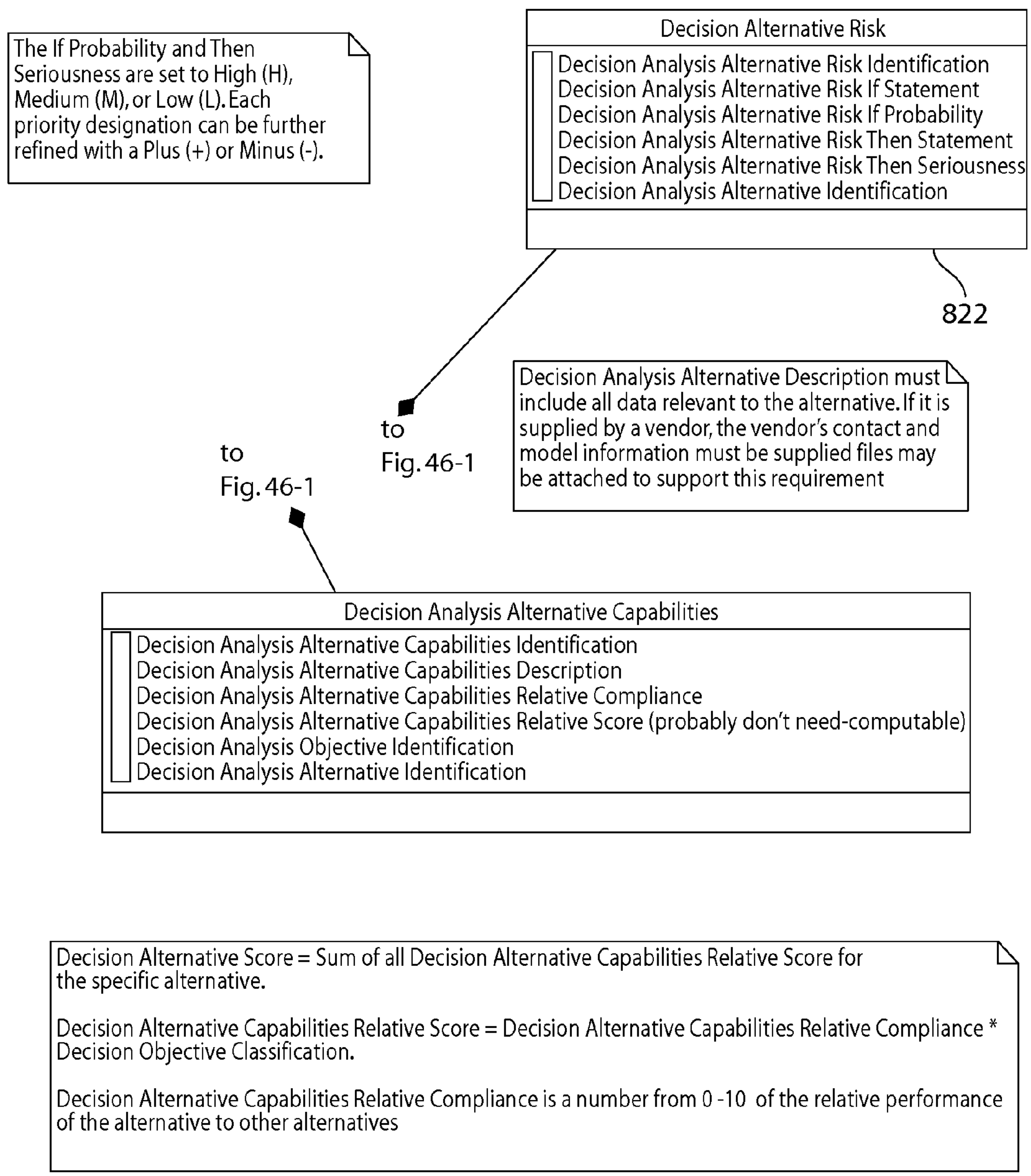

Decision analysis process screen sequence class inheritance graph is shown in FIG. 46. DECISION ANALYSIS class 824 is derived from the general process class (800, FIG. 43). Objectives are manipulated by DECISION ANALYSIS OBJECTIVES class 818. Alternatives are handled by DECISION ANALYSIS ALTERNATIVES class 820. Adverse consequences are manipulated by DECISION ALTERNATIVES RISK class 822.

Figures 1, 47:
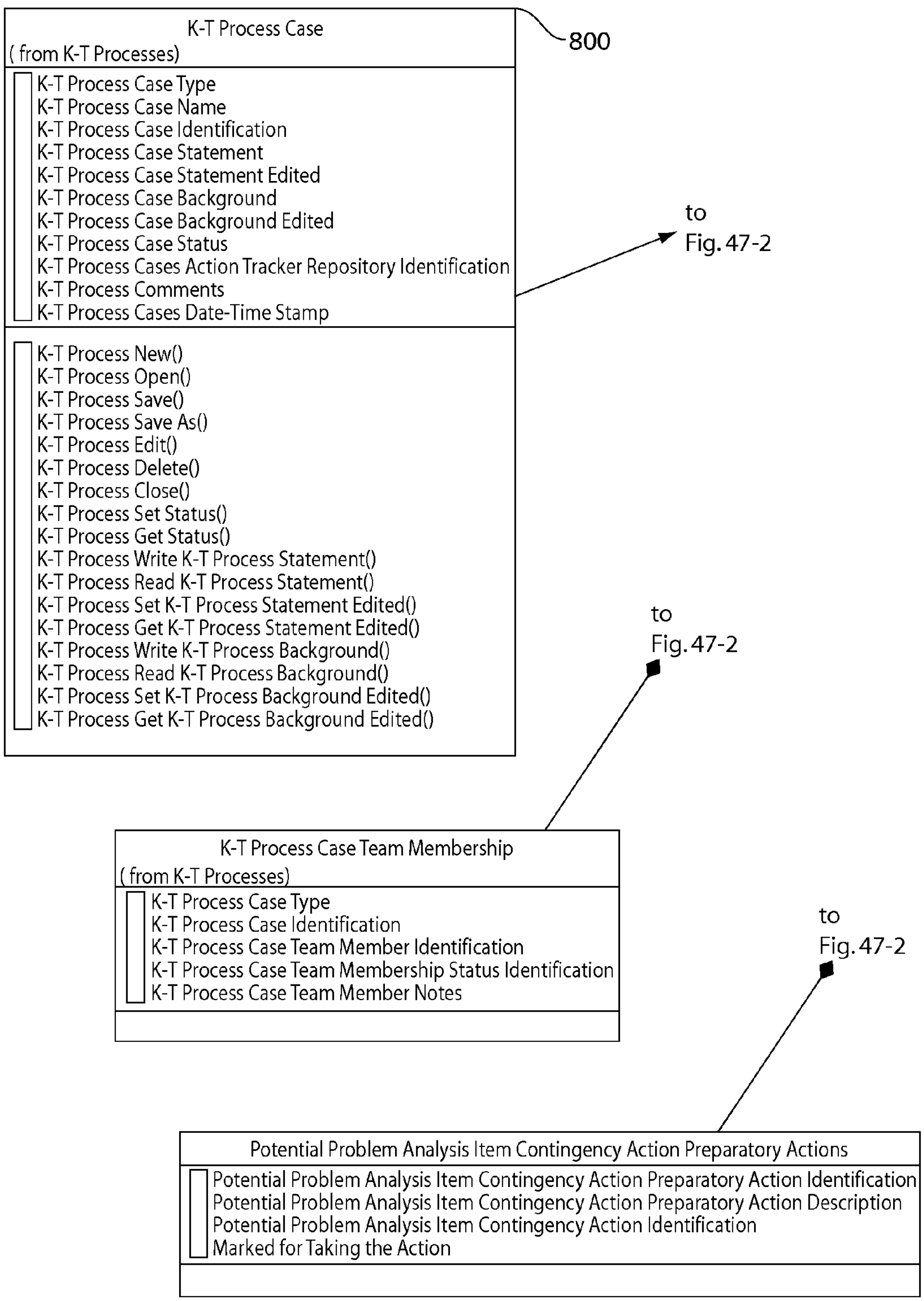
FIG. 47 shows the potential problem analysis class inheritance graph.
Figures 2, 47:
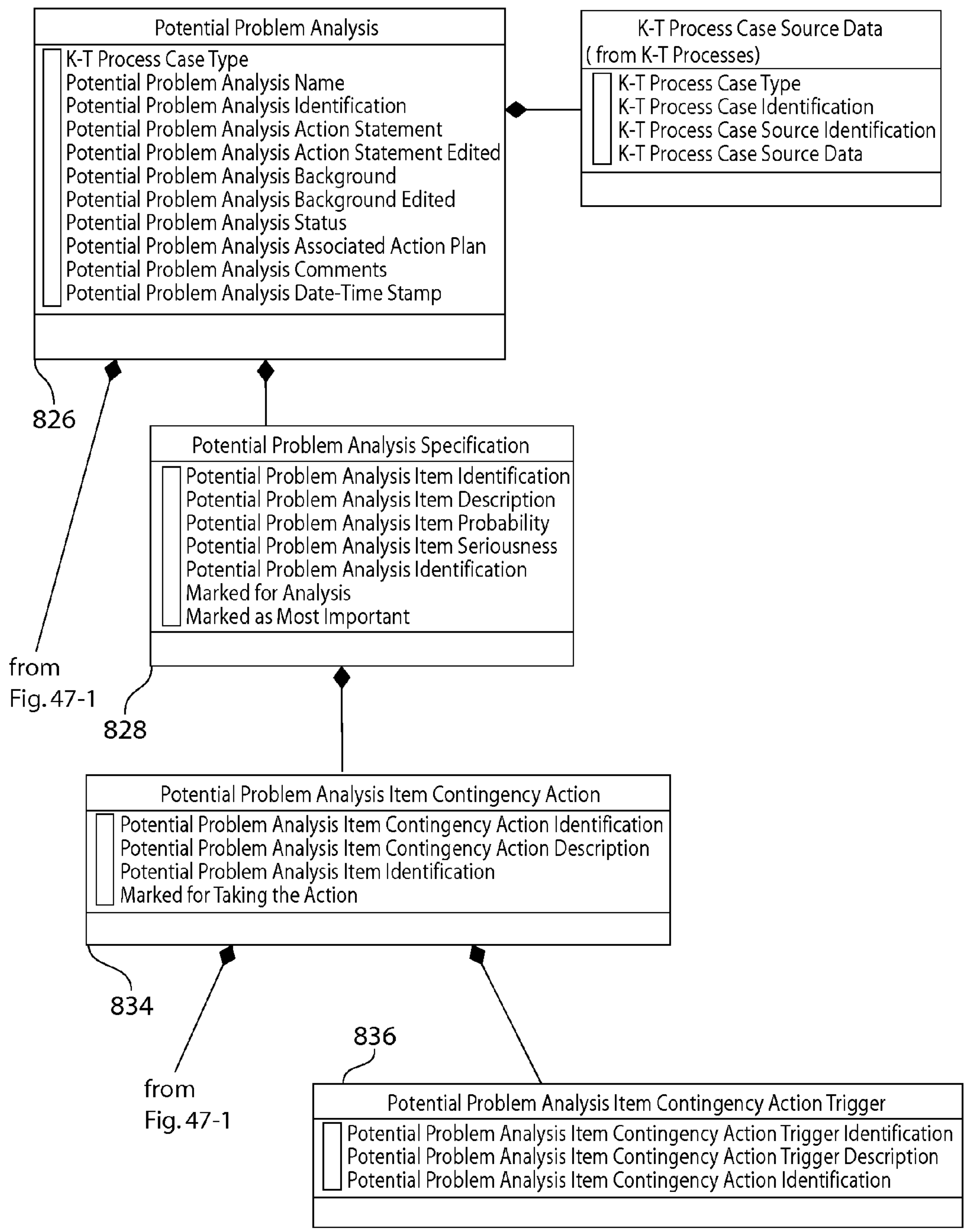
Figures 3, 47:
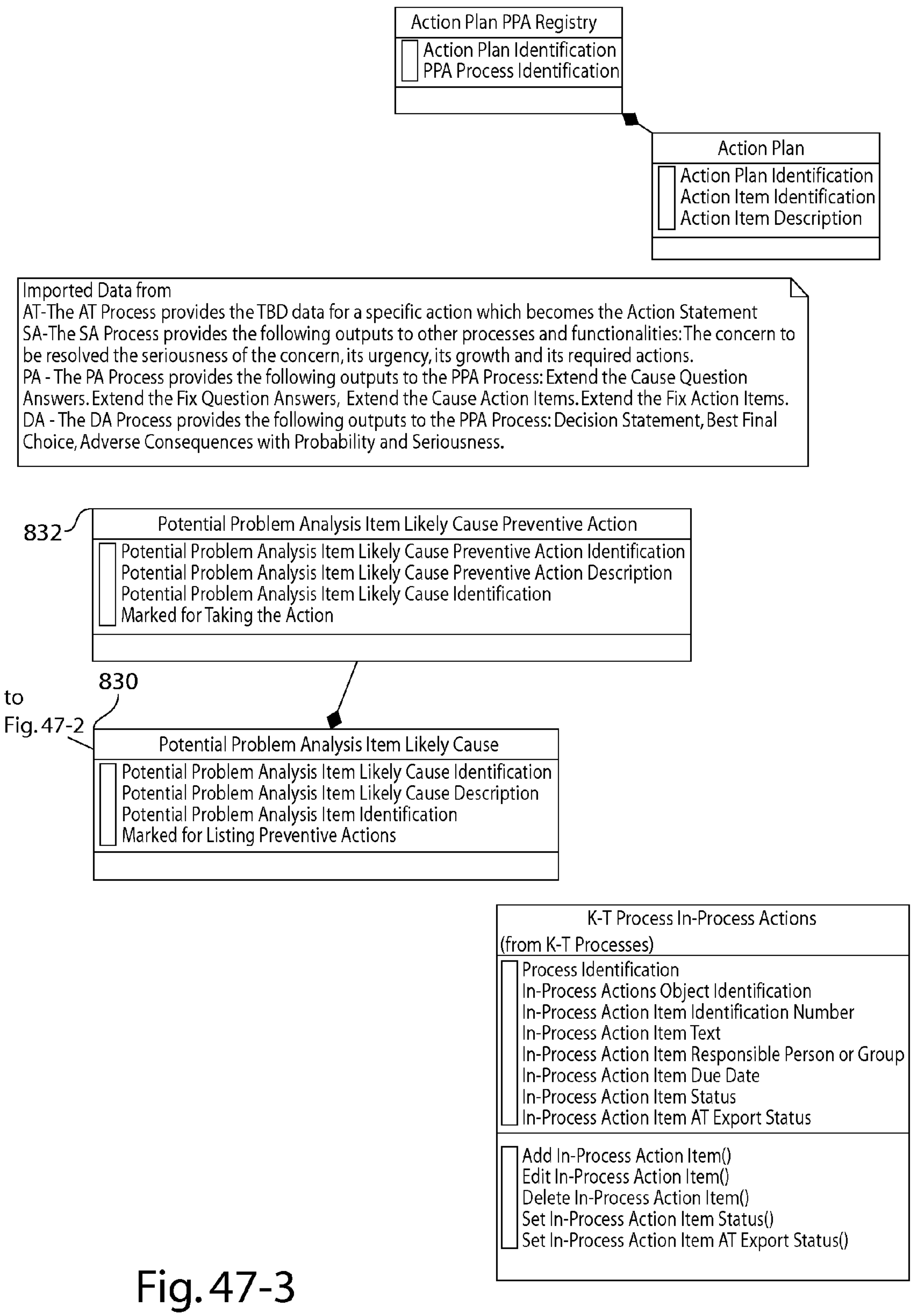

FIG. 47 shows the class inheritance graph for the potential problem analysis screen sequence. POTENTIAL PROBLEM ANALYSIS class 826 is derived from the general PROCESS class 800, and also handles the action statement. Action description, probability, and seriousness are handled by POTENTIAL PROBLEM ANALYSIS SPECIFICATION class 828. Likely causes and preventative actions are handled by the LIKELY CAUSES AND PREVENTATIVE ACTION classes 830 and 832, respectively. Contingent actions and the associated triggers are handled by CONTINGENCY ACTION and ACTION TRIGGER classes 834 and 836, respectively.

Figures 1, 47A:
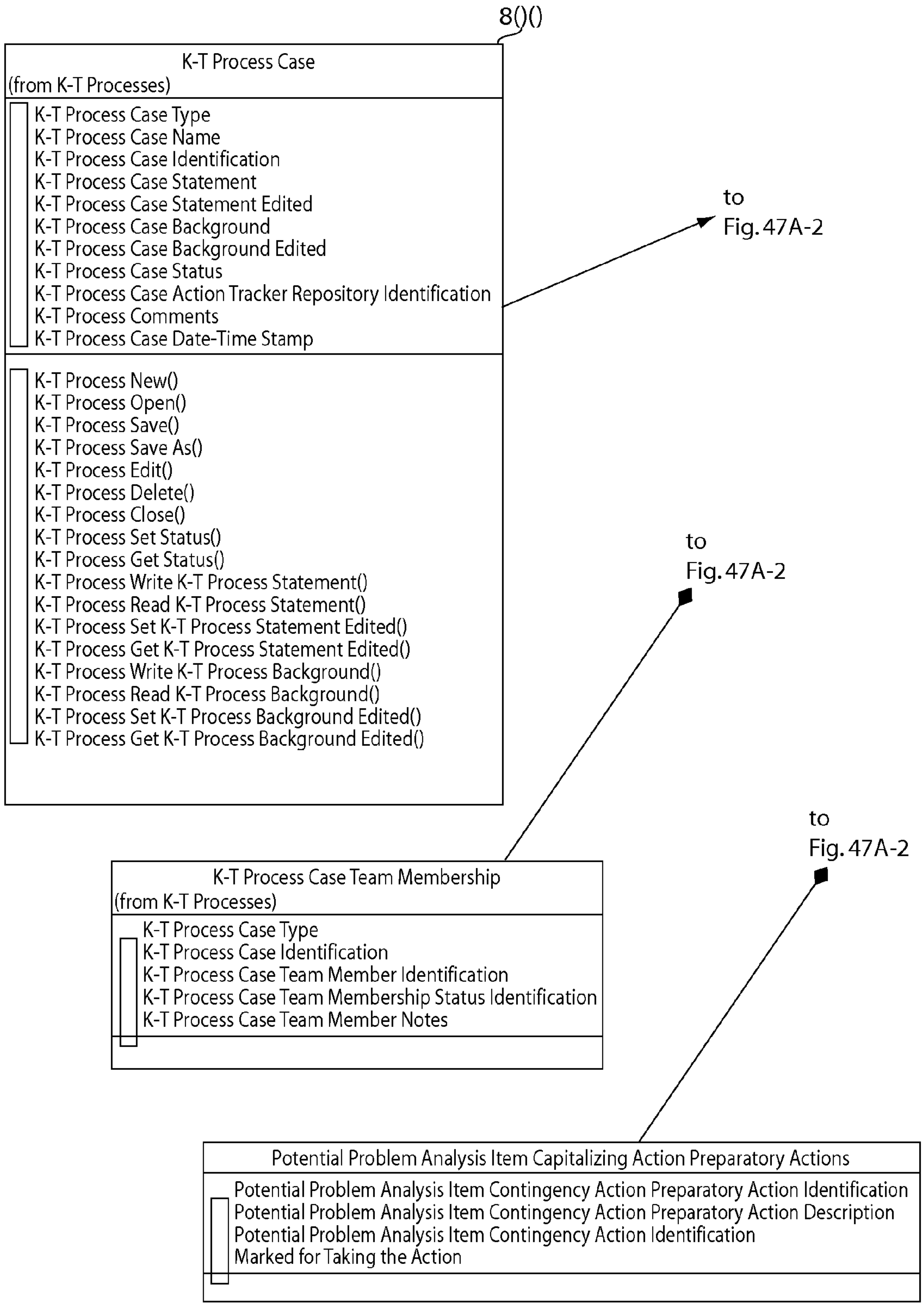
FIG. 47*a* shows the potential opportunity analysis class inheritance graph.
Figures 2, 47A:
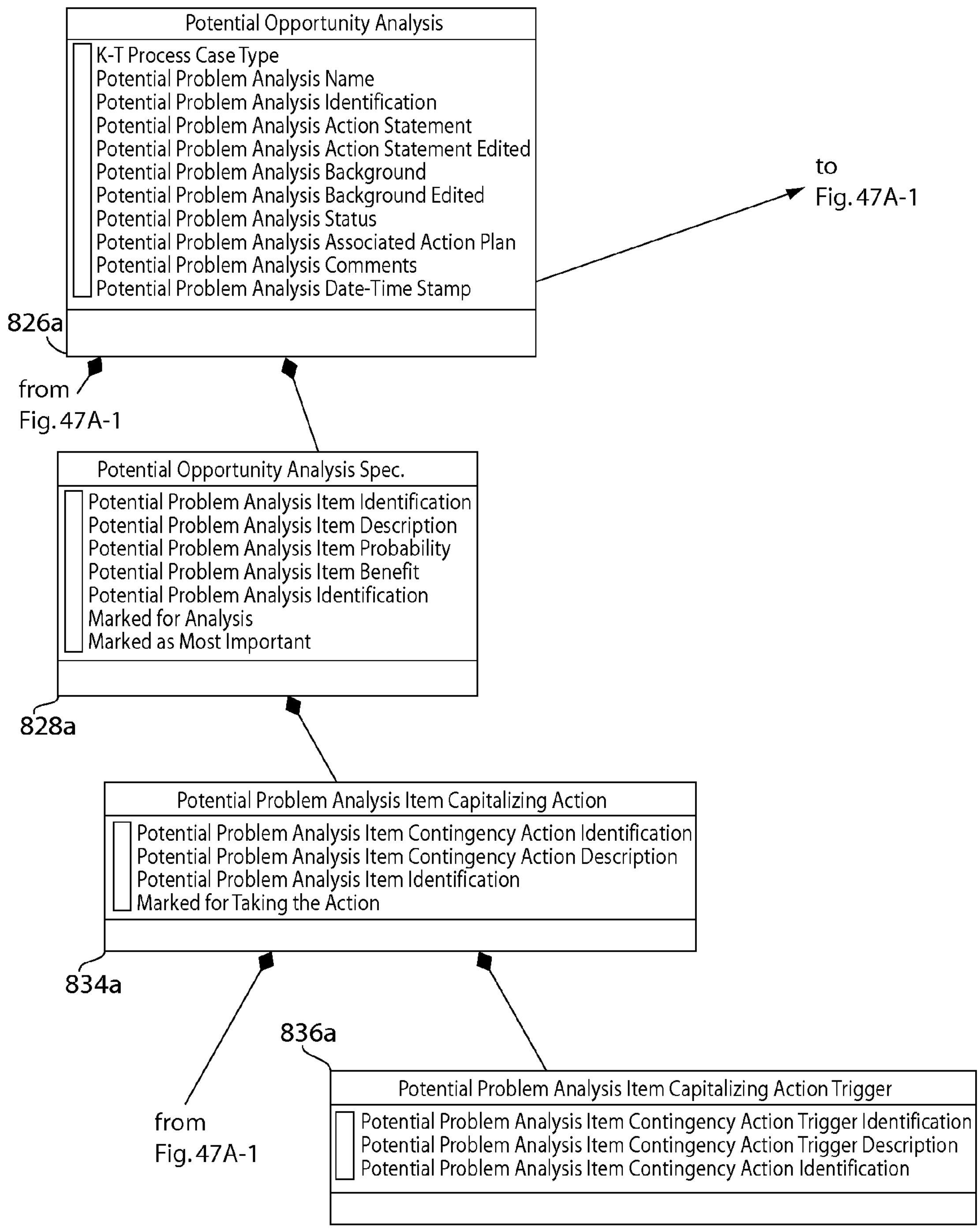
Figures 3, 47A:
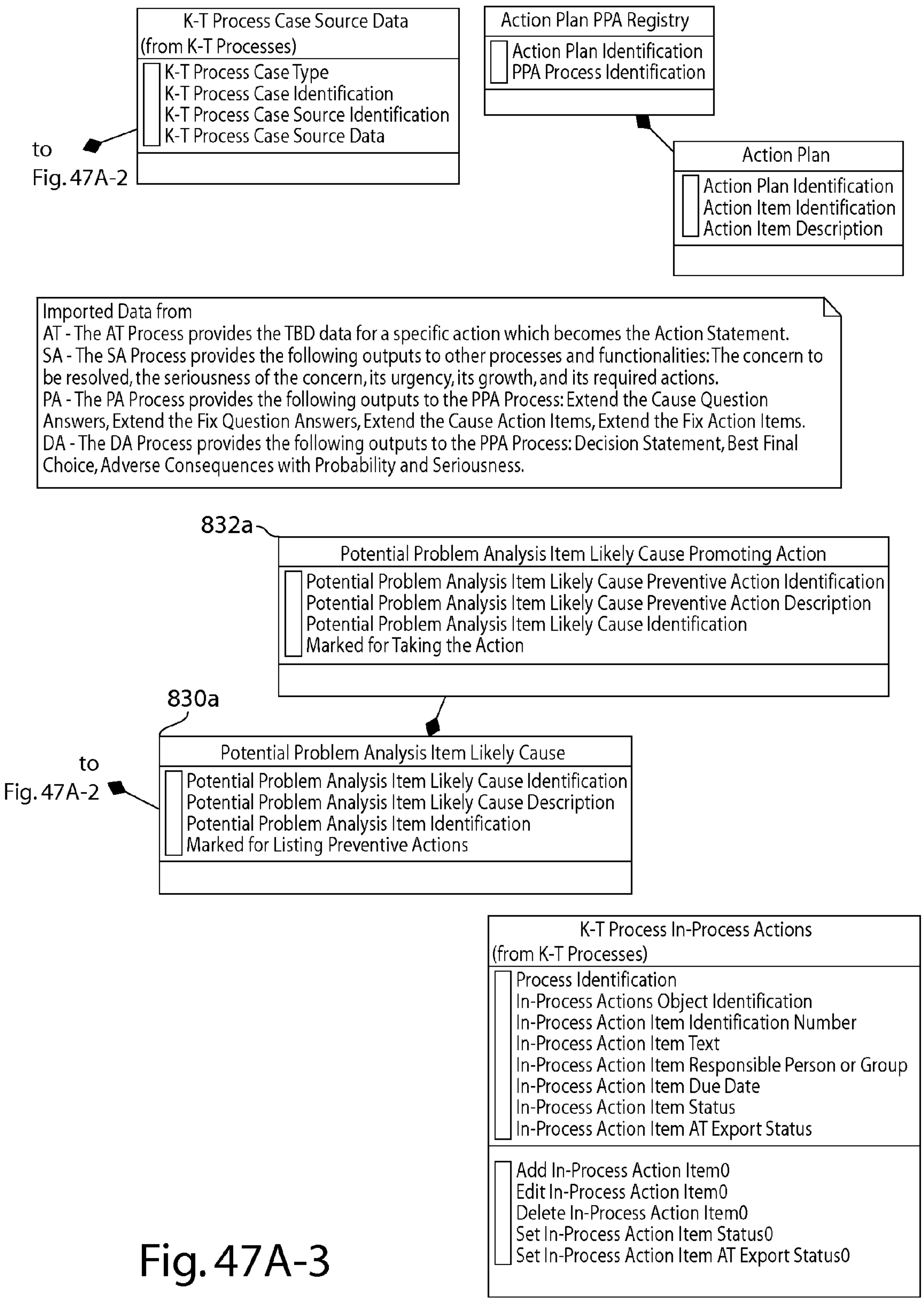

FIG. 47*a* shows the class inheritance graph for the potential opportunity analysis screen sequence. POTENTIAL OPPORTUNITY ANALYSIS class 826*a* is derived from the general PROCESS class 800*a*, and also handles the action statement. Action description, probability, and benefit are handled by POTENTIAL OPPORTUNITY ANALYSIS SPECIFICATION class 828*a*. Likely causes and promoting actions are handled by the LIKELY CAUSES AND PROMOTING ACTION classes 830*a* and 832*a*, respectively. Capitalizing actions and the associated triggers are handled by CAPITALIZING ACTION and ACTION TRIGGER classes 834*a* and 836*a*, respectively.

Figures 1, 48:
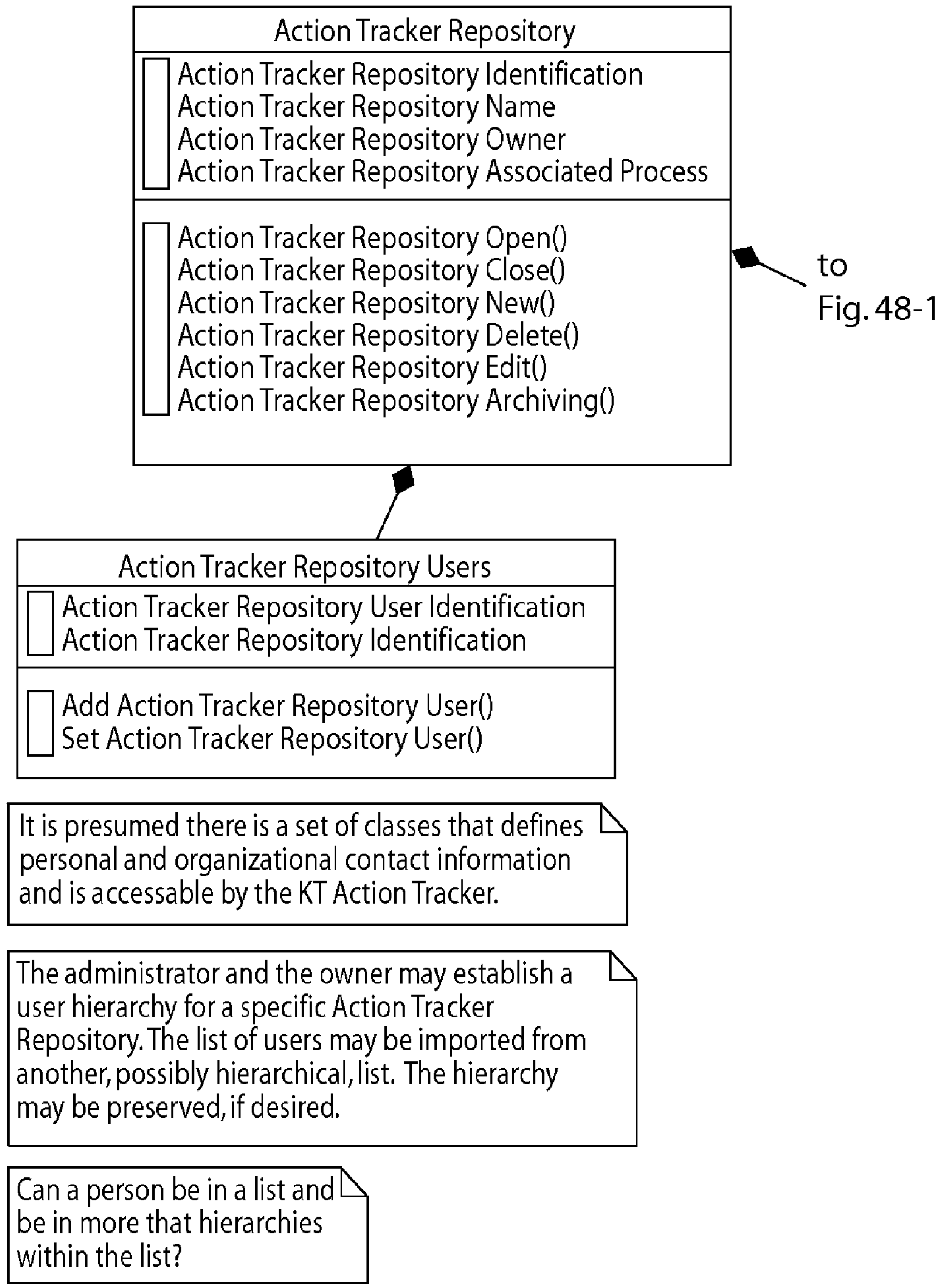
FIG. 48 shows the action tracker class inheritance graph.
Figures 2, 48:
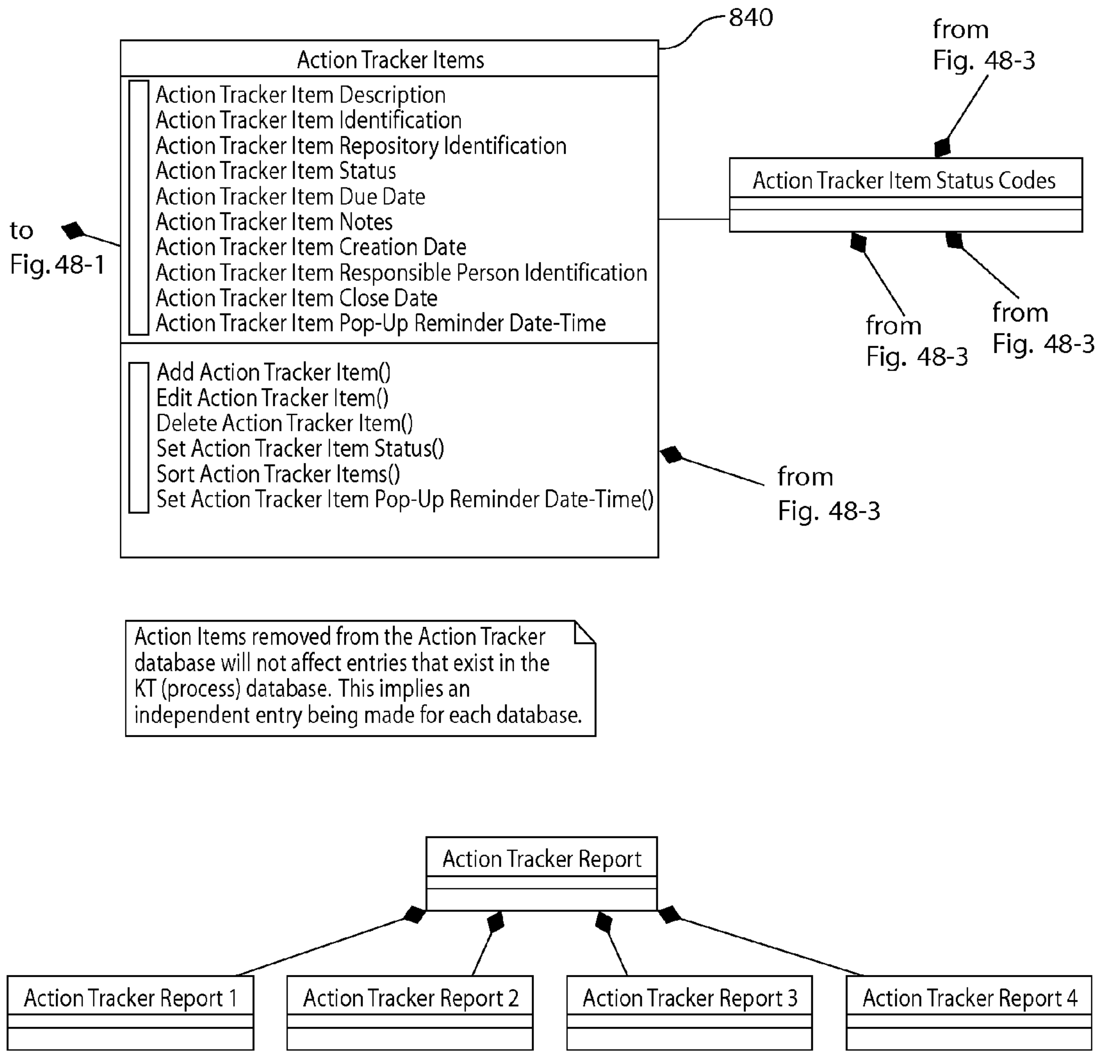
Figures 3, 48:
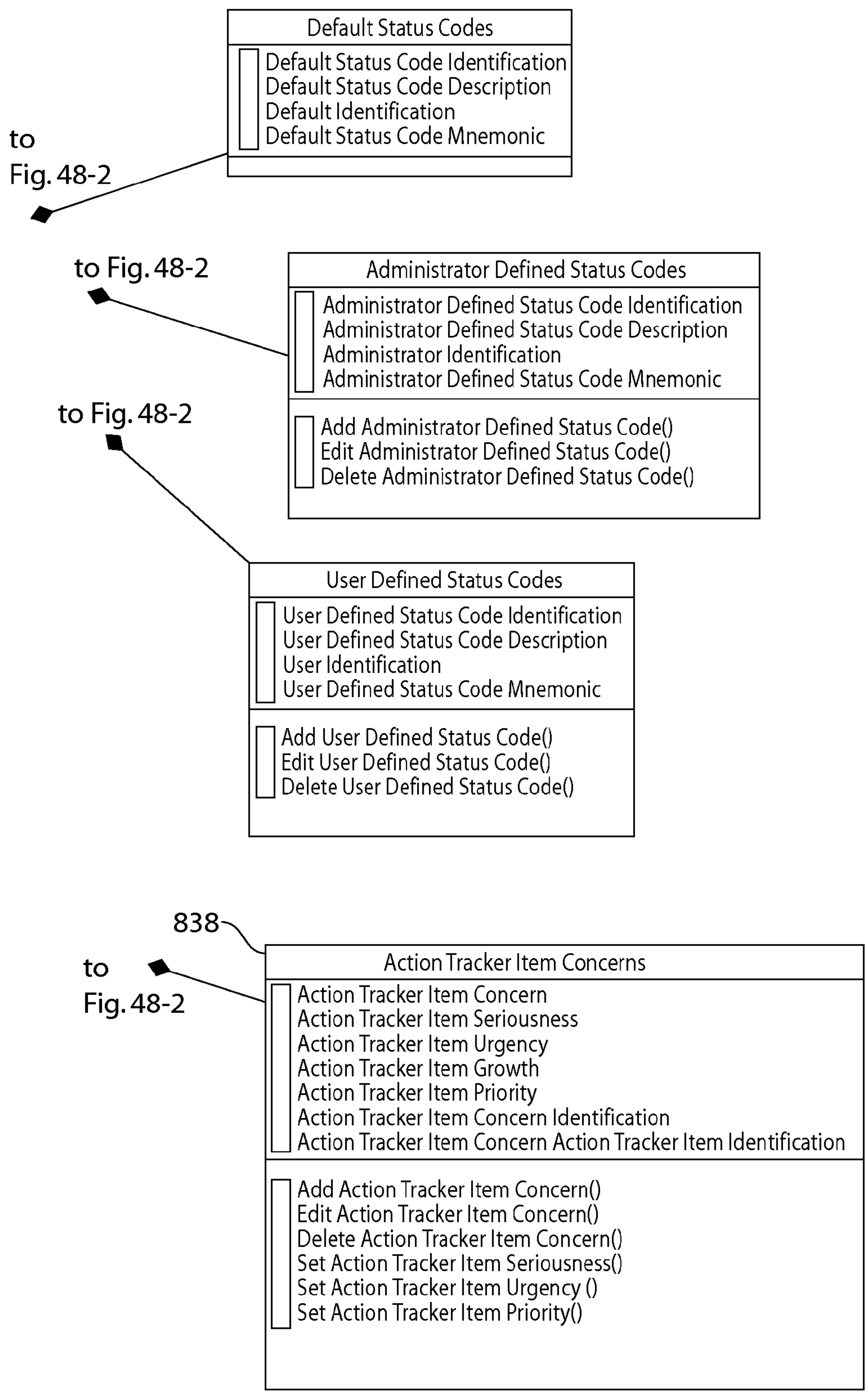

Action tracker inheritance graph is shown on FIG. 48. ACTION TRACKER CONCERNS class 838 manipulates concerns and the related ranking cells of seriousness, urgency, growth, and priority as defined above. Action descriptions and associated logistic scheduling data is manipulated by ACTION TRACKER ITEMS class 840.

As various extensions and modifications to the present invention, including alternate embodiments of screen layout, sequence, and input methods may be apparent to those skilled in the art, the present invention is not intended to be limited except by the following claims.

What is claimed is:

1. A process for eliciting, processing, storing, and displaying information concerning a complex business situation, the process comprising:

employing a knowledge base providing for structured storage and retrieval of data stored in an indexed and normalized form;

employing at a) a situation appraisal process to elicit, store, retrieve and present situation data, the situation data including (i) concerns about the situation and respective attributes of the concerns, the attributes of each concern including a relative priority and a process to be used for further analysis, and (ii) actions to be taken to address the concerns;

b) a problem analysis process to elicit, store, retrieve and present problem data including an object of a problem in the situation and attributes of the object, the attributes including a deviation, possible causes, actions to be taken to confirm a true cause, a confirmed true cause, and actions to be taken to address the confirmed true cause;

c) a decision analysis process to elicit, store, retrieve and present decision data, the decision data including (i) objectives of a decision regarding the situation and respective attributes of the objectives, the attributes of each objective including an indication of relative importance and at least one alternative, (ii) for each alternative a set of risks and respective probabilities and consequences, (iii) a final decision regarding alternatives to be pursued, and (iv) actions to be taken to implement the final decision; and d) a potential side effect analysis process to elicit, store, and present potential side effect data, the side effect data including potential side effects of an action to be taken to address the situation and respective attributes of the potential side effects, the attributes of each potential side effect including a likely cause, actions to be taken to influence the likelihood of occurrence of the side effect, and actions to be taken in the event of occurrence of the side effect; and employing an action tracker process to (i) retrieve and present actions from the other processes, and (ii) to elicit, store, retrieve and present attributes of the actions, the attributes of each action including a responsible person, a deadline, and status;

wherein each process employs a corresponding set of graphical user interface (GUI) process screens in eliciting data from and presenting data to a user;

wherein each process further includes providing user performance support that includes providing examples to the user regarding the data being elicited upon an indication by the user that such providing of examples is desired; and wherein each analysis process further includes process checking to screen and filter data input by the user to ensure the completeness and correctness thereof.

2. Previously added) A process according to claim 1, wherein providing user performance support includes coaching the user by providing explanations and suggestions about the data being elicited upon an indication by the user that such coaching is desired.

3. A process according to claim 1, wherein providing user performance support includes providing pop-up definitions of highlighted terms appearing on the GUI process screens in response to the user's selection thereof.

4. A process according to claim 1, wherein the process checking includes misstated information checking to detect skipped steps, unsound data, and incomplete analysis.

5. A process according to claim 1, wherein the process checking includes common pitfall checking to advise the user of pitfalls that can be encountered as a result of impreciseness in the data entered by the user.

6. A process according to claim 1, wherein the process checking includes sharpening to successively refine entered data considered to be critical to proper analysis.

7. A process according to claim 1, wherein the process checking includes notifying the user upon detection of incomplete or incorrect data.

8. A process according to claim 7, wherein notifying the user comprises displaying a message to the user as the user attempts to advance to a succeeding GUI process screen.

9. A process according to claim 7, wherein notifying the user comprises displaying a message to the user immediately upon detection of the incomplete or incorrect data.

10. A process according to claim 1, wherein each analysis process further includes disabling the process checking at the request of the user.

11. A process according to claim 1, wherein each analysis process is usable in either a worksheet mode or an interview mode, each mode being associated with a different set of the GUI process screens, the interview mode GUI process screens containing specific questions to elicit a proper type of data from a user.

12. A process according to claim 11, wherein the interview mode GUI process screens include transition screens each summarizing a respective set of process steps to be performed in an immediately-following set of GUI process screens.

13. A process according to claim 11, wherein the interview mode GUI process screens include summary screens each summarizing a respective set of process steps performed and the data entered in an immediately-preceding set of GUI process screens.

14. A process according to claim 11, further operative to toggle between worksheet mode and interview mode upon user demand.

15. A process according to claim 1, wherein the attributes for each concern included in the situation data further include seriousness, urgency, and growth of the concern.

16. A process according to claim 1, wherein the attributes of each object included in the problem data further include a location and a date pertaining to a deviation thereof.

17. A process according to claim 1, wherein the attributes of each object included in the problem data further include "is" and "is not" descriptions.

18. A process according to claim 17, wherein the attributes of each object further include distinctions and changes.

19. A process according to claim 1, wherein the attributes of each object included in the problem data further include conditions and assumptions associated with the possible causes.

20. A process according to claim 1, wherein the indication of relative importance of each objective included in the decision data includes a classification as either a "must" or a "want" and a weight for each objective classified as a "want".

21. A process according to claim 1, wherein the attributes of at least one objective include multiple alternatives for pursuing the objective, and wherein the decision analysis process further includes ranking the alternatives according to desirability in pursuing the objective.

22. A process according to claim 1, wherein the side effect analysis process is a potential problem analysis process, the side effect data is problem data, the potential side effects are potential problems, the likelihood-influencing actions for each potential problem are preventative actions to reduce the likelihood of occurrence, and the event-occurrence actions for each potential problem are contingent actions to diminish the effect of occurrence.

23. A process according to claim 1, wherein the side effect analysis process is a potential opportunity analysis process, the side effect data is opportunity data, the potential side effects are potential opportunities, the likelihood-influencing actions for each potential opportunity are promoting actions to increase the likelihood of occurrence, and the event-occurrence actions for each potential opportunity are capitalizing actions to enhance the effect of occurrence.

24. A process according to claim 1, wherein the action tracking process further includes eliciting, storing, retrieving, and presenting process data from at least one of the other processes in addition to the associated actions.

25. A process according to claim 24, wherein the process data includes concerns from the situation appraisal process.

26. A process according to claim 24, wherein the process data includes objects from the problem analysis process.

27. A process according to claim 24, wherein the process data includes decisions from the decision analysis process.

28. A process according to claim 24, wherein the process data includes potential side effects from the potential side effect analysis process.

29. A process according to claim 1, wherein the knowledge base is adapted for structured storage and retrieval of keywords by the processes, and wherein each process further includes (i) assisting the user in identifying keywords in the elicited data, (ii) storing the identified keywords in the knowledge base, and (iii) executing keyword searches of the knowledge base upon the user's demand.

30. A process according to claim 1, wherein the GUI process screens contain cells capable of receiving user-entered data and capable of being associated with complex data objects stored in the knowledge base, and wherein each process further includes receiving such user-entered data into the cells and associating such complex data objects with the cells as directed by the user.

31. A process according to claim 1, wherein each analysis process further includes a notes cell used to enter clarifying notes.

32. A process according to claim 1, further operative to generate reports containing selected portions of the data concerning the complex business situation.

33. A process according to claim 1, further operative to generate electronic mail messages containing actions from one or more of the processes and to send the mail messages to one or more other users of the computer program.

34. A process according to claim 33, further operative to automatically initiate the generating and sending of the electronic mail messages.

35. A process according to claim 33, further operative to send the electronic mail messages to recipients who are not users of the computer program.

36. A process according to claim 1, wherein the action tracker process further includes:

selecting a previously entered action file for at least one of review and update, the action file selected from action files on user's systems across a network so as to achieve enterprise wide monitoring of the various process screen sequences being undertaken;

selecting a concern from the concerns stored in the selected action file; displaying actions entered for the selected concern; and sorting the actions according to specified sort criteria.

37. A process according to claim 36, wherein the actions are sorted and presented by the when attribute.

38. A process according to claim 36, wherein the actions are sorted and presented by the who attribute.

39. A process according to claim 36, wherein the actions are sorted and presented by the status attribute.

40. A process according to claim 1, wherein each analysis process further includes querying the knowledge base to draw upon knowledge obtained from prior performances of the processes.

41. A process according to claim 40, wherein the querying includes retrieving previously-created queries from the knowledge base and querying the knowledge base therewith.

42. A process according to claim 1, further including specifying an individual responsible for a specified task.

43. A process according to claim 1, wherein multiple users are able to access the data in the knowledge base concerning the complex business situation.

44. A process according to claim 43, wherein a user is able to selectively incorporate data provided by other users into the knowledge base in association with the complex business situation.

45. A process according to claim 43, wherein (i) multiple users are able to copy data from the knowledge base for respective individual use, and (ii) the multiple users are able to store respective separate copies of the data in the knowledge base.

46. A computer-readable medium containing a computer program for eliciting, processing, storing, and displaying information concerning a complex business situation, the computer program comprising: program code for accessing a knowledge base stored in an indexed and normalized form and providing for structured storage and retrieval of data a situation appraisal module operative to elicit, store, retrieve and present situation data, the situation data including (i) concerns about the situation and respective attributes of the concerns, the attributes of each concern including a relative priority and a process to be used for further analysis, and (ii) actions to be taken to address the concerns;

a problem analysis module operative to elicit, store, retrieve and present problem data including an object of a problem in the situation and attributes of the object, the attributes including a deviation, possible causes, actions to be taken to confirm a true cause, a confirmed true cause, and actions to be taken to address the confirmed true cause;

a decision analysis module operative to elicit, store, retrieve and present decision data, the decision data including (i) objectives of a decision regarding the situation and respective attributes of the objectives, the attributes of each objective including an indication of relative importance and at least one alternative, (ii) for each alternative a set of risks and respective probabilities and consequences, (iii) a final decision regarding alternatives to be pursued, and (iv) actions to be taken to implement the final decision;

a potential side effect analysis module operative to elicit, store, and present potential side effect data, the side effect data including potential side effects of an action to be taken to address the situation and respective attributes of the potential side effects, the attributes of each potential side effect including a likely cause, actions to be taken to influence the likelihood of occurrence of the side effect, and actions to be taken in the event of occurrence of the side effect; and an action tracker module operative to (i) retrieve and present actions from the other processes, and (ii) to elicit, store, retrieve and present attributes of the actions, the attributes of each action including a responsible person, a deadline, and status;

wherein each module employs a corresponding set of graphical user interface (GUI) modules screens in eliciting data from and presenting data to a user;

wherein each module further includes providing user performance support that includes providing examples to the user regarding the data being elicited upon an indication by the user that such providing of examples is desired; and wherein each module further includes module checking to screen and filter data input by the user to ensure the completeness and correctness thereof.

47. A computer-readable medium according to claim 46, wherein providing user performance support includes coaching the user by providing explanations and suggestions about the data being elicited upon an indication by the user that such coaching is desired.

48. A computer-readable medium according to claim 46, wherein, providing user performance support includes providing pop-up definitions of highlighted terms appearing on the GUI process screens in response to the user's selection thereof.

49. A computer-readable medium according to claim 46, wherein the module checking includes misstated information checking to detect skipped steps, unsound data, and incomplete analysis.

50. A computer-readable medium according to claim 46, wherein the module checking includes common pitfall checking to advise the user of pitfalls that can be encountered as a result of impreciseness in the data entered by the user.

51. A computer-readable medium according to claim 46, wherein the module checking includes sharpening to successively refine entered data considered to be critical to proper analysis.

52. A computer-readable medium according to claim 46, wherein the module checking includes notifying the user upon detection of incomplete or incorrect data.

53. A computer-readable medium according to claim 52, wherein notifying the user comprises displaying a message to the user as the user attempts to advance to a succeeding GUI process screen.

54. A computer-readable medium according to claim 52, wherein notifying the user comprises displaying a message to the user immediately upon detection of the incomplete or incorrect data.

55. A computer-readable medium according to claim 46, wherein each module further includes disabling the module checking at the request of the user.

56. A computer-readable medium according to claim 46, wherein each module is usable in either a worksheet mode or an interview mode, each mode being associated with a different set of the GUI process screens, the interview mode GUI process screens containing specific questions to elicit a proper type of data from a user.

57. A computer-readable medium according to claim 56, wherein the interview mode GUI process screens include transition screens each summarizing a respective set of process steps to be performed in an immediately-following set of GUI process screens.

58. A computer-readable medium according to claim 56, wherein the interview mode GUI process screens include summary screens each summarizing a respective set of process steps performed and the data entered in an immediately-preceding set of GUI process screens.

59. A computer-readable medium according to claim 56, wherein each module further includes toggling between worksheet mode and interview mode upon user demand.

60. A computer-readable medium according to claim 46, wherein the attributes for each concern included in the situation data further include seriousness, urgency, and growth of the concern.

61. A computer-readable medium according to claim 46, wherein the attributes of each object included in the problem data further include a location and a date pertaining to a deviation thereof.

62. A computer-readable medium according to claim 46, wherein the attributes of each object included in the problem data further include "is" and "is not" descriptions.

63. A computer-readable medium according to claim 62, wherein the attributes of each object further include distinctions and changes.

64. A computer-readable medium according to claim 46, wherein the attributes of each object included in the problem data further include conditions and assumptions associated with the possible causes.

65. A computer-readable medium according to claim 46, wherein the indication of relative importance of each objective included in the decision data includes a classification as either a "must" or a "want" and a weight for each objective classified as "want".

66. A computer-readable medium according to claim 46, wherein :he attributes of at least one objective include multiple alternatives for pursuing the objective, and wherein the decision analysis process further includes ranking the alternatives according to desirability in pursuing the objective.

67. A computer-readable medium according to claim 46, wherein the side effect analysis module is a potential opportunity analysis module, the side effect data is problem data, the potential side effects are potential problems, the likelihood-influencing actions for each potential problem are preventative actions to reduce the likelihood of occurrence, and the event-occurrence actions for each potential problem are contingent actions to diminish the effect of occurrence.

68. A computer-readable medium according to claim 46, wherein the side side effect analysis module is a potential opportunity analysis module, the side effect data is opportunity data, the potential side effects are potential opportunities, the likelihood-influencing actions for each potential opportunity are promoting actions to increase the likelihood of occurrence, and the event-occurrence actions for each potential opportunity are capitalizing actions to enhance the effect of occurrence.

69. A computer-readable medium according to claim 46, wherein the action tracking module further includes eliciting, storing, retrieving, and presenting module data from at least one of the other modules in addition to the associated actions.

70. A computer-readable medium according to claim 46, wherein the module data includes concerns from the situation appraisal module.

71. A computer-readable medium according to claim 69, wherein the module data includes objects from the problem analysis module.

72. A computer-readable medium according to claim 69, wherein the module data includes decisions from the decision analysis module.

73. A computer-readable medium according to claim 69, wherein the module data includes potential side effects from the potential side effect analysis module.

74. A computer-readable medium according to claim 46, wherein the knowledge base is adapted for structured storage and retrieval of keywords by the modules, and wherein each module further includes (i) assisting the user in identifying keywords in the elicited data, (ii) storing the identified keywords in the knowledge base, and (iii) executing keyword searches of the knowledge base upon the user's demand.

75. A computer-readable medium according to claim 46, wherein the GUI process screens contain cells capable of receiving user-entered data and capable of being associated with complex data objects stored in the knowledge base, and wherein each module further includes receiving such user-entered data into the cells and associating such complex data objects with the cells as directed by the user.

76. A computer-readable medium according to claim 46, wherein each module further includes a notes cell to enter clarifying notes.

77. A computer-readable medium according to claim 46, wherein the computer program further comprises a report writer program code module operative to perform a report writer process, the report writer process including generating reports containing selected portions of the data concerning the complex business situation.

78. A computer-readable medium according to claim 46, wherein the computer program further comprises electronic mail program code operative to generate electronic mail messages containing actions from one or more of the modules and to send the mail messages to one or more other users of the computer program.

79. A computer-readable medium according to claim 78, wherein the electronic mail program code is further operative to automatically initiate the generating and sending of the electronic mail messages.

80. A computer-readable medium according to claim 78, wherein the electronic mail program code is further operative to send the electronic mail messages to recipients who are not users of the computer program.

81. A computer-readable medium according to claim 46, wherein the action tracker process further includes:

selecting a previously entered action file for at least one of review and update, the action file selected from action files on user's systems across a network so as to achieve enterprise wide monitoring of the various process screen sequences being undertaken;

selecting a concern from the concerns stored in the selected action file; displaying actions entered for the selected concern; and sorting the actions according to specified sort criteria.

82. A computer-readable medium according to claim 81, wherein the actions are sorted and presented by the when attribute.

83. A computer-readable medium according to claim 81, wherein the actions are sorted and presented by the who attribute.

84. A computer-readable medium according to claim 81, wherein the actions are sorted and presented by the status attribute.

85. A computer-readable medium according to claim 46, wherein each analysis module further includes querying the knowledge base to draw upon knowledge obtained from prior performances of the processes.

86. A computer-readable medium according to claim 85, wherein the querying includes retrieving previously-created queries from the knowledge base and querying the knowledge base therewith.

87. A computer-readable medium according to claim 46, wherein the computer program contains program code operative to specify an individual responsible for executing a specified task.

88. A computer-readable medium according to claim 46, wherein the computer program contains program code operative to enable multiple users to access the data in the knowledge base concerning the complex business situation.

89. A computer-readable medium according to claim 88, wherein the access-enabling program code is further operative to enable a user to selectively incorporate data provided by other users into the knowledge base in association with the complex business situation.

90. A computer-readable medium according to claim 88, wherein the access-enabling program code is further operative to (i) enable the multiple users to copy data from the knowledge base for respective individual use, and (ii) enable the multiple users to store respective separate copies of the data in the knowledge base.

* * * * *

UNITED STATES PATENT AND TRADEMARK OFFICE

CERTIFICATE OF CORRECTION

PATENT NO. : 7,096,188 B1

APPLICATION NO. : 09/493783

DATED : August 22, 2006

INVENTOR(S) : James D. Schlick et al.

It is certified that error appears in the above-identified patent and that said Letters Patent is hereby corrected as shown below:

In the Claims:

In Claim 1, Column 23, Line 23, delete “employing at” and replace with --employing:--.

In Claim 2, Column 24, Line 7, delete “Previously added)” at the beginning of the claim.

In Claim 46, Column 27, Line 25, delete “other processes” and replace it with --other modules--.

In Claim 46, Column 27, Line 30, delete “modules screens” and replace with --process screens--.

In Claim 66, Column 28, Line 55, delete “:he” and replace with --the--.

In Claim 67, Column 28, Line 61, delete “potential opportunity” and replace with --potential problem--.

In Claim 68, Column 29, Line 2, delete “side side effect” and replace with --side effect--.

In Claim 85, Column 30, Line 29, delete “each analysis module” and replace with --each module--.

Signed and Sealed this

Twentieth Day of February, 2007

JON W. DUDAS

*Director of the United States Patent and Trademark Office*